US007610113B2

(12) United States Patent
Cocciadiferro et al.

(10) Patent No.: US 7,610,113 B2
(45) Date of Patent: Oct. 27, 2009

(54) OPERATIONAL CONTROL SYSTEM AND A SYSTEM PROVIDING FOR REMOTE MONITORING OF A MANUFACTURING DEVICE

(75) Inventors: Edward Cocciadiferro, Fletcher, NC (US); Todd Hanna, Tulsa, OK (US); Noelle Dye, Charlestown, MA (US)

(73) Assignee: Intellipack, Inc., Tulsa, OK (US)

( * ) Notice: Subject to any disclaimer, the term of this patent is extended or adjusted under 35 U.S.C. 154(b) by 125 days.

(21) Appl. No.: 10/841,821

(22) Filed: May 10, 2004

(65) Prior Publication Data

US 2005/0010323 A1    Jan. 13, 2005

Related U.S. Application Data

(62) Division of application No. 10/623,858, filed on Jul. 22, 2003, and a division of application No. 10/623,868, filed on Jul. 22, 2003.

(60) Provisional application No. 60/488,010, filed on Jul. 18, 2003, provisional application No. 60/488,102, filed on Jul. 18, 2003, provisional application No. 60/488,009, filed on Jul. 18, 2003, provisional application No. 60/458,983, filed on May 9, 2003, provisional application No. 60/468,982, filed on May 9, 2003.

(51) Int. Cl.
*G06F 19/00* (2006.01)
*G05B 15/02* (2006.01)
*G05B 9/02* (2006.01)
*G06F 11/30* (2006.01)
*G06F 11/00* (2006.01)

(52) U.S. Cl. .............................. 700/108; 700/9; 700/79; 700/122; 702/185; 702/186

(58) Field of Classification Search .................. 700/9, 700/26, 27, 79–81, 106, 108, 109, 174, 177, 700/299, 301, 122–126; 702/182–185, 188
See application file for complete search history.

(56) References Cited

U.S. PATENT DOCUMENTS 2,583,761 A    1/1952   Axelson (Continued)

FOREIGN PATENT DOCUMENTS

GB    2 291 620    1/1996

(Continued)

OTHER PUBLICATIONS

Allied Motion, Emoteq Corp., Engineered Motion Technology Brushless Motors and Drives, dated pulled from internet Feb. 20, 2003, file://C:\Documents%20and%20Settings\Administrator\Local%Setting\Temp\GW}000... (4 pgs).

(Continued)

*Primary Examiner*—Sean P Shechtman
(74) *Attorney, Agent, or Firm*—Smith, Gambrell & Russell, LLP

(57) ABSTRACT

A system and method for providing operational control and/or remote monitoring of a manufacturing device as in a foam dispenser device such as a foam-in-bag dispensing device. In architecture, the remote monitoring system includes a server device containing a remote monitoring system. The remote monitoring system further includes a transceiver to receive an indication of a help condition, connect to the manufacturing device; and receive data from the manufacturing device. The present invention can also be viewed as a method for providing remote monitoring of a manufacturing device. The method operates by (1) receiving an indication of a help condition; (2) connecting to the manufacturing device; and (3) receiving data from the manufacturing device. The operational control system is designed to control operation of one or more sub-systems of the manufacturing device as in a foam dispenser's chemical supply (proper temperature and pressure) and solvent supply as well as performance of a reciprocating valve device. With a foam-in-bag system, the control system provides for additional control over, for example, film feed and tensioning, bag edge and end seals as well as dispenser output into the bag. In a preferred embodiment, the operational control system and remote monitoring control interface with each other.

29 Claims, 66 Drawing Sheets

U.S. PATENT DOCUMENTS

| | | | |
|---|---|---|---|
| 2,833,909 A | 5/1958 | Levy | |
| 2,890,836 A | 6/1959 | Gusmer et al. | |
| 3,087,040 A | 4/1963 | Van Der Meulen | |
| 3,097,288 A | 7/1963 | Dunlop | |
| 3,253,122 A | 5/1966 | Kochmer et al. | |
| 3,263,928 A | 8/1966 | Gusmer | |
| 3,267,822 A | 8/1966 | Harrison | |
| 3,486,290 A | 12/1969 | Pretzer | |
| 3,553,059 A | 1/1971 | Stohlquist | |
| 3,687,370 A | 8/1972 | Sperry | |
| 3,770,938 A | 11/1973 | Agarate | |
| 3,976,230 A | 8/1976 | Sperry | |
| 4,090,640 A | 5/1978 | Smith et al. | |
| 4,138,718 A * | 2/1979 | Toke et al. | 700/7 |
| 4,154,368 A | 5/1979 | Gusmer et al. | |
| 4,213,031 A | 7/1980 | Farber | |
| 4,376,365 A | 3/1983 | Moertel | |
| 4,390,953 A | 6/1983 | Johnstone | |
| 4,568,003 A | 2/1986 | Sperry et al. | |
| 4,674,268 A | 6/1987 | Gavronsky et al. | |
| 4,800,708 A | 1/1989 | Sperry | |
| 4,854,109 A | 8/1989 | Piarer et al. | |
| 4,898,327 A | 2/1990 | Sperry et al. | |
| 4,983,007 A | 1/1991 | James et al. | |
| 4,999,975 A | 3/1991 | Willden et al. | |
| 5,005,765 A | 4/1991 | Kistner | |
| 5,050,776 A | 9/1991 | Rosenplanter | |
| 5,139,151 A | 8/1992 | Chelak | |
| 5,255,847 A | 10/1993 | Sperry et al. | 239/112 |
| 5,376,219 A | 12/1994 | Sperry et al. | |
| RE35,067 E * | 10/1995 | Bauknecht | 493/11 |
| 5,499,745 A | 3/1996 | Derian et al. | 222/136 |
| 5,531,357 A | 7/1996 | Guilmette | |
| 5,548,535 A | 8/1996 | Zvonar | |
| 5,575,435 A | 11/1996 | Sperry et al. | |
| 5,602,747 A * | 2/1997 | Rajala | 700/122 |
| 5,666,096 A | 9/1997 | VanZeeland | |
| 5,679,208 A | 10/1997 | Sperry et al. | |
| 5,709,317 A | 1/1998 | Bertram et al. | |
| 5,727,370 A | 3/1998 | Sperry | 53/472 |
| 5,942,076 A | 8/1999 | Salerno et al. | 156/359 |
| 5,964,378 A | 10/1999 | Sperry et al. | 222/145.2 |
| 5,983,594 A * | 11/1999 | Forman | 53/133.5 |
| 5,996,848 A | 12/1999 | Sperry et al. | |
| 6,003,288 A | 12/1999 | Sperry et al. | |
| 6,311,740 B1 | 11/2001 | Sperry et al. | |
| 6,550,229 B2 | 4/2003 | Sperry et al. | |
| 6,598,373 B2 | 7/2003 | Sperry et al. | 53/403 |
| 6,704,617 B2 * | 3/2004 | Cherfane et al. | 700/239 |
| 6,725,181 B2 * | 4/2004 | Hu et al. | 702/188 |

FOREIGN PATENT DOCUMENTS

| | | |
|---|---|---|
| GB | 2 357 389 | 6/2001 |
| JP | 11-268096 | 10/1999 |
| JP | 2000-155613 | 6/2000 |

OTHER PUBLICATIONS

Faulhaber, Brushless DC Motor Information, pulled from internet Apr. 23, 2002, www.micromo.com (1 page).

Web site showing TOSS Machine Components, Inc. heat seal equipment, http://www.packexpo.com/ve/37298/mainlhtml, printed off website on Jul. 15, 2003, (4 pgs).

AccuPak® Menu Direct Polyurethane Foam Packaging System, Flexible Products Company, (29 pages) (Nov. 1998).

Flexible Products "AccuPak Menu Direct", Supplemental Information Attachment I, AccuPak Menu Direct Wiring Diagram (1 page) with two pages of additional information under the heading "AccuPak 24—Heater Control Settings" (date not available) (presumed corresponds to Nov. 1998 date in AC above).

Flexible Products "AccuPak Menu Direct", Supplemental Information Attachment II, Heater Assembly (heated channel hose and wire connector interchange) (3 pgs) (date not available) (presumed corresponds to Nov. 1998 date in AC above).

Flexible Products "AccuPak Menu Direct", Supplemental Information Sheet, Attachment III, Manifold and Tubing Assembly Schematic (date not available) (presumed corresponds to Nov. 1998 date in AC above).

SpeedyPacker™ Foam-In-Bag Packaging System, User's Guide, Sealed Air Corporation, dated Jul. 2, 1996.

AccuFlow 20D, Electronic Manual, Flexible Products Company, Revised Oct. 21, 1998, (38 pages).

Instapak 901/970 Foam Packaging System, User's Guide, (1998).

\* cited by examiner

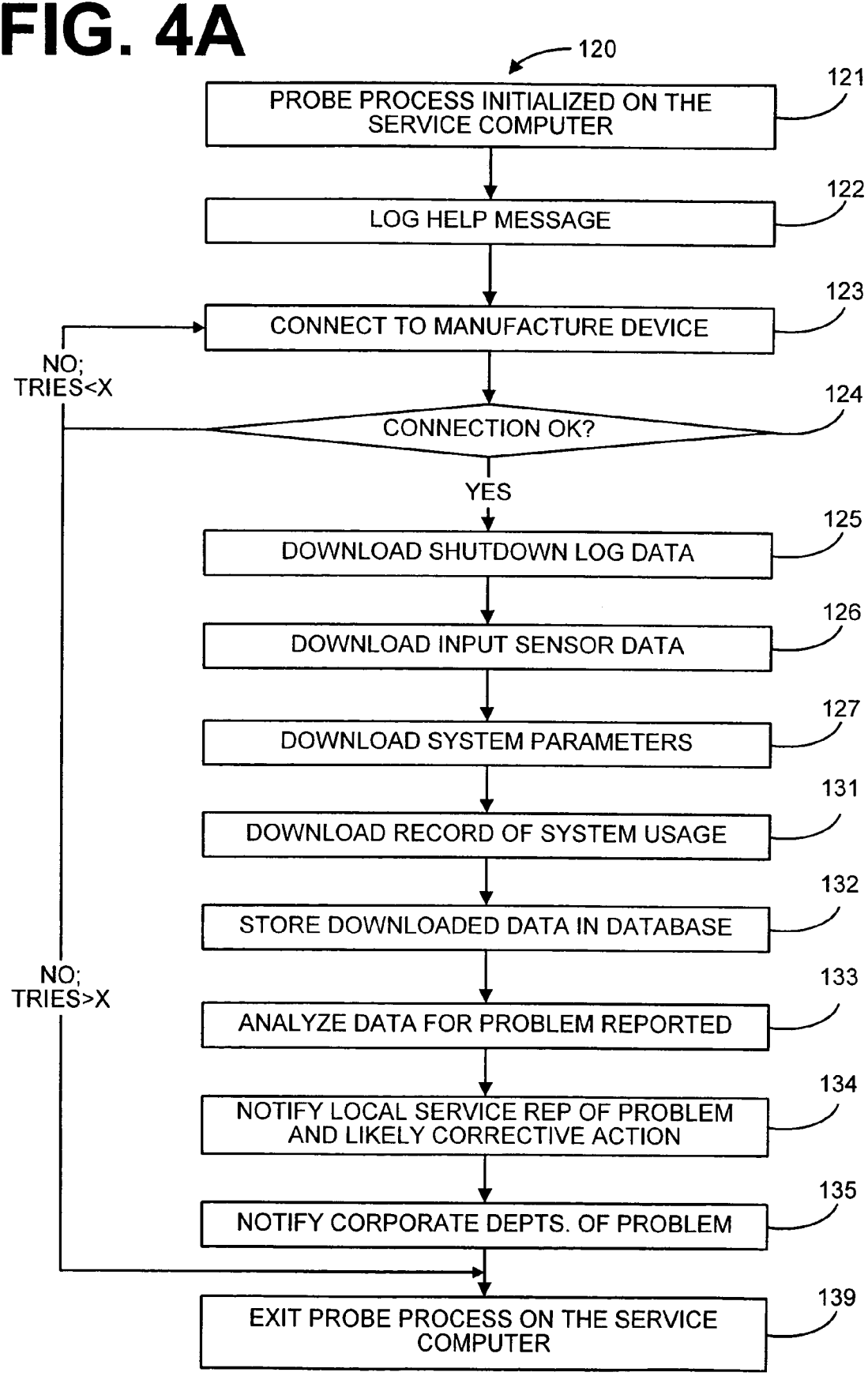

Legend

◯ⓂⓂ = Motor

···· = Linkage

⊗ = Pump

= Pump Shaft/Hose

▭ = Heating element (all orientations)

⋈ = Filter

⊥ = Pressure Transducer (all orientations)

▲▬ = Tip Cleaning Brush

= Solvent Pump

⬌ = Level Sensor

▱ = Mixing Module +

◯ = Idler Roller

◯◯ = Nip Rollers

∩ = Edge Seal Wire

| u∨u |
|-----|
| ∩∧∩ |

= Jaw Assembly (X-seal, X-cut, X-seal) +

FIG. 11A

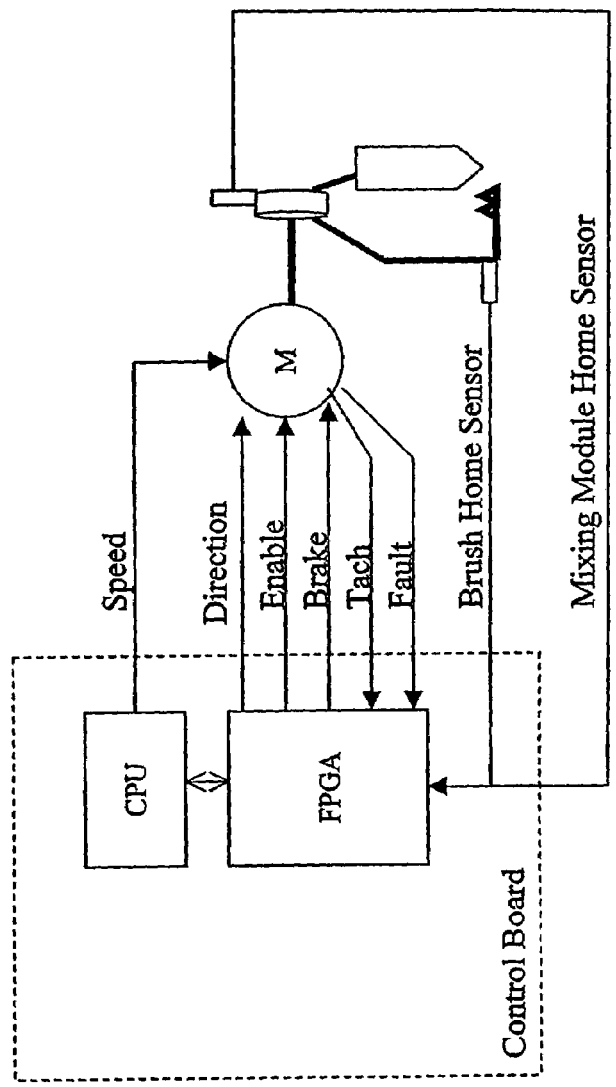

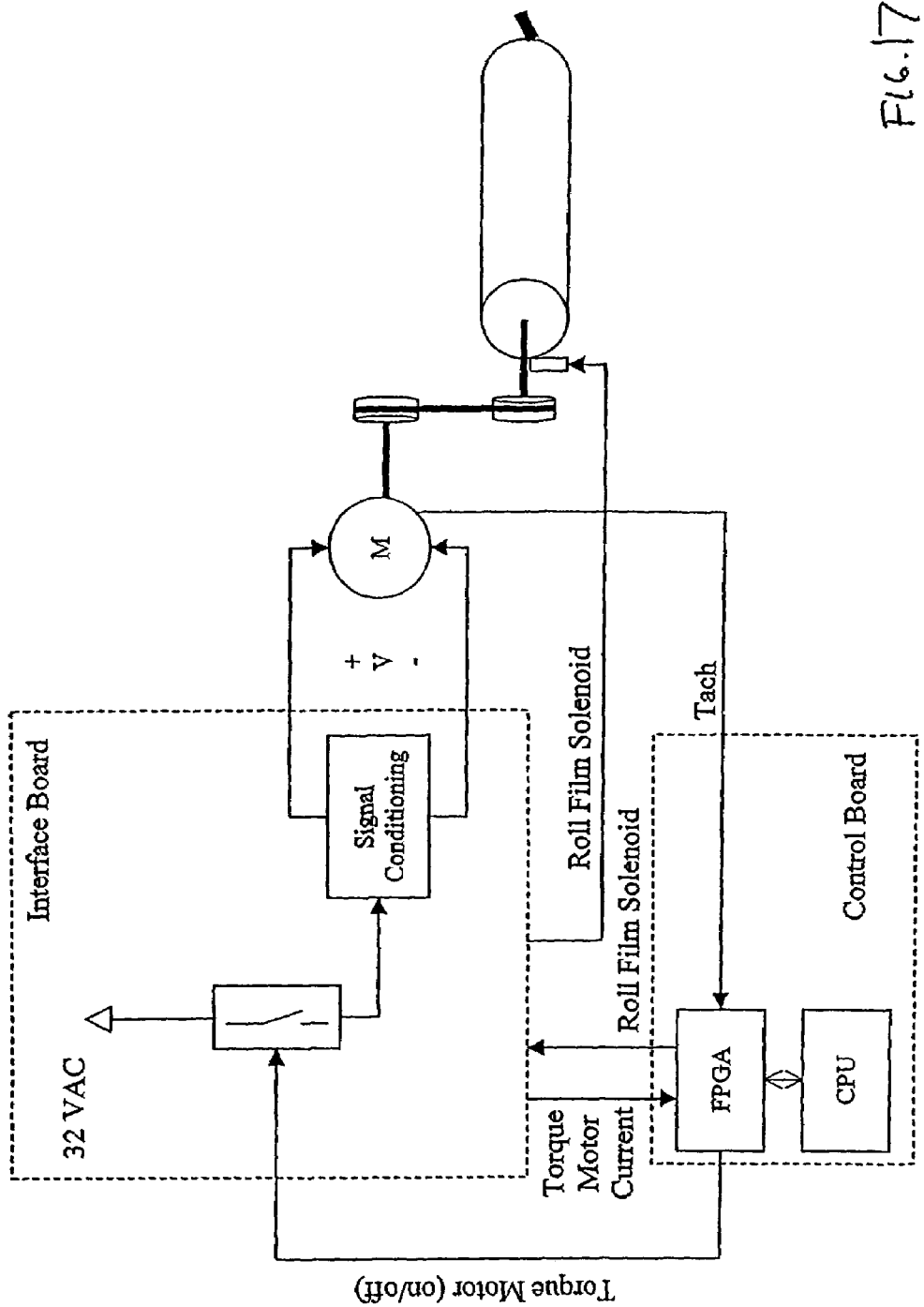

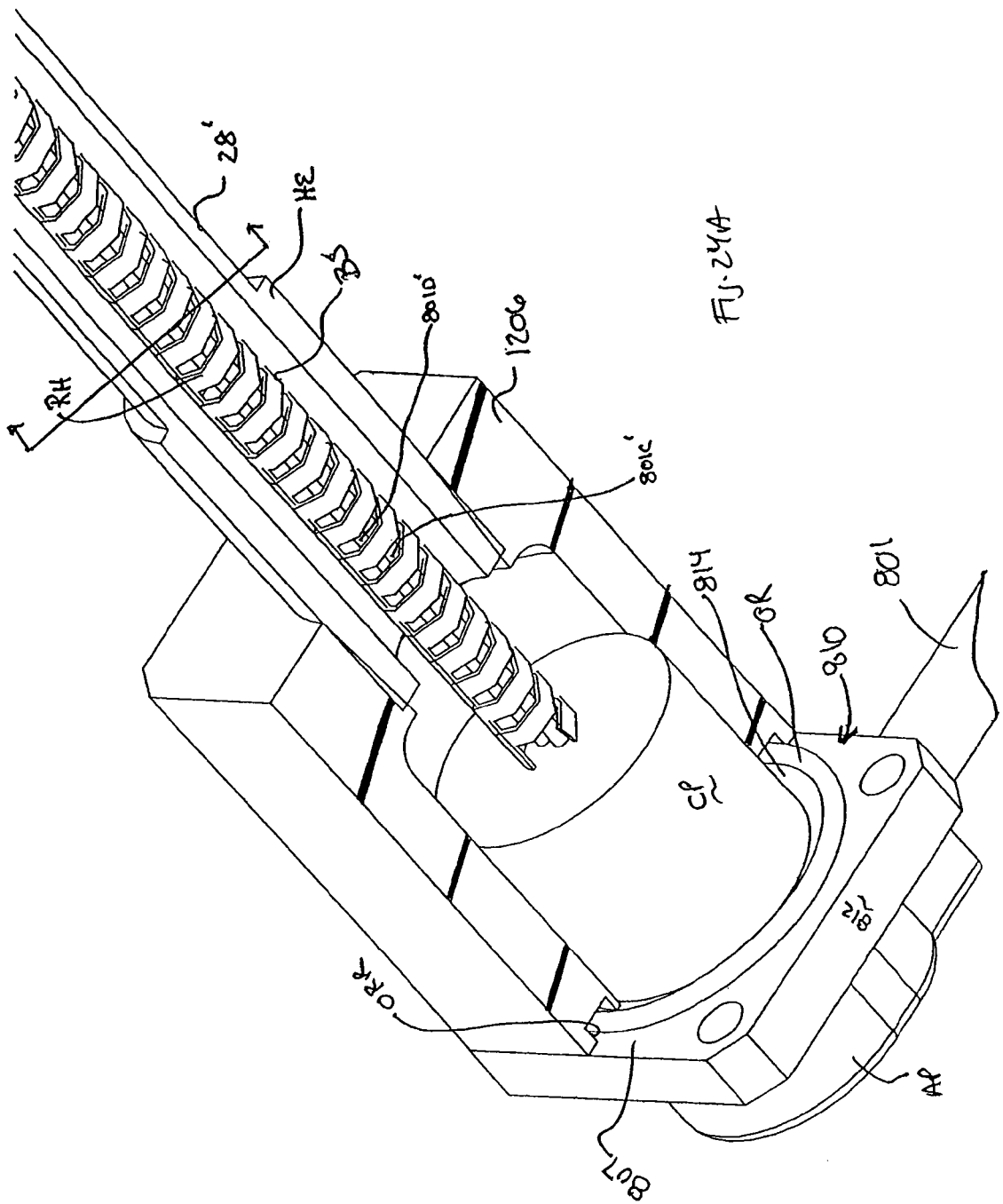

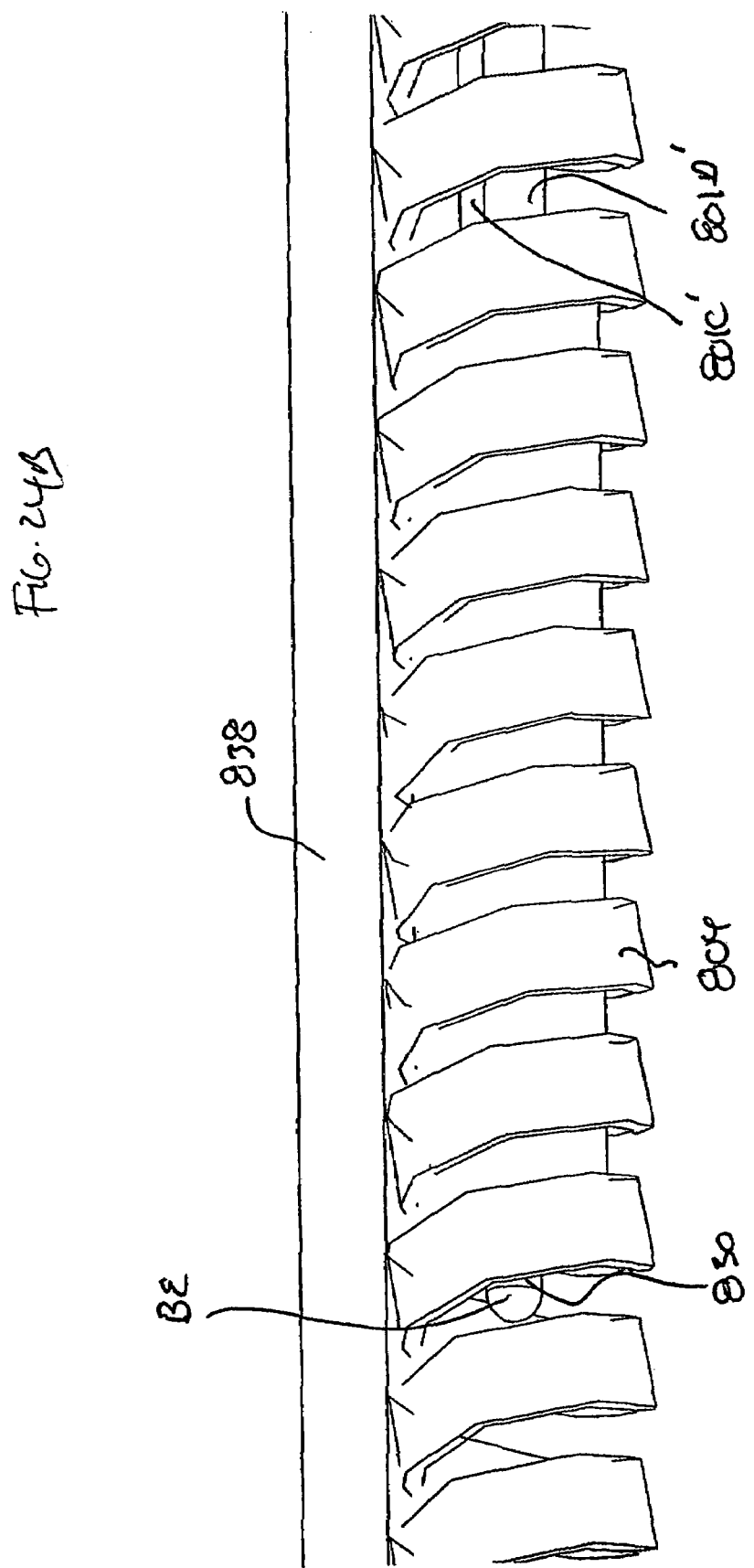

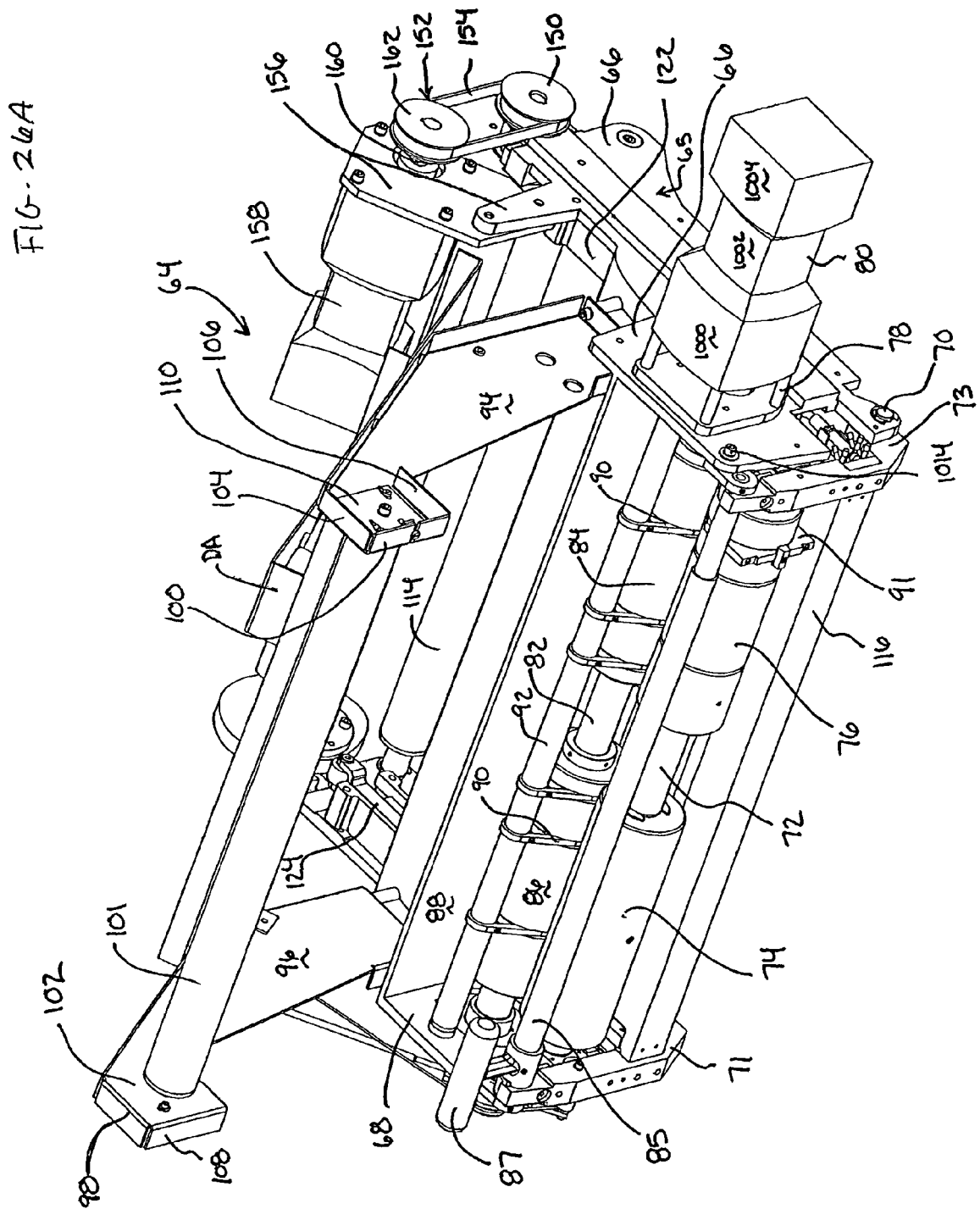

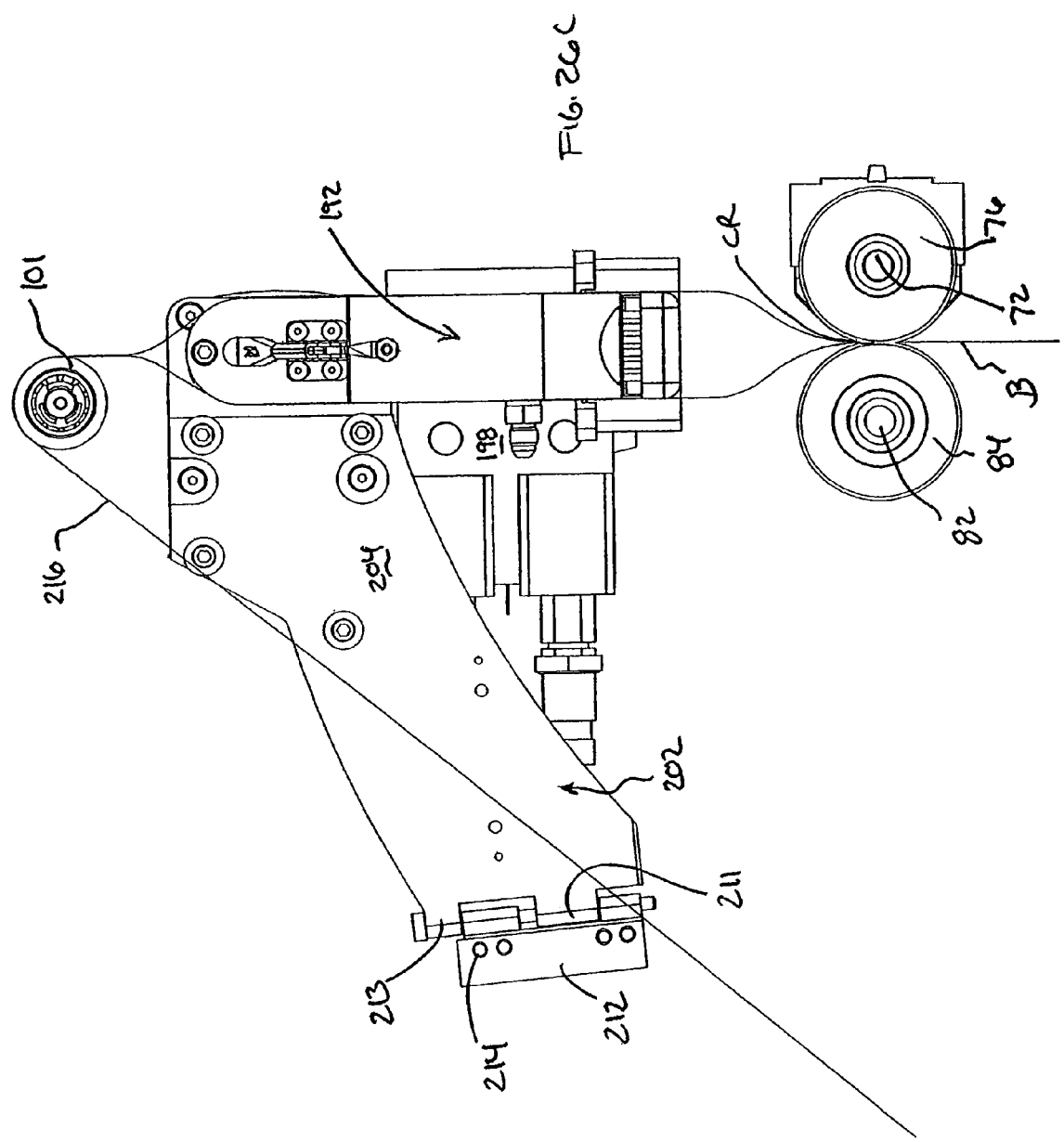

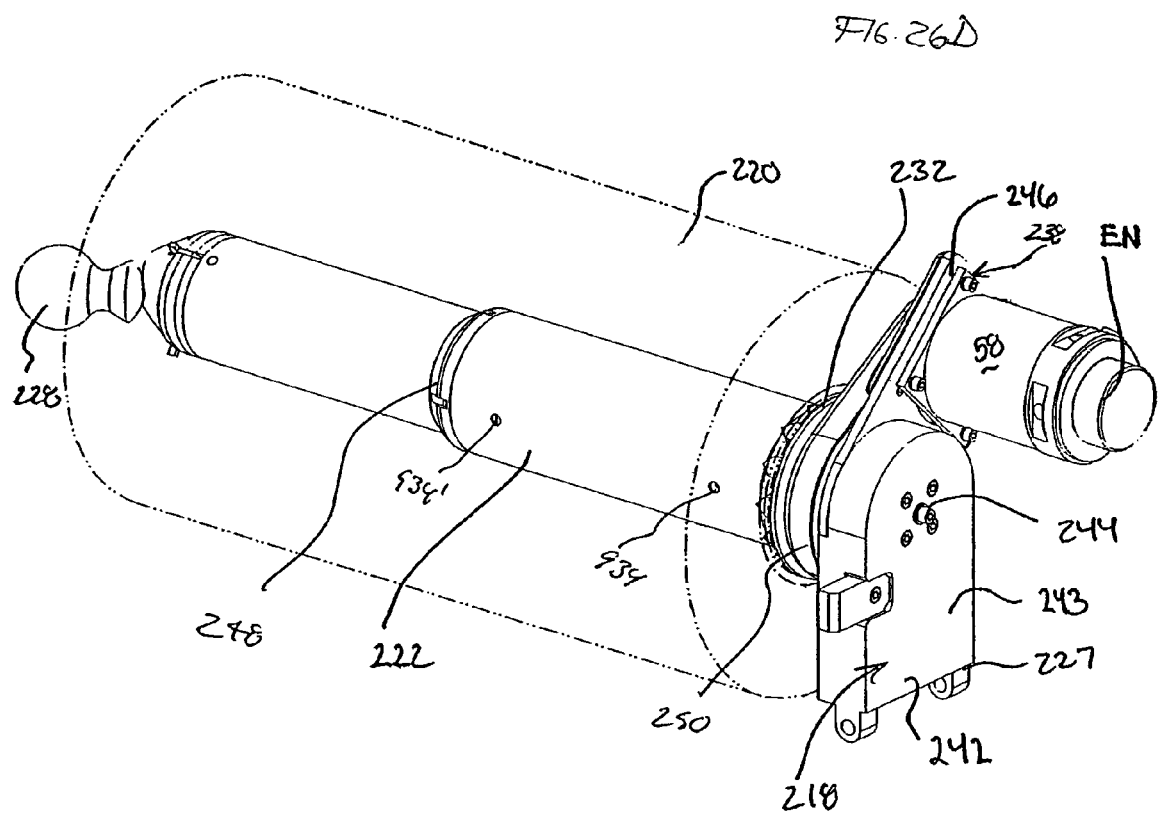

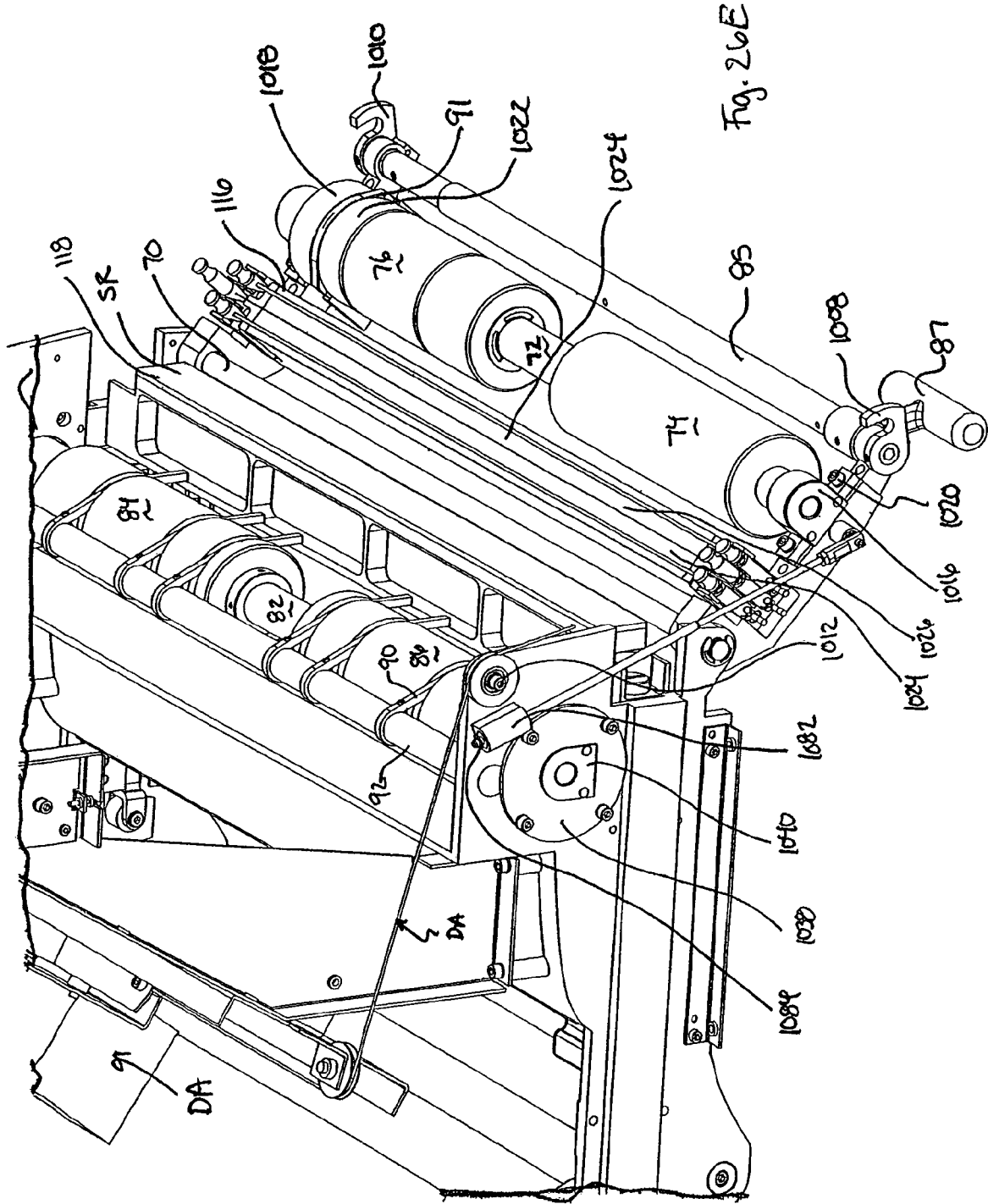

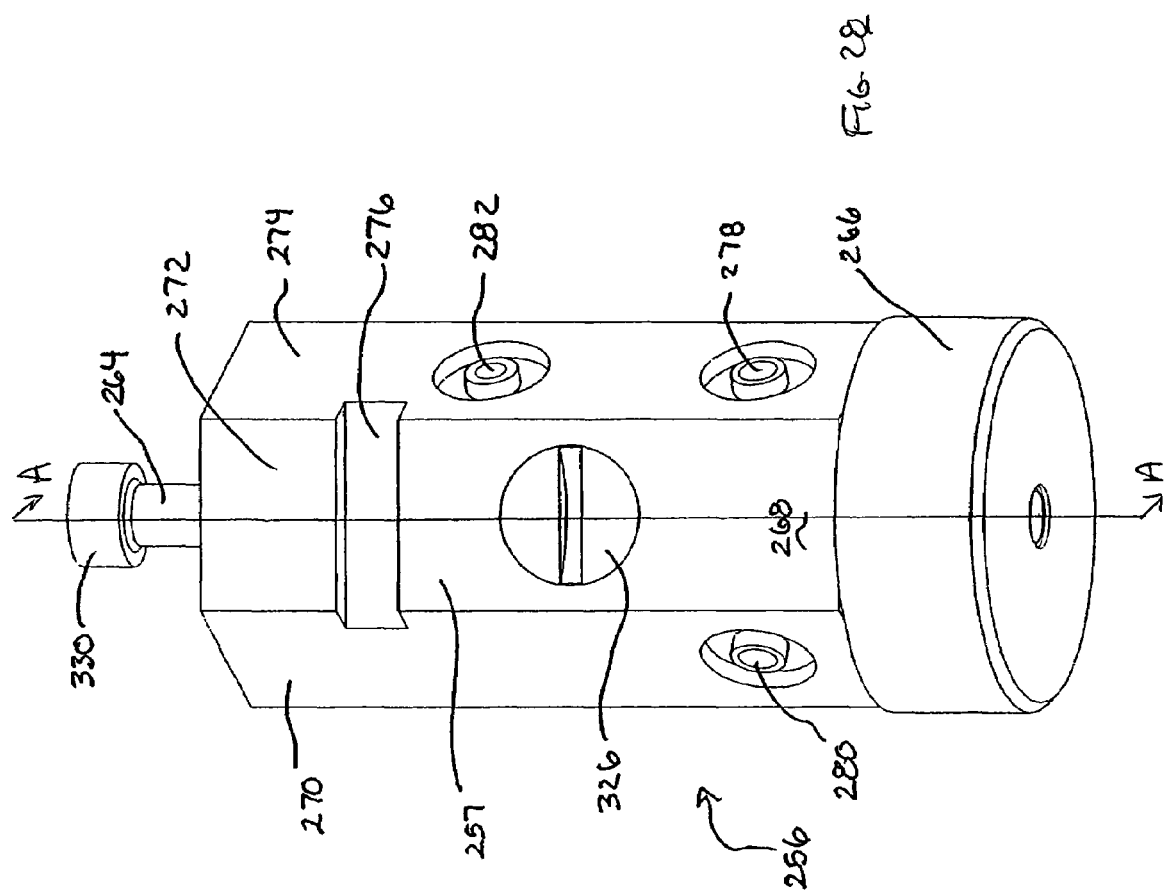

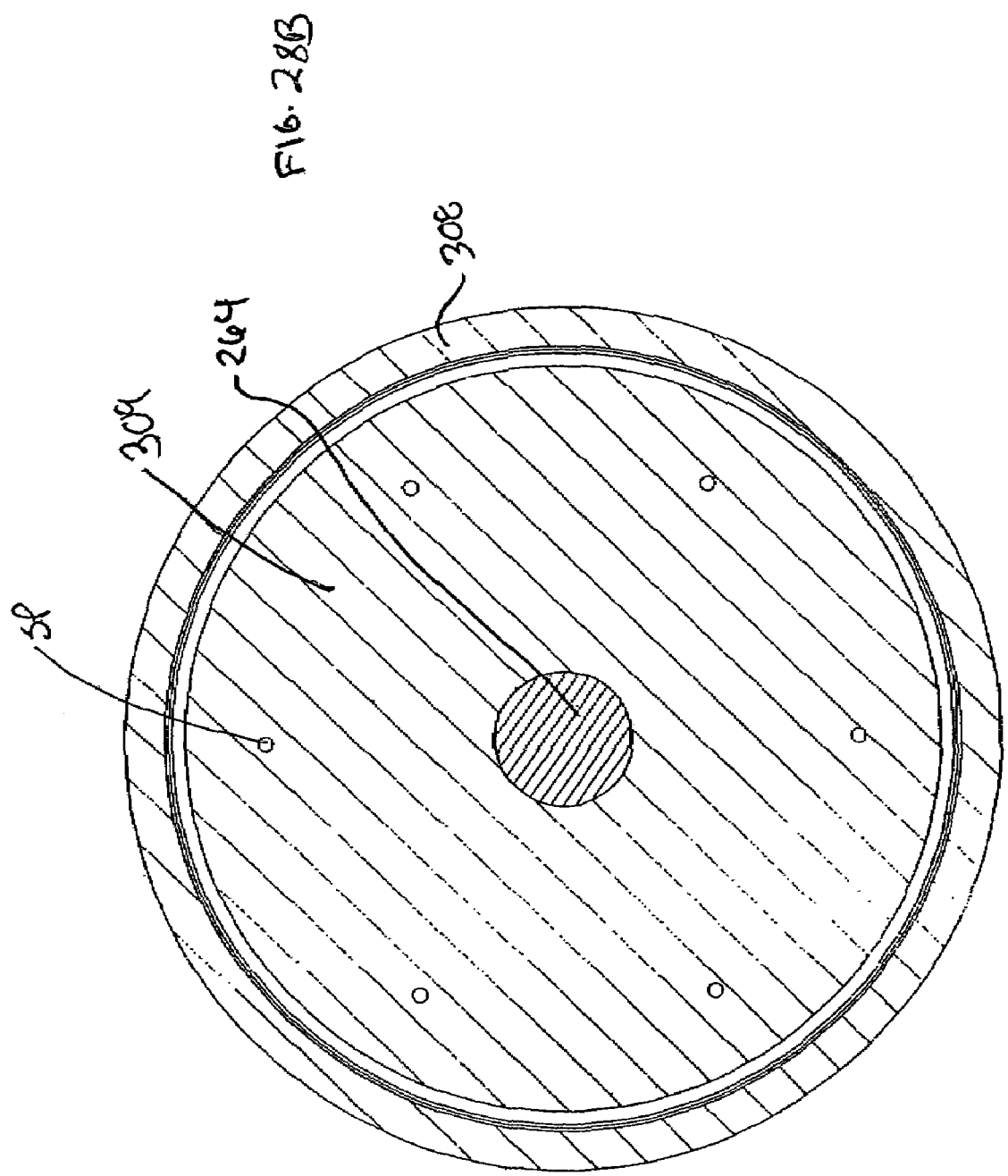

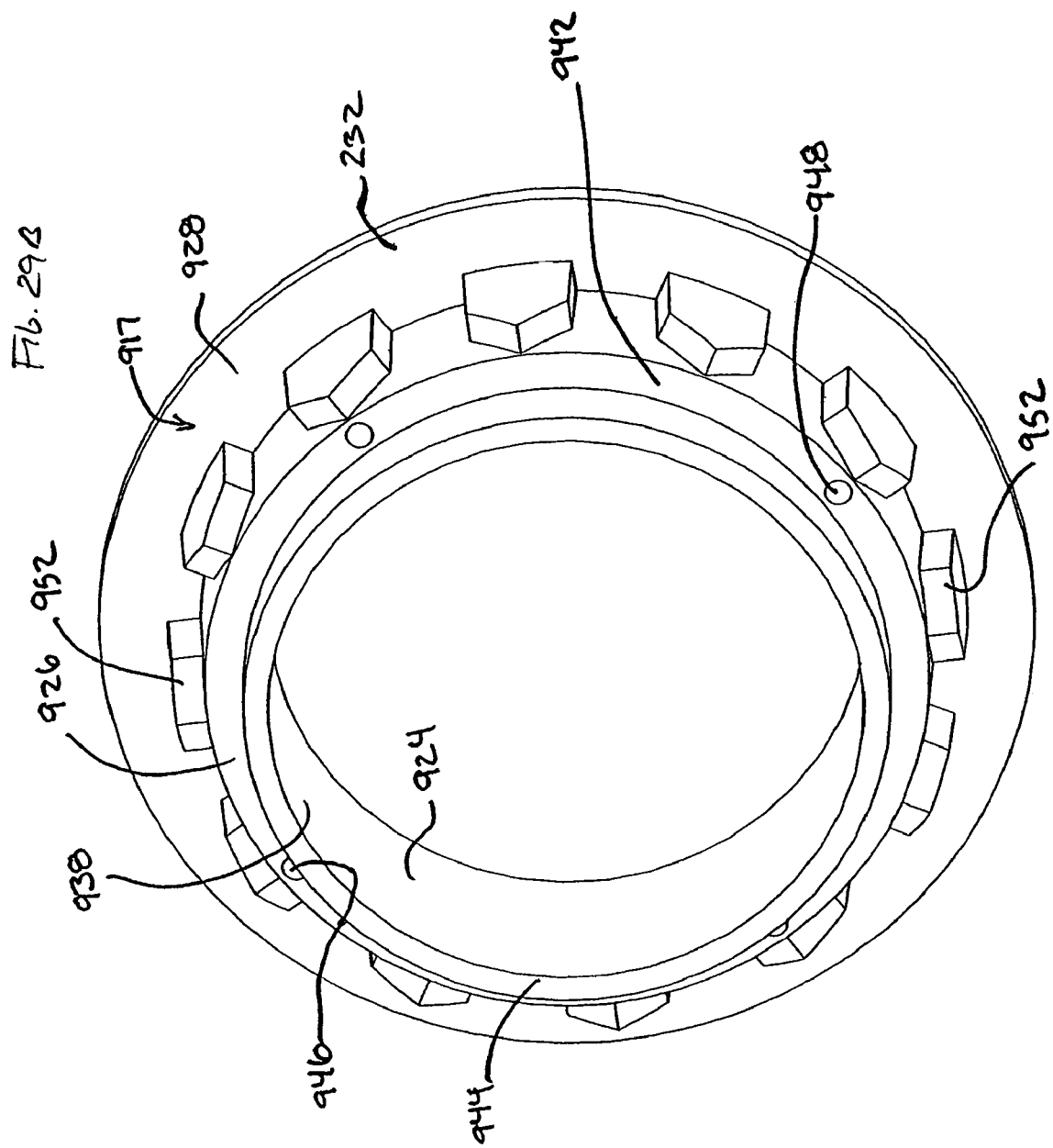

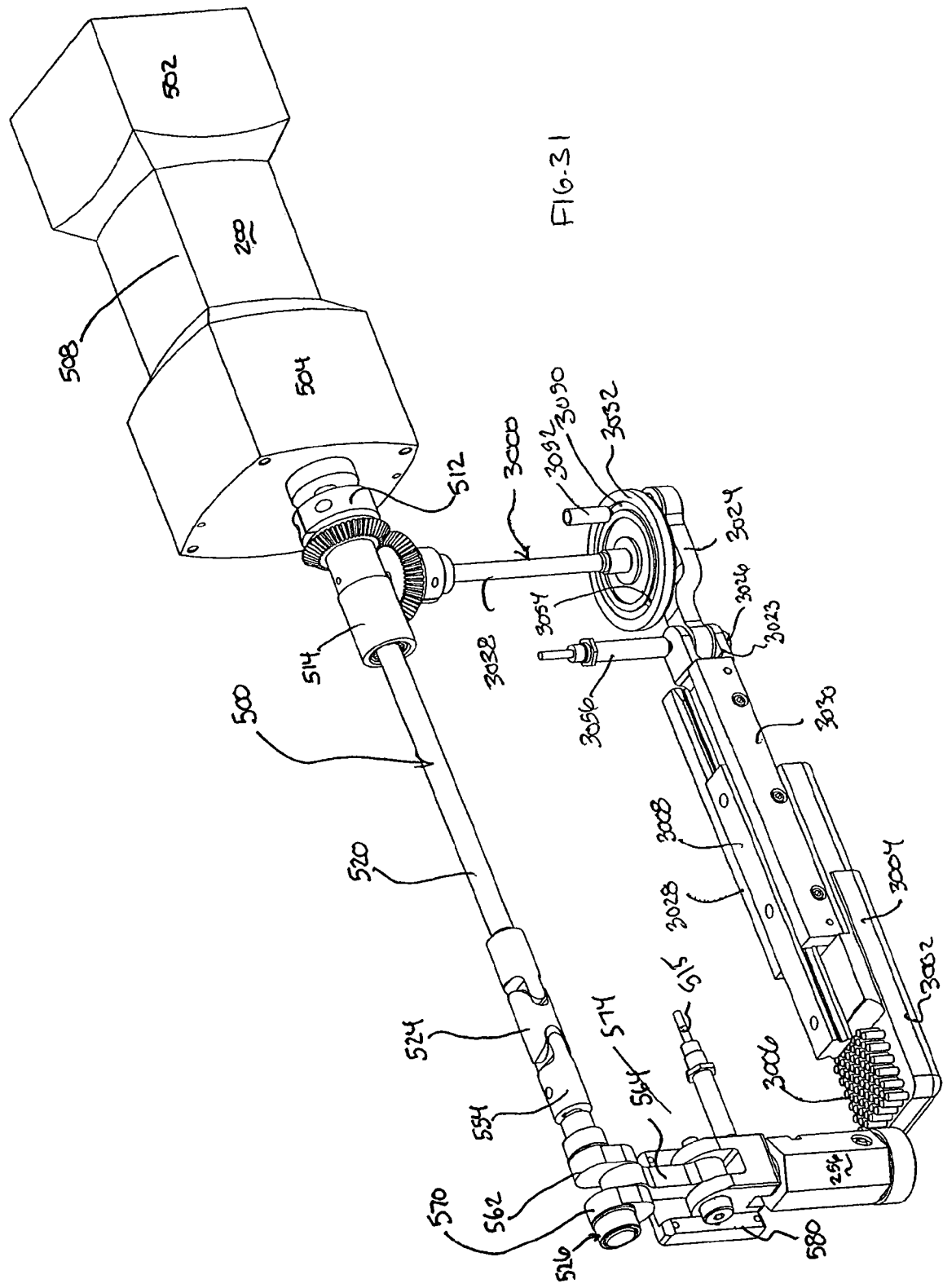

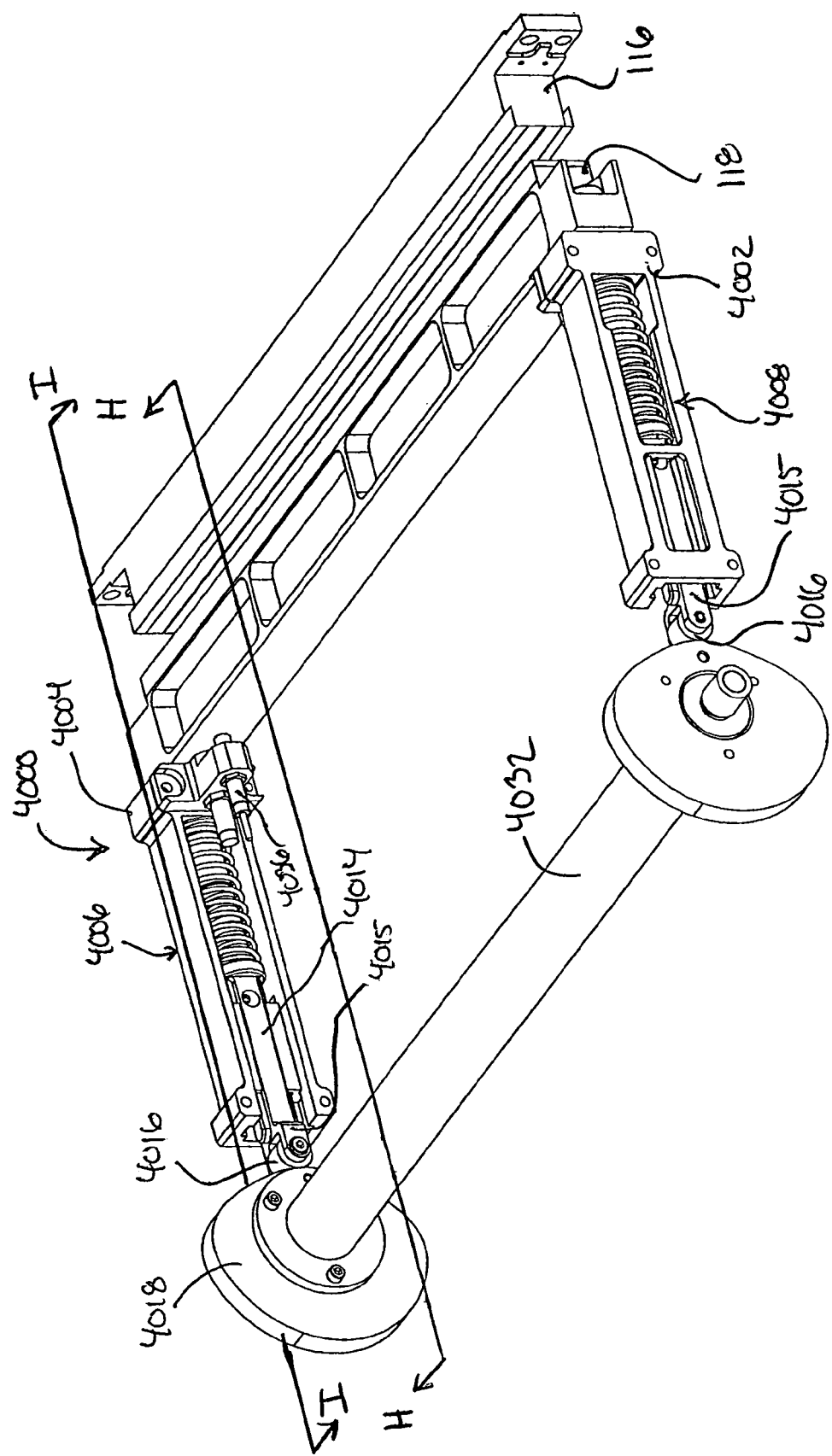

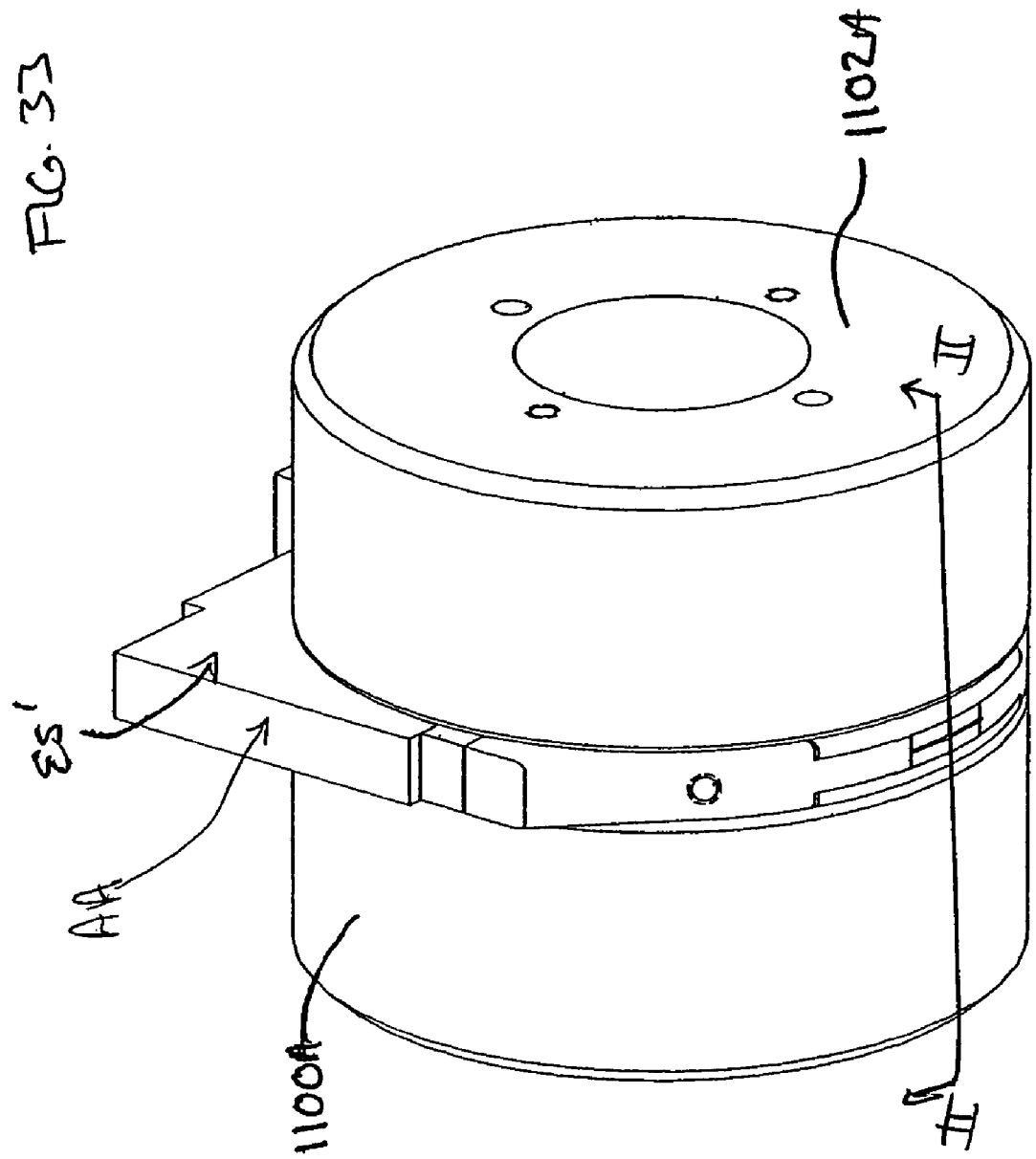

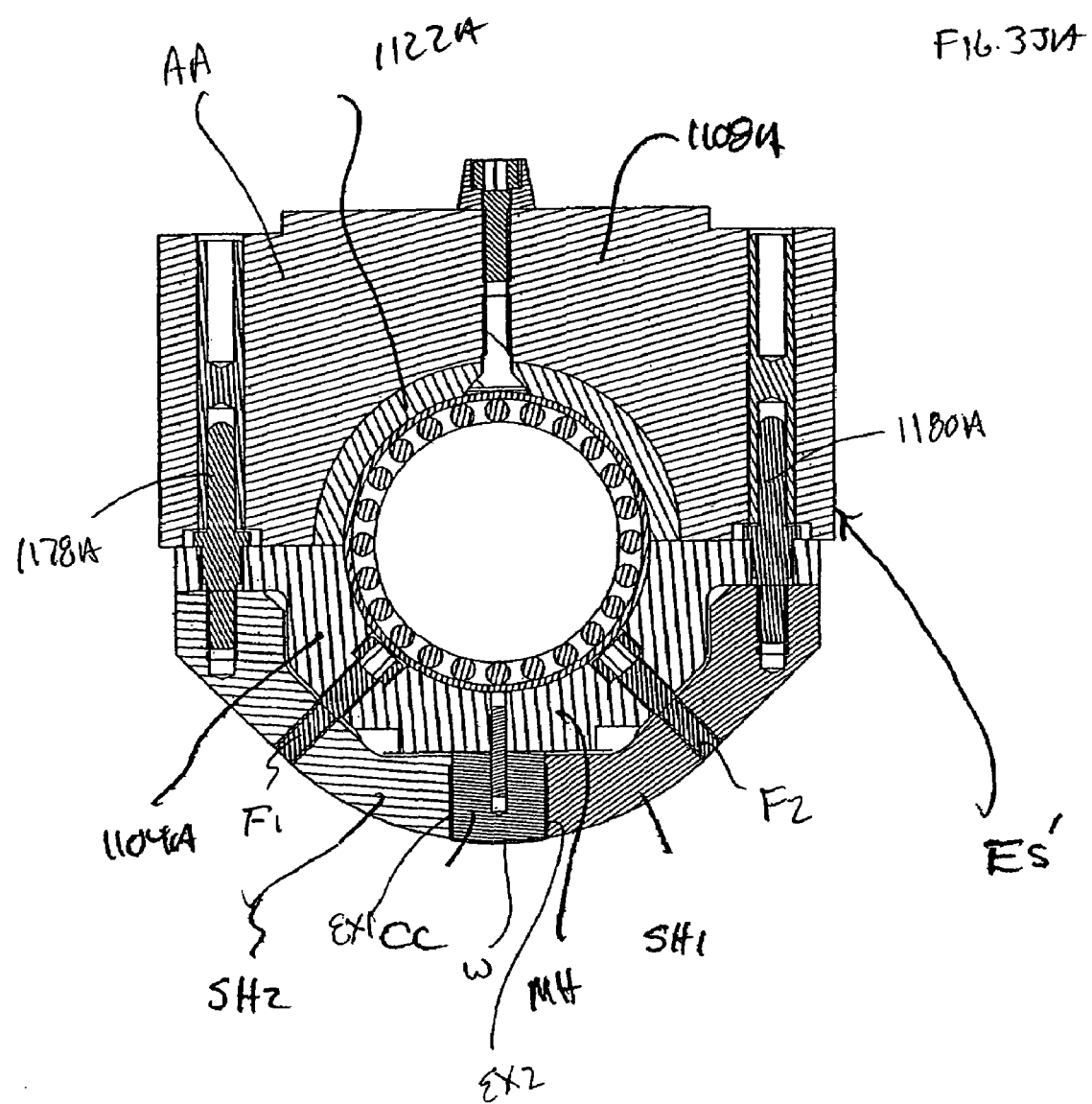

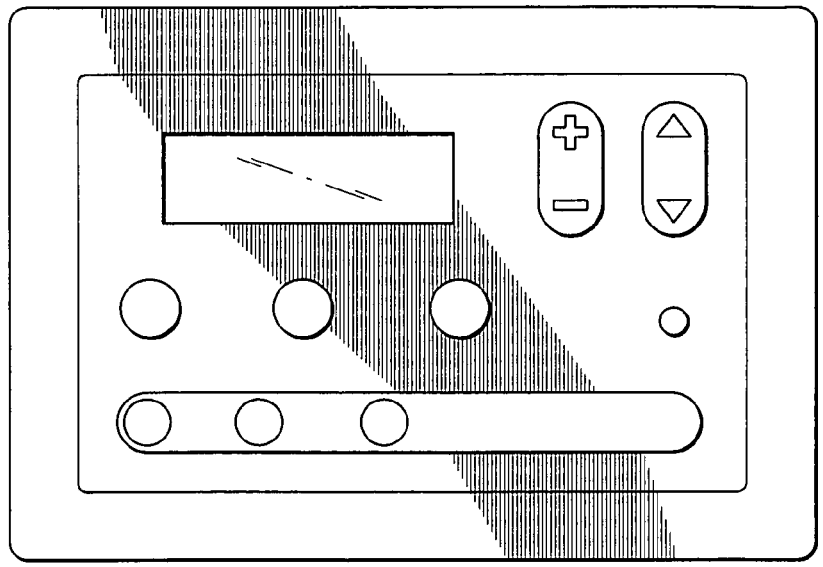
FIG.39
PRIOR ART
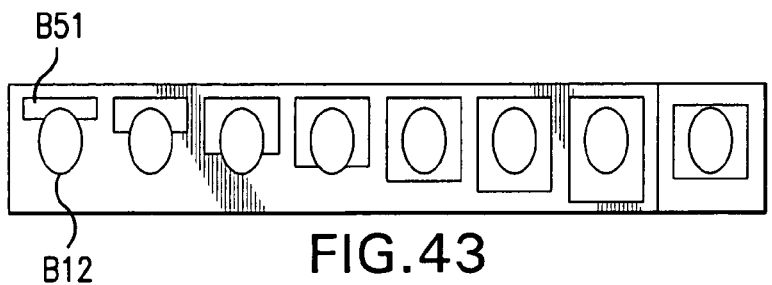
FIG.41
FIG.43
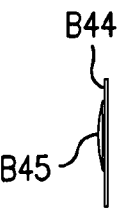
FIG.44
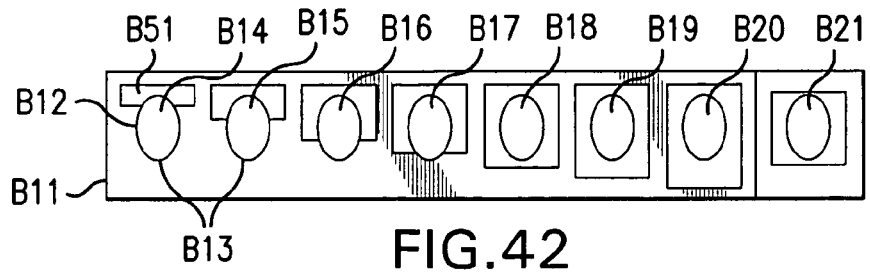
FIG.42

OPERATIONAL CONTROL SYSTEM AND A SYSTEM PROVIDING FOR REMOTE MONITORING OF A MANUFACTURING DEVICE

CROSS REFERENCE TO RELATED APPLICATIONS

Priority under 35 U.S.C. § 119(e) is claimed relative to the Provisional Patent Application(s) referenced as "K to O" in the Table immediately below, filed on May 9, 2003 and Jul. 18, 2003. The disclosure of each of the 15 provisional applications A to O set forth below is incorporated herein by reference.

TABLE 1

| REF. ID. | SERIAL NUMBER | FILED | TITLE |
| --- | --- | --- | --- |
| A | 60/468,942 | May 9, 2003 | Dispenser Assembly With Mixing Module Design |
| B | 60/469,034 | May 9, 2003 | Bagger With Integrated, Inline Chemical Pumps |
| C | 60/469,035 | May 9, 2003 | Mixing Module Drive Mechanism |
| D | 60/469,037 | May 9, 2003 | Mixing Module Mounting Method |
| E | 60/469,038 | May 9, 2003 | Dispenser Tip Management System |
| F | 60/469,039 | May 9, 2003 | Hinged Front Access Panel For Bag Module Of, For Example, A Foam In Bag Dispenser |
| G | 60/469,040 | May 9, 2003 | Improved Film Unwind System With Hinged Spindle And Electronic Control Of Web Tension |
| H | 60/469,042 | May 9, 2003 | Exterior Configuration Of A Foam-In-Bag Dispenser Assembly |
| I | 60/468,988 | May 9, 2003 | Bag Forming System Edge Seal |
| J | 60/468,989 | May 9, 2003 | Improved Heater Wire |
| K | 60/468,982 | May 9, 2003 | Foam-In-Bag Dispenser System With Internet Connection |
| L | 60/468,983 | May 9, 2003 | Ergonomically Improved Push Buttons |
| M | 60/488,010 | Jul. 18, 2003 | Control System For A Foam-In-Bag Dispenser |
| N | 60/488,102 | Jul. 18, 2003 | A System And Method For Providing Remote Monitoring Of A Manufacturing Device |
| O | 60/488,009 | Jul. 18, 2003 | Push Buttons And Control Panels Using Same |

The present application is a divisional application under 35 U.S.C. § 120 to the U.S. Patent Applications referenced below by "Q" and "R", which applications are incorporated herein by reference. In addition, all of the following co-pending applications to the same assignee are incorporated herein by reference as well.

| REF. ID. | SER. NO. | FILING DATE | TITLE |
| --- | --- | --- | --- |
| P | 10/623,716 | Jul. 22, 2003 | Dispenser Mixing Module And Method of Assembling and Using Same |
| Q | 10/623,858 | Jul. 22, 2003 | Dispensing System And Method of Manufacturing and Using Same With a Dispenser Tip Management |
| R | 10/623,868 | Jul. 22, 2003 | Improved Film Unwind System With Hinged Spindle And Electronic Control of Web Tension |
| S | 10/623,720 | Jul. 22, 2003 | Exterior Configuration of a Foam-In-Bag Dispenser Assembly |
| T | 10/623,100 | Jul. 22, 2003 | Bag Forming System Edge Seal |
| U | 10/717,989 | Nov. 21, 2003 | Mixing Module Drive Mechanism and Dispensing System With Same |
| V | 10/717,998 | Nov. 21, 2003 | Dispensing System with Mixing Module Mount and Method of Using Same |
| W | 10/717,997 | Nov. 21, 2003 | Dispensing System with Means for Easy Access of Dispenser Components and Method of Using Same |
| X | 10/776,453 | Feb. 12, 2004 | Dispensing System With End Sealer Assembly And Method Of Manufacturing And Using Same |
| Y | TBD | Mar. 12, 2004 | Dispensing System With In Line Chemical Pump System |

FIELD OF THE INVENTION

The present inventive subject matter includes a method and system for controlling operation of a manufacturing device such as a foam-in-bag manufacturing device, and also comprises a method and system for providing remote monitoring of a manufacturing device such as a foam-in-bag dispensing device, which facilitates additional activities as in servicing and resupply scheduling. One embodiment of the invention includes a system for a manufacturing device which includes an operational control system, electrical supply and interfacing system. The operational control system is preferably designed to coordinate and integrate a variety of functions being carried out by the foam-in-bag dispenser, and in a preferred embodiment, it comprises features that work in conjunction with the remote monitoring system, although the present invention is also directed at the remote monitoring system alone. One embodiment of the invention also includes a control panel with push buttons that can be used in association with remote monitoring system and/or control system.

BACKGROUND OF THE INVENTION

In many manufacturing environments, machines, manufacturing equipment and other such systems are used to produce particular goods or components for goods. These machines most often are attended by a machine operator who actually controls the machine operation. During normal operation the machine operator generally can operate the machine without any help.

However, in the instances where the machine experiences a problem or there is insufficient system control, the operator must then solve the problem or contact others for help. With the lost productivity and opportunity cost of some of the machines available today, it is extremely costly to have the machine down until a service engineer can be dispatched to the site of the malfunctioning machine. Therefore, it is beneficial to reduce the amount of machine down time to a minimum and to lessen the need for reliance on outside service representatives to make service calls.

Likewise, actions to update, change, correct or otherwise modify the machine can result in unwanted down time. Moreover, it can be very expensive to dispatch a service engineer to perform the update, change or modification to the machine.

Thus, heretofore an unaddressed need exists in the industry to address the aforementioned deficiencies quickly and efficiently. This need is particularly pronounced for dispensers of foam material with foam-in-bag dispensing systems being in particular need for monitoring and effective control. The ability to control manufacturing devices such as foam-in-bag dispensing systems, which feature a lot of simultaneously operating systems and the potential for any one of those sub-systems to have a problem or go out of a preferred operating range, is also problematic in the associated industry. Further, the control units used on manufacturing device such as foam-in-bag dispensers are problematic in the sense of not providing an efficient control panel with readily and accurately manipulated control buttons.

For example, over the years a variety of material dispensers have been developed including those directed at dispensing foamable material such as polyurethane foam which involves mixing certain chemicals together to form a polymeric product while at the same time generating gases such as carbon dioxide and water vapor. If those chemicals are selected so that they harden following the generation of the carbon dioxide and water vapor, they can be used to form "hardened" (e.g., a cushionable quality in a proper fully expanded state) polymer foams in which the mechanical foaming action is caused by the gaseous carbon dioxide and water vapor leaving the mixture.

In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a package or a foam-in-place bag (see e.g., U.S. Pat. Nos. 4,674,268, 4,800,708 and 4,854,109), where it reacts to form a polyurethane foam.

A particular problem associated with certain foams is that, once mixed, the organic resin and polyisocyanate generally react relatively rapidly so that their foam product tends to accumulate in all openings through which the material passes. Furthermore, some of the more useful polymers that form foamable compositions are adhesive. As a result, the foamable composition, which is often dispensed as a somewhat viscous liquid, tends to adhere to objects that it strikes and then harden in place. Many of these adhesive foamable compositions tenaciously stick to the contact surface making removal particularly difficult. Solvents are often utilized in an effort to remove the hardened foamable composition from surfaces not intended for contact, but even with solvents (particularly when considering the limitations on the type of solvents suited for worker contact or exposure) this can prove to be a difficult task. The undesirable adhesion can take place in the general region where chemicals A and B first come in contact (e.g., a dispenser mixing chamber) or an upstream location, as in individual injection ports, in light of the expansive quality of the mix, or downstream as in the outlet tip of the dispenser or, in actuality, anywhere in the vicinity of the dispensing device upon, for instance, a misaiming, misapplication or leak (e.g., a foam bag with leaking end or edge seals). For example, a "foam-up" in a foam-in-bag dispenser, where the mixed material is not properly confined within a receiving bag, can lead to foam hardening in every nook and cranny of the dispensing system making complete removal not reasonably attainable, particularly when considering the configuration of the prior art systems.

Because of this adhesion characteristic, steps have been taken in the prior art to attempt to preclude contact of chemicals A and B at non-desired locations as well as precluding the passage of mixed chemicals A/B from traveling to undesired areas or from dwelling in areas such as the discharge passageway for aiming the A/B chemical mixture. Examples of dispensing systems for such foamable compositions and their operation are described in U.S. Pat. Nos. 4,568,003 and 4,898,327. As set forth in both of these patents, in a typical dispensing cartridge, the mixing chamber for the foam precursors is a cylindrical core having a bore that extends longitudinally there through. The core is typically formed from a fluorinated hydrocarbon polymer such as polytetrafluoroethylene ("PTFE" or "TFE"). Polymers of this type are widely available from several companies, and one of the most familiar designations for such materials is "Teflon", the trademark used by DuPont for such materials.

Teflon material and many of the related polymers have the ability to "cold flow" or "creep". This cold flow distortion of the Teflon is both beneficial (e.g., allowing for the conformance of material about surfaces intended to be sealed off) and a cause of several problems, including the potential for the loss of the fit between the bore and the valving rod as well as the fit between the openings (e.g., ports) through which the separate precursors enter the bore for mixing and then dispensing. In many of the prior art systems utilizing Teflon, the Teflon core is fitted in the cartridge under a certain degree of compression in order to help prevent leaks in a manner in which a gasket is fitted under stress for the same purpose. This compression also encourages the Teflon to creep into any gaps or other openings that may be adjacent to it which can be either good or bad depending on the movement and what surface is being contacted or discontinued from contact in view of the cold flow.

Under these prior art systems, however, over time the sealing quality of the core is lost at least to some extent allowing for an initial build up of the hardenable material which can lead to a cycle of seal degradation and worsening build up of hardened material. This in turn can lead to a variety of problems including the partial blockage of chemical inlet ports so as to alter the desired flow mix and degrade the quality of foam produced. In other words, in typical injection cartridges the separate foam precursors enter the bore through separate entry ports and polyurethane foam tends to build up at the area at which the precursor exits the port and enters the mixing chamber. Such buildups cause spraying in the output stream, and dispensing of the mixture in an improper ratio. The build up of hardened material can also lead to partial blockage of the dispenser's exit outlet causing a misaiming of the dispensed flow into contact with an undesirable surface (e.g., the operator or various nooks and crannies in the dispenser). Another source of improper foam output is found in a partially or completely blocked off dispenser outlet tip that, if occurs, can lead the foam spray in undesirable areas or system shutdown if the outlet becomes so blocked as to preclude output. A variety of prior art systems have been developed in an effort avoid tip blockage, particularly in automated systems, as in foam-in-bag systems, which impose additional requirements due to the typical high usage level and the less ready access to the tip as compared to a hand-held dispenser (although the present invention can also be utilized in such environments such as in the control of other sub-systems (e.g., chemical pumping operation)). The prior art systems include, for example, porous tips with solvent flush systems. However, over time these tips tend to load up with hardened foam and eventually become ineffective.

The build of hardened/adhesive material over time can lead to additional problems such as the valve rod and even a purge only rod, becoming so adhered within its region of reciprocal travel that either the driver mechanism is unable to move the rod (leading to an oft seen shut down signal generation in many common prior art systems) or a component along the drive train breaks off which is often the annular recessed valve rod engagement location relative to some prior art designs or simply wears out as in gear slippage.

The above described dispensing device has utility in the packing industry such as hand held dispensers which can be used, for instance, to fill in cavities between an object being packed and a container (e.g., cardboard box) in which the object is positioned. Manufacturers who produce large quantities of a particular product also achieve efficiencies in utilizing automated dispensing devices which provide for automated packaging filling such as by controlled filling of a box conveyed past the dispenser (e.g., spraying into a box having a protective covering over the product), intermediate automated formation of molded foam bodies, or the automatic fabrication of foam filled bags, which can also be preformed or placed in a desired location prior to full expansion of the foam whereupon the bag conforms in shape to the packed object as it expands out to its final shape.

With dispensing devices like the hand held and foam-in-bag dispensing apparatus described above, there is also a need to provide the chemical(s) (e.g., chemicals "A" and "B") from their respective sources (typically a large container such as a 55 gallon container for each respective chemical) in the desired state (e.g., the desired flow rate, volume, pressure, and temperature). Thus, even with a brand new dispenser, there are additional requirements involved in attempting to achieve a desired foam product. Under the present state of the art a variety of pumping techniques have arisen which feature individual pumps designed for insertion into the chemical source containers coupled with a controller provided in an effort to maintain the desired flow rate characteristics through monitoring pump characteristics. The individual in "barrel" pumps typically feature a tachometer used in association with a controller attempting to maintain the desired flow rate of chemical to the dispenser by adjustment in pump output. The tachometers used in the prior art are relatively sensitive equipment and prone to breakdowns and thus, while usable under systems of the present invention, are not the preferred choice in most instances. Also, under many prior art systems, particularly those having in "barrel" pump motors with associated pressure transducers and tachometers, and temperate monitors to maintain a desired chemical pump speed/pressure level electronic circuitry as in electrical drivers are placed far away from the dispensing location requiring electrical leads to extend to/from a dispensing stand with its own electrical control system to an electrical console sub-system or the like with control logic, driver circuitry, etc. Under this prior art arrangement there was generated a large amount of electromagnetic energy along these lines and in the pump and console regions which were not or only minimally protected from allowing electromagnetic output into the environment. Thus, many prior art systems failed to have satisfactory "CE" levels and failed the CE European certificates program for electromagnetic noise levels.

In an effort to address the injection of chemicals into the mixing chamber at the desired temperature(s) there has been developed heater systems positioned in the chemical conduits extending between the chemical supply and the dispenser, these heaters include temperature sensors (thermisters) and are adjusted (rather crudely) in an effort to achieve the desired temperature in the chemical leaving the feed line or conduit. Reference is made to, for example, U.S. Pat. Nos. 2,890,836 and 3,976,230.

As noted above, in the packaging industry, a variety of devices have been developed to automatically fabricate foam filled bags for use as protective inserts in packages. Some examples of these foam-in-bag fabrication devices can be seen in U.S. Pat. Nos. 5,376,219; 4,854,109; 4,983,007; 5,139,151; 5,575,435; 5,679,208; 5,727,370 and 6,311,740.

In addition to the common occurrence of foam dispenser system lock up, cleaning downtime requirements, poor mix performance in prior art foam-in-bag systems, a dispenser system featuring an apparatus for automatically fabricating foam filled bags introduces some added complexity and operator problems. For example, an automated foam-in-bag system adds additional complexity relative to film supply, film tracking and tensioning, bag sealing/cutting (e.g., from the stand point of a proper temperature cutter/sealer or proper cutter/sealer positioning and compression levels relative to the bag being formed), bag venting, film feed blockage. Thus, in addition to the variety of problems associated with the prior art attempts to provide chemicals to the dispenser in the proper rate, keeping the dispenser cartridge operational, and feeding film properly (e.g., positioning and tension), the prior art foam-in-bag systems also represent a particular source of additional problems for the operators. Additional problems include, for example, attempting to understand and operate a highly complicated, multi-component assembly for feeding, sealing, tracking and/or supplying film to the bag formation area; high breakdown or misadjustment occurrence due to the number of components and complex arrangement of the components; poor quality bag formation, often associated with poor film tracking performance, difficulty in achieving proper bag seals and cuts, particularly when taking into consideration the degrading and contamination of the often used heater wires due to, for example, foam build up and the inability to accurately monitor current heated wire temperature application, difficulty in formation and maintaining clear bag vent holes, as well as the inevitable foam contamination derivable from a number of sources such as the dispenser and/or bag leakage, and clean up requirements in general and when foam spillage occurs.

Many prior art foam-in-bag systems and other automated dispensing systems have shown in the field to have high service requirements due to, for example, breakdowns and rapid supply usage requirements (e.g., film, solvent, precursor chemicals, etc.). There is thus a great deal of servicing associated with prior art systems as in problem solving and in maintaining adequate supply levels. The prior art systems suffer from the problem of difficult and often non-adequate servicing which can be operator or service representative induced (e.g., failing to monitor own supply levels (e.g., solvent supply) or anticipating level of usage, or difficulty in responding timely to service requests which are often on an emergency or rush basis as any down time can be highly disruptive to an operator in timely meeting orders). In addition, foam-in-bag system, when in operation can require rapid system manipulation and changes as in dispenser timing, bag size adjustments, menu scrolling etc. (e.g., in some foam-in-bag system settings there is required rapid action on the part of the operator to avoid having a filled bag harden before being properly positioned).

As can be seen there are numerous potential areas that can create problems in the field of dispensing, and this type of manufacturing equipment has a great need for close monitoring to preempt potential problems, spot problems when they arise, and take appropriate action to prevent further system problems. Accordingly, foam-in-bag dispensing systems and the like are illustrative of systems which work well with the present inventive subject matter directed at a control system for one or more of the various subsystems, and a system and method for providing remote monitoring of a manufacturing device including, preferably, an interfacing relationship with the operational control system as well as enhanced button control as explained below.

SUMMARY OF THE INVENTION

The invention provides a system and method for providing operational control system for a manufacturing device as in a foam-in-bag device, and further describes a method and system for remote monitoring of a manufacturing device and/or control of the same. A preferred embodiment features a manufacturing device with both systems and an interfacing relationship between the two. For example, a preferred embodiment of the present invention is directed at addressing one or more of the numerous potential areas that can create problems in the field of dispensing, as this type of manufacturing equipment has a great need for close monitoring to both preempt potential problems, spot problems when they arise, and take appropriate action to prevent further system problems. Moreover, apart (or in conjunction) from any remote monitoring aspect, the operational control system of the present invention features a control system for local monitoring, adjusting, and preemptive stopping of various sub-systems of a manufacturing device. For example, in the above described foam-in-bag system, a coordinating operational control system is provided which, depending on the nature of the dispenser, preferably involves one or more of the following control sub-systems— heated wire—(cross seal and/or cut)
heated wire (edge seal)
moving jaw
mixing module valve rod
film advance and tracking
film web tensioning
chemical hose heating and monitoring
main manifold and dispenser housing heating and monitoring
pump feeding
solvent feed The aforementioned dispenser operational control subsystems each preferably have means for feeding to the operational control system pertinent data to facilitate proper operational parameters for the dispensing system. In addition, the operational data can be utilized in conjunction with remote monitoring of the dispenser device as described above and below, as in monitoring film operation and sending out data on the same, for use in, for example, material resupply through monitoring the level of usage or in shutting down all the sub-systems in the event of a sensed film jamming.

For remote monitoring of the manufacturing device, a preferred embodiment of the invention comprises a system that includes a server device containing a remote monitoring system. The remote monitoring system further comprises: a transceiver to receive an indication of a help condition (e.g., a push button activated help signal), connect to the manufacturing device and receive data from the manufacturing device.

A preferred embodiment of the invention includes a method for providing remote monitoring of a manufacturing device, the method comprising in one embodiment the steps of: (1) receiving an indication of a help condition; (2) connecting to the manufacturing device; and (3) receiving data from the manufacturing device.

The present invention further includes a method comprising receiving a sensed parameter indicative of a potential or actual problem (which can encompass a resupply need) associated with the manufacturing device from a monitoring control system; sending data to a remote location either based on a self initiated output signal generation by the control system, a periodic remote location check in or check out cycle and/or an operator or remote location representative's induced output generation of the sensed parameter indicative of a potential or actual problem.

An embodiment of the present invention features a foam-in-bag dispensing system operational control system which helps coordinate various sub-systems of the dispensing system in an effort to avoid or lessen the effect of the numerous drawbacks associated with the prior art systems such as those described above. A preferred embodiment of the operational control system is also designed to integrate and coordinate a variety of functions being carried out by sub-assemblies of the overall system at hand as in foam dispensing and foam-in-bag dispensing systems. For example, depending on the manufacturing device being controlled there could be a need for proper chemical supply conditions as in temperature, pressure and flow rate and proper dispensing as in dispenser valve manipulation, film feed; bag forming (e.g., end and edge sealing placement of the cutter wire at proper temperature(s), locations and film contact pressure); maintaining tension in the film; solvent supply for removing and avoiding hardened foam build up, etc. In a preferred embodiment of the invention, the operational control system also facilitates (i) interfacing amongst the noted sub-assemblies, (ii) interfacing with an operator and (iii) interfacing with the remote monitoring system which preferably includes supply and servicing monitoring. Relative to the re-supply and servicing functions, the operational control system is useful in providing system operational information as in sensed temperatures, pressure level, equipment positioning, supply levels, etc., which facilitates the remote monitoring system functioning under the present invention.

While features of the present invention are applicable to single component dispensing systems, the present invention is particularly suited for systems that have a plurality of openings (usually two) arranged in the core in communication with the bore for supplying mixing material such as organic resin and polyisocyanate to the bore, which acts as a mixing chamber. In a preferred embodiment of the invention, there is utilized a combination valving and purge rod positioned to slide in a close tolerance, "interference", fit within the bore to control the flow of organic resin and polyisocyanate from the openings into the bore and the subsequent discharge of the foam from the cartridge.

The invention (e.g., remote monitoring system and/or operational control system) is also particularly well suited for foam-in-bag dispensing systems as they add even more complexity to the overall system that the present invention is well suited for handling.

Thus, an embodiment of the inventive subject matter includes a foam-in-bag operating system which includes a control system which works in association with an electrical supply and interfacing sub-systems. The invention is designed to integrate and coordinate a variety of functions being carried out by sub-assemblies of the foam-in-bag system including foam dispensing (e.g. proper chemical supply conditions as in temperature, pressure and flow rate and proper dispensing as in dispenser valve manipulation); film feed; bag forming (e.g. end and edge sealing); maintaining tension in the film; solvent supply for removing and avoiding hardened foam build up. In addition the present invention is directed at facilitating both the interfacing amongst the noted sub-assemblies; interfacing with an operator and interfacing with a remote site for requirements such as supply and servicing. The inventive subject matter also includes a control panel and operational buttons that facilitate operation of the manufacturing device as, for example, in the above described interfacing with the remote monitoring system and/or operational facets associated with local control means. In a preferred embodiment the operational control system comprises a set of control boards (e.g., CPU and PFGA logic based control boards) that are grouped together and stored in the control panel in an easy access manner. This avoids the level of noise (electromagnetic) associated with those systems, for example, that utilized at or closer to chemical source pump control. Similarly, in a preferred embodiment the remote monitoring is also contained on a common control support as the operational control system with one or more control boards, although as noted above, independent and/or semi-integrated system are also featured under the present invention.

BRIEF DESCRIPTION OF THE DRAWINGS

Features of the present invention can be better understood with reference to the following drawings. The components within the drawings are not necessarily to scale relative to each other, emphasis instead being placed upon clearly illustrating the features of the present invention.

FIG. 11A provides a legend key for the features shown schematically in FIG. 11.

FIG. 14 shows a schematic view of the operational controls, interface and power distribution features for a moving jaw with cross cut and seal wiring.

FIG. 15 shows a schematic view of the operational control, interface and power distribution features for a rod moving mechanism for chemical dispensing and the dispenser tip cleaning system.

FIG. 17 shows an illustration of the operational control, interface and power distribution features for a film web tensioning system of the present invention.

FIG. 18 shows an illustration of the operational control, interface and power distribution features for a heated and temperature monitored chemical hoses.

FIG. 24A shows a cut away view of the electrically heater hose at the feedthrough unite end.

FIG. 24B shows a section of the coiled hose heater resistance element with internal temperature probe.

FIG. 26A shows a film support means or film source support roll mounted thereon and showing a web tensioning or film source drive system.

FIG. 26C shows a portion of the film travel path past the dispenser apparatus and nip roller assembly.

FIG. 26D shows the web tensioning or film source drive system.

FIG. 26E shows a front view of the front access panel in an open state.

FIG. 28 shows a perspective view of a mixing module having chemical and solvent inlet conduits and a valving and/or purge rod received within a mixing rod passageway.

FIG. 28B shows a cross-sectional view taken along cross-section line D-D in FIG. 28A.

FIG. 29B shows a perspective view of the spindle spline drive or engagement member of the spindle spline drive assembly with emphases on the tooth drive side.

FIG. 31 shows the mixing module valve and brush moving means provided in the dispenser housing of the dispenser assembly in FIG. 30.

FIG. 39 shows a prior art control panel.

FIG. 41 shows a top plan view of the bag control button panel shown in FIG. 40.

FIG. 42 shows a front elevational view of the bag control button panel.

FIG. 43 shows a schematic depiction of that which is shown in FIG. 42.

FIG. 44 shows an end elevational view of FIG. 41.

DETAILED DESCRIPTION OF THE INVENTION

Remote Monitoring System

Figure 1:
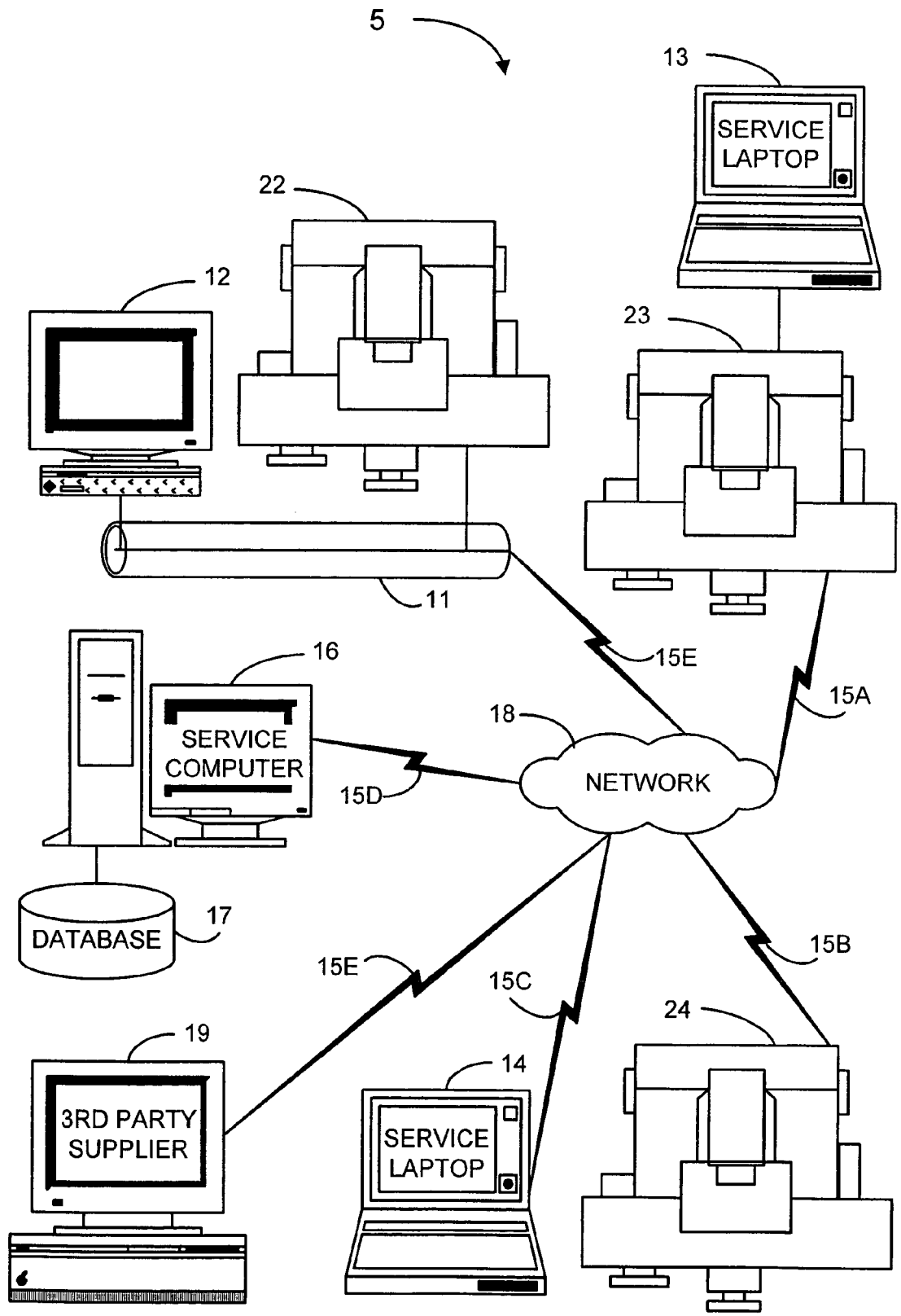
FIG. 1 is a block diagram illustrating an example of the network environment for a computer system and the manufacturing devices utilizing the remote monitoring system of the present invention.

One embodiment of the invention to be described hereafter provides a cost-effective means for monitoring, changing and repairing manufacturing devices remotely. One embodiment of the remote monitoring system of the present invention enables a user of the manufacturing device to connect to a service computer to seek and obtain help. The monitoring control system for the remote monitoring system can be a self contained system or can share components or functions with the operational control system described further below.

In one embodiment of the remote monitoring system of the present invention, the service computer initiates a connection to the manufacturing device in an effort to determine what problem has occurred and a fix to solve the problem. The service computer receives the data stream from the manufacturing device including, but not limited to: system parameters, log, current device status, set up parameters, sensor data and the like. With the data in the data stream a service representative will be able to analyze and perform online troubleshooting of the manufacturing device. In the past, a service representative would actually have to visit the location of the manufacturing device to acquire all the data items now available in the data stream. This saves time and money for the manufacturer in the effort to get the manufacturing device back in production.

If the service representative determines that an adjustment or adjustments can be made remotely, then the remote monitoring system of the present invention facilitates the service representative in adjusting any system parameter in the manufacturing device. In the past, adjustments of any system parameter required a service representative to actually physically go to the location of the manufacturing device to perform the adjustment. With the remote adjustment feature, the manufacturer saves time and money.

The remote monitoring system of the present invention also enables the collection of manufacturing device performance data for reporting purposes either with a common remote monitoring service computer or via a report only service computer provider. This feature enables the producer of the manufacturing device, for example, to monitor the manufacturing device to track the performance of the manufacturing device as well as facilitates resupply timing and quantity requirements (e.g., foam precursor chemicals, film supply, solvent supply, etc.).

The remote monitoring system of the present invention also enables the capability to download software patches, upgrades and new versions of software from the service computer to any supportable manufacturing device. Currently this task requires a service representative to visit the location of each manufacturing device. This can be very time-consuming and take several months to upgrade numerous manufacturing devices at a customer site, and can lead to users having varying levels of upgrades. In addition, the current method for updating supportable manufacturing devices is the swapping of memory. This memory is very fragile and can easily be corrupted or destroyed.

The remote monitoring system of the present invention enables software upgrades and patches to be installed for a network saving hundreds of hours of travel time and expenses. The remote monitoring system of the present invention also provides the additional benefit that a producer of manufacturing device may upgrade all supportable manufacturing devices at all customer locations at the same time.

The remote monitoring system of the present invention is applicable to a computer processing system connected to a manufacturing device. The system and method for remote monitoring of a manufacturing device is typically implemented in a networked computing arrangement in which any number of manufacturing devices communicating with at least one computer device over a network are involved. Examples of networks applicable include, but are not limited to: the Internet, a local area network (LAN), a wide area network (WAN), any other like networks, or any combination of connections. The connections can be enabled using a modem, further using a telephone line, a radio frequency (RF) or other transceiver such as Wi-Fi, satellite or the like.

If a manufacturing facility employs more than one manufacturing device, communication between the devices and a receiver is preferably conducted via wireless transmitters. The receiver device then manages the database for each of the member manufacturing devices in a given facility. Alternatively, each manufacturing device is provided with a means for communicating on a one-to-one basis with, for example, a remote network service computer across, for example, a direct to manufacturing device telephone line.

Another commercial use for this feature is on-line ordering. As an example, reorder levels are negotiated with a customer and the machine monitors usage and requests replenishment to sustain on-hand inventory of consumables.

Referring now to the drawings, in which like numerals illustrate like elements throughout the several views, FIG. 1 illustrates the basic components of a system 5 using the remote monitoring system in connection with the preferred embodiment of the present invention. The system 5 includes manufacturing devices 22, 23 and 24. Service computers 12, 13, 14 and 16 are illustrative of a variety of service computer to manufacturing device set ups and the service computers contain applications, with service computer 16 shown to further contain a database 17 that can be accessed by manufacturing devices 22, 23 and 24 via, for example, intermittent connections 15(a-e), respectively, over network 18. Service computer 12, 13, 15 and 16 include, but are not limited to: PCs, workstations, laptops, PDAs, palm devices, tablets and the like. The computer 12 or 16 may also be connected to the local area network 11 (LAN) within an organization.

The structure and operation of the remote monitoring system enables the service computer 16 and the database 17 associated therewith to monitor manufacturing devices 22, 23 and 24. Particularly, the remote monitoring system of the present invention enables the manufacturing devices 22-24 to operate more efficiently by increasing manufacturing device uptime through the ability to closely monitor. The manufacturing devices 22-24 may each be located at remote sites (e.g., one or more manufacturing devices at a plurality of different manufacturing facilities). When the manufacturing devices 22, 23 and 24 connect to the computer 16, the servicer (e.g., a separate entity from the manufacturer or associated entity relative to the manufacturer of the manufacturing devices and/or producer of the manufacturing device 22-24) may provide online or remote support. The manufacturing devices 22, 23 and 24 may provide data to be stored on the database 17 and may access the computer 16 over a network 18, such as but not limited to: the Internet, a local area network (LAN), a wide area network (WAN) or other like networks, via a modem using a telephone line, a radio frequency (RF) such as WI-FI, or other transceiver or other like networks. The manufacturer device preferably has integrated equipment (e.g., a modem) to carry out the foregoing sending and receiving of data.

Advantageously, the present invention provides a system and method for remote support and monitoring of manufacturing devices by providing communication of device information to a computer system.

Figure 2A:
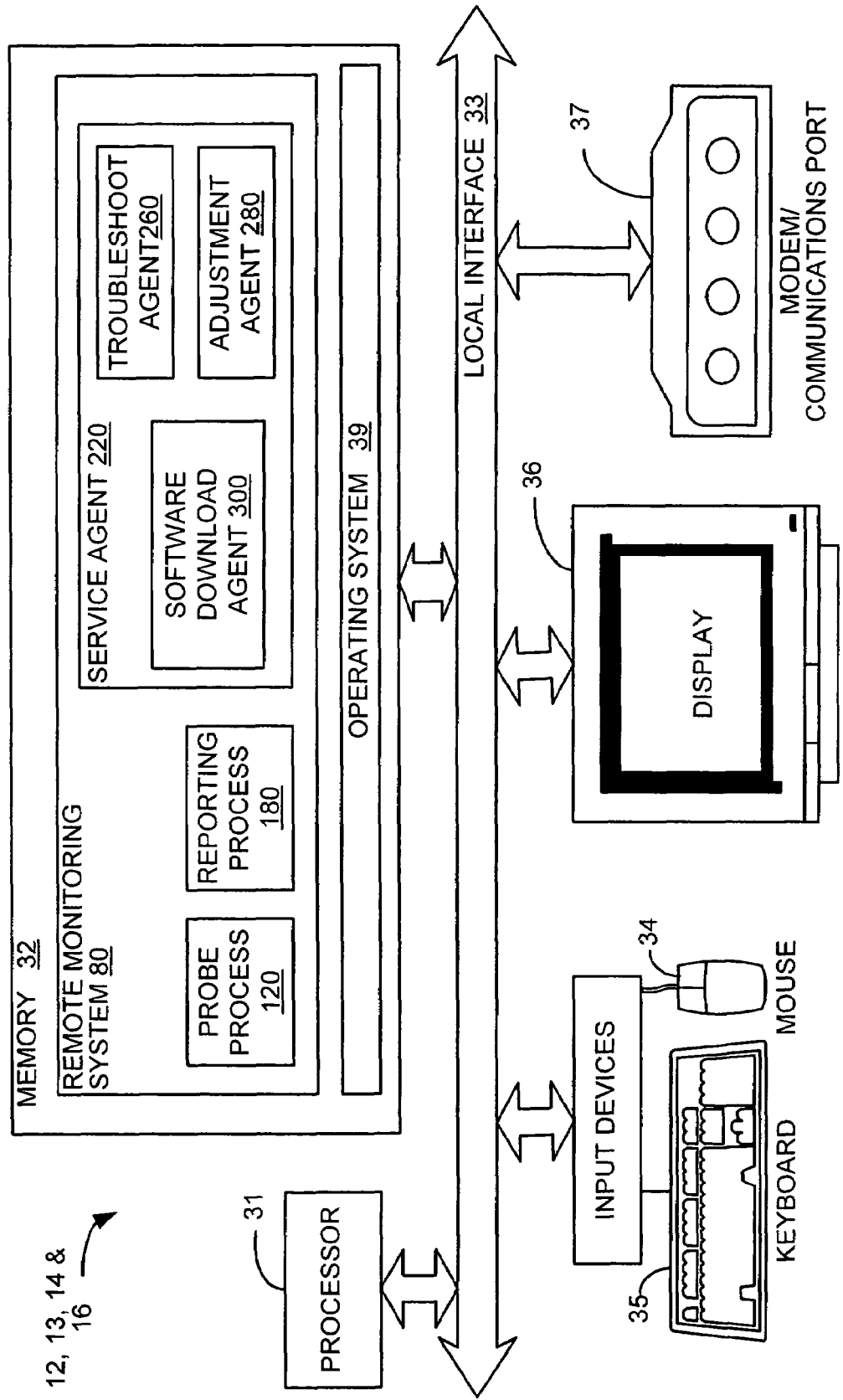
FIG. 2A is a block diagram illustrating an example of a computer system utilizing the remote monitoring system of the present invention, as shown in FIG. 1.
Figure 2B:
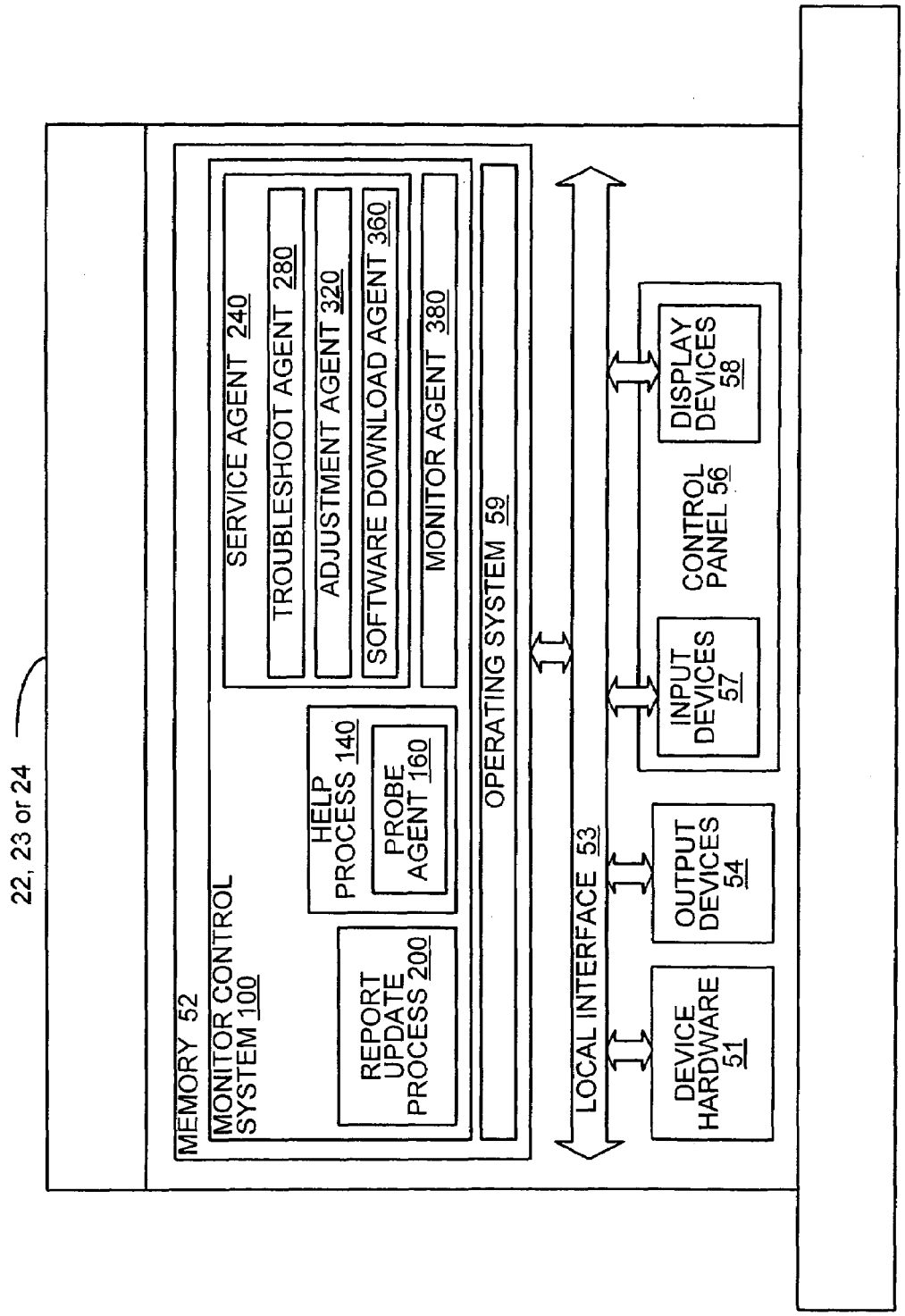
FIG. 2B is a block diagram illustrating an example of a manufacturing device utilizing the remote monitoring system of the present invention, as shown in FIG. 1.

Illustrated in FIG. 2A is a block diagram demonstrating an example of a service computers 12, 13, 14 and 16, as shown in FIG. 1, utilizing the remote monitoring system 80 of the present invention. Illustrated in FIG. 2B is an example demonstrating a manufacturing device 22-24 (e.g., a foam-in-bag dispensing system) utilizing remote monitoring system of the present invention. Service computers 12, 13, 14 and 16 include, but are not limited to, PCs, workstations, laptops, PDAs, palm devices and the like. The processing components of the manufacturing device 22, 23 and 24 are substantially similar to that of the description for the service computer 16 (FIG. 2A). However, it is contemplated that many of the components in the user's manufacturing device 22, 23 and 24 can be more limited in general function.

Generally, in terms of hardware architecture, as shown in FIG. 2A, the service computer 12, 13, 14 and 16 are shown to include a processor 31, memory 32, and one or more input and/or output (I/O) devices (or peripherals) that are communicatively coupled via a local interface 33. The local interface 33 can be, for example but not limited to, one or more buses or other wired or wireless connections, as is known in the art. The local interface 33 may have additional elements, which are omitted for simplicity, such as controllers, buffers (caches), drivers, repeaters, and receivers, to enable communications. Further, the local interface 33 may include address, control, and/or data connections to enable appropriate communications among the aforementioned components.

The processor 31 is a hardware device for executing software that can be stored in memory 32. The processor 31 can be virtually any custom made or commercially available processor, a central processing unit (CPU) or an auxiliary processor among several processors associated with the service computer 16, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 32 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 32 may incorporate electronic, magnetic, optical, and/or other types of storage media. Note that the memory 32 can have a distributed architecture, where various components are situated remote from one another, but can be accessed by the processor 31.

The software in memory 32 may include one or more separate programs, each of which comprises an ordered listing of executable instructions for implementing logical functions. In the example illustrated in FIG. 2A, the software in the memory 32 includes a suitable operating system (O/S) 39 and the remote monitoring system 80 of the present invention.

A non-exhaustive list of examples of suitable commercially available operating systems 39 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 39 essentially controls the execution of other computer programs, such as the remote monitoring system 80, and provides scheduling, input-output control, file and data management, memory management, and communication control and related services. However, it is contemplated by the inventors that the remote monitoring system 80 of the present invention is applicable on all other commercially available operating systems.

The remote monitoring system 80 may be a source program, executable program (object code), script, or any other entity comprising a set of instructions to be performed. When a source program, then the program is usually translated via a compiler, assembler, interpreter, or the like, which may or may not be included within the memory 32, so as to operate properly in connection with the O/S 39. Furthermore, the remote monitoring system 80 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA and the like.

The I/O devices may include input devices, for example but not limited to, a keyboard 35, mouse 34, scanner (not shown), microphone (not shown), etc. Furthermore, the I/O devices may also include output devices, for example but not limited to, a printer (not shown), display 36, etc. Finally, the I/O devices may further include devices that communicate both inputs and outputs, for instance but not limited to, a NIC or modulator/demodulator 37 (modem) for accessing manufacturing devices, other files, devices, systems, or a network), a radio frequency (RF) or other transceiver such as Wi-Fi or the like (not shown), a telephonic interface (not shown), a bridge (not shown), a router (not shown), etc. The inventors understand that a WI-F connection may be utilized between manufacturing devices. This communication can be utilized to allow a multiple number of the manufacturing devices to share a common communication link to the service computer 16, or each manufacturing device can be a self contained unit with a direct link to the service computer, or combinations thereof (e.g., a large number of manufacturing devices sharing a common communication link to said service a computer and a lesser number at another facility having a non-shared communication link with, for example, the same service computer used for monitoring the manufacturing devices at the two different facilities linked by a common remote service providing network). As will become more apparent below, a variety of remote service providing arrangements can be set up to suit the manufacturing device set up within a servicing area for the one or more remote monitoring service computers involved.

If the service computer 16 is a PC, workstation, intelligent device or the like, the software in the memory 32 may further include a basic input output system (BIOS) (omitted for simplicity). The BIOS is a set of essential software routines that initialize and test hardware at startup, start the O/S 39, and support the transfer of data among the hardware devices. The BIOS is stored in some type of read-only-memory, such as ROM, PROM, EPROM EEPROM or the like, so that the BIOS can be executed when the service computer 12, 13, 14 and 16 are activated.

When the computers 12, 13, 14 and 16 are in operation, the processor 31 for each is configured to execute software stored within the memory 32, to communicate data to and from the memory 42, and to generally control operations of the service computer 12, 13, 14 and 16 are pursuant to the software. The remote monitoring system 80 and the O/S 39 are read, in whole or in part, by the processor 31, perhaps buffered within the processor 41, and then executed.

When the remote monitoring system 80 is implemented in software, as is shown in FIGS. 2A and 2B, it should be noted that the remote monitoring system 80 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The remote monitoring system 80 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the remote monitoring system 80 is implemented in hardware, the remote monitoring system 80 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of a manufacturing device 22-24 utilizing the remote monitoring system 80 of the present invention, as shown in FIG. 1. As illustrated, the manufacturing devices 22-24 include many of the same components as service computer 16 described with regard to FIG. 2A. Manufacturing device 22-24 includes device hardware 51, which is analogous to a processor 31, and output devices 54 which are analogous to display 36 or printer (not shown). Control panel 56 includes input devices 57 and display devices 58. Input devices 57 can be specialty function input devices or general input devices, such as mouse 34 and keyboard 35 demonstrated in FIG. 2A. Control panel 56 is herein described in further detail with regard to FIG. 2C. Also included in FIG. 2B is memory 52 which corresponds to memory 32 (FIG. 2A).

As an example, there is described herein the use of remote monitoring system 80 in conjunction with a foam-in-bag dispensing system as the manufacturing devices 22-24. That system has located in memory 52 processing system 100 (e.g., the monitoring control system for the manufacturing device) for use with a foam-in-bag dispenser, which includes the following processes such as, but not limited to, the report update process 200, help process 140, service agent 240 and monitor agent 380. The service agent 240 further comprises a troubleshooting agent 280, adjustment agent 320 and a software download agent 360. When the processing system 100 is implemented in software, as is shown in FIG. 2B, it should be noted that the processing system 100 (FIG. 2B) can be stored on virtually any computer readable medium for use by or in connection with any computer related system or method.

In an alternative embodiment, where the processing system 100 is implemented in hardware, the processing system 100 can be implemented in the same way as described above with regard to the remote monitoring system 80.

Figure 2C:
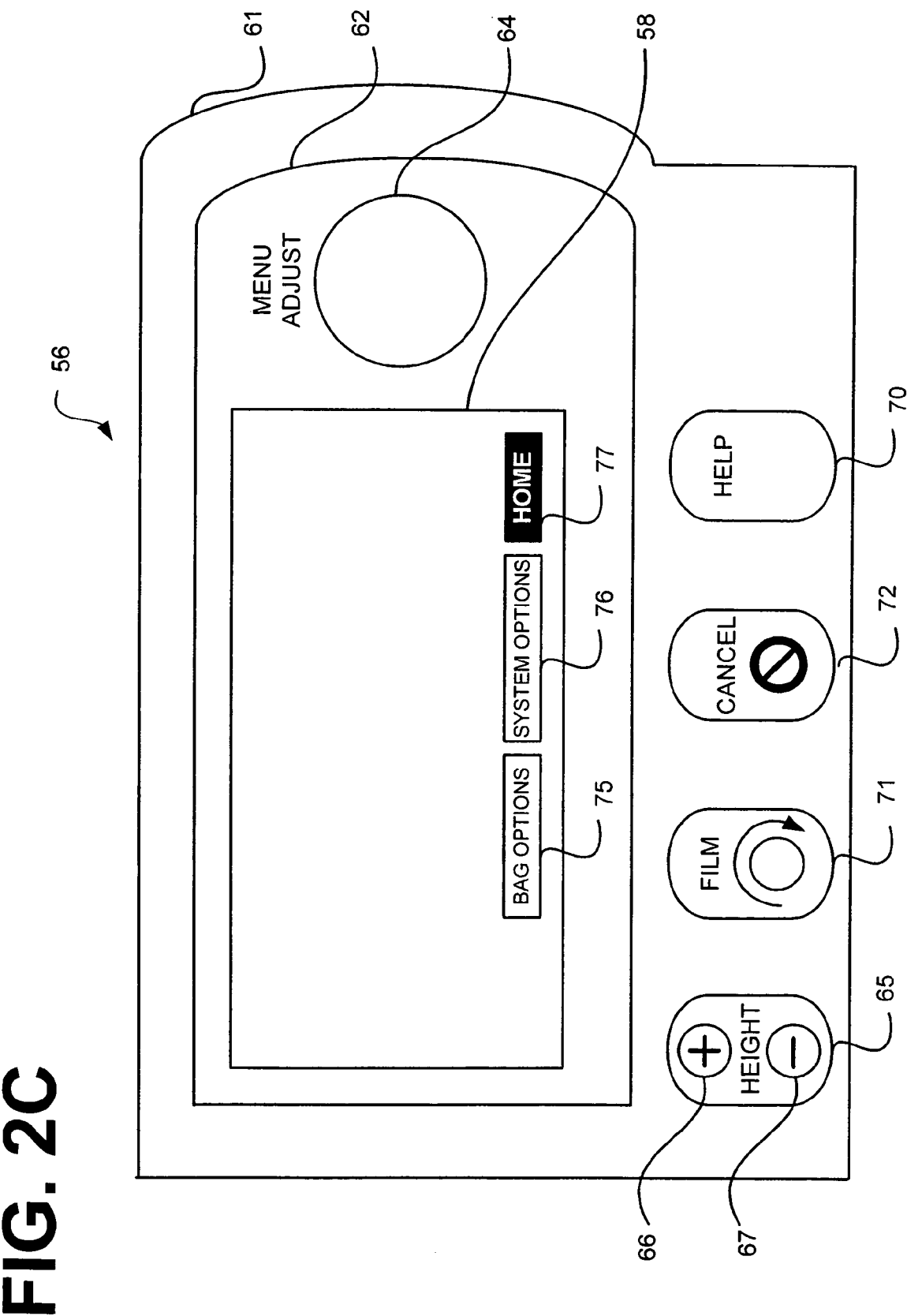
FIG. 2C is a block diagram illustrating an example of a control panel for the manufacturing device utilizing the remote monitoring system of the present invention, as shown in FIG. 1.

Illustrated in FIG. 2C is a block diagram demonstrating an example of a control panel 56 for the manufacturing device 22-24 utilizing the remote monitoring system 80 of the present invention, as shown in FIG. 1-2B. The example of control panel 56 includes control panel housing 61 and display housing 62. The example of the control panel 56 further includes display screen 58, with buttons 75-77. Also included in display panel 56 are input buttons: height 65, film 71, cancel 72 and help button 70. In the preferred embodiment, the machine operator for machine device 22-24 can initiate a help call relative to the remote monitoring system 80 of the service computer by activating help button 70. However, it is understood that other of means of activating the remote monitoring system 80 of the present invention may be utilized, including periodic remote activation and deactivation. Item 64 is a dial and select navigation knob similar to aeronautical GPS units. Also, remote monitoring system 80 is shown in its preferred self-contained in service computer although other arrangements are also contemplated including shared relationships of one or more remote systems requirements as in usage of the remote network interconnection.

Figure 3A:
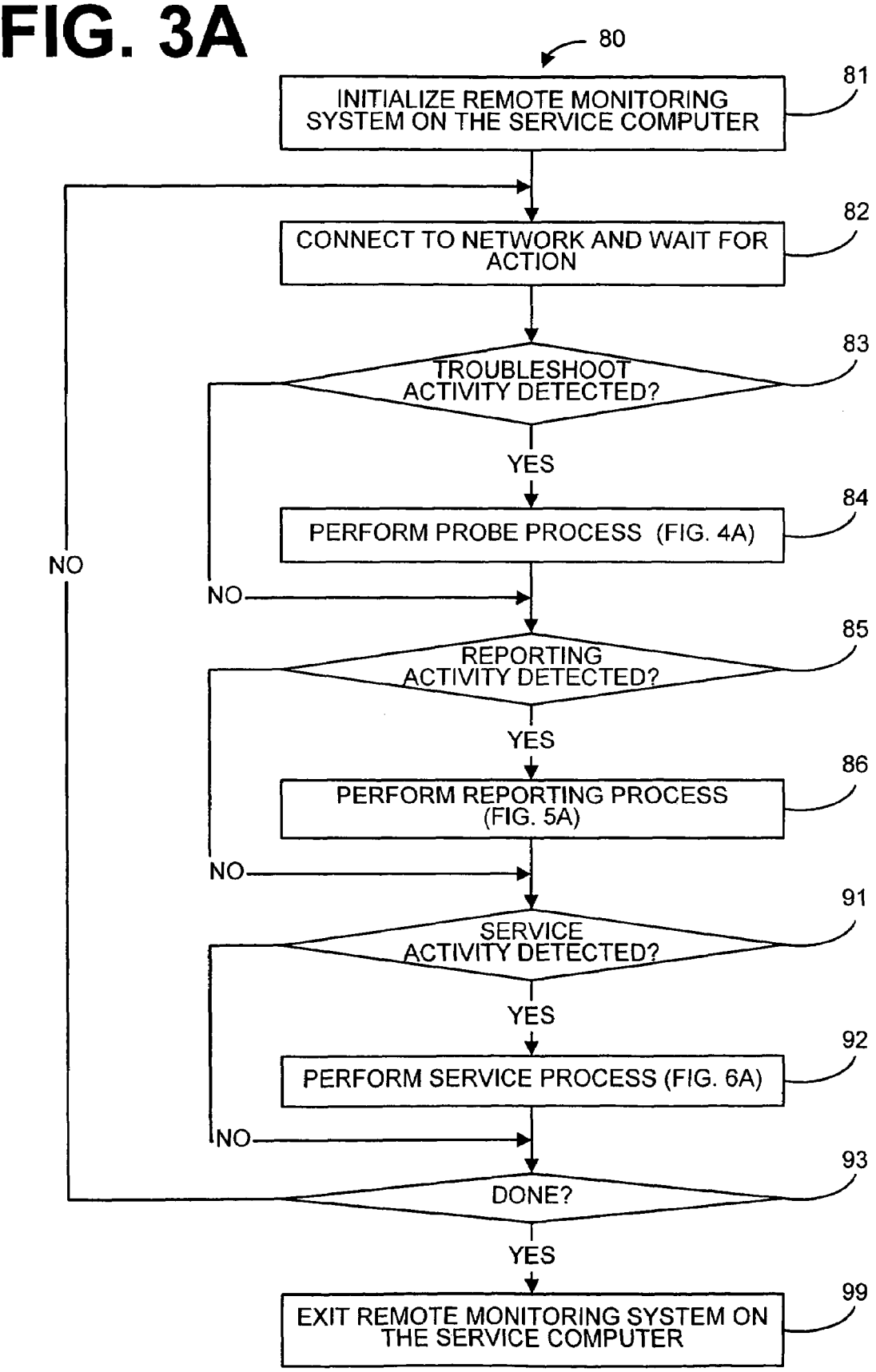
FIG. 3A is a flow chart illustrating an example of the operation of the remote monitoring system of the present invention on the server, as shown in FIGS. 1 and 2A.

FIG. 3A is a flow chart illustrating an example of the operation of the remote monitoring system 80 of the present invention on the service computer 16, as shown in FIGS. 1 and 2A. The remote monitoring system 80 of the present invention enables a user of the manufacturing device 22-24 to connect to a service computer 16 to seek help. The service computer 16 will initiate a connection to the manufacturing device 22-24 in an effort to investigate what problem has occurred and a solution to the problem.

In the depicted example, the service computer 16 receives the data stream from the manufacturing device 22-24 including, but not limited to: system parameters, log, current device status, set up parameters, sensor data and the like. With the data in the data stream, a service representative will be able to analyze and perform online troubleshooting of the manufacturing device 22-24. If the service representative determines that adjustment can be made remotely, then the remote monitoring system 80 of the present invention facilitates the service representative in adjusting any system parameter in the manufacturing device 22-24. The remote monitoring system 80 of the present invention also enables the collection of performance data for manufacturing devices 22-24 for reporting purposes. This feature enables the producer of the manufacturing device to track the performance of the manufacturing device.

The remote monitoring system 80 of the present invention also enables the capability to download software patches, upgrades and new versions of software from the service computer to any supportable manufacturing device. Currently this task requires a service representative to visit the location of each manufacturing device 22-24. This can be very time-consuming and take several months to upgrade numerous manufacturing devices at a customer site, and often leads to confusion and/or added status accounting work as to which machines and/or operator sites have been upgraded and with which upgrade. In addition, the current method for updating supportable manufacturing devices is the swapping of memory. This memory is very fragile and can easily be corrupted or destroyed.

First at step 81, the remote monitoring system 80 is initialized on the service computer 16. This initialization includes the startup routines and process embedded in the BIOS of the service computer 16. The initialization also includes the establishment of data values for particular data structures utilized in the service computer 16 and remote monitoring system 80, which are either fixed or adjustable by the operator to a desired pre-setting (e.g., a desired operational heating wire temperature to be monitored).

At step 82, the remote monitoring system 80 connects to a network. The network may be the Internet, a local area network (LAN), a wide area network (WAN), a telephone line (PSTN) using a modem or other like networks. After connecting to the network, the remote monitoring system 80 then waits to receive action events.

At step 83, the remote monitoring system 80 determines if there is a troubleshooting activity detected. A trouble shooting activity can be initiated by the monitoring control system 100 shown operating in a foam-in-bag device representing an example of manufacturing devices 22-24. If it is determined the step 83 that a trouble shooting activity was not detected, then the remote monitoring system 80 of the present invention skips to step 85.

If a trouble shooting activity is detected, the monitoring control system 100 has sensed that a parameter is outside a present range which can actually provide means of preventing a more egregious problem (e.g., detection of heater wire performance being outside a preset temperate range which can be precondition of a more serious problem potentially arising as in a burn out and missed bag edge sealing with resultant foam spillage). In other words, if a trouble shooting activity is detected, the manufacturing device 22-24 has experienced a problem ("Problems" include, for example, detection of an actual breakdown or non-operational feature and/or parameters indicative of an upcoming breakdown and/or the machine operator has activated the help button and/or a sensed parameter is outside of a preset value or range and/or that a preset value has been reached (e.g., calculated or estimated length of film output). The troubleshoot activity can be triggered in a variety of ways as in an internet based check made in conjunction with an initial start up or shut down, or any desired check in sequence or time. More specific examples of problems that might arise include, for example, problems dealing with proper chemical supply conditions as in temperature, pressure and flow rate, proper dispensing as in dispenser valve manipulation; film feed; bag forming (e.g., end and edge sealing); maintaining tension in the film; solvent supply for removing and avoiding hardened foam build up, etc. The monitoring control system of the present invention can be set up to send out (independent or in conjunction with a help request of the operator), a suitable signal (e.g., screen display and/or other signal means as in audio signals that is initiated at the manufacturing device in addition to the remote signal generation). This can be, for example, separate and apart from operational warning signals determined by the below described operational control systems.

Thus, if a troubleshooting activity is detected, the remote monitoring system 80 of the present invention can perform the probe process at step 84 if the trouble shooting problem is of the type for which additional probing can be beneficial. The probe process is performed at step 84, and includes connection to the manufacturing device 22-24 and the downloading data from the manufacturing device 22-24 in order to facilitate a service representative to attempt to fix the problem. The probe process is herein defined in further detail with regard to FIG. 4A.

At step 85, remote monitoring system 80 determines if a reporting activity has been detected. A reporting activity can be an event initiated, for example, by the administrator of the remote monitoring system 80 to look into, for instance, the activity of certain systems that are prone to being problematic as described above including when within acceptable operating range parameters. Alternatively, it can be based on a self detected "problem" arising wherein the reporting activity can be either a general check in request and with description or the same with an associated output of associated sensed data related to the problem detection. If it is determined that a reporting activity is not detected, the remote monitoring system 80 then skips to step 91. However, if it is determined at step 85 that the reporting activity is detected, the remote monitoring system 80 then performs a reporting process at step 86. The reporting process is herein defined in further detail with regard to FIG. 5A. A reporting activity can also be initiated by the manufacturing device operator, as during, for example, periodic downtimes when the equipment is in a no use or downtime status.

At step 91, the remote monitoring system determines if a service activity is detected. A service activity is generally a service engineer initiated activity, but, as above, can also be triggered by the operator or a sensed reason for activation occurrence. In addition, other known service activities can be included into the service activity process. If it is determined at step 91 that a service activity is not detected then the remote monitoring system 80 of the present invention proceeds to step 93. However, if it is determined at step 91 that a service activity is detected, the remote monitoring system 80 of the present invention then performs the service process at step 92. The service process as herein defined further detail with regard to, for example, FIG. 6A.

At step 93, the remote monitoring system 80 determines if there are more operations to be performed. If it is determined at step 93 that there are more operations to be performed, the remote monitoring system 80 returns to repeat steps 82 through 93. However, if it is determined at step 93 that there are no more operations to be performed, the remote monitoring system 80 then exits at step 99.

Figure 3B:
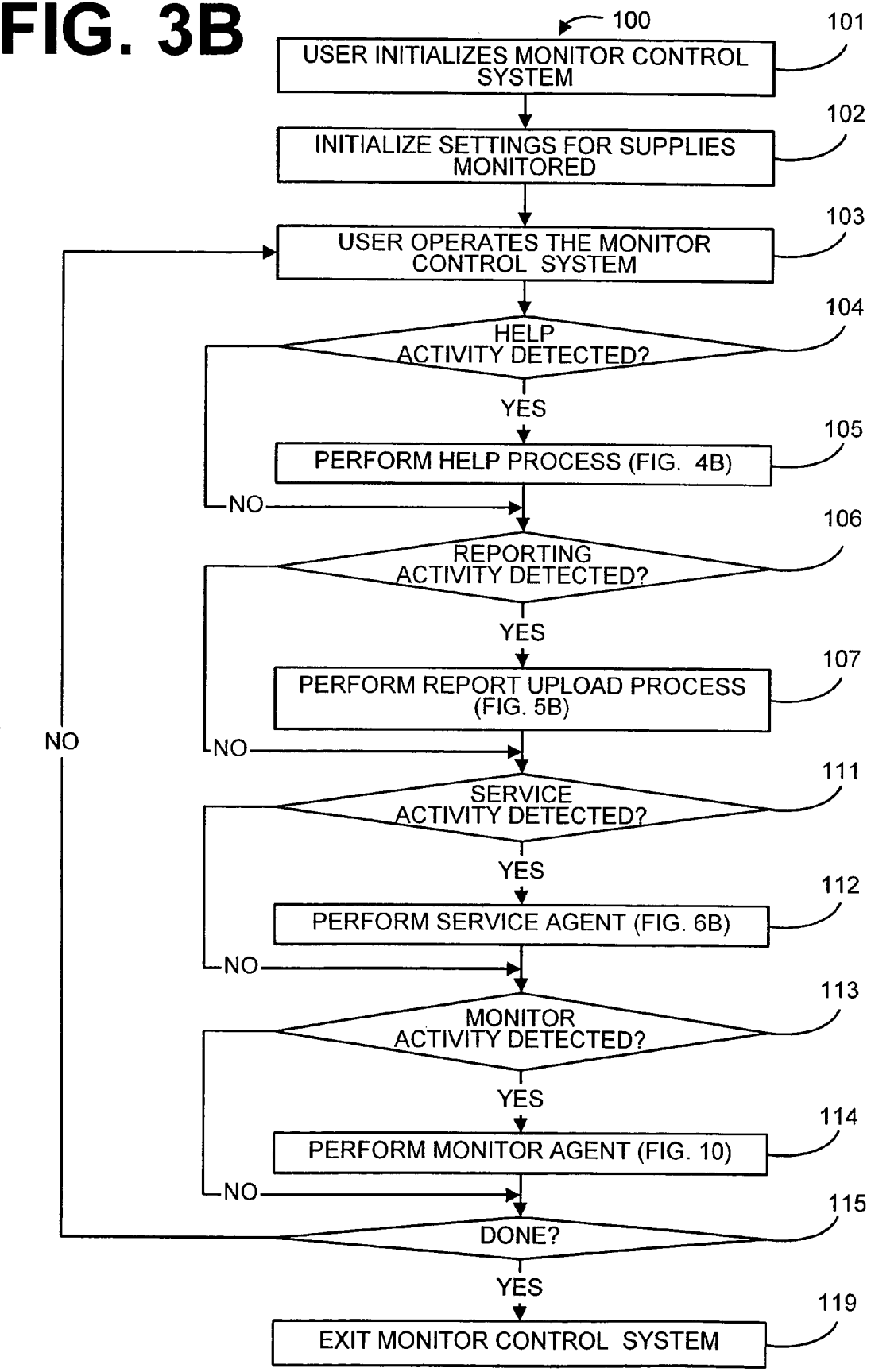
FIG. 3B is a flow chart illustrating an example of the operation of the monitoring control system on the manufacturing device and utilized by the remote monitoring system of the present invention, as shown in FIGS. 1 and 2B.

FIG. 3B is a flow chart demonstrating an example of the operation of the monitor control system 100 on the manufacturing device 22-24 and is utilized by the remote monitoring system 80 of the present invention, as shown in FIGS. 1 and 2B. Hereinafter, the manufacturing device 22-24 will be referred to as manufacturing device 22 for the sake of brevity. In the example illustrated, the remote monitoring system 80 of the present invention will be demonstrated interacting or interfacing with the manufacturing device's monitor control system 100 (local or an "interconnected" sub-system). The monitor control system 100 has the features and functionality to enable the operation of the remote monitoring system 80 of the present invention.

For example, in a first stage the manufacturing device 22 is initialized at step 101. This initialization includes the startup routines and processes embedded in the BIOS of the manufacturing device 22. The initialization also includes the establishment of data values (e.g., single point, multiple points or ranges) for particular data structures utilized in the manufacturing device 22. At step 102, the monitor control system 100 initializes the settings for any supplies to be automatically monitored. The settings for indicating which supplies are to be monitored are preset by the manufacturer of the manufacturing device 22. It is understood that these setting can be reset by the administrator on service computer 16 or by the user of the monitor control system 100 on the manufacturing device 22 including, for example, formulas with relying on multiple sensed variable (e.g., temperature and humidity). At step 103, the user operates the manufacturing device 22 in a normal operating mode. Some of the monitoring functions as in the storage of desirable values and suitable ranges like temperature can be the sole domain or shared with the operational control system described below wherein the monitoring control signal receives only processed end sensing results carrier out by the operational control system.

At step 104, the monitor control system 100 determines if a help activity is detected. A help activity will be detected when the user operator of the machine device 22 activates a help button 70 (FIG. 2B) or in some other fashion as described above. If it is determined at that step that the help activity is not detected, then the monitor control system 100 proceeds to step 106. However, if it is determined at step 104 that a help activity event is detected, then the monitor control system 100 performs the help process at step 105. The help process is herein defined in further detail with regard to FIG. 4B.

At step 106 the monitor control system 100 determines if a reporting activity is detected. A reporting activity would be, for example, an activity initiated by an administrator or service engineer using the remote monitoring system 80 (FIG. 2A). If it is determined at step 106 that a reporting activity is not detected, then the monitor control system 100 proceeds to step 112. However, if it is determined at step 106 that a reporting activity is detected, then the monitor control system 100 performs the report upload process at step 107. The report uploading process is herein defined in further detail with regard to FIG. 5B.

At step 111, the monitor control system 100 determines if a service activity is detected. A service activity would be initiated, for example, by the service engineer using the remote monitoring system 80 (FIG. 2A). If it is determined to step 111 that a service activity is not detected, the monitor control system 100 would proceed to step 113. However, if it is determined at step 105 that a service activity is detected, then the monitor control system 100 initiates the service agent at step 112. The service agent is herein defined in further detail with regard to FIG. 6B.

At step 113, the monitor control system 100 determines if a monitor activity is detected. A monitor activity would be initiated, for example, by the monitor control system 100 inventory system (not shown). It is possible for a user of manufacturing device 22 to initiate the monitor activity if the user of desires to reorder inventory. If it is determined at step 113 that a monitor activity is not detected, the monitor control system 100 would proceed to step 115. However, if it is determined at step 113 that a monitor activity is detected, then the monitor control system 100 initiates the monitor agent at step 114. The monitor agent is herein defined in further detail with regard to FIG. 10.

At step 115, the monitor control system 100 determines if there is more processing to occur. If it is determined at step 115 that there is more processing to occur, then the monitor control system 100 returns to repeat steps 102 through 113. However it is determined at step 115 that there is no more processing to be done, then the monitor control system 100 exits the monitor control system 100 on manufacturing device 22 at step 119.

FIG. 4A is a flow chart illustrating an example of the operation of the probe process 120 utilized by the remote monitoring system 80 of the present invention, as shown in FIGS. 2A and 3A. The probe process 120 is initiated, for example, from a help activity signaled from the remote monitoring system 100 (FIG. 3B). The probe process 120 enables a service engineer to connect to the monitor control system 100. Once connected, the probe process 120 captures information that potentially can be used to determine corrective actions for the monitor control system 100 in an effort to control and maintain a properly performing manufacturing device 22.

First at step 121, the probe process 120 is initialized on the service computer 16. This initialization includes the startup routines and process embedded in the BIOS of the service computer 16. The initialization also includes the establishment of data values for particular data structures utilized by the probe process 120. At step 122, the probe process 120 logs the help message received from the monitor control system 100 on the manufacturing device 22.

At step 123, the probe process 120 attempts to connect to or interface with the smart bagger system 100 on manufacturing device 22. At step 124, it is determined if the connection is OK. If it is determined at the connection is valid, then the probe process 120 proceeds to step 125. If it is determined at the connection is not valid, then the probe process 120 returns to retry the connection to the monitor control system 100 on the manufacturing device 22 at step 123. However, if the probe process 120 has attempted and failed to connect within a predetermined number of the attempts, the probe process 120 signals a service engineer that the connection has failed and then exits at step 139.

At step 125, the probe process 120 initiates a download of, for example, the shutdown log of data in the monitor control system 100 on the manufacturing device 22. At step 126 and 127, the input sensor data and system parameters are downloaded. At step 131, the probe process 120 downloads a record of the system usage. The description of the information downloaded is for illustration purposes and it is contemplated that other types of data can be captured. It is also contemplated that some sort of user interface may be utilized in order to allow the service engineer to select with types of data is to be downloaded via the monitor control system 100 executed on manufacturing device 22.

At step 132, all the information downloaded is stored within database 17 (FIG. 1). At step 133 of the probe process 120 the data is presented (directly or in a manipulated fashion to facilitate an analysis (e.g., a comparison against a history log to show if any recent deviations)) to a service engineer in order to enable the service engineer to analyze (e.g., just view and/or vary in presentation format and/or further manipulate) the data for the problem being reported. It is contemplated by the inventors that a user interface (not shown) may be utilized in order to enable a service engineer to retrieve (as in for example an on site retrieval the remote monitoring servicer location or a second remote site not associated with the manufacturing device location or first remote servicer location site) for analysis. As known in the art, there are various types of user interfaces to enable database searching.

At step 134, the probe process 120 then enables a central service engineer to either handle the problems directly (as in through instructions sent to the monitor control system) or notify a more local service engineer of the problem occurring with manufacturing device 22. This notification can be accomplished in numerous ways including but not limited to e-mails, phone calls, SMS messages, paging the local service engineer and the like. In the preferred embodiment, e-mail is sent to the local service engineer describing the likely corrective actions to fix the problem reported by the system 100 on manufacturing device 22. Alternatively, or in addition to, there is forwarded to the manufacturing device's control panel instructions based on the remote service analysis if physical activity on the part of an operator or local service representative.

At step 135, the probe process 120 also notifies locations having an interest in manufacturing device performance as in the corporate office of the producer of manufacturing device 22 of the problem experienced by the operator of manufacturing device 22. This notification may be to other integral parties to the process, including but not limited to, purchasing departments, maintenance departments, local sales offices, research and development, etc. This notification can be accomplished in numerous ways including but not limited to e-mails, phone calls, SMS messages, paging and the like. At step 139, the probe process then exits on service computer 16.

Figure 4B:
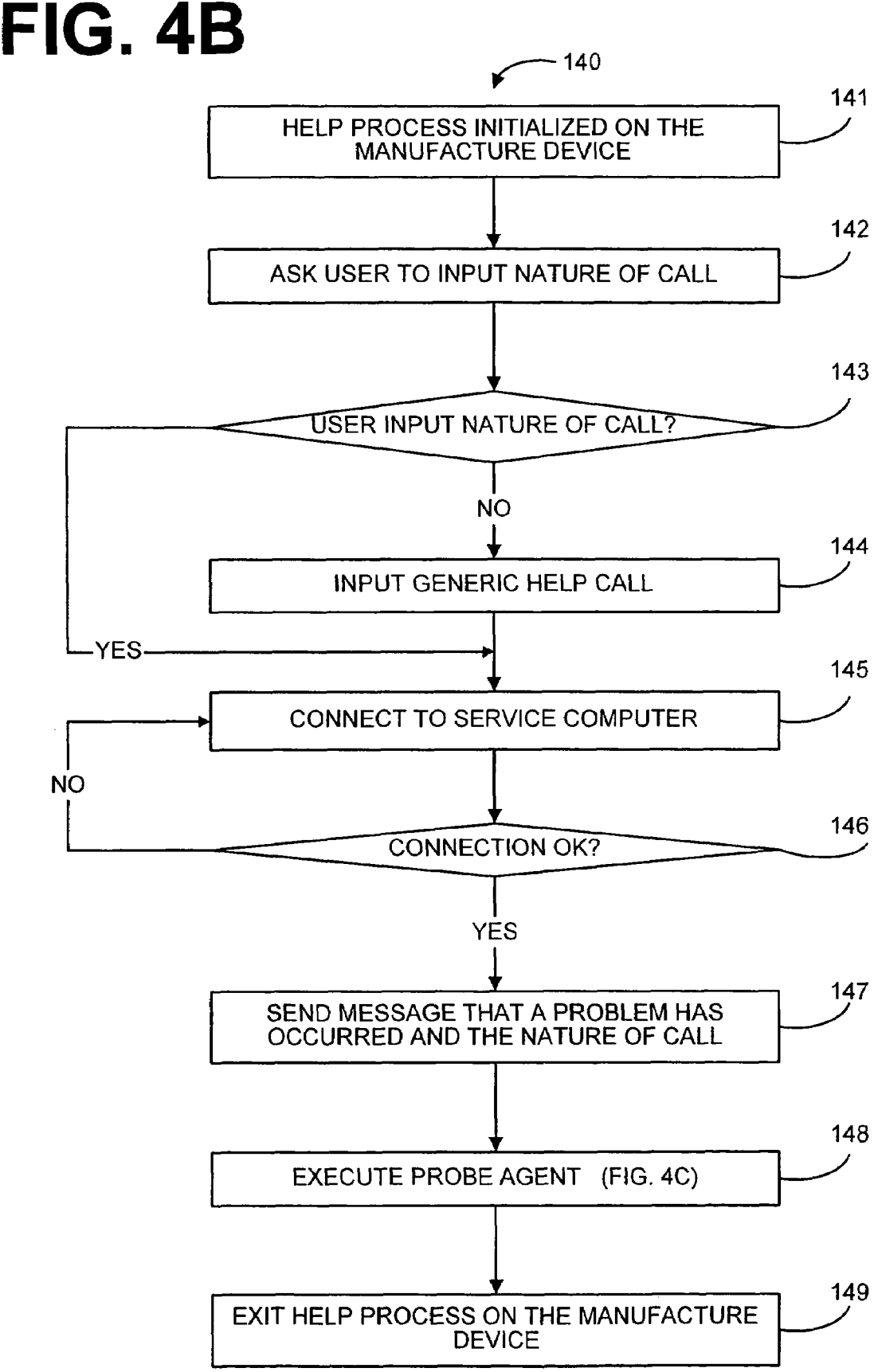
FIG. 4B is a flow chart illustrating an example of the operation of the help process controlled by the monitoring control system on the manufacturing device and utilized by the remote monitoring system of the present invention, as shown in FIGS. 2B and 3B.

FIG. 4B is a flow chart illustrating an example of the operation of the help process utilized by the monitor control system 100 on the manufacturing device 22 and utilized by the remote monitoring system 80 of the present invention, as shown in FIGS. 2B and 3B. The help process 140 interacts with the operator of manufacturing device 22 (FIG. 2B) and enables a user to report a problem with manufacturing device 22.

First, the help process 140 is initialized at step 141. This initialization includes the startup routines and processes embedded in the BIOS of the manufacturing device 22. The initialization also includes the establishment of data values for particular data structures utilized by help process 140. At step 142, the user is asked to input the nature of the help call (this step may be omitted as in situations, for example, where the sensing system of the manufacturing device is providing input or one or more sub-system irregularities already, or altered as in first presenting choices to the operator that are in line with or relevant to the sensed potentially problematic sub-systems). This information can be captured and a number of different ways such as, but not limited to, the selection of a problem from a user interface, capturing of a problem condition on the manufacturing device 22, or data input by the operator of the manufacturing device 22. In the preferred embodiment, the data is acquired on manufacturing device 22 using input devices 57 (FIG. 2B).

At step 143, the help process 140 determines if the user has input the nature of the help call. If it is determined at step 143 that the user has input the nature of the help call, then the help process 140 then skips to step 145. However, if it is determined at step 143 that the user has not input the nature of the call then the help process 140 provides, for example, a generic help call at step 144.

At step 145, the help process 140 attempts to connect to service computer 16 (FIG. 1). At step 146, the help process 140 determines if the connection is OK. If the connection has failed, the help process 140 returns to the attempt to connect to service computer 16 at step 145. However if it is determined at step 146 that the connection has been successfully completed, then the help process 140 sends a message to service computer 16 that a problem has occurred, along with the nature of the help call describing the problem at step 147.

At step 148, the help process 140 executes the probe agent. The probe agent is preferably a stand-alone process that runs in the background and enables a service engineer to connect to the monitor control system 100 on manufacturing device 22. The probe agent is herein defined further detail with regard to FIG. 4C. At step 149, the help process 140 then exits the monitor control system 100 for manufacturing device 22.

Figure 4C:
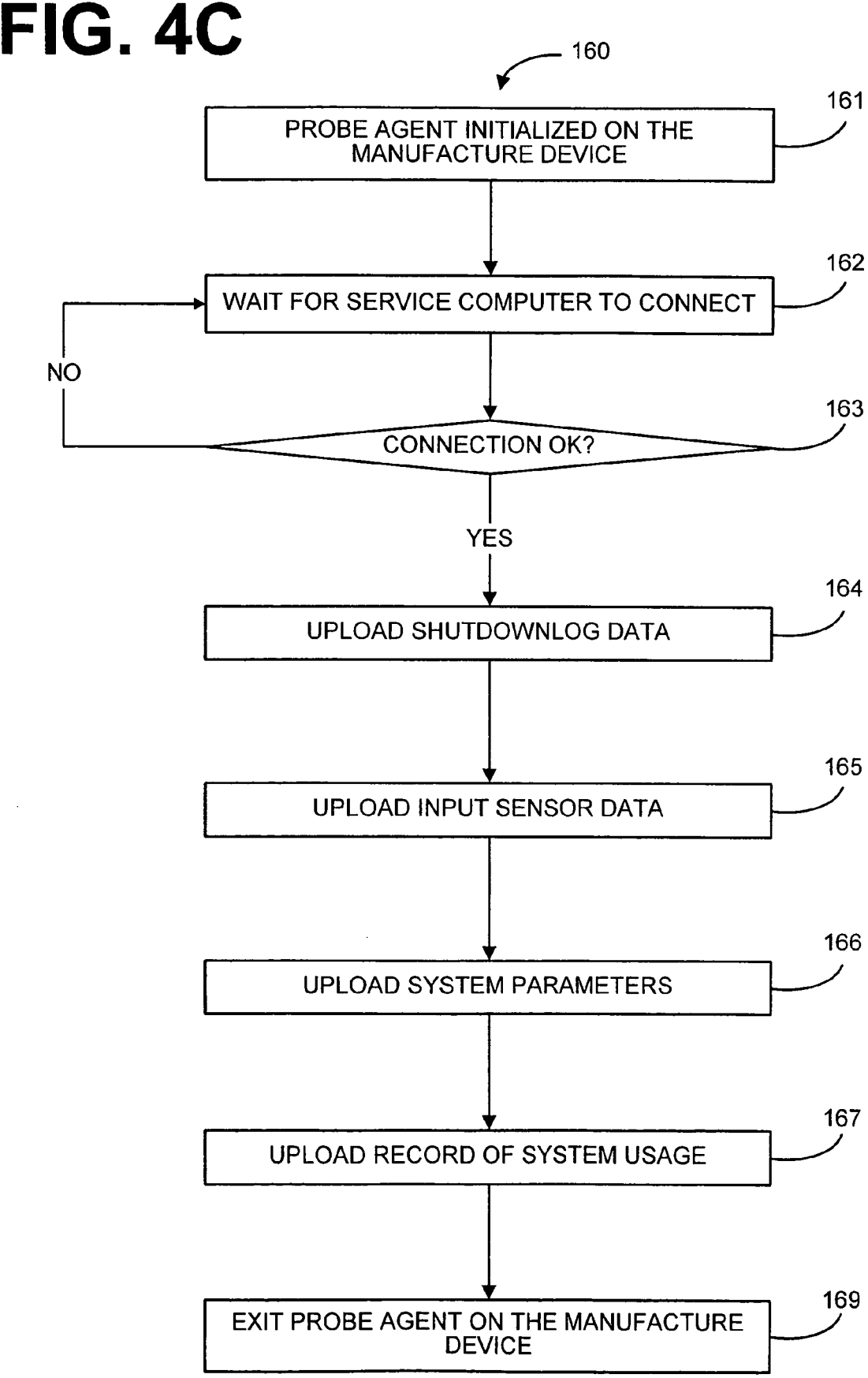
FIG. 4C is a flow chart illustrating an example of the operation of the probe agent used in conjunction with the help process on the control system which is on the manufacturing device and utilized by the remote monitoring system of the present invention, as shown in FIGS. 2B, 3B and 4B.

FIG. 4C is a flow chart illustrating an example of the operation of the probe agent 160 used in conjunction with the help process 140 on the monitor control system 100 which is for the manufacturing device 22 and utilized by the remote monitoring system 80 of the present invention, as shown in FIGS. 2B, 3B and 4B. The probe agent 160 is a stand-alone process that runs in the background and enables a service engineer to connect to the monitor control system 100 on manufacturing device 22.

First, the probe agent 160 is initialized at step 161. This initialization includes the startup routines and processes embedded in the BIOS of the manufacturing device 22. The initialization also includes the establishment of data values for particular data structures utilized by probe agent 160.

Next, the probe agent 160 waits for the service computer 16 (FIG. 1) to connect to the manufacturing device 22 (FIG. 2B) at step 162. After the service computer 16 attempts to connect to the manufacturing device 22, the probe agent 160 determines if the connection is successful at step 163. If the connection is not successful, the probe agent 160 returns to repeat step 162 to wait for service computer 16 to connect. However, if it is determined at step 163 that the connection was successful, the probe agent 160 uploads the shutdown log data at step 164. At steps 165 and 166, the probe agent 160 uploads the input sensor data and system parameters respectively.

At step 167, the probe agent 160 uploads the record of system usage. The uploaded data described above is here in included for illustrative purposes only. It is understood by the inventors that other types of data maybe requested by service computer 16 and uploaded during the probe agent process 160 execution. After the data requested by service computer 16 is uploaded, the probe agent 160 then exits the monitor control system 100 on manufacturing device 22 at step 169.

Figure 5A:
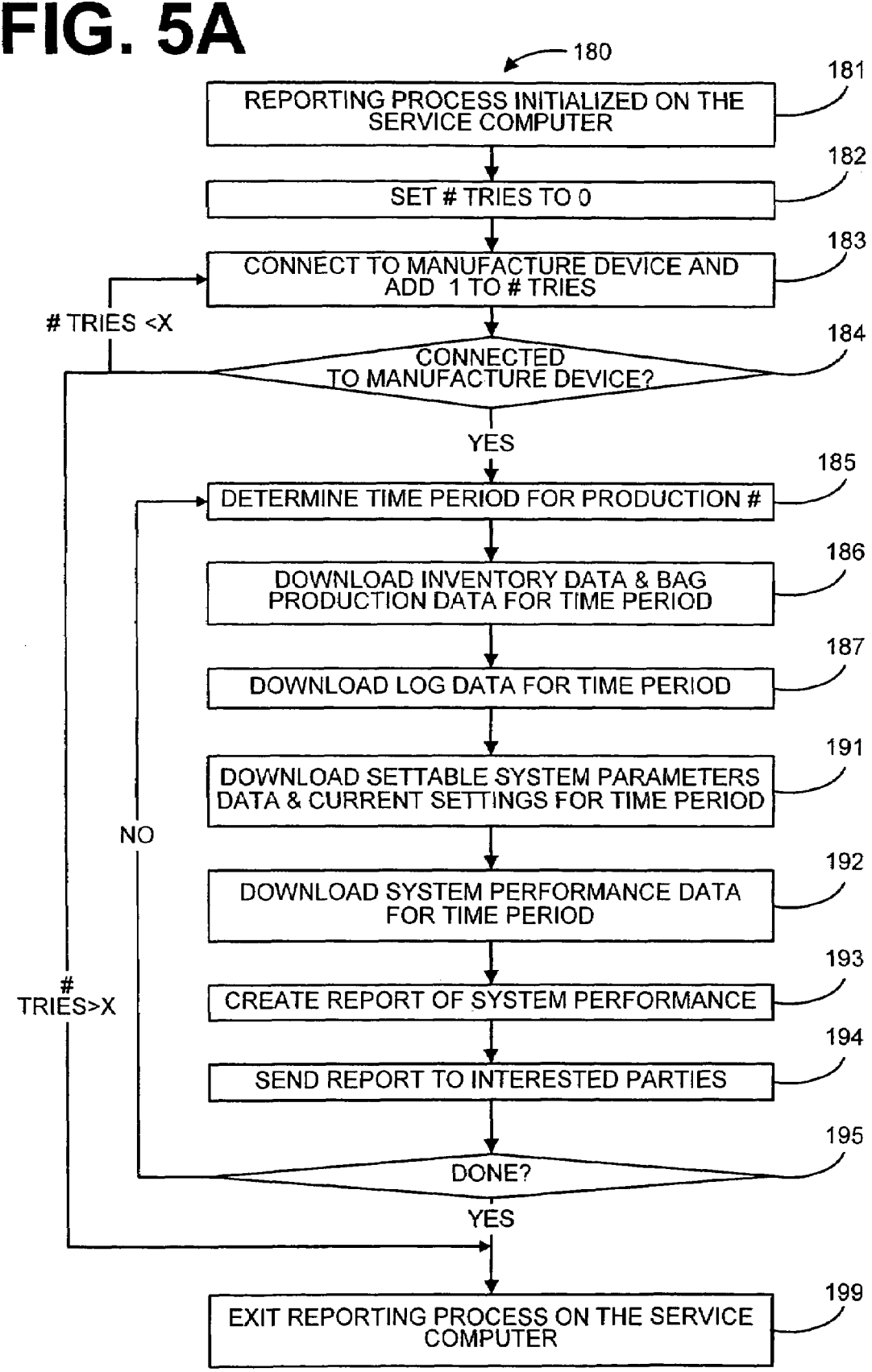
FIG. 5A is a flow chart illustrating an example of the operation of the reporting process utilized by the remote monitoring system of the present invention, as shown in FIGS. 2A and 3A.

FIG. 5A is a flow chart illustrating an example of the operation of the reporting process 180 utilized by the remote monitoring system 80 of the present invention, as shown in FIGS. 2A and 3A. The reporting process 180 is initiated upon the detection of a reporting activity. A reporting activity is, for example, an event initiated by an administrator on the remote monitoring system 80. The reporting process 180 acquires data from manufacturing device 22 (FIG. 1) and creates a report utilizing the data acquired. The generated report can then be sent to any number of other interested parties.

First at step 181, the reporting process 180 is initialized on service computer 16. This initialization includes the startup routines and process embedded in the BIOS of the service computer 16. The initialization also includes the establishment of data values for particular data structures utilized in the reporting process 180. At step 182, the reporting process 180 sets the number of tries to zero. At step 183, the reporting process 180 attempts a connection to the monitor control system 100 on manufacturing device 22 and increments the number of tries by one.

At step 184, the reporting process 180 determines if the connection to the monitor control system 100 on manufacturing device 22 was successful. If it is determined at step 184 that the connection to monitor control system 100 on manufacturing device 22 was successful, the reporting process 180 proceeds to step 185. If it is determined the step 184 that the connection to the monitor control system 100 on manufacturing device 22 was not successful then the reporting process 180 returns to step 183 to re-attempt to the connection to manufacturing device 22 if the number of tries is less than a predetermined number. However, if it is determined at step 184 that the connection to the monitor control system 100 on manufacturing device 22 was not successful and that the number of tries is greater than the predetermined number, then the reporting process 180 provides a notification that the connection was unsuccessful and exits at step 199.

At step 185, the reporting process 180 then determines one or more characteristics associated with the manufacturing device and the operations performed thereby as in, for example, a bag time period for the report being generated using, for example, a production count to determine the time period. It is understood that this production count can be predetermined or can be dynamically determined by the user. In the preferred embodiment, the reporting process 180 generally determines the time period on a predetermined number of operations. In an alternative embodiment, the reporting process 180 can determine the last date and time that the reporting process was run on the particular manufacturing device 22 currently connected and use that as a starting date to current date. However it is also understood, that a user interface may be utilized to enable an administrator to indicate the bag time period to be utilized. At step 186, the reporting process 180 downloads the inventory data and bag production data for the indicated time period from manufacturing device 22. At step 187, the log data is downloaded for the time period indicated. At step 191, the reporting process 180 downloads the settable system parameter data and the current settings for the monitor control system 100 for the manufacturing device 22 for the indicated time period. At step 192, the reporting process 180 downloads the system performance data for the time period indicated. The data downloaded from the monitor control system 100 on manufacturing device 22 described above is herein included for illustrative purposes only. It is contemplated by the inventor that other types of data may be downloaded as requested, and that this data may be determined using a variety of different means. One such a means would be to program the reporting process 182 request different types of information. It is also understood that these types of information may be, for example, determined by an administrator or user of the reporting process 180 through a unit user interface (not shown).

At step 193, the reporting process 180 then creates a report of the system performance for the bag time period indicated. The report created by the reporting process 180 may be determined programmatically or may be selected utilizing a user interface (not shown). At step 190 for the reporting process 180 determines if there are more reports to be run for the currently connected manufacturing device 22. If it is determined that there are more reports to be run, then the reporting process 180 returns to repeat steps 185 through 194. However, if it is determined at step 194 that the reporting process 180 is complete, then the reporting process 180 exits at step 199.

Figure 5B:
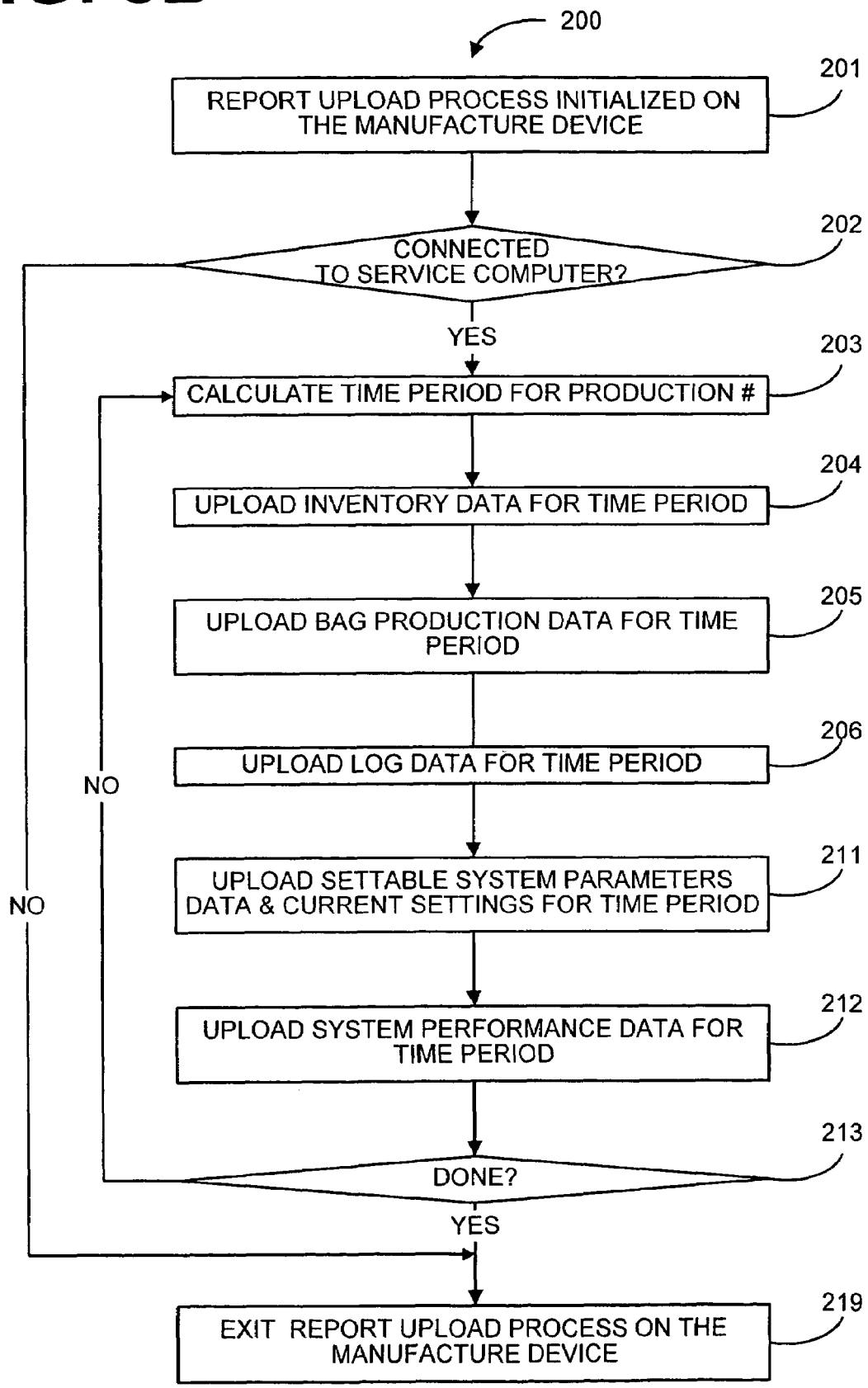
FIG. 5B is a flow chart illustrating an example of the operation of the report upload process controlled by the monitoring control system of the manufacturing device and utilized by the remote monitoring system of the present invention, as shown in FIGS. 2B and 3B.

FIG. 5B is a flow chart illustrating an example of the operation of the report upload process 200 utilized by the monitor control system 100 on the manufacturing device 22 and utilized by the remote monitoring system 80 of the present invention, as shown in FIGS. 2B and 3B. The report upload process 200 is initiated when the monitor control system 100 detects a reporting activity at step 105 (FIG. 3B.). A reporting activity would be, for example, an activity initiated by an administrator or service engineer using the remote monitoring system 80 (FIG. 2A).

First, the report upload process 200 is initialized at step 201. This initialization includes the startup routines and processes embedded in the BIOS of the manufacturing device 22. The initialization also includes the establishment of data values for particular data structures utilized by report upload process 200. At step 202, report upload process 200 determines if the manufacturing device 22 is connected to service computer 16 (FIG. 1). If it is determined at step 202 that the report upload process 200 is not connected to service computer 16, then the report upload process 200 exits at step 219.

However, if it is determined at step 202 that the upload report process 200 is connected to service computer 16, then the report upload process 202 calculates, one or more characteristics of the manufacturing device as in, for example, the bag time period to be captured for analyzing, for example, bag production of a foam-in-bag dispenser. This input bag time period is transmitted to manufacturing device 22 by service computer 16.

At step 204, the step of uploading an inventory for the indicated time period is performed. Next at step 205 and 206, the bag production data and log data for the time period indicated is uploaded to service computer 16. At step 211 and 212, the settable system parameters, current settings and system performance data for the manufacturing device 22 (FIG. 2B) is uploaded for the time period indicated. It is also contemplated that the identification code for the monitor control system 100 may be uploaded if requested or automatically.

At step 213, the report upload process 200 determines if there are more time periods and data to be uploaded. If it is determined at step 213 that there are more time periods and data to be uploaded, then the report upload process 200 returns to repeat steps 203 through 213. However, if it is determined at step 213 that there is no more time periods and data to be uploaded, then the report upload process 200 exits the monitor control system 100 on manufacturing device 22 at step 219.

Figure 6A:
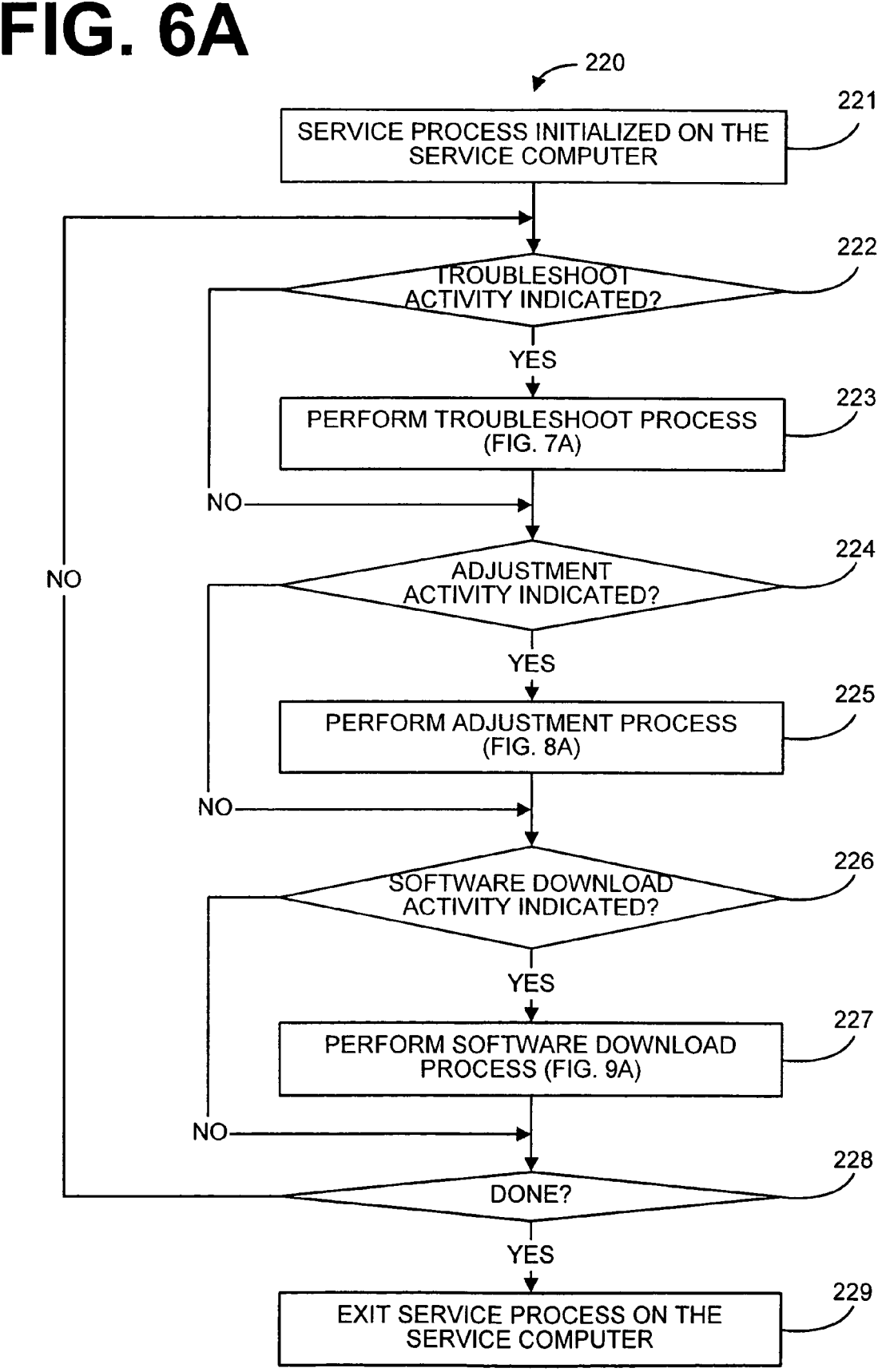
FIG. 6A is a flow chart illustrating an example of the operation of the service agent utilized by the remote monitoring system of the present invention, as shown in FIGS. 2A and 3A.

FIG. 6A is a flow chart illustrating an example of the operation of the service process 220 utilized by the remote monitoring system 80 of the present invention, as shown in FIGS. 2A and 3A. The service process 220 provides for service processing as in troubleshooting, system and device adjustment and software downloads by a service engineer on service computer 16 to the manufacturing device 22 (FIG. 1).

First at step 81, the service process 220 is initialized on service computer 16. This initialization includes the startup routines and process embedded in the BIOS of the service computer 16. The initialization also includes the establishment of data values for particular data structures utilized in the service process 220. At step 222, the service process 220 determines if a troubleshooting activity is indicated. If it is determined at step 222 that a troubleshooting activity is not indicated, then the service process 220 then proceeds to step 224. However, if it is determined at step 222 that a troubleshooting activity is indicated, then the service agent 220 performs the troubleshooting process at step 223. The troubleshooting processes is herein defined in further detail with regard FIG. 7A.

At step 224, the service process 220 determines if an adjustment activity is indicated. If it is determined at step 224 that an adjustment activity is not indicated, then the service process 220 then proceeds to step 226. However, if it is determined to step 224 that an adjustment activity is indicated, the service process 220 performs the adjustment process at step 225. The adjustment process is herein defined in further detail with regard FIG. 8A.

At step 226, the service process 220 determines if a software download activity is indicated. If it is determined at step 226 that a software download activity is not indicated, then the service process 220 then proceeds to step 228. However, if it is determined at step 226 that a software download activity is indicated, then the service process 220 performs a software download process at step 227. The software download process is herein defined a further detail with regard FIG. 9A.

At step 228, the service process 220 determines if there are more services to be performed. If it is determined that there are more services to be performed, the service process 220 returns to repeat steps 222 through 228. However, if it is determined at step 228 that there are no more services to be performed, the service process 220 exits service computer 16 at step 229.

Figure 6B:
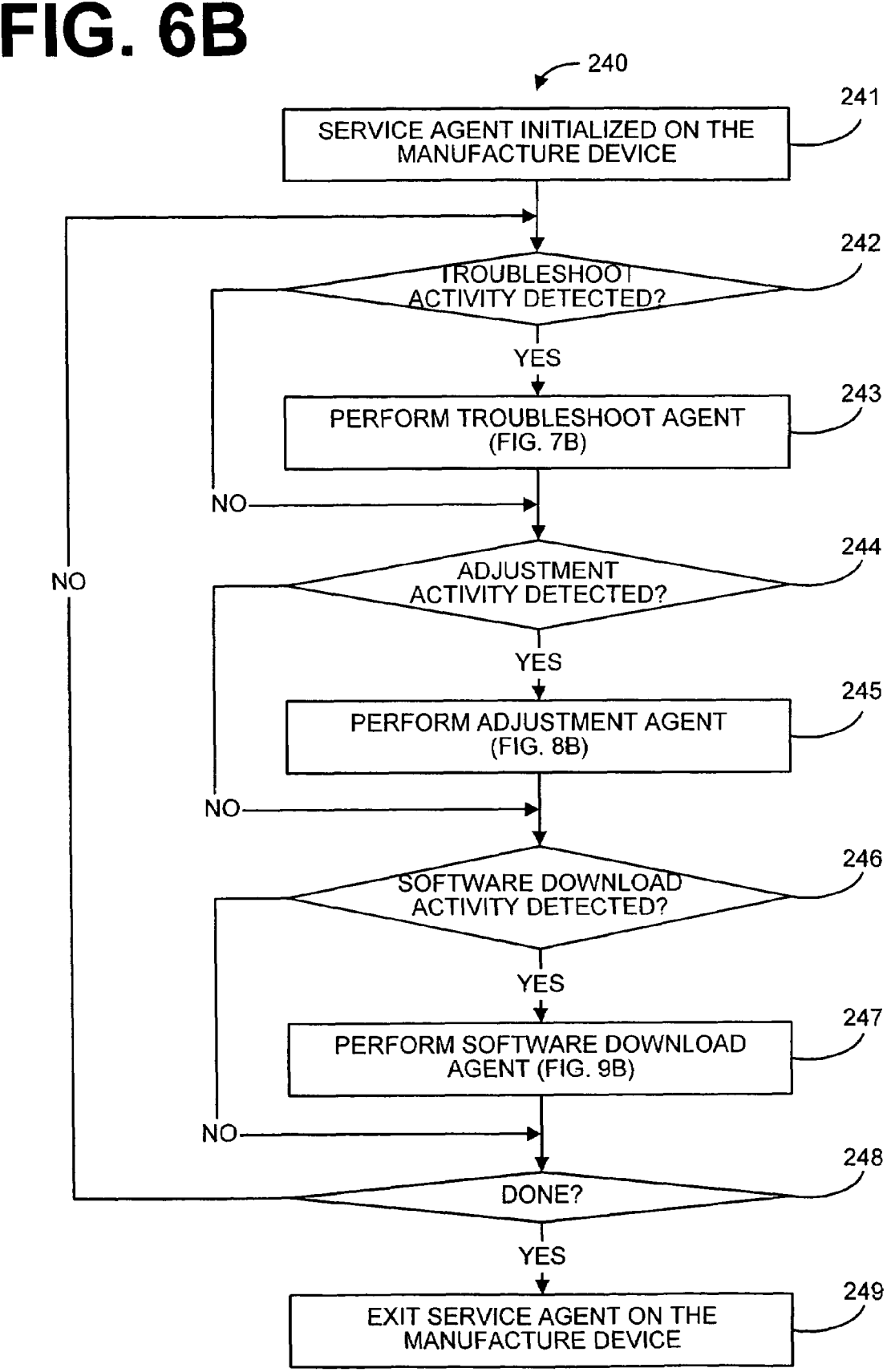
FIG. 6B is a flow chart illustrating an example of the operation of the service agent controlled by the monitoring control system on the manufacturing device and utilized by the remote monitoring system of the present invention, as shown in FIGS. 2B and 3B.

FIG. 6B is a flow chart illustrating an example of the operation of service agent 240 utilized by the monitor control system 100 on the manufacturing device 22 and utilized by the remote monitoring system 80 of the present invention, as shown in FIGS. 2A, 2B, 3A and 3B. The service agent 240 is the processor on the manufacturing device 22 that provides interaction with service process 220 (FIG. 6A) on service computer 16. The service agent 240 is initiated when the monitor control system 100 detects a service activity at step 111 (FIG. 3B.). A service activity would be, for example, an activity initiated by an administrator or service engineer using the remote monitoring system 80 (FIG. 2A).

First, the service agent 240 is initialized at step 241. This initialization includes the startup routines and processes embedded in the BIOS of the manufacturing device 22. The initialization also includes the establishment of data values for particular data structures utilized by service agent 240. At step 242, the service agent 240 determines if a troubleshooting activity is detected. If it is determined at step 242 that the troubleshooting activity is not detected, the service agent 240 then skips to step 244. However, if it is determined at step 242 that a troubleshooting activity is detected, the service agent 240 then proceeds to troubleshoot agent at step 243. A troubleshoot agent is herein defined in further detail with regard FIG. 7B.

At step 244, the service agent 240 determines if an adjustment activity is indicated. If it is determined at step 244 that an adjustment activity is not indicated, then the service agent 240 then proceeds to step 246. However, if it is determined at step 244 that an adjustment activity is indicated, and then the service agent 240 performs the adjustment agent at step 245. The adjustment agent is herein defined in further detail with regard FIG. 8B.

At step 246, the service agent 240 determines if a software download activity is indicated. If it is determined at step 246 that a software download activity is not indicated, then the service agent 240 then proceeds to step 248. However, if it is determined at step 246 that a software download activity is indicated, then the service agent 240 performs a software download agent at step 247. The software download agent is herein defined a further detail with regard FIG. 9B.

At step 248, the service agent 240 determines if there are more services to be performed. If it is determined that there are more services to be performed, the service agent 240 returns to repeat steps 242 through 248. However, if it is determined at step 248 that there are no more services to be performed, the service agent 240 exits the monitor control system 100 on manufacturing device 22 at step 249.

Figure 7A:
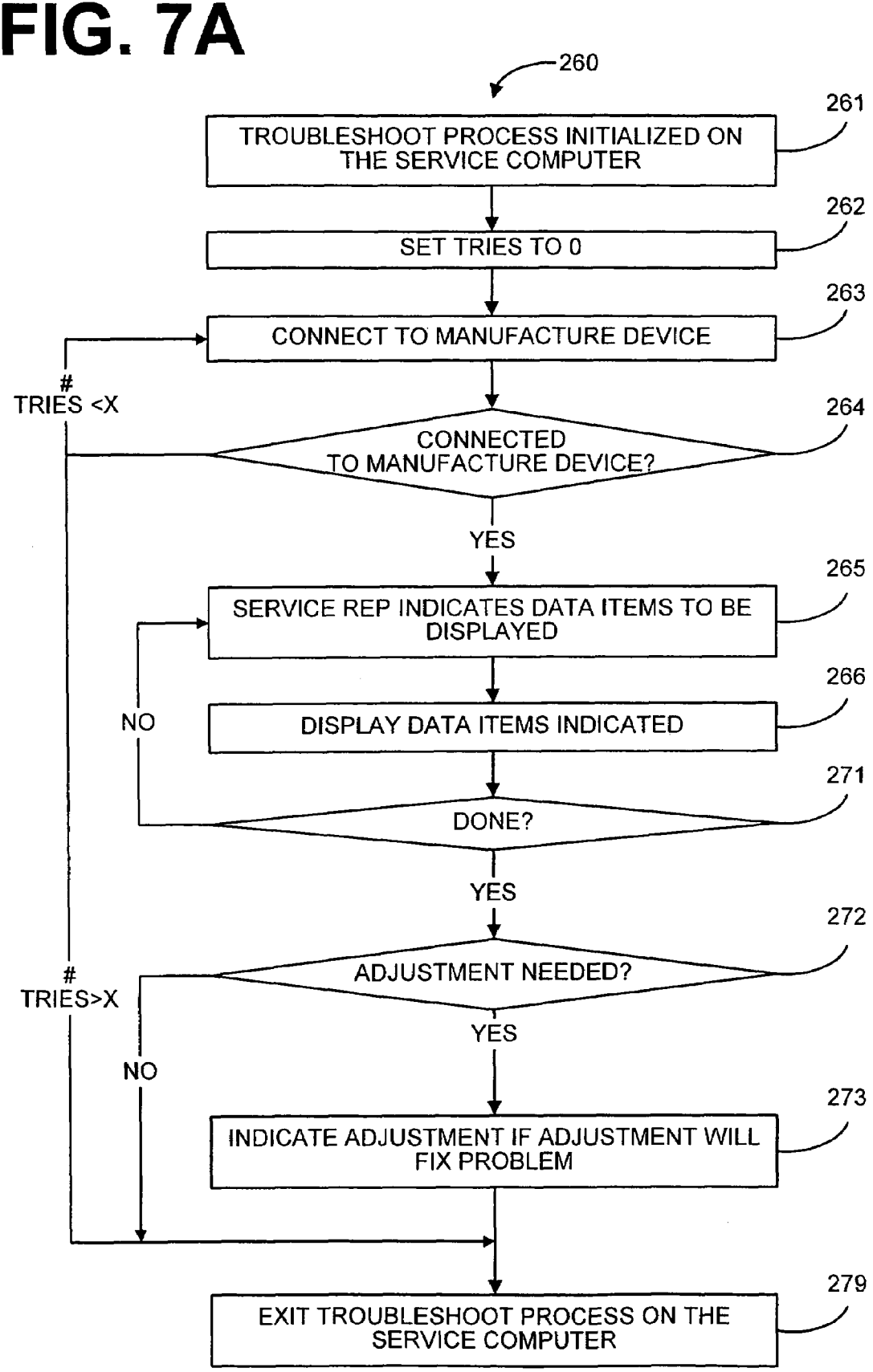
FIG. 7A is a flow chart illustrating an example of the operation of the troubleshoot process utilized by the remote monitoring system of the present invention, as shown in FIGS. 2A, 3A and 6A.

FIG. 7A is a flow chart illustrating an example of the operation of the troubleshoot process 260 utilized by the remote monitoring system 80 of the present invention, as shown in FIGS. 2A, 3A and 6A. Troubleshoot process 260 enables a service engineer to connect to or work through monitor control system 100 (FIG. 2B) on manufacturing device 22 (FIG. 2B) in order to perform a troubleshooting operation.

First at step 261, the troubleshoot process 260 is initialized on service computer 16. This initialization includes the startup routines and process embedded in the BIOS of the service computer 16. The initialization also includes the establishment of data values for particular data structures utilized in the troubleshoot process 260. At step 262, the troubleshoot process 260 sets the number of connection tries to 0, and attempts to connect to the manufacturing devices monitor control system 100 on the manufacturing device 22 at step 263.

At step 264, the troubleshoot process 260 determines if there is a successful connection to the monitor control system 100 on manufacturing device 22. If it is determined at step 264 that the troubleshoot process 260 has successfully connected to monitor control system 100 on the manufacturing device 22, then the troubleshoot process 260 proceeds to step 265. If however, the troubleshoot process 260 determines that the connection to the manufacturing device 22 is not successful, then the troubleshoot process 260 returns to repeat step 263 if the number of attempts to connect to manufacturing device 22 is less than a predetermined number. However, if it is determined that the attempts to connect to manufacturing device 22 has exceeded a predetermined number, then the troubleshoot process 260 then exits the step 279.

At step 265, the troubleshoot process 260 enables the service engineer to indicate the data items to be display. In the preferred embodiment, the service engineer is able to indicate that data items to be displayed using a user interface. However, it is understood that other means to indicate the data items to be displayed can be utilized such as, but not limited to, programming the data to be displayed. At step 266, the troubleshoot process 260 then displays the data items to be indicated. The display of data items indicated it can be accomplished using the display terminal 36 (FIG. 2A). However, it is understood that other means to display the data indicated can be utilized, such as, but not limited to, printing the data to be indicated on a printer (not shown).

At step 271, it is determined if there are additional data items to be displayed. If it is determined at step 271 that there are additional data items to be displayed, the troubleshoot process 260 returns to repeat steps 265 through 271. However, if it is determined at step 271 that there are no more data items to be displayed, then the troubleshoot process 260 determines whether or not adjustment is needed at step 272.

If it is determined at step 272 that an adjustment in manufacturing device 22 is not needed, the troubleshoot process 260 then exits at step 279. However, if it is determined at step 272 that an adjustment of the manufacturing device 22 is required, then the troubleshoot process 260 enables the service engineer to indicate the adjustment needed to fix the problem.

The adjustment indication can be accomplished in a number of different ways. One such way to indicate an adjustment is to indicate an adjustment activity on service computer 16 and monitor control system 100. Setting the adjustment activity will provide the means for the service engineer to adjust monitor control system 100 or manufacturing device 22 or, depending on the adjustment involved may be carried out by sending control signals to a logic control unit of the monitor control system to implement a change in setting (e.g., a base line heater wire temperature setting) or as an activity triggering signal to the operational control system to initiate the modification desired in the system (e.g., an increase in base heating wire temperature to compensate for a degraded heated wire of coating of foam on the wire). The indicating of an adjustment may also result in an e-mail being sent to a local service engineer that a service call to manufacturing device 22 is required. The troubleshoot process 260 then exits at step 279.

Figure 7B:
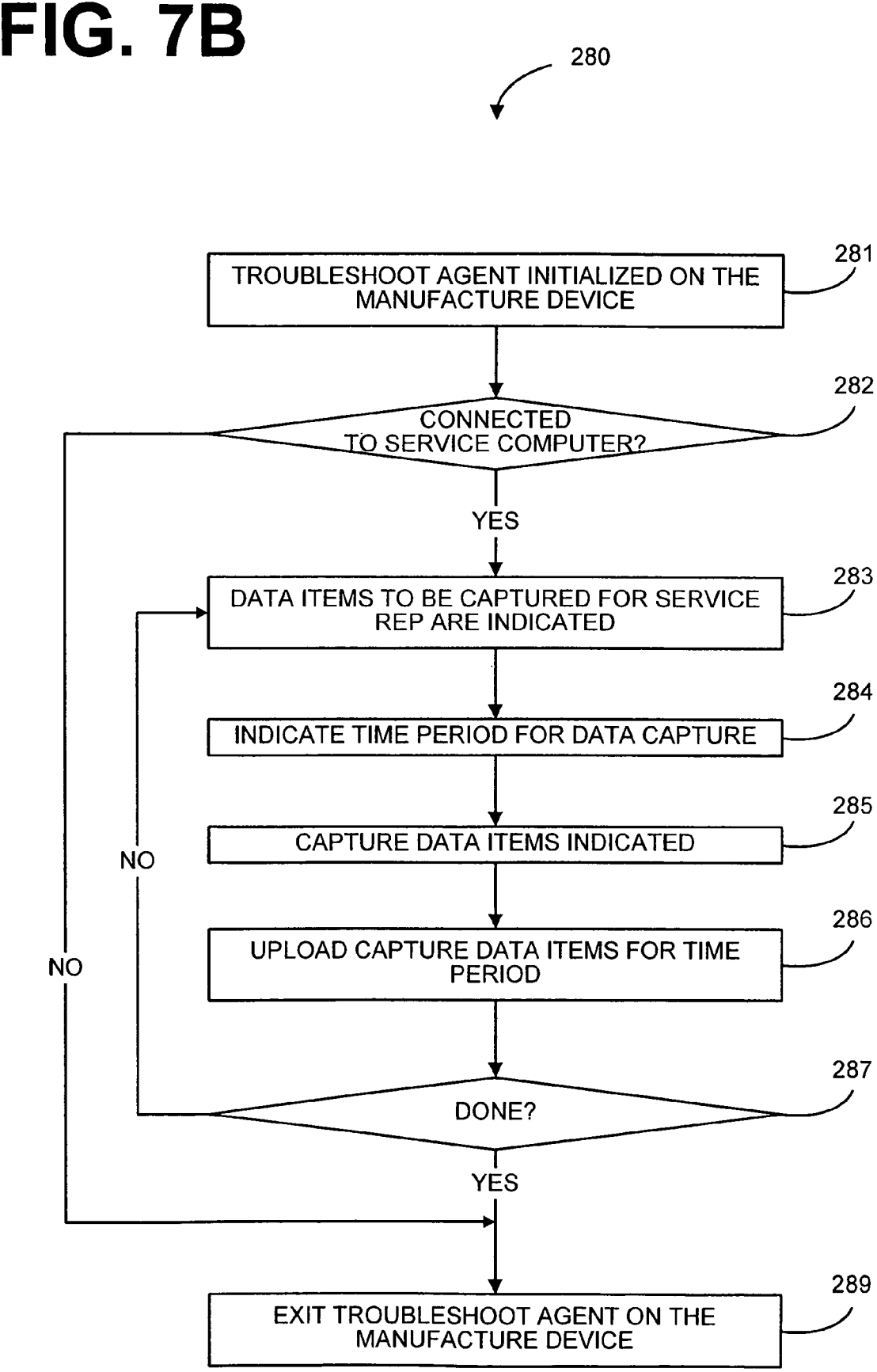
FIG. 7B is a flow chart illustrating an example of the operation of the troubleshoot agent controlled by the monitoring control system on the manufacturing device and utilized by the remote monitoring system of the present invention, as shown in FIGS. 2B, 3B and 6B.

FIG. 7B is a flow chart illustrating an example of the operation of the troubleshoot agent 280 utilized by the monitor control system 100 on the manufacturing device 22, and utilized by the remote monitoring system 80 of the present invention, as shown in FIGS. 2A, 2B, 3B and 6B. The troubleshoot agent 280 is initiated when the monitor control system 100 detects a troubleshoot activity at step 242 (FIG. 6B.). A troubleshoot activity would be, for example, an activity initiated by an administrator or service engineer using the remote monitoring system 80 (FIG. 2A). This can be carried out, for example, in follow up to an auto-generated troubleshooting process based on a supply of monitoring system signals (e.g., a self adjustment process followed by a signaling out for troubleshooting if not sufficiently corrected either locally, remotely, or both either simultaneously or in sequence (e.g., local first followed by local to remote signaling, either automatically such as an automated output after a predetermined period or upon the next network connecting link up) and when an operator doesn't send out a help button activating signal in the interim, as in a situation where an operator determines the problem is of a type not readily correctible by the operator).

First, the troubleshoot agent 280 is initialized at step 281. This initialization includes the startup routines and processes embedded in the BIOS of the manufacturing device 22. The initialization also includes the establishment of data values for particular data structures utilized by troubleshoot agent 280. At step 282, troubleshoot agent 280 determines if the manufacturing device 22 is connected to service computer 16 (FIG. 1). If it is determined at step 282 that the troubleshoot agent 280 is not connected to service computer 16, then the troubleshoot agent 280 exits at step 289.

However, if it is determined at step 282 that the troubleshoot agent 280 is connected to service computer 16, then the troubleshoot agent 280 receives an indication of the data items that are to be captured from the troubleshooting process 260 (FIG. 7A) on the service computer 16. At step 280 for, the troubleshoot agent 280 receives the indication of the time period for data to be captured.

At step 285, the troubleshoot agent 280 then captures the data items indicated for the time period indicated. At step 286, the data items captured for the time period indicated are uploaded to the service computer 16. At step 287, the troubleshoot agent 280 determines if there is additional data items to be captured. If it is determined at step 287 that there are more data items to be captured, the troubleshoot agent 280 returns to repeat steps 283 through 287. However, if it is determined at step 287 that there are no additional data items to be captured, the troubleshoot agent then exits at step 289.

Figure 8A:
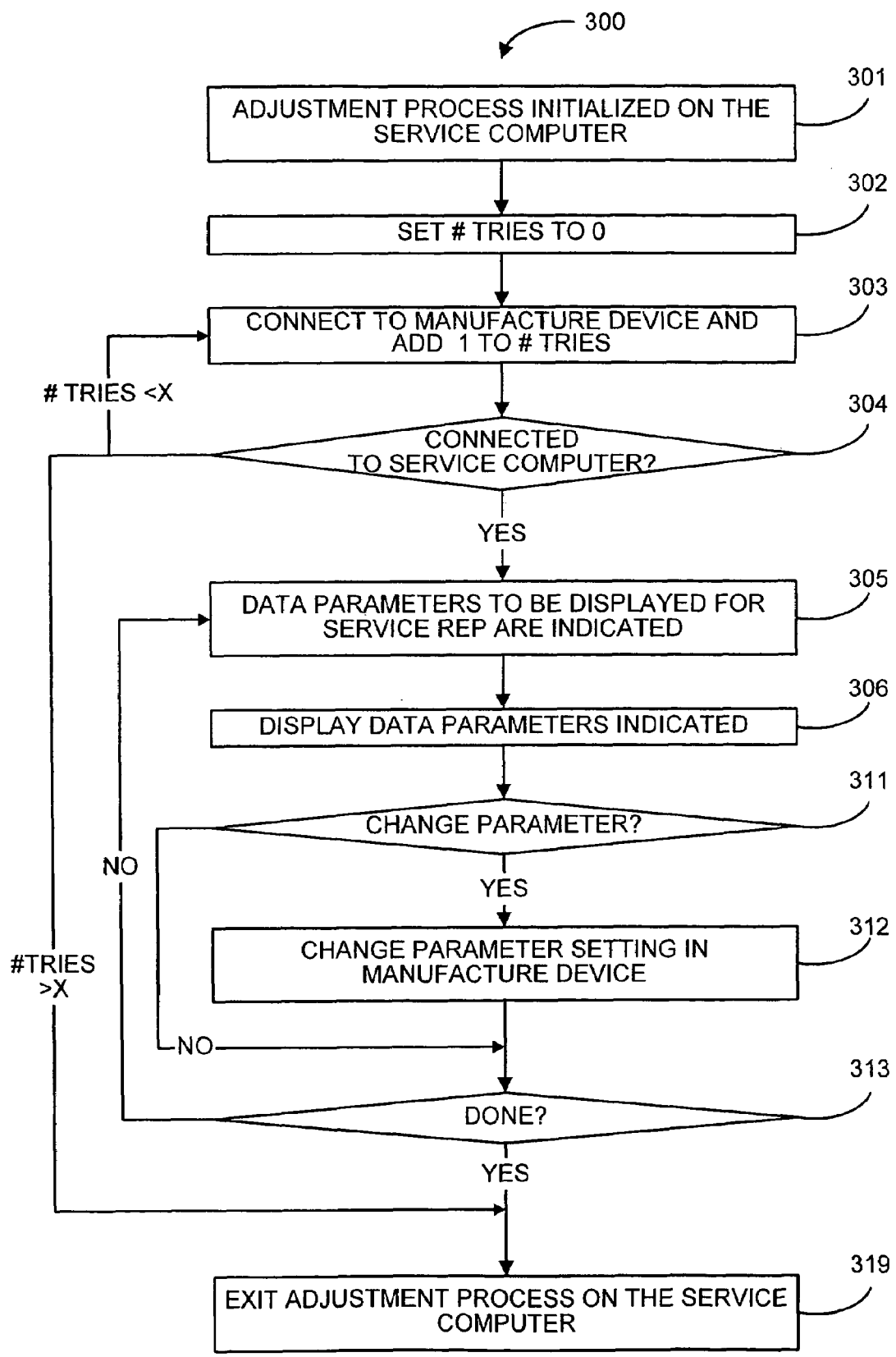
FIG. 8A is a flow chart illustrating an example of the operation of the adjustment process utilized by the remote monitoring system of the present invention, as shown in FIGS. 2A-3.

FIG. 8A is a flow chart illustrating an example of the operation of the adjustment process 300 utilized by the remote monitoring system 80 of the present invention, as shown in FIGS. 2A-3. The adjustment process 300 enables, for example, a service engineer to connect to monitor control system 100 (FIG. 2B) on manufacturing device 22 (FIG. 2B) in order to perform an adjustment operation.

First at step 301, the adjustment process 300 is initialized on service computer 16. This initialization includes the startup routines and process embedded in the BIOS of the service computer 16. The initialization also includes the establishment of data values for particular data structures utilized in the adjustment process 300. At step 302, the adjustment process 300 sets the number of connection tries to 0, and attempts to connect to the monitor control system 100 on the manufacturing device 22 at step 303.

At step 304, the adjustment process 300 determines if there is a successful connection to the monitor control process 100 on manufacturing device 22. If it is determined at step 304 that the adjustment process 300 has successfully connected to monitor control system 100 on the manufacturing device 22, then the adjustment process 300 proceeds to step 305. If however, the adjustment process 300 determines that the connection to the manufacturing device 22 is not successful, then the adjustment process 300 returns to repeat step 303 if the number of attempts to connect to manufacturing device 22 is less than a predetermined number. However, if it is determined that the attempts to connect to manufacturing device 22 has exceeded a predetermined number, then the adjustment process 300 then exits the step 319.

At step 305, the adjustment process 300 enables, for example, a service engineer to indicate the data parameters to be displayed as in the service engineer utilizing a user interface on display 36 (FIG. 2A) to indicate the data parameters to be displayed. However, it is contemplated that other means may be utilized to enable a service engineer to indicate which data parameters are to be displayed. At step 306, the data parameters indicated by the service engineer are displayed.

At step 311, it is determined if the service engineer has indicated a change of parameters. If it is determined at step 311 that the service engineer has not indicated parameters to be changed, then the adjustment process 300 steps to step 313. However, if it is determined at step 311 that a change of parameters was indicated, then the adjustment process 300 changes the parameters setting in the monitor control system 100 on the manufacturing device 22 currently connected. This is accomplished by the adjustment process 300 in the remote monitoring system 80 through transmitting the parameter setting changes to the monitor control system 100 on manufacturing device 22.

At step 313, the adjustment process 300 determines if there are more adjustments to be made. If it is determined at step 313 that there are more adjustments to be made, then the adjustment process 300 returns to repeat steps 305 through 313. However, if it is determined that there are no more adjustments to be made, then the adjustment process 300 exits at step 319.

Figure 8B:
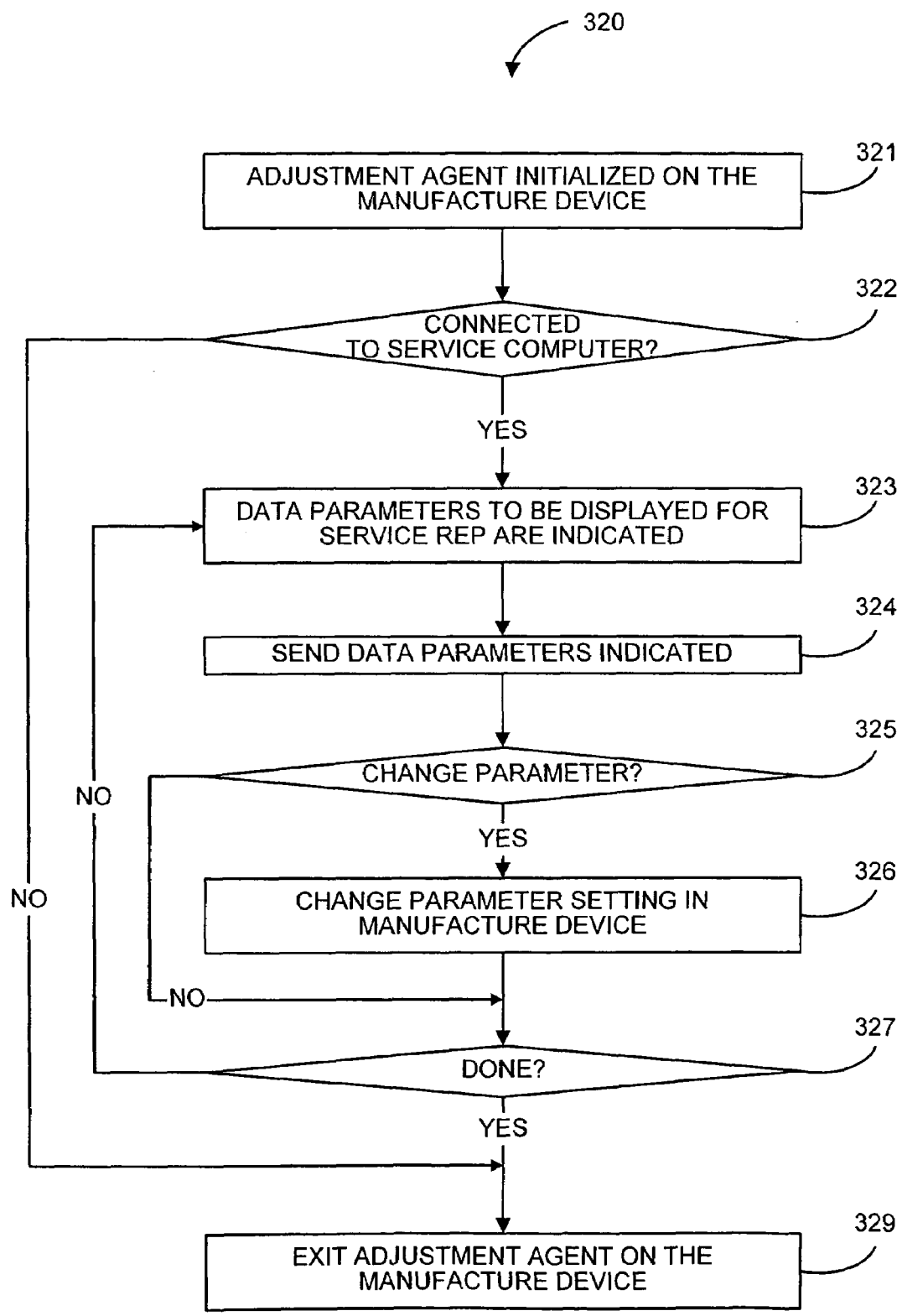
FIG. 8B is a flow chart illustrating an example of the operation of the adjustment agent controlled by the monitoring control system of the manufacturing device and utilized by the remote monitoring system of the present invention, as shown in FIGS. 2B, 3B and 6B.

FIG. 8B is a flow chart illustrating an example of the operation of the adjustment agent 320 utilized by the monitor control system 100 on the manufacturing device 22 and utilized by the remote monitoring system 80 of the present invention, as shown in FIGS. 2B, 3B and 6B. The adjustment agent 320 is initiated when the monitor control system 100 detects an adjustment activity at step 244 (FIG. 6B.). In the embodiment illustrated in FIG. 8, an adjustment activity is preferably initiated by an administrator or service engineer using the remote monitoring system 80 (FIG. 2A).

First, the adjustment agent 320 is initialized at step 321. This initialization includes the startup routines and processes embedded in the BIOS of the manufacturing device 22. The initialization also includes the establishment of data values for particular data structures utilized by adjustment agent 320. At step 322, adjustment agent 320 determines if the manufacturing device 22 is connected to service computer 16 (FIG. 1). If it is determined at step 322 that adjustment agent 320 is not connected to service computer 16, then the adjustment agent 320 exits at step 329.

However, if it is determined at step 322 that the adjustment agent 320 is connected to service computer 16, then the adjustment agent 320 receives a request for data parameters at step 323. At step 324, the adjustment agent 320 then sends the data parameters indicated to the adjustment process 300 (FIG. 8A). At step 325, the adjustment agent 320 then determines if it has received a request to change a parameter in manufacturing device 22. If at step 325 it is determined that there is no change of a parameter to be made, the adjustment agent 320 then skips to step 327. However, if it is determined at step 325 that a request to change parameter has been received, then the adjustment agent 320 then changes the parameter setting in the manufacturing device 22 at step 326.

At step 327, the adjustment agent 320 determines if there are more adjustments to the made. If it is determined at step 327 that there are more adjustments to be made, then the adjustment agent 320 returns to repeat steps 323 through 327. However, if it is determined that there are no more adjustments to be made, then the adjustment agent 320 exits at step 329.

Depending on the subsystem of the manufacturing device involved in the adjustment activity, an alternate embodiment of the present invention also features an automated adjustment process (e.g., closed loop temperature sensing and adjustment process) monitored by the monitor control system, for example, which can be a component of an overall operating control system or an independent control system functioning independently or in association with the operating control system, and automated adjustment means can first be utilized to attempt to correct a potential problem (e.g., adjustment of cross-cut heater wire base temperatures) and with continued sensing if the sensed potential problem is not removed, the need for activity report signal can be generated to the operator and/or remote service provider to facilitate further investigation (e.g., an automated remote signal generation or one relying on operator or remote servicer activation). Furthermore, an alternate embodiment of the invention also provides an adjustment control system which includes means for limiting or locking out certain adjustments as in extensions or contractions of ranges or an increase or decrease in present values to the remote operator or the local operator upon release/authorization by the remote service provider (e.g., a password requirement to alter certain characteristics of manufacturing device operation).

Figure 9A:
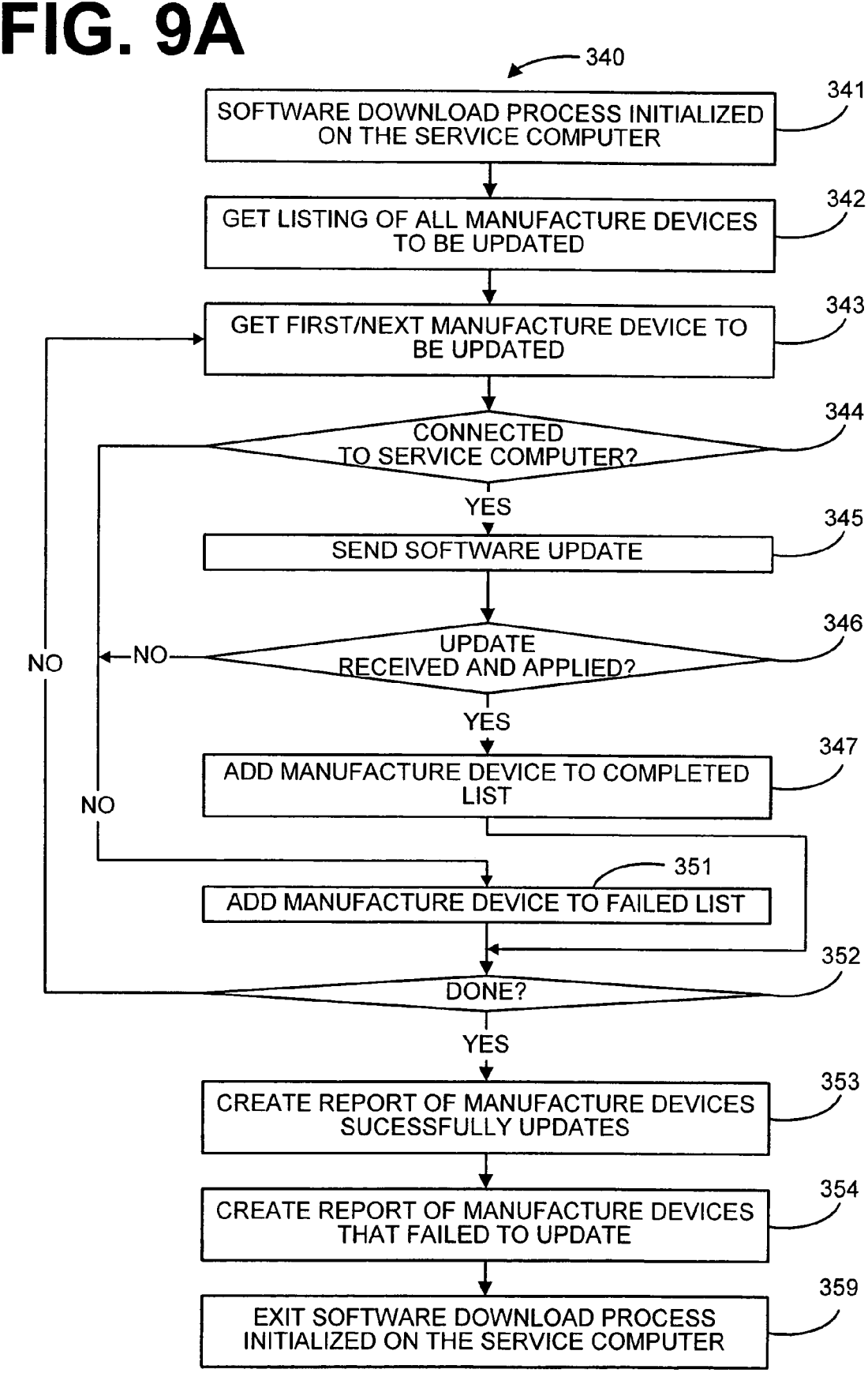
FIG. 9A is a flow chart illustrating an example of the operation of the software download process utilized by the remote monitoring system of the present invention, as shown in FIGS. 2A-3.

FIG. 9A is a flow chart illustrating an example of the operation of the software download process 340 utilized by the remote monitoring system 80 of the present invention, as shown in FIGS. 2A-3. The software download process 340 enables a service engineer to connect to monitor control system 100 (FIG. 2B) on manufacturing device 22 (FIG. 2B) in order to perform a software update operation.

First at step 341, the software download process 340 is initialized on service computer 16. This initialization includes the startup routines and process embedded in the BIOS of the service computer 16. The initialization also includes the establishment of data values for particular data structures utilized in the software download process 340. At step 342, the software download process 340 gets a listing of all monitor control system's 100 to be updated. At step 343 the software download process 340 gets the first or next monitor control system to be updated.

At step 344, the software download process 340 attempts to connect to the current monitor control system to be updated. If it is determined at step 344 that the software download process 340 was not able to connect to the current monitor control system, then the software download process 340 proceeds to step 351.

However, if it is determined at step 344 that the software download process 340 has successfully connected to the monitor control system then the software download process 340 sends the software update to the currently connected monitor control system at step 345. At step 346, the software download process 340 determines if the update was successfully used received and applied to the currently connected monitor control system. If it is determined at step 340 states that the update wasn't not successfully received and applied to the currently connected monitor control system then the software download process 340 proceeds to step 351. However, if it is determined at step 346 that the update was successfully received and applied to the currently connected monitor control system then the software download process 340 adds the currently connected monitor control system to the completed list and proceeds to step 352.

At step 351, the software download process 340 adds the currently connected monitor control system to the failed list. The failed list will indicate those systems that may require manual intervention in order to be updated.

At step 352, the software download process 340 determines if there are more manufacturing device systems to be updated. If it is determined at step 352 that there additional monitor control systems to be updated, then the software download process 340 returns to repeat steps 343 through 352. However, it is determined at step 352 that there are no more monitor control systems to be updated, and then the software download process 340 creates a report indicating the monitor control systems successfully updated at step 353. At step 354, the software download process 340 creates a report of the monitor control systems that failed to be updated. The software download process 340 exits at step 359.

Figure 9B:
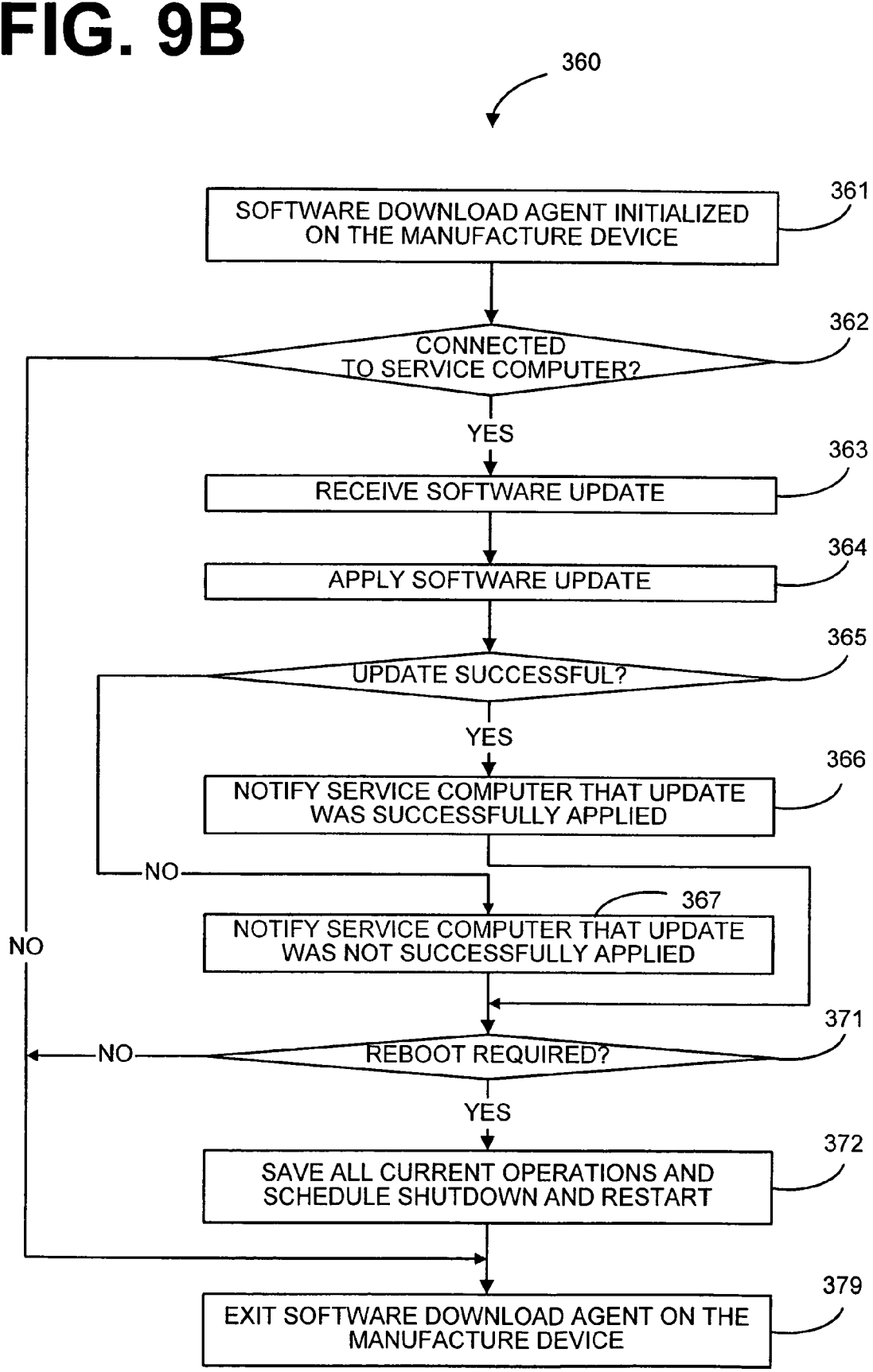
FIG. 9B is a flow chart illustrating an example of the operation of the software download agent controlled by the monitoring control system on the manufacturing device and utilized by the remote monitoring system of the present invention, as shown in FIGS. 2B, 3B and 6B.

FIG. 9B is a flow chart illustrating an example of the operation of the software download agent 360 utilized by the monitor control system 100 on the manufacturing device 22, and utilized by the remote monitoring system 80 of the present invention, as shown in FIGS. 2B, 3B and 6B. The software download agent 360 is initiated when the monitor control system 100 detects a software download activity at step 246 (FIG. 6B.). A software download agent 360 would be, for example, an activity initiated by an administrator or service engineer using the remote monitoring system 80 (FIG. 2A).

First, the software download agent 360 is initialized at step 361. This initialization includes the startup routines and processes embedded in the BIOS of the manufacturing device 22. The initialization also includes the establishment of data values for particular data structures utilized by software download agent 360. At step 362, the software download agent 360 determines if the manufacturing device 22 is connected to service computer 16 (FIG. 1). If it is determined at step 362 that the software download agent 360 is not connected to service computer 16, then the troubleshoot agent 360 exits at step 379.

However, if it is determined at step 362 that the software download agent 360 is connected to service computer 16, then the software download agent 360 receives software updates at step 363. At step 364 the software download agent 360 applies the software update.

At step 365 it is determined whether the software update was successfully applied. If it is determined at step 365 that the software update was successfully received and applied, then the software download agent 360 notifies a service computer 16 that the update was successfully received and applied. However, if it is determined at step 365 that the software update was not successfully applied, and then the software download agent 360 notifies a service computer 16 that the update was not successfully received and applied.

At step 371, the software download agent 360 determines if a reboot is required. If it is determined at step 371 that a reboot is not required, the software download agent 360 proceeds to exit at step 379. However, if it is determined that a reboot is required at step 371, then the software download agent 360 saves all the current operations data, and schedules a shutdown and restart of the monitor control system 100 on manufacturing device 22 at step 372. The software download agent 360 then exits at step 379.

Figure 10:
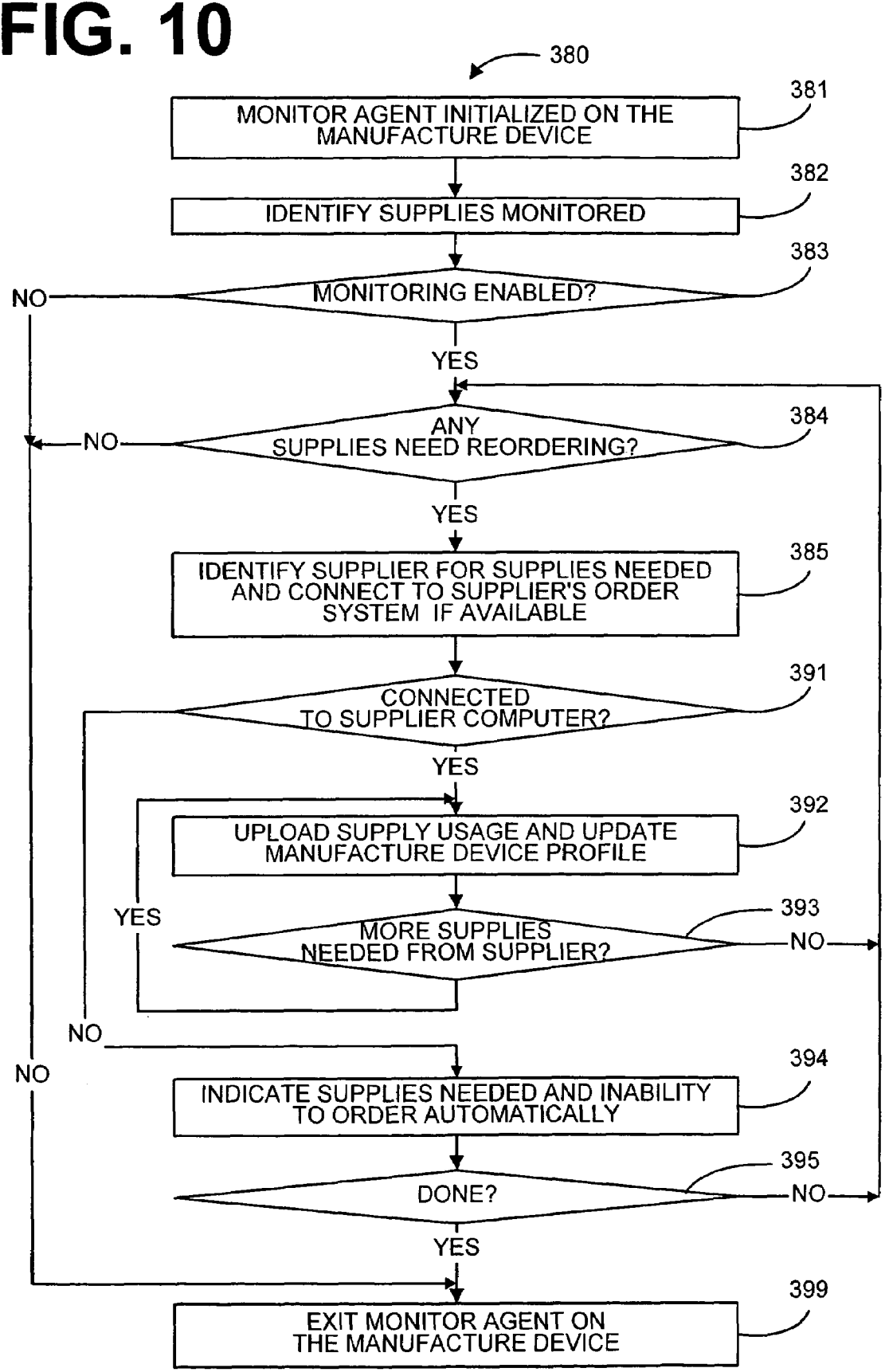
FIG. 10 is a flow chart illustrating an example of the operation of the monitor agent controlled by the control system on the manufacturing device and utilized by the remote monitoring system of the present invention, as shown in FIGS. 2A, 2B and 3B.

FIG. 10 is a flow chart illustrating an example of the operation of the monitor agent 380 utilized by the monitor control system 100 on the manufacturing device 22 and utilized by the remote monitoring system 80 of the present invention, as shown in FIGS. 2A, 2B and 3B. The monitor agent 380 can be initiated by an inventory system (not shown) on the monitor control system 100. It is also possible for a user of manufacturing device 22 (FIG. 1) to initiate the monitor activity if the user desires to reorder inventory electronically. The settings for indicating which supplies are to be monitored and the preferred suppliers are preset by the manufacturer of the manufacturing device 22. It is understood that these setting can be reset by the administrator on service computer 16 or by the user of the monitor control system 100 on the manufacturing device 22.

In the FIG. 10 example of operation of monitor agent 380, the monitor agent 380 is first initialized at step 381. This initialization includes the startup routines and processes embedded in the BIOS of the manufacturing device 22. The initialization also includes the establishment of data values for particular data structures utilized by monitor agent 380. At step 382, the monitor agent 380 identifies which supplies are to be monitored automatically. The monitor agent 380 also identifies the current status of the supplies that are monitored. At step 383, and the monitor agent 380 determines if the monitoring of supplies is enabled. If it is determined at step 383 that the monitoring of supplies is not enabled, then the monitoring agent 380 exits at step 399.

However, if it is determined at step 383 that monitoring of at least one supply is enabled, the monitor agent 380 determines if any of the supplies enabled for monitoring need reordering. If it is determined at step 384 that no supplies enabled for monitoring need reordering, then the monitoring agent 380 exits at step 399. However, if it is determined that at least one supply enabled for monitoring need reordering, then the monitoring agent 380 identifies the supplier for the supply needing reordered. At this time, the monitor agent 380 attempts to confirm that supplier ordering system if available. This information regarding suppliers is preset by the producer of manufacturing device 22 and/or a service provider either directly associated with the manufacturing, independently, or an affiliate service provider. Also, the monitor agent also preferably includes means for resetting of information as in one that can be reset by an administrator on service computer 16 (FIG. 1) or by the user of the manufacturing device 22 (FIG. 1). For illustrative purposes only, this connection to a supplier's computer is shown as service computer 16. However, it is understood that a connection to a $3^{rd}$ party supplier's computer (not shown) is available as known in the art.

At step 391, the monitor agent 380 determines if the manufacturing device 22 is connected to supplier's computer 16 (FIG. 1). If it is determined at step 391 that the monitor agent 380 is not connected to supplier's computer 16, then the monitor agent 380 proceeds to step 394. However, if it is determined at step 391 that the monitor agent 380 is connected to this supplier's computer, the monitor agent uploads the supply usage information in order to complete the electronic supply order and updates a profile (not shown) in the monitor control system 100 to reflect the supplies ordered. This recorder sequence can be activated, for example, in conjunction with a call out for any other reason as in those described above, made as part of a time based automated call out (e.g., once a week) or based on a sensed parameter of manufacturing device usage as in number of machine turn on/off or as another example relative to the illustrated foam-in-bag device the number of bags formed. The past history report logs are useful in helping to determine time periods relative to this feature of the invention. Also, the past history can be used by the monitor control system to determine likely period remaining in the current supply and the most opportune time to reorder based on, for example, volume or quantity of remaining material usage and likely re-supply period (e.g., some still in stock at manufacturer or whether in stock at the supplier, then X days to provide or show).

At step 393, it is determined if more supplies are needed from the currently connected supplier. It is determined at step 383 that there are more supplies needed from the currently connected supplier, then the monitor agent 380 returns to repeat steps 392 and 393. However, if it is determined at step 393 that there are no more supplies needed from the currently connected supplier, then the monitor agent 380 returns to repeat step 384.

At step 394, the monitor agent 380 indicates the supplies needed inability to reorder the supplies needed automatically. At step 395, the monitor agent 380 determines if there are more supplies to be evaluated better enabled for monitoring. If it is determined at step 395 that there are no more supplies the need of enabled for monitoring, then the monitor agent 380 exits at step 399. However, if it is determined at step 395 that there are more supplies enabled for monitoring, then the monitor agent 380 returns to repeat step 384.

Operational Control System

The present invention is also directed at an operational control system for a manufacturing device which provides for effective control over the various operational sub-systems as found in, for example, a foam-in-bag dispenser, and also provides a control system which works well with the above described remote monitoring system (e.g., the monitor control system being part of a common overall control system or an independent control sub-system such as one with suitable interfacing as in sensed parameter data sharing with a separate operational control board arrangement). Thus, with a dispensing system as the manufacturing device (e.g., a foam-in-bag or hand held or fixed in position foam dispenser) the control system of the present invention allows various parameters to be sensed and monitored to facilitate, for example, basic operations of the manufacturing device and preferably also data-supply means for use by the remote monitoring system. Thus, a preferred embodiment of the operational control system of the present invention provides for the passing on of pertinent data from the manufacturing device, triggering an output signal to the monitor control means for its forwarding to a remote service location servicer system of data pertinent to a potential or actual system problem or a resupply need, as well as other interfacing attributes with the remote control system as seen from the following discussion for a preferred embodiment of a foam-in-bag operational system with operational control system.

Examples of foam dispenser sub-systems under control of the operational control system and preferably monitored by monitor control system include, for example;

a) temperature parameters for
   i) foam chemical precursor material heating means as in chemical hose heater wires
   ii) foam chemical precursor material heating in dispenser manifolds b) pumping system parameters for
   i) foam precursor chemical flow
   ii) solvent flow (with or without heating)

c) resupply system parameters as in
   i) chemical supply levels
   ii) solvent supply levels d) mixing module drive parameters e) mechanical dispenser tip cleaning parameters The operational control system of the present invention is also well suited fur use in a foam-in-bag system where, there is, in addition to the above parameters, further sub-system operational control and monitoring requirements including, for example:

f) temperature parameters for
   i) end cutter temperature and status
   ii) end sealer temperature and status
   iii) edge sealer temperature and status g) supply system parameters as in
   i) bag formation film supply levels h) end sealer compression assembly positioning j) film feed status as in tension and amount remaining and/or used With reference to the control of the aforementioned sub-systems "a-e" for a dispenser (e.g., hand held or fixed support dispenser with or without bag formation) and "f-i" for a foam-in-bag embodiment and with reference to FIGS. 11 to 34, some examples of means for operational control of sub-systems of a manufacturing device are provided relative to a foam-in-bag dispensing system. As can be seen the means for operational system control can work well in conjunction with the monitor control system of the present invention, or the latter can be a sub-component of an overall operational control system. The operational control system preferably has means to provide sensed operational parameter information to the remote monitoring control system and as well to help carry out, for instance, operator system adjustments fed from the remote monitoring system. As the operational control system and remote monitor control system can be sub-systems of an overall control system of the manufacturing device reference to "control system" below is representative of the overall control system which may, depending on the circumstances, involve one or the other sub-systems or both together. Reference is also made to the incorporated by reference Provisional Application No. 60/488,010, filed Jul. 18, 2003 for discussion of the operational control system for a foam-in-bag dispenser which includes operational components for manufacturing device sub-systems and means for monitoring performance of those sub-systems. Also, many of the operational sub-systems are described in greater detail in the incorporated by reference, applications "A" to "Y" references in the two part table set out on pages 1 and 2 of the present application.

Figure 23:
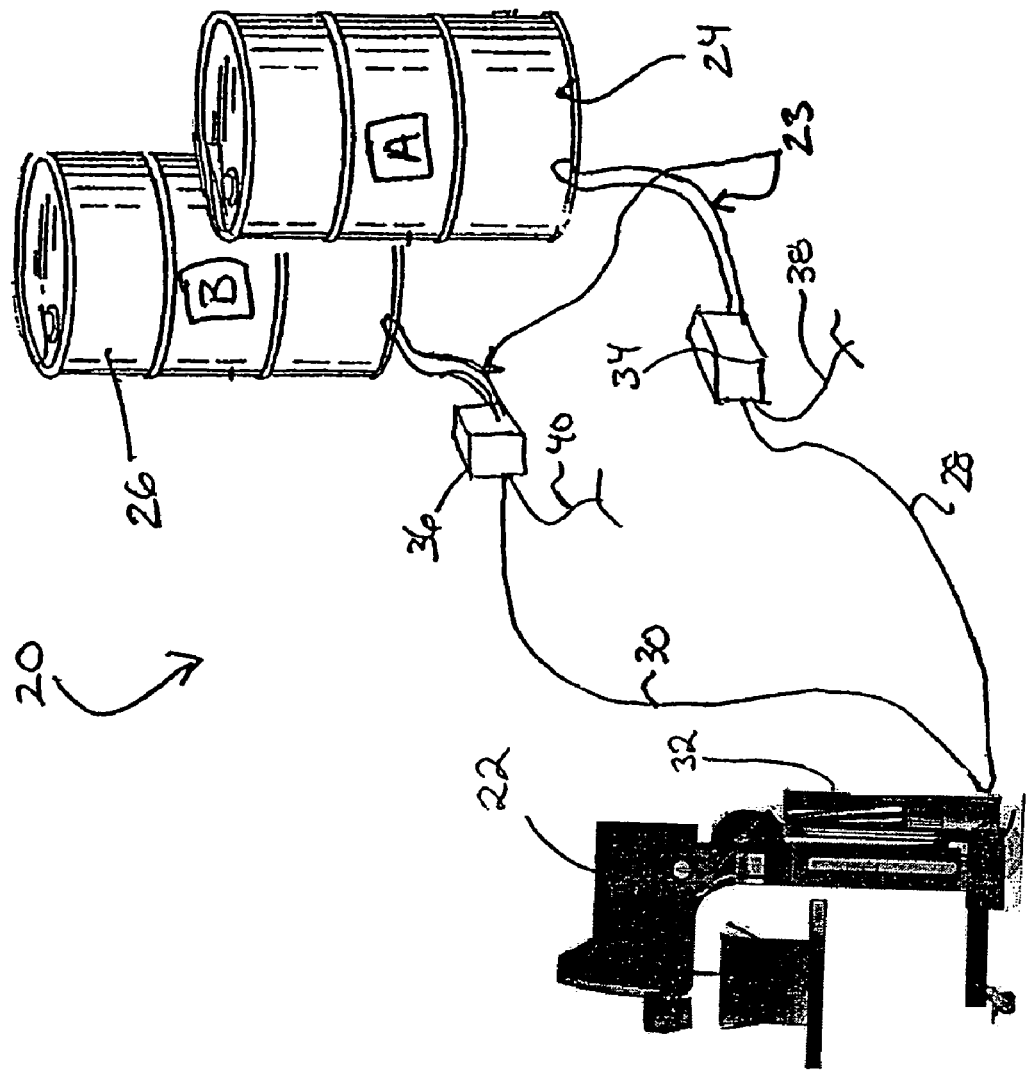
FIG. 23 shows an embodiment of a dispenser assembly of the present invention.

As an example of a manufacturing device for which the operational control system and remote monitoring systems are well suited for use is illustrated in FIGS. 23 to 33 and 40. FIG. 23 illustrates a preferred embodiment of the dispensing system 20 of the present invention which comprises dispenser system 22 in communication with chemical supply container 24 (supplying form precursor chemical component A) and chemical supply container 26 (supplying foam precursor chemical component B). Chemical hoses 28 (chemical A) and 30 (chemical B) provide fluid communication between respective chemical supply containers 24, 26 and pump system 32 mounted on dispenser system 22. FIG. 23 further illustrates feed pumps 34, and 36 associated with chemical supply containers 24, and 26. Feed pumps 34, and 36 are placed between respective chemical sources 24 and 26 and in-line chemical pumps 44, 46 (FIG. 24) which in-line chemical pumps function to keep a desired flow rate in the chemical being fed from the pumps into heated chemical supply hoses 28' and 30' shown coiled within an overall hose management cabinet 60 and then into a mixing chamber in the dispenser just prior to mixed chemical output into a bag being simultaneously formed. Feed pumps 34, 35 thus provide a positive pressure to the in-line pump system so as to provide positive pressure on their input ports to avoid problems like cavitations, or starvation of the pumping means represented by in-line pumps 44, 46 (e.g., a gerotor based pump system) and to reliably suck chemical out of the bottom of the supply containers even if the in-line pumps are far away (e.g., over 100 feet). FIG. 23 illustrates a multiple chemical conduit arrangement wherein feed pumps 34 and 36 feed chemical to more than one dispenser system at the same time with lines 28 and 30 feeding dispenser system 22 and lines 38 and 40 feeding a second dispenser system (not shown). A single feed pump with manifold assembly can also be used to distribute chemicals A and B to multiple locations.

Figure 24:
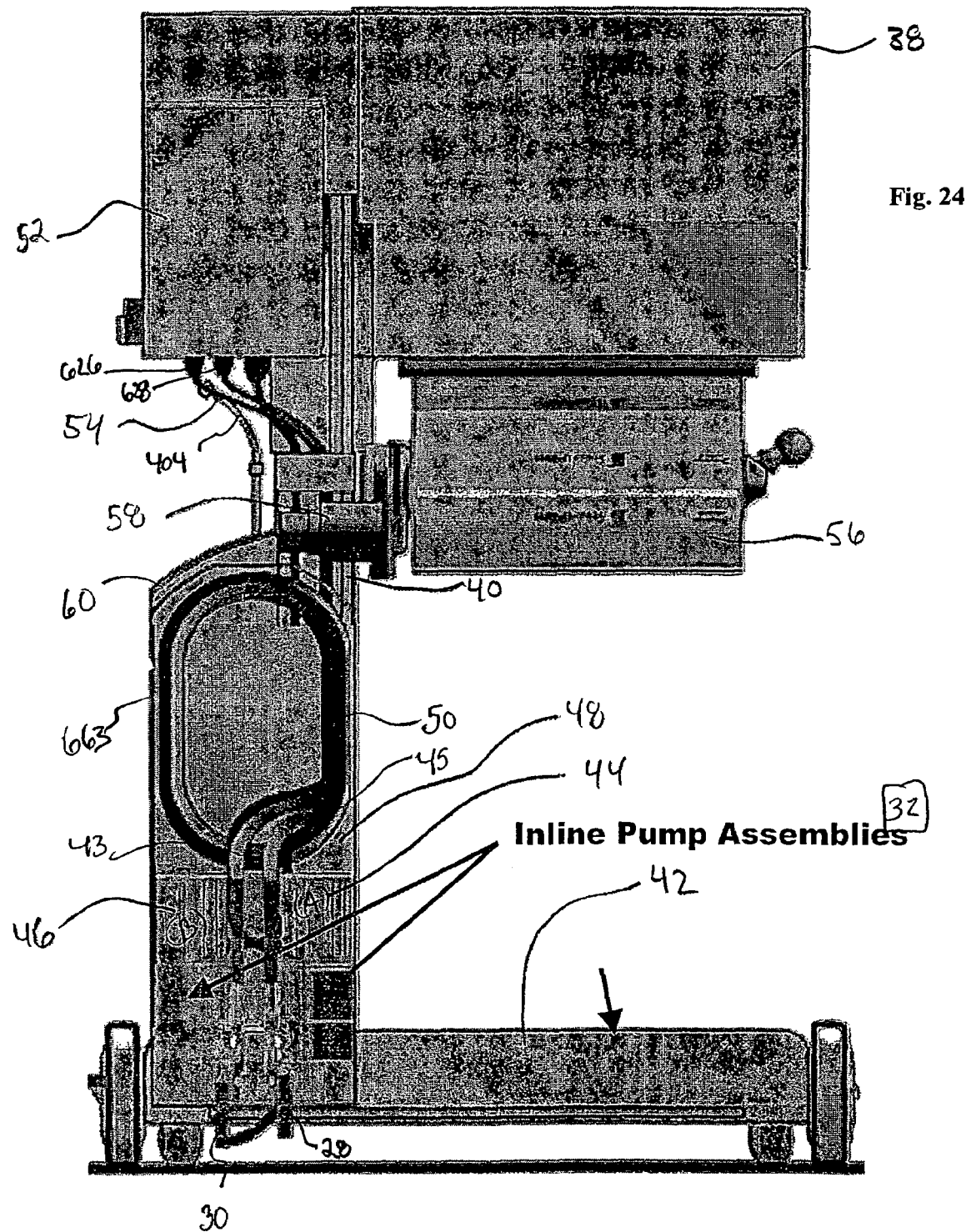
FIG. 24 shows a rear elevational view of a dispenser system embodiment.

FIG. 24 provides a rear elevational view of dispenser system 22 which includes exterior housing 38 supported on telescoping support assembly 40 which in a preferred embodiment comprises a lifter (e.g., electric motor driven gear and rack system with inner and outer telescoping sleeves) and is mounted on base 42 (e.g., a roller platform base to provide some degree of mobility). Further mounted on base 42 is in-line pump system 32 comprising in line chemical A pump 44 and in line chemical B pump 46 housing output or downstream chemical supply coiled conduit sections 43 and 45 of heated chemical hoses 28' and 30' that extend into hose manager assembly 48 containing heated coiled hoses and cables set 50 in a well managed, adjustable (coil contractions or extension) manner. The rear view shown in FIG. 24 also illustrates control console 52 and communication links generally represented by communication lines 54 (e.g., telephone lines for a modem used by the remote monitoring system). Film roll reception assembly 56 and film roll driver 58 extends out from support assembly 40.

Figure 25:
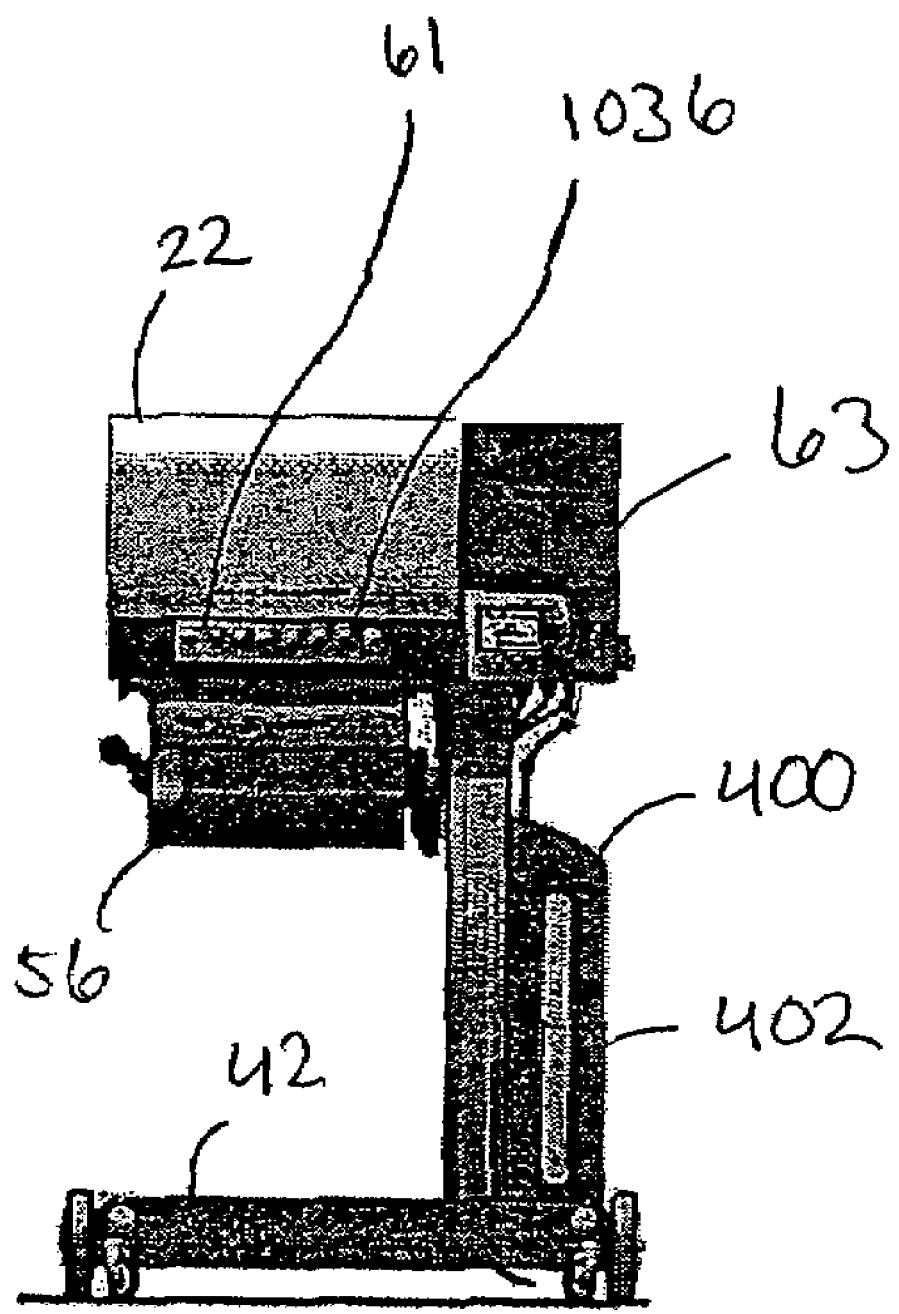
FIG. 25 shows a front view of the dispenser system.

FIG. 25 provides a front view of dispenser assembly 22 including first and second control panels 61 and 63 for interfacing to the internet through a modem or the like as described herein relative to the remote monitoring of a manufacturing device.

Figure 26:
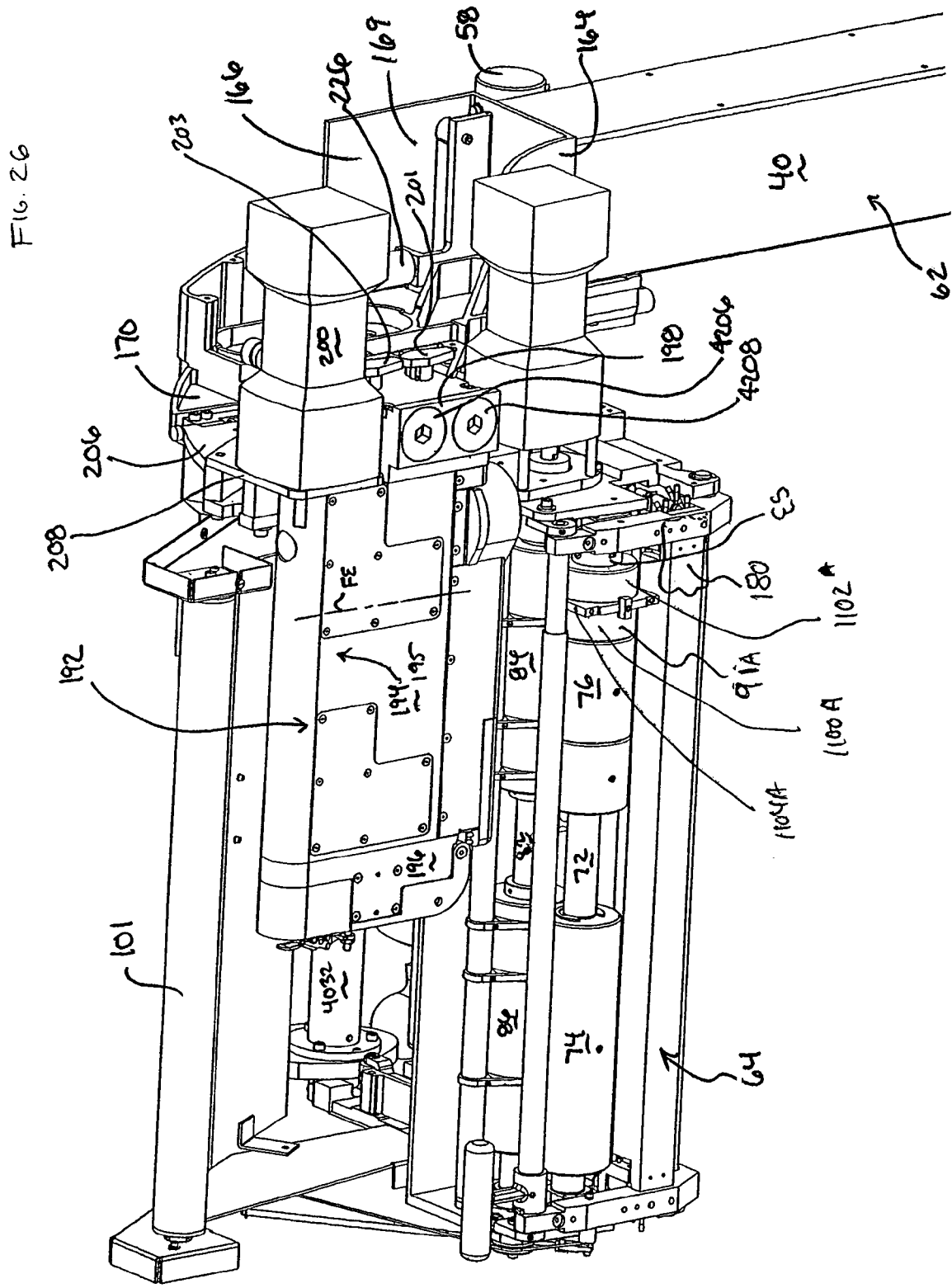
FIG. 26 illustrates the film source, guidance rollers and driver roller set with the chemical dispenser removed for added visualization.
Figure 26B:
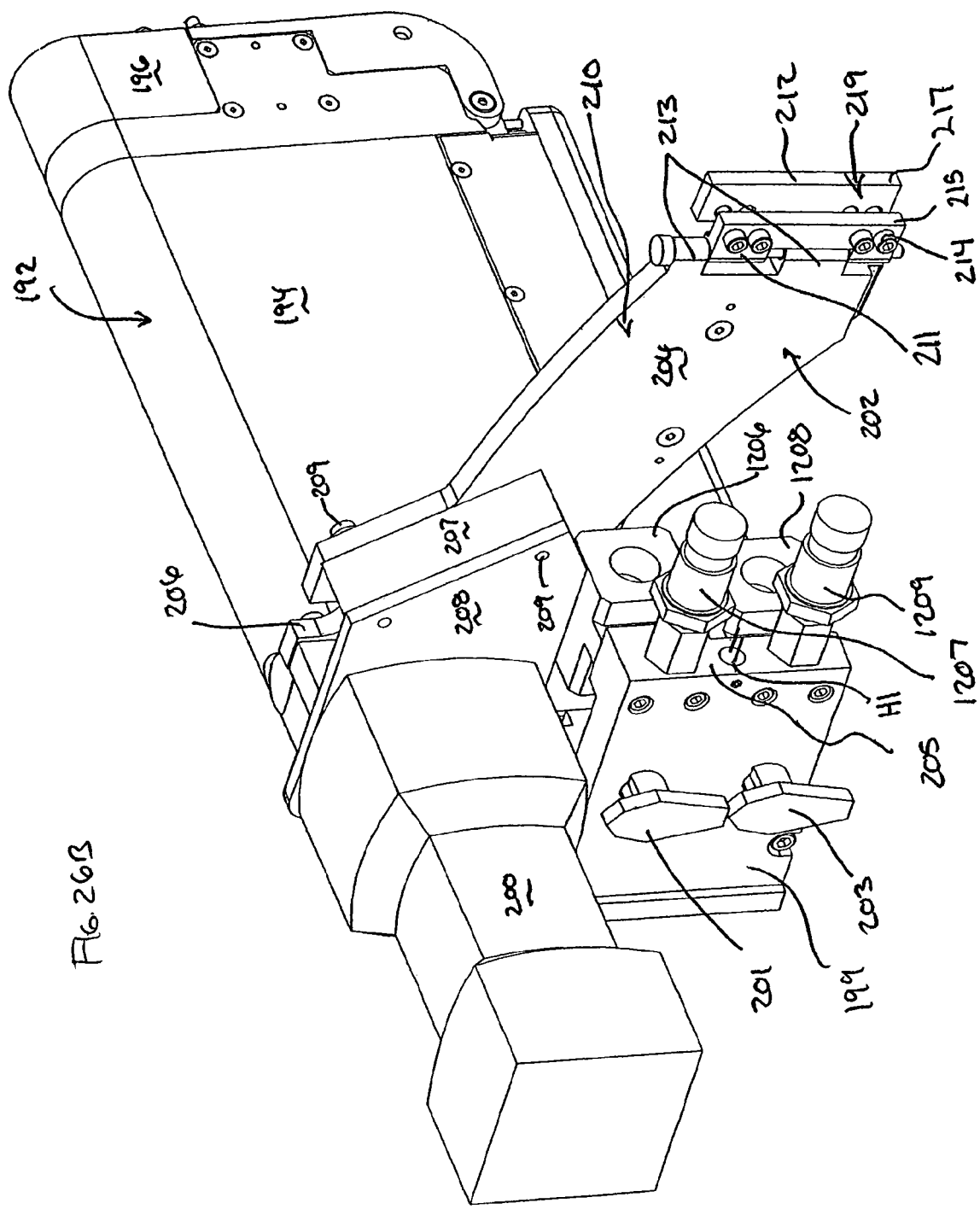
FIG. 26B shows the dispenser apparatus separated from its support location.
Figure 30:
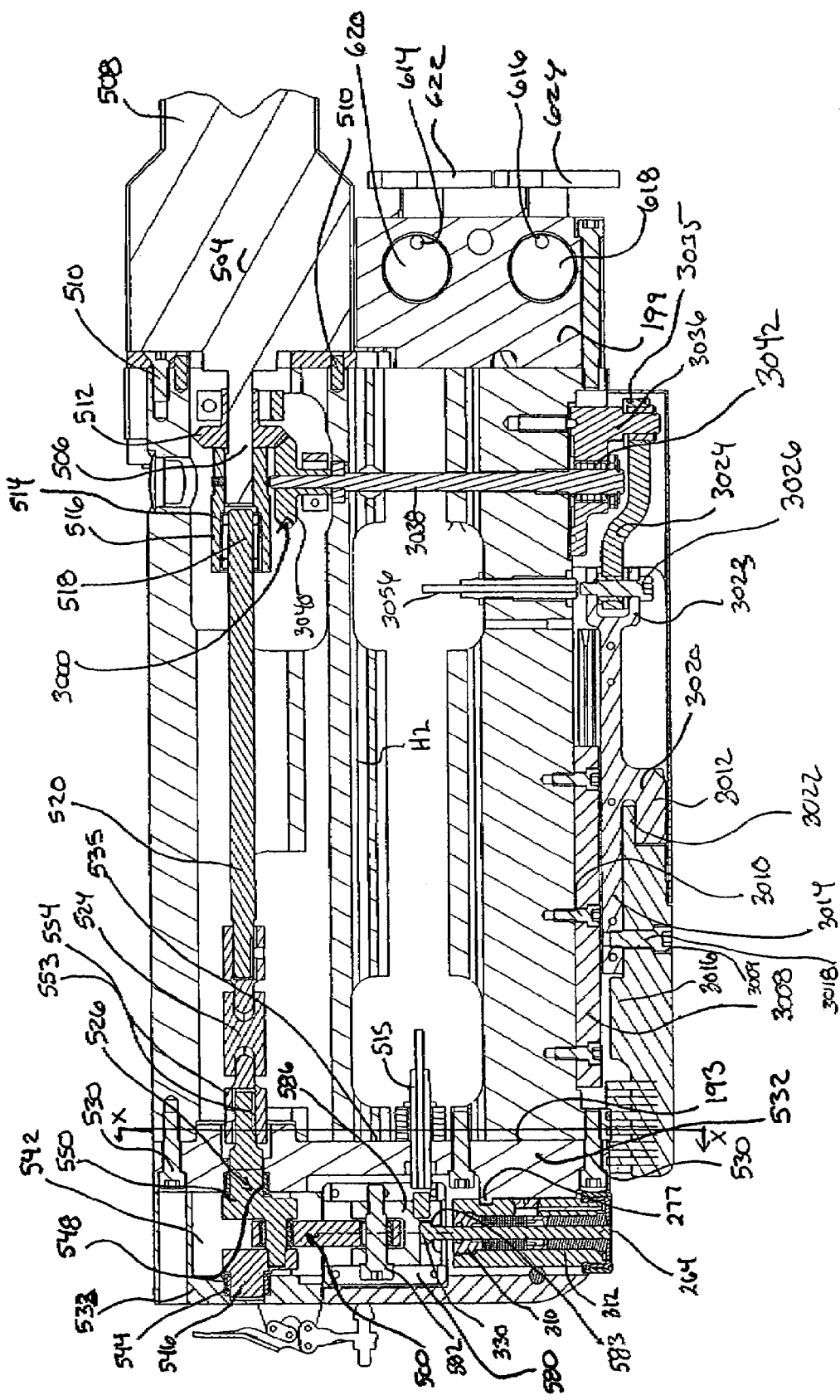
FIG. 30 shows the dispenser assembly in longitudinal cross-section.
Figure 40:
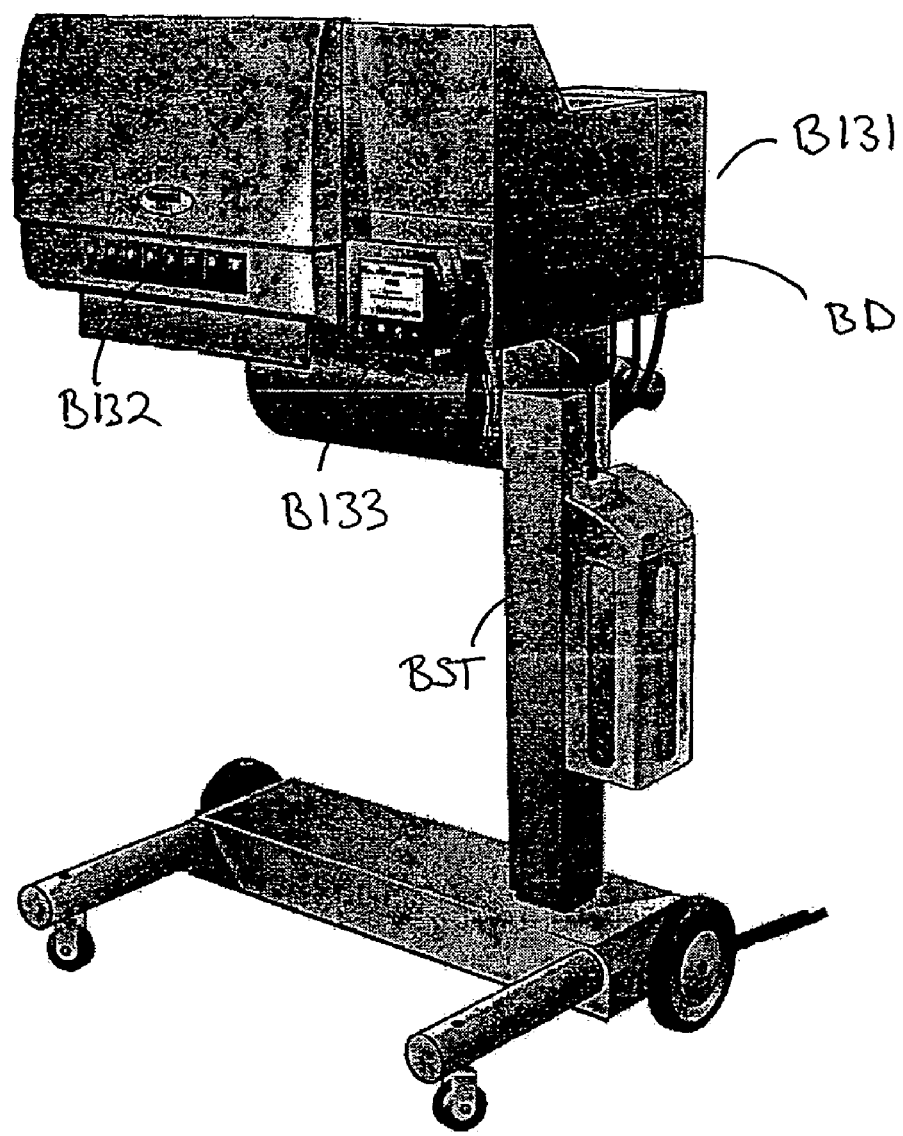
FIG. 40 shows a foam-in-bag dispensing system having ergonomically oblong push buttons in its remote access control panel and in its bag functioning control panel.

FIGS. 24, 25 and 40 additionally show solvent supply system 400 having solvent container 402 with associated pumping which pumps solvent through solvent supply line 404 into the dispenser assembly 22 as through the chemical inlet manifold 199 of FIG. 26B and main manifold of the dispenser housing shown in FIG. 30. FIG. 24 also shows heated chemical hose dispenser assembly (intake manifold) connectors 626 and 628. Adjacent that connector is illustrated electrical cabling connector 627 with the upstream cable portion (e.g., electrical cable lines that are coiled together with the heated chemical hoses 28', 30' having internal coiled resistance heaters with thermistor temperature sensors having their own electrical lines). Control console 52 (FIG. 24) includes for example the electrical driving boards for the in-line pumps, etc. as well as logic control boards as in the operational control and remote monitoring control boards (helps in suppressing EM noise levels).

FIGS. 26 and 26A to 26D illustrate the film feed and tensioning assembly of a preferred foam-in-bag dispenser embodiment as well as the dispenser and end seal compression mechanism for the foam-in-bag dispenser.

FIG. 26 provides a perspective view of bagger assembly 64 with dispenser apparatus 192 (e.g., a two component foam mix dispenser apparatus is shown) mounted on dispenser mounting base 170 which together with the entire bagger assembly 64 is supported by assembly 62 in cantilever fashion so as to have, when in its operational position, a vertical central cross-sectional plane generally aligned with the nip roller contact region CR (between roller sets 74, 76 and 84, 86 as shown in FIG. 26C) positioned below it to dispense material between a forward positioned central axis of driver shaft 72 and a rearward positioned central axis of driver shaft 82. As further shown in FIG. 26, dispenser assembly 192 comprises dispenser housing 194 with main housing section 195, a dispenser end or outward section 196 of the dispenser housing with the dispenser outlet preferably also being positioned above and centrally axially situated between first and second side frame structures 66, and 68 (FIG. 26A). With this positioning, dispensing of material can be carried out in the clearance space defined axially between the two respective nip roller sets 74, 76 and 84, 86 during the below described bag formation.

Also dispenser assembly 192 is preferably supported above the nip contact location CR or the underlying (preferably horizontal) plane on which both rotation axes of shafts 72, 82 fall. This arrangement allows for receipt of chemical in the bag being formed in direct fashion. Dispenser apparatus 192 further includes chemical inlet section 198 on the opposite side of main dispenser housing 194 as dispenser end section 196. The outlet or lower end of dispenser assembly 194 is further shown positioned below idler roller 101. As shown in FIG. 26C the smooth curved edge of dispenser housing 194 helps in the opening initiation of the C-fold film or like film with the edges being separated and opened up as the film passes from idler roller 101 and along the smooth sides of dispenser housing 194 into the nip roller set.

FIG. 26 also illustrates dispenser motor 200 used for dispenser valve rod reciprocation as described below. Inlet end section 198 comprises chemical shut off valves with chemical shut off valve handles 201, 203. As shown in FIG. 26B, chemical shutoff valves 201, 203 are supported on intake manifold housing 205 through which the chemicals pass before being forwarded to the manifold housing portion of dispenser housing 194.

Inlet end section 198 further includes pressure transducers 1207 and 1209 adjacent heater chemical hose and hose heater feed through manifolds 1206 and 1208 which feed into main manifold 199. Pressure transducers are in electrical communication with the control system of the foam-in-bag dispenser system and used to monitor the general flow state (e.g., monitoring pressure to sense line blockage or chemical run out) as well as to provide pressure signal feedback used by the control system in maintaining the desired chemical characteristics (e.g., pressure level, temperatures, flow rate etc.) for the chemicals in maintaining the desired mix relationship for enhanced foam generation. In this regard, reference is made to FIG. 19 for an illustration of chemical temperature control means in the intake manifold 199 and housing manifold 194 (zones 1 and 2) and FIG. 26B which illustrates manifold heater H1 in communication with the control system for maintaining a desired temperature in the intake manifold 199. Filter devices 4206 and 4208 seen in FIG. 26 are placed in fluid communication with the heated chemical passing through the manifold.

FIG. 26B illustrates dispenser apparatus 192 separated from its support location shown in FIG. 26 and shows main housing 194, dispenser end 196 as well as additional detail as to inlet end section 198 and dispenser motor 200.

In FIG. 26 there is demarcation line FE representing an interior film edge location with the opposite edge traveling forward of the free end of dispenser system 192. Thus, with a C-fold film the bend edge is free to pass by the cantilevered dispenser system 192 while the interior two sides are joined together with edge sealer 91 while passing along line edge FE.

Heating the chemical manifolds of the dispenser assembly to a proper temperature range prevents the phenomenon called cold shot, which occurs when the chemical temperature drops in proximity to the dispenser, because of the large mass of relatively cold metal in that area. Cold shot degrades the quality of the foam output as well as the foam's intended usage as in a protective cushioning barrier. The present invention has the advantageous feature of providing heat sources at strategic locations to provide temperature maintenance heating along the entire path of chemical travel starting with a heater in the chemical supply hose initiated within 20 feet or so of the dispenser housing, a heater in the main manifold 205, and a heater in the dispenser housing 194 which has chemical passageways that exit into the mixing module. In this way, from the initiation point all the way to the outlet tip, the chemical is maintained at the desired temperature (maintained in the sense of not being allowed to drop below a desired temperature (e.g., 130° F.) or with the option of applying additional heat to raise the level at to above an initial chemical hose temperature setting). The manifolds of the present invention are preferably heated to the same temperature as the chemical lines, which is preferably about 125 to 145 degrees F. A preferred embodiment of the invention uses two cartridge heaters, one is preferably mounted into a drilled hole in the main manifold 199 (the manifold block designated 205) and is represented by H1 in FIG. 26B, and the other (H2—FIG. 30) is preferably installed into an extruded hole in the dispenser support and is of cartridge form meaning it has its own sensors and controls for making adjustments in coordination with a control board processor or with its own processor or reliance can be placed on the control sub-system for the manifold noted above.

A preferred embodiment of the present invention has two manifolds (199 and dispenser housing 194 described below), each with its own independent cartridge heater, thermistor (H1 and H2), and control circuit; giving it the capability of controlling each manifold independently and at a wide range of setpoints if necessary (e.g., a number of setpoints falling between 3 to 20). The control circuits and thermistor sensors that are used in the manifolds of the present invention are easily capable of maintaining manifold temperatures to an accuracy of 2 or 3° F., even if ambient temperatures in the work environment vary widely. The present invention also preferably uses the feature of having the temperature setpoints of the manifolds H1 and H2 follow and match the temperature setpoints of the chemical hoses. For example, if the operator sets the chemical line temperatures (e.g., 130 degrees F.) for chemical hoses 28' and 30' feeding from the in-line pumps to the dispenser). Thus, the system controller can automatically make the setpoint temperatures of the manifolds match the set chemical hose temperature (e.g., 130 degrees F.) unless instructed otherwise. If the operator later changes the line temperature setpoints to 140 degrees F., the system controller can automatically make the temperatures of the heaters in the manifolds set for 140 degrees F. in the chemical passing therepast.

FIG. 26B further illustrates support bracket assembly 202 comprising main bracket body 204, having bracket plate 206 secured to an exterior bracket plate 208 by way of cross plate 207 with securement bolts 209 on which motor 200 is mounted, with dispensing system 192 also being secured to bracket assembly 202. Bracket assembly 202 further comprises dispenser rotation facilitator means 210 such as the hinged bracket support assembly 219 for the rotation of the dispenser 192 between a chemical output position to a servicing position.

FIG. 26C provides a side elevational view of dispenser system 192 and bracket assembly 202 in relationship to film 216.

As shown in FIG. 26 after leaving the film roll and traveling past lower idler roller 114 (FIG. 26A), the film is wrapped around upper idler roller 101 and exits at a position where it is shown to have a vertical film departure tangent vertically aligned with the nip contact edge of the nip roller sets. Because of the C-fold arrangement, the folded edge is free to travel outward of the cantilever supported dispenser system 192. That is, depending upon film width desired, the folded end of C-fold film 216 travels vertically down to the left side of dispenser end section 196 (from a front view as in relative to FIG. 26) for driving nip engagement with the contacting, left set of nip rollers (74, 86). As further shown in FIG. 26C the opposite end of film 216 with free edges travels along the smooth surface of dispenser housing whereupon the free edges are brought together for driving engagement relative to contacting right nip roller set (76, 84) whereupon the contacting free film edges are subject to edge sealer 91 to complete the side edge sealing for the bag being formed.

FIG. 26D illustrates the film roll spindle loader adjustment means 218 of the present invention that facilitates the loading of a roll of film for use in bagger assembly 64 on to the spindle 222 with adjustable end lock 228.

Figure 29A:
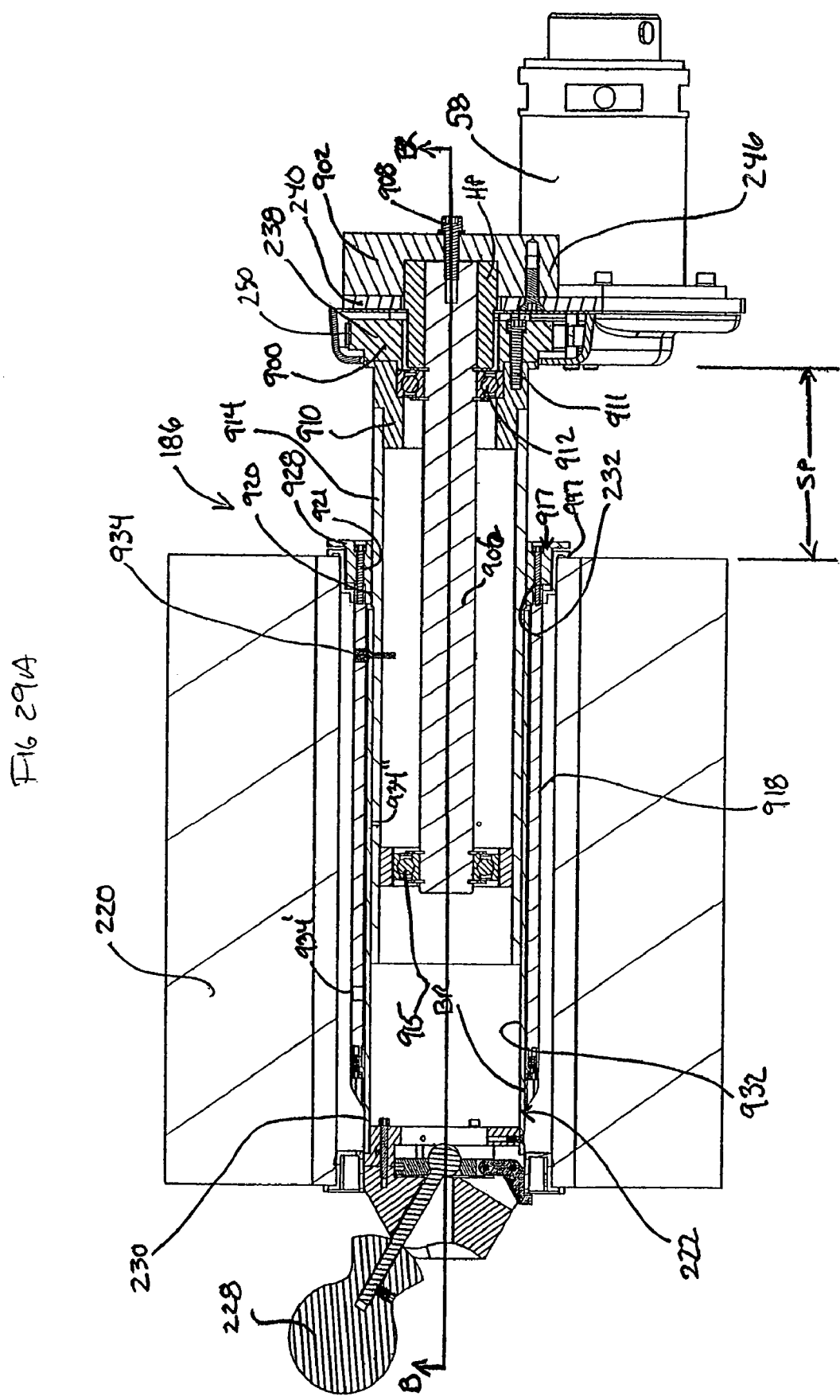
FIG. 29A shows a vertical cross-sectional view of the spindle with spline drive assembly shown in FIG. 26D.
Figure 29C:
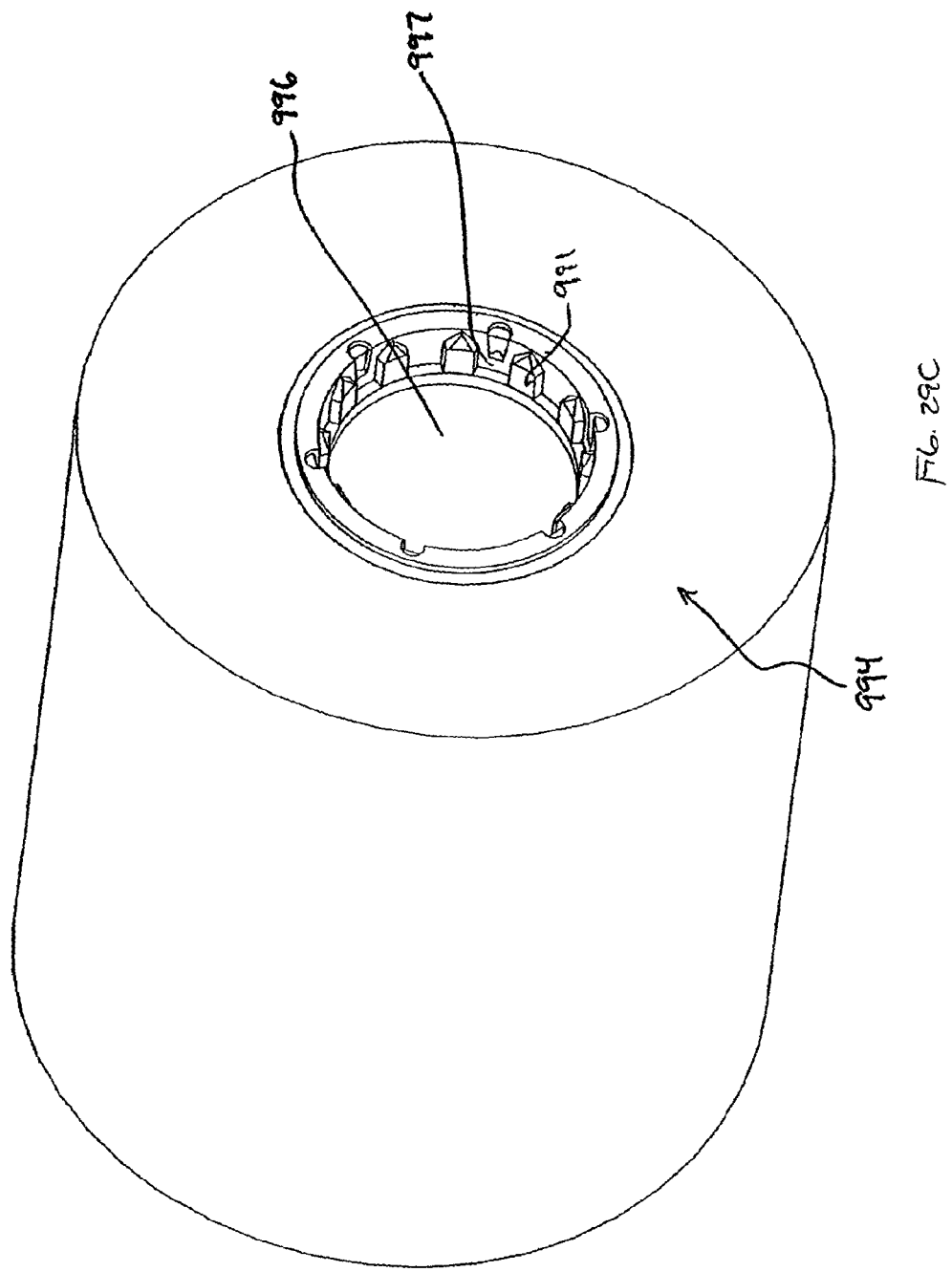
FIG. 29C shows a perspective view of a film roll with core and opposite end core plugs or inserts.

FIGS. 26D and 29A also show roll film drive transmission 238 which includes spindle base or proximal end roll engagement means 232. The spindle base end engagement member 232 drives film roll 220 with web tension motor 58 and forms the downstream component of web tension or film source drive transmission 238, with the film source drive means of web tension assembly 190 comprising driver or web tension motor 58 and film source or web tension drive transmission 238.

FIG. 26D further illustrates spindle loading adjustment means 218 having a load support structure with hinge section 242, an intermediate support section 244, aligned with the central axis of spindle 222 and receiving by way of a bearing support the base end of the spindle, and a web tension motor mount support section 246 radially spaced from the noted central spindle axis. Drive transmission 238 features a timing belt 250 extending about driving pulley 252 and a driven pulley (not shown) with the latter being in driving engagement with engagement member 232.

FIG. 29A provides a cross sectional view of the film support means 186 with spindle 222 supporting film roll 220 locked in position thereon and with spindle supported engagement member 232 providing driving communication from the web tension drive transmission 238 directly to film roll via a film roll core insert. Under the present invention web tension is monitored and controlled with the controller sub-system illustrated in FIG. 17 (preferably in conjunction with the controller sub-system of FIG. 16 used for film advance and web tracking). Web tension motor 58 is mounted on spindle load adjustment means 218 that includes hinge section 242 or a support-to-spindle connector for achieving spindle load rotation between a load and film unwind state. FIG. 29A illustrates in greater detail the rotation drive arrangement for the spindle which includes web tension drive transmission 238 with main gear 900 encircling stationary support shaft extension 906 extending axially in and received by hub pocket HP formed in load support structure 240 and is fixed there with fastener 908. Attached to main gear (e.g., see fastener 911 in FIG. 29A) is stub shaft 910 which rotates together with main gear 900. Between fixed axial shaft 906 and the rotating stub shaft there is located first roller bearing 912. Stub shaft 910 includes a free end minor step down over which is slid and fixed in position the illustrated radially interior cylindrical extension sleeve 914. At the free end of fixed axial shaft 906 there is located a second roller bearing 915 which is in bearing contact with the rotating interior cylindrical extension sleeve 914.

FIGS. 29A and 29B further illustrate spindle spline drive 917 which includes engagement member 232 and outer sleeve 918. Engagement member 232 is shown independently in FIG. 29B while FIG. 29A shows spindle spline drive 917 received by fixed interior cylinder 914 in a rotation transmission manner when the sliding or telescoping sleeve 918 (at telescope junction 248, FIG. 26D) is locked in position via locking fastener 934, but with the capability to axial slide along sleeve 914 when locking fastener 934 is released. The interior annular surface 924 of outer cylindrical sleeve 918 is mounted over and onto the outer flange extension 920 of engagement member 232 of spindle spline drive 917, and fixed in position through use of fasteners 921 extending through fastener holes 922 shown formed in a thickened base region 926 of engagement member 232. Fasteners 921 are threaded through fastener holes 922 into threaded reception holes formed in the abutting edge of outer cylindrical shaft 918. Radial extension flange 928 extends radially off base region 926 out for a distance sufficient for film roll contact retention as shown in FIGS. 115 and 116. Thus, when fastener 934 locks cylindrical sleeves 914 and 918 together, the connection of engagement member 232 to outer sleeve 918 provides for transmission of the rotation gear 900 and stub shaft rotation to roll 20. Intermediate cylindrical shaft 932 has an inner surface which is concentrically spaced relative to the outer surface of interior cylindrical sleeve 914 and has an open forward end into which is inserted the base of roll lock assembly 228. The free end of the outer cylindrical sleeve 918 has a radially inward extending annular bearing ring BR in contact with sleeve 932. Spindle 222 is comprised of a plurality of cylindrical sleeves that fit tightly into a telescoping assembly, either extending or contracting to provide for different film width usage on the same support spindle.

Engagement member 232 of spline drive 917 is preferably a plastic or metal molded member as in a casting or plastic injection mold product and features a plurality of locking members 952 which are shown in the referenced figures as being a plurality of protrusions spaced (preferably equally) about the circumference of base region 926. In a preferred embodiment the protrusions or means for engaging are teeth shaped. The teeth help ensure good rotational engagement with the corresponding roll plug 977 (FIG. 29C), which in a preferred embodiment features similar shaped teeth pointed in the opposite direction such that the triangular, sloped or divergent apex portion are less than the total base axial length. In this way, there is a portion of base side wall to base side wall contact between the teeth of the roll core plug and the teeth of the spline drive engagement member. Also, there is preferably a friction fit contact between the adjacent base portion of the roll film drive plug received within the roll film core and the base of the spindle spline drive or engagement member 232. The mesh arrangement is locked in the desired state upon lock 228 being engaged to prevent roll slippage along spindle 222.

The mate and lock means of the present invention, illustrated by the intermeshing protrusions for each of the spindle drive spline and roll drive spline (997, FIG. 29C), with the web tension motor 58, facilitates providing a positive drag or drive to the film 216 (FIG. 26C) of the film source roll 20. For if the roll film core 188 were allowed to slip on the outside diameter of roll spindle 222, web tensioning at the preferred level of control would be made more difficult to achieve. Spindle spline drive engager 232 is thus sized to properly mate both axially and radially with roll film drive 997 which in turn is preferably sized to provide a no slip interrelationship relative to the core 188 having the film wrapped thereon.

With reference to FIG. 26C, there is illustrated the region of film travel following the film exiting the film roll supported on the spindle 26C which at that point, tangentially off the top of the film roll and into contact with the forward side of idler roller 114 (FIG. 26A), and then up as shown in FIG. 26C into engagement with the rear side of upper idler roller 101 where it is redirected downward. From idler roller 101, film 216, in its preferred C-fold form, is separated over a portion of its non-fold side (the fold side passing externally and in front of the front end 196 of the dispenser 192) and then brought back together as both sides of the film enter the nip roller assembly comprised of drive nip roller pair 84 and 86 supported on shaft 82 and driven nip roller pair 74,76 on shaft 72. Reference is again made to the above explanation as to how the roll core is locked in place and is rotated and (electronically) controlled based on its relationship with the spline drive driven by web tension motor in communication with a controller preferably with a general or web tension dedicated processor. FIG. 17 illustrates the control and interfacing features of the film tensioning sub-system (as well as the spindle latch release sub-system). This ability to control film tension and to counteract film slacking events provides advantages over the prior art devices relying on braking for example, in an effort to avoid film slacking.

The present invention thus features electronic (e.g., digital signal) web tension control that provides for film tensioning and tracking. Film tension and tracking relates to how the film is handled once it is loaded into the machine. Any film handling or bag making system is only as good as its ability to control tension and to provide proper tracking for the moving web. Poor control of web tension has a negative effect on web tracking, which can cause all sorts of problems with bag quality. The preferred present invention features means for providing active, digital control of web tension, provided by, for example, the illustrated DC motor/encoder 58 driver (motor), which is mounted directly to the film roll spindle and the transmission line from the motor to the roll as explained above. The motor torque, hence web tension, is accurately controlled by the system processors, and based on algorithms installed in the system processors to carry out the below described web tensioning functions.

Under the arrangement of the present invention, the active control capability allows the present invention to adjust tension in the web in response to the rapidly changing dynamics of the bag making process. This type of active web tension control is beneficial with this application, because it can even move the roll backwards, unlike prior art passive or braking web tensioning systems wherein web tension may be lost if the film drive rollers run in reverse, which such prior art devices do at the end of every bag making cycle to pull the film away from the cross-cut wire. For example, the web tensioner on a commonly used prior art device provides web tension via a set of spring loaded drag plates that are positioned to drag on the ends of the film roll.

Under the present invention tension control is available while the system is in an idle mode. During idle mode, the web tension torque motor of the present invention pulls back on the film (fed through the system by the nip rollers and associated nip roller driver) with a slight torque, just enough to keep the film from going slack. The motor torque for the web tension driver, hence the web tension, are controlled by the main system control board in conjunction with a correspondingly designed motor control circuit (e.g., tach motor encoder EN) that allows the system to control torque via the control of current through the motor windings.

The present web tensioning means is also active in controlling tension while dispensing film. For example, while running, the web tensioning control takes into consideration dynamic changes, such as inertia and roll momentum changes based on the continuous decrease in mass of roll film. For example, in a preferred embodiment, film level monitoring is achieved through a continuous monitoring of the DC motor on the film unwind shaft (film roll support) and compared to the film advance motor. For instance, the rotational momentum of the film roll is considered in the calculation of motor torque when the roll is starting or stopping. When starting film drawing, the torque on the motor will be rapidly reduced so as not to over tension the web. When stopping film drawing, the torque on the motor will be rapidly increased so that the film roll's own momentum does not overrun and cause the web to become slack. The web tensioning device thus works in association with the film feed rollers and other sensors such as system shut down triggering.

In a preferred embodiment of the invention, tension calculation includes consideration of film roll diameter by way of knowledge of the tach state of the film advance motor 80 and web tensioning motor 56. The control system of the present invention and the web tensioning device of the present invention provide for adjustment in the torque in the web tension motor based on, for example, the amount of film left on the spindle. Motor torque will generally be higher when there is less film on the roll, to make up for the loss of moment arm due to the smaller radius film roll. The encoder on the back of the web tension motor, in conjunction with data on speed of the film drive motor on the nip rollers, provides the information that the control system uses to calculate film roll diameter using standard formulation.

An additional advantage of the web tension system of the present invention is in the ability of the system to sense when out of film as well as when approaching a film run out state (roll diameter sensed at a minimum level and signal generated as in an audible sound—so as to facilitate preparation for roll replacement when the roll does run out as described below). Encoder EN on the back of the web tension motor 58 provides the system controller with the ability to sense a run out of film on the film roll. If the roll runs out of film, the web tension motor will have nothing to resist the torque that it is generating, so it will start to spin, more rapidly than normal, in the reverse direction. This speed change is sensed by the encoder, which is monitored by the system control board, which will quickly shut the system down as soon as it occurs. This provides an efficient out-of-film sensing mechanism, and uses no extra components. Thus the present system can be run until it completely runs out of film, and then safely shuts down. An added benefit with such a system is that there are no wasted feet of film left on the roll, and the audible or some other signaling means indicating running low allows the operator to be in a ready to replace state when the system does indeed shut down upon completion of a film roll.

In addition to the web tension system rapidly detecting an out-of-film situation, the web tension system of the present invention also provides a film jam or the like safety check and shut down. For example, if there is a film jam somewhere in the system, and the film can no longer move forward in response to the turning of the drive and driver rollers 74, 76 and 84, 86 or nip rollers (a likely occurrence in response to a major foam-up), the nip rollers keep turning, but the web tension motor stops turning as there is sensed no film feed occurring. In other words, the system controller sees that the encoder pulses from the web tension motor are not keeping up with the speed of the film as determined by the speed of the film drive motor on the nip rolls. The discrepancy causes a quick shutdown, and can save the system from further damage. Once again, no additional components are required for this feature illustrating the multifaceted benefits associated with the web tensioning and monitoring film unwinding means of the present invention.

By utilizing, for example, the control and monitoring system of the present invention with the film tension and film advance/tracking sub-systems of the present invention, there can be achieved high performance web tensioning under the present invention. The web tensioning, control and monitoring involves, in one technique, the calculation of film roll size to determine motor torque. That is, the film drive motor (that drives the aluminum nip roller) has an encoder signal that allows the central processing unit to monitor its speed of rotation, by counting the number of pulses received during a known time. The motor produces about 200 encoder pulses per revolution.

Since the film does not slip between the two nip rollers, if you know the diameter of the driven nip roller and its speed of rotation, you can easily calculate the web velocity.

Web Velocity=(Roller RPM)×(Roller Circumference)

Where:
Web Velocity is measured in inches per minute
Roller RPM is the revolutions per minute of the film drive roller
Roller Circumference is the circumference of the film drive roller measured in inches.
Calculated as (×Roller Diameter)

The other motor on the web path is located on the film unwind spindle. Its purpose is to provide web tension so that the web does not become slack during operation. Slackness in the web will usually lead to film tracking problems, which are highly problematic to the foam-in-bag process.

The web tension motor must not be allowed to over-tension the web, as this can create serious problems like film stretching, tearing, or slippage in the nip rolls.

This motor also has an encoder output, which, for example, provides 500 pulses per revolution. This encoder output is used, in conjunction with the encoder signal on the film drive motor, to calculate the diameter of the film roll on the unwind spindle. The film roll diameter gets smaller as the film is used, and suddenly gets larger when a roll is replaced.

The roll diameter can easily be calculated, when the film is moving at a steady speed, by comparing the web velocity to the angular velocity of the film roll as it unwinds.

Roll Diameter can be calculated as follows:

Roll Diameter=(Web Velocity)/[×(RPM of Web Tension Motor)]

Where web velocity is calculated by the formula shown above, and the RPM of the Web Tension Motor is measured by the encoder on the output shaft of the web tension motor. For instance, RPM of the web tension motor can be calculated by dividing the number of encoder pulses received per minute by the number of encoder pulses in a complete revolution.

The film roll diameter is informative because the torque output of the web tension motor is preferably adjusted as a function of the diameter, to maintain web tension, as measured in pounds per inch of web width, at a constant level. The tension motor torque will track armature current very closely, with a response time measured in milliseconds.

Motor Torque is related to Web Tension in the following equation. This equation applies to the greatest extent if the motor and the web are moving at a constant velocity, or are stationary. If the motor and the web are accelerating or decelerating, the equation relating these two variables involves further adjustment which takes into consideration the acceleration of deceleration with associated acceleration/deceleration formulas.

Motor Torque=Desired Web Tension×Web Width× Film Roll Diameter/2

Where:
a) Web Tension is measured in Pounds per Inch of Web Width
b) Web Width is measured in inches
c) Roll Diameter is measured in inches
d) Motor Torque is measured in Inch-Pounds The central processor controls the torque output of the web tension motor by, for example, measuring and controlling the current flow through the armature coil of the motor. In a preferred embodiment, the web tension motor is a Permanent Magnet DC Brush Motor. In this type of motor, output torque is directly proportional to armature current. The intention of this control system is to maintain within the parameters involved a constant web tension.

As noted above, the web tension motor can be used in other situations to help keep web tension constant, or to change it as desired.

For long idle periods, where the system is left idle for long periods, the web tension can be reduced to a lower level than what is normally used during operation. This will extend the life of the motor, by reducing current flow through the brushes.

For a starting of web motion, during the start of the bag making cycle, the web has to be accelerated to its final velocity. This means that the web has to yank the film roll to get it moving, an act that inherently increases the web tension because the film roll has rotational inertia. During these acceleration periods, the web motor torque can be reduced to compensate for the increase in tension that is inherent to accelerating the film roll. This reduction is preferably based on trial runs and a monitoring of performance of the web tensioner for given roll settings.

At the end of the web motion, or the end of the bag making cycle, the film roll has to stop, or a lot of slack will be induced into the web. Since the rotational inertia of the film roll is quite high, the web tension motor torque must be increased to prevent the roll from overrunning the web as it comes to a stop. As with the start of motion, this torque profile is typically determined through trial runs.

The encoder output on the web tension motor also provides shutdown information that is useful to machine operation. For example, if the nip rolls are turning, and the web tension motor is not turning, then something has jammed the web. An immediate machine shutdown is required. If this happens at the end of a film roll, it probably means that the tape holding the film to the core is too strong, and the film cannot pull off the paper core. This appears to be a jam as far as the machine control system is concerned.

Also, if the web tension motor turns in reverse of its direction of rotation when the film is unwinding, then the roll is out of film. When the film pulls off the core, at the end of a roll, this is the expected shutdown mode.

Figure 16:
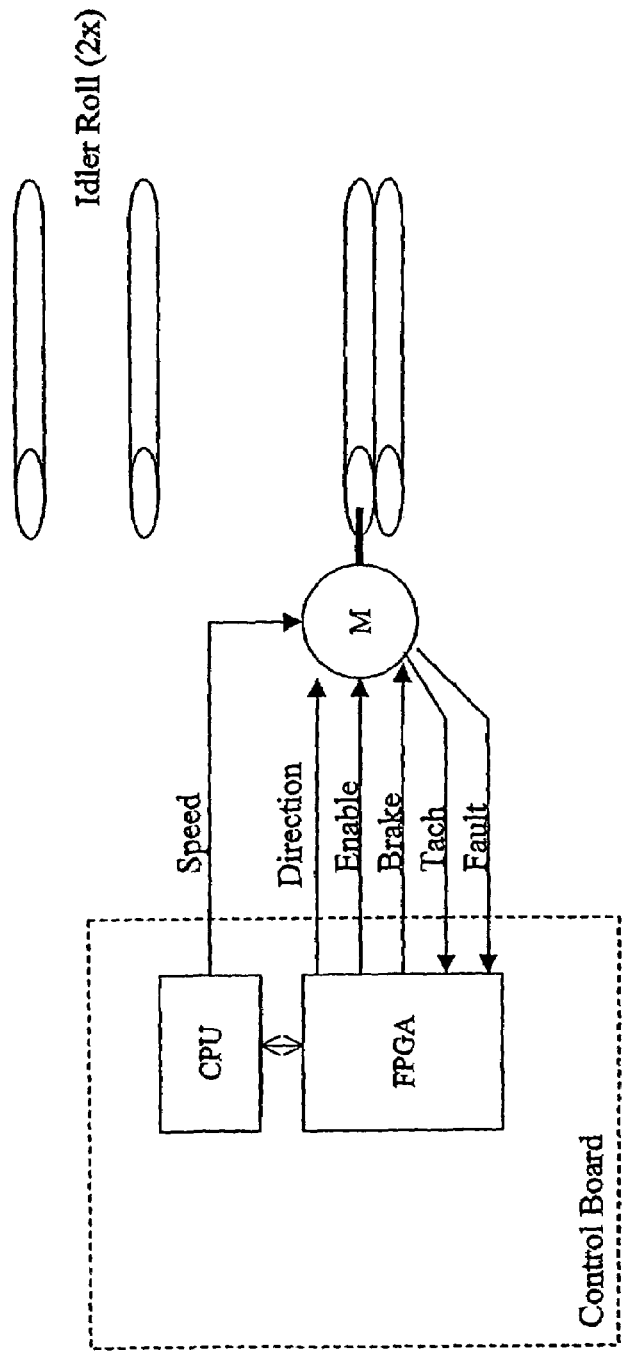
FIG. 16 shows an illustration of the operational control, interface and power distribution features for a film advance and tracking system.

The film advance/tracking controller sub-system shown in FIG. 16 illustrates the control system's arrangement for carrying out the film advance and monitored. As shown, the control board comprises, for example, the central processing unit working in conjunction with a field programmable gate array ("FPGA") and control circuitry receiving signals and sending data on the real time characteristic of the film advance. The FPGA can receive programmed data input from the memory stored in the processor upon machine start up, for example. FIG. 26A illustrates drive roller shaft 82 which is driven by driver 80 whose output shaft is in direct engagement with the roller shaft via step down gearing 1000 of driver 80, with driver 80 also preferably comprising a brushless DC motor 1002 with encoder sensor 1004 as in the previous discussed motor 200 for the mixing module drive assembly. As described above, the control board film advance sub-system shown in FIG. 19I can thus monitor, via the encoder sensor, the status of the drive roller shaft 82 with fixed roller set 84 and 86. As shown in FIG. 26A, for example, each roller (84, 86) includes slots for receiving canes 90 supported on fixed rod 92 to help avoid undesirable film back travel. This monitoring is useful for monitoring general tracking of film feed and, as noted above, can be used in conjunction with the web tension driver encoder to monitor system conditions like the above noted film out condition.

Figure 22:
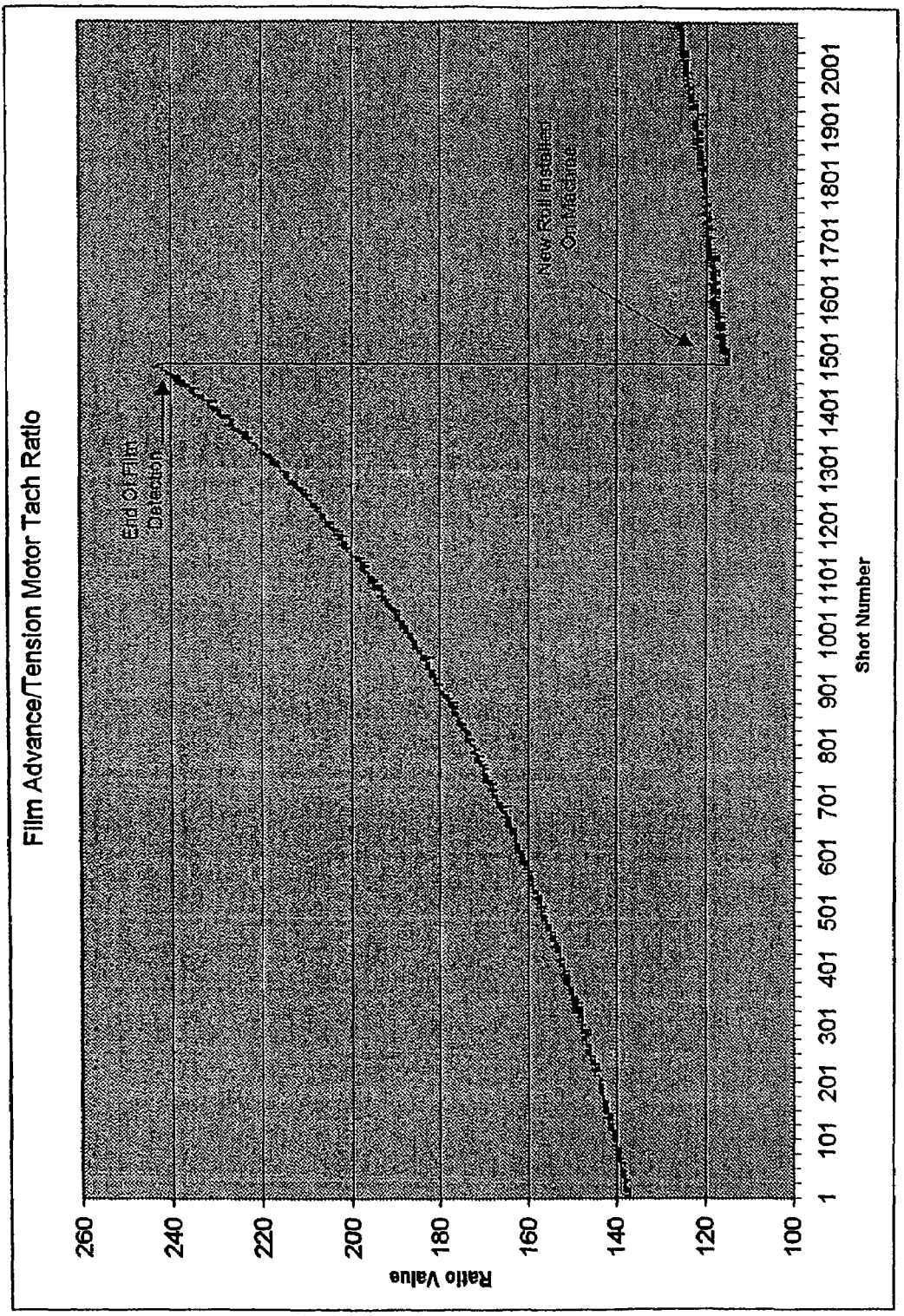
FIG. 22 shows a comparison of ratio value (ratio of accumulated tachometer pulses of film tension motor divided by the accumulated tachometer pulses of film advance motor) versus number of dispenser shots brought about by a control board comparison of the encoder signals from the respective film advance and film tension motors.

FIG. 22 provides an illustration of a film advance versus tension motor ratio and its use in monitoring the relationship between roll usage and the interrelationship between the film advance and web tension tachometer feed to the control system. The "shot number" along the X-axis illustrates a history line of the number of dispensed shots for a given bag volume and foam output volume (useful in comparison from one roll to the next as to film usage). This information is useful in the monitoring of film re-supply needs as described in the above noted remote monitoring system with the remote monitoring, and re-supply of material capabilities facilitated with the control system of the present invention.

For example, three main supply requirements for a foam-in-bag dispenser are film (for bags), chemicals (for foam) and solvent (to prevent foam build up in the valving/purge rod and a tip of dispenser). As an additional example of monitoring resupply and usage levels of an operator, is in monitoring solvent usages. For example, there is provided a certain volume solvent container (e.g., 3 gallons) that is in line with a metering pump (e.g., a pump that dispensers a fixed volume of fluid with every cycle (e.g., 0.57 ml based on a preferred 3 pump pulses of 0.19 ml per bag cycle). The controller thus receives signals from the pump as to cycles and/or correlates with bag cycle history such that by monitoring the number of cycles of known solvent volume usage there can be determined usage of solvent and when re-supply is needed. The solvent container also has a float valve or the like which signals when a first low level is reached and sends out a warning via controller interfacing. There is also provided an even lower level sensor that when triggered shuts down system to prevent purge rod binding and other problems involved with no solvent flow is provided. With the monitoring of solvent level based on usage and/or container levels, a new supply of solvent can be automatically sent out from a supplier when there is reached either a certain level of closed amounts or a container level signal following a review of history of usage for machine (re-supply could be triggered by the first low signal or at a higher level depending on re-supply time etc.).

A somewhat similar arrangement is provided to monitor the chemical usage for re-supply, for example. The preferred gerotor pump system used to pump the chemical to the dispenser is not a fixed volume pump per se so there is monitored with the controller the chemical mass of each bag produced is maintained in the database. This is a calculated field based on the 'dispenser open time' and the respective flow rate standard with the know source supply (e.g., a 55 gallon drum) a monitoring of usage and re-supply needs can be actively made by the controller.

One way to monitor the film usage is to use the encoder on the nip roller set to determine number of rotations and with estimated film passage length per rotation can compare against overall length on a roll of film or film source. Under the present invention there is an alternate way to monitor film usage and that is to utilize facets of the above noted web tensioning comparison wherein the output of the film tensioning system (e.g., the encoder of a web tension torque motor having a torque drive transmission system in direct engagement with a roll core drive insert) and the output of a motor driving the nip roller set are used with the controller to compare the interrelationship, and with a review of roll unwinding charcteristics a determination can be made as to how much film has been fed out from the roller. The comparison of motor torque method is the preferred method since it is independent of the machine keeping track of when a roll of film is changed and how much film is on the roll. The DC motor on the film unwind shaft is constantly being monitored and compared to the film advance motor to compensate for the continual decrease in mass of a roll of film.

Reference is now made to FIGS. 27, 28, 30 and 31 to illustrate the mixing module with reciprocating valving and/or purge rod, rod driving mechanism, mechanical tip cleaning system.

Figure 28A:
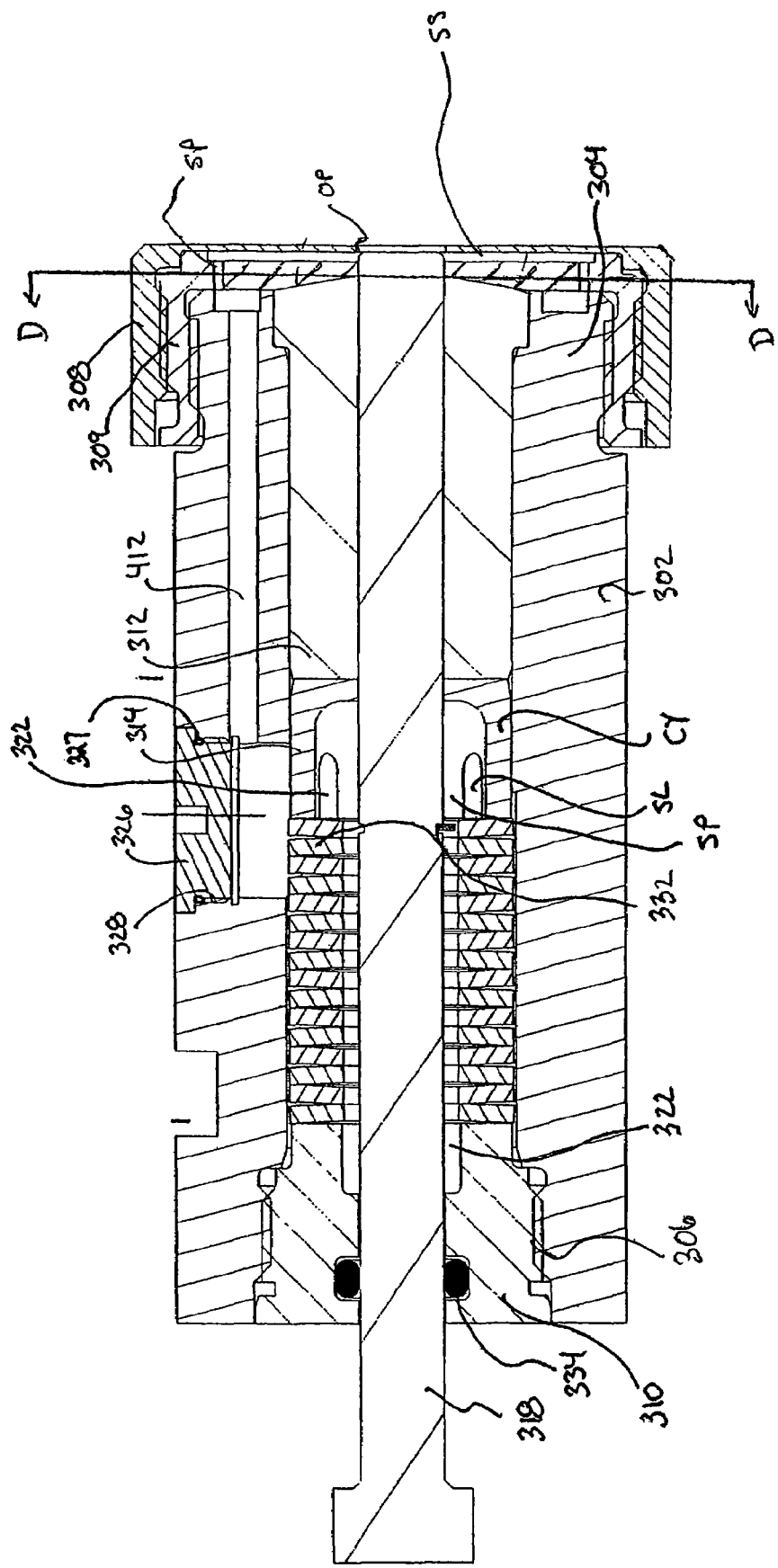
FIG. 28A shows a cross-sectional view of the mixing module taken along cross-section line A-A in FIG. 28.

FIGS. 28 and 28A show a mixing module cartridge 256 whereupon chemicals A and B, which are fed into the cartridge via chemical inlet ports 278, 280 when valve rod 264 is retracted and are mixed together before exiting out the outlet hole formed in hardened tip 266. The cartridge is designed for maintaining within the front end of dispensing housing and placed in position via position of notch 276. FIG. 28 also shows the solvent in feed port 282 which feeds into a solvent passageway system to avoid foam build up at susceptible areas with FIG. 28A showing the solvent pool region 322 and solvent feed passageway. A pool of solvent can be provided via access opening 326, as well as by pumping solvent through the intake manifold, the main dispenser housing manifold and through solvent port 282. Mixing module is shown in FIG. 28A as having module housing 302 with front open end 304 and rear open end 306 with associated front end solvent dispensing cap assembly 308 (comprising inner cap member 309 threaded directly to the main housing's front end and outer cap member 308 threaded over the exterior surface of inner cap member 309). As shown in FIG. 28B inner cap member has a plurality of solvent ports SP providing solvent flow to the solvent space SS extending radially inward to the tip region of stems 318 in the area of the stem access opening formed in outer cap member 308 such that the tip region is maintained bathed in solvent and is replenished in continuous fashion via a solvent pump in line with the solvent source container.

As a means for reciprocating rod 264 shown in FIG. 28 and thus controlling the on-off flow of mixed chemicals from the mixing module, reference is now made to the mixing module drive mechanism 500 of a preferred embodiment of the present invention which is shown alone in FIG. 31 and in position within dispenser 192 in FIG. 30.

Figure 11:
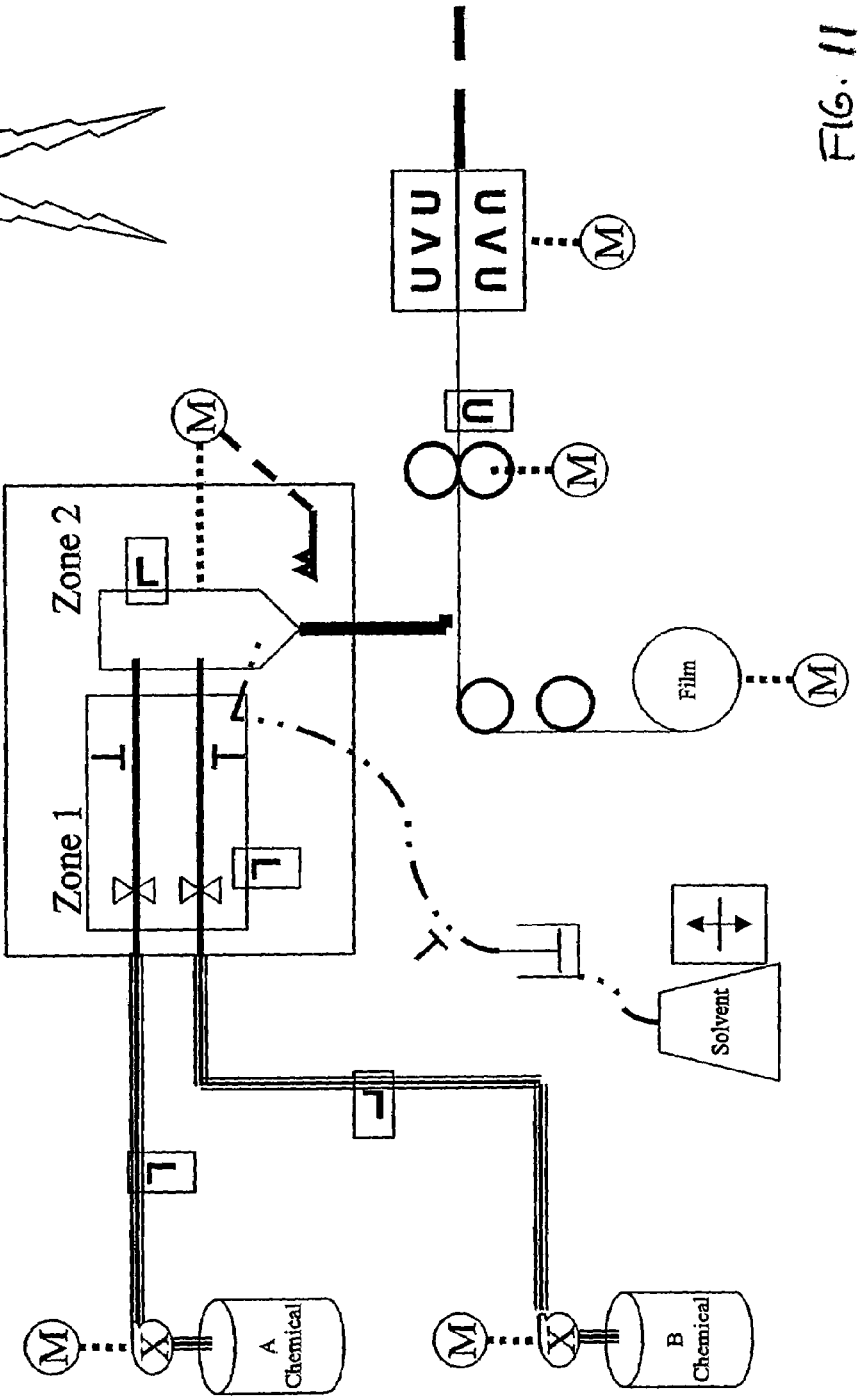
FIG. 11 shows an overall schematic view of the display, operational controls and power distribution for a preferred foam-in-bag dispenser embodiment.

As shown, drive mechanism 500, which is used to reciprocate rod 264 within mixing module 256, is housed in dispenser system 192 and, at least, for the most part, is confined within the smoothly contoured housing of dispenser system 192. Dispenser drive mechanism 500 includes dispenser drive motor system 200 ("motor" for short which entails either a motor by itself or more preferably a motor system having a motor, an encoder means and/or gear reduction means). Motor 200 (the system "driver") preferably comprises a brushless DC motor 508 with an integral controller 502 mounted to the back section of the motor and encased within the motor housing, and gear reduction assembly 504. Motor controller 502 provides encoder feedback (e.g., a Hall effect or optically based encoder system) to the controller such as one provided as a component of main system control board which is used to determine speed and position of the various drive components in the drive mechanism 500. FIGS. 11 and 11A, in general, and FIG. 15 in more schematic detail illustrate the control system for operating, monitoring and interfacing the data concerning the rod drive mechanism to achieve chemical output. The motor controller input from the main system control board preferably includes a 0 to 5 volt speed signal from the main system controller, a brake signal, a direction signal and an enable signal. Motor 200 further preferably includes a gear reduction front section 504 out from which motor output drive shaft 506 extends. The front section 504 of motor 200 is mounted with fasteners 510 (e.g., pins and bolts) to the rear end dispenser housing 194. Motor output shaft 506 has fixed thereon bevel gear 512 and one-way clutch 514. One way clutch 514 is fixedly attached to drive shaft 506 and has clutch reception section 516 receiving first end 518 of main drive shaft 520. Clutch reception section 516 includes means for allowing drive transmission during one direction of rotation (e.g., clockwise) such that rod 264 is reciprocated in mixing module 256, while one way clutch 514 freewheels when drive shaft 506 rotates in an opposite direction (e.g., counter clockwise) such that bevel gear 512 can drive the below described tip brush cleaning system rather then the reciprocating rod. This provides an efficient means of assuring the timing of any dispenser tip brushing and dispenser output avoiding an extension of this cleaning brush described below at a time when chemical is being output. Interior rollers/cam lock up mechanisms 522 of one way clutch 514 provides for device lock up to transmit torque when rotating in a first direction with near zero backlash. It is noted that clutch 514 is included in a preferred embodiment of the invention wherein motor 200 is dual functioning and reversible in direction based on the control system's instructions, (e.g., reciprocation of valving rod and reciprocation of a cleaning brush or some other means for clearing off any material that accumulates at the end of the dispenser).

The second end of main drive shaft 520 is shown connected to flexible coupling 524, which is in driving engagement with dispenser crank assembly 526. Dispenser crank assembly 526 is contained in dispenser component housing. Dispenser component housing 528 is a self contained unit that is connected to the front end of main housing portion 195 and forms forward dispenser end section 196. Dispenser component housing 528 comprises main crank (and mixing module) support housing component 532 and upper dispenser housing cap 533, with support housing 532 having a generally planar interior end 535 for flush engagement with the forward end 193 of support housing 194. Dispenser component housing 532 includes pivot recesses 534 to which is pivotably attached closure door 536 which is openable and closable by way of a finger trigger latch.

Dispenser housing cap 533 is secured to the top front of support structure 194 and is shown as having a common axial outline with support structure 194 (such that all potentially film contact surfaces of dispenser 192 are made with a non-interrupted smooth surface). Housing cap 533 has a large crank clearance recess 542 and a bearing recess 544 sized for receipt of a first of two bearings such as the illustrated first (forwardmost) needle bearing 546. Housing cap 533 is secured in position on the forward top face of main crank support housing component 532 by suitable fasteners (not shown). Bearing recess 544 is axially aligned with inner bearing recess 548 provided on the forward face of housing component 532 (FIG. 66A). Inner bearing device 550 represents the second of the two bearings within cap 533 and is received in inner bearing recess 548. Crank assembly 526 has opposite ends rotatably received within respective inner and outer bearings 545, 550 and is preferably formed of two interconnected components with a first crank assembly component 552 with key slot shaft extension 553 designed to extend past the innermost surface of main housing component 532 and into driving connection with the forward flexible coupling connector 554.

First crank assembly component 552 further includes bearing extension 560 sized for bearing engagement with inner bearing 550 and is positioned between slotted shaft extension 553 and inner crank extension 562. Inner crank extension is elliptical is shape and has bearing extension 560 having a central axis aligned with a first end (foci) of the ellipsoidal inner crank extension and crank pin 564 extending forward (to an opposite side as extension 560) from the opposite end (foci) of inner crank extension 562. Crank pin 564 has a reduced diameter free end which is dimensioned for reception in pin reception hole 566 formed in outer crank extension 568 of second crank component 570 having a peripheral elliptical or elongated shape conforming to that of the first crank component. At the opposite end of the elliptical extension 568, and aligned with the central axis of first or inner bearing extension 560, is provided outer or second bearing extension 572. Second bearing extension 572 is dimensioned for reception in outer bearing 546.

FIG. 31 shows connecting rod 574 extending down between a parallel set of guide shoes (only one shown as) 580 and into engagement with hinge pin 582. Hinge pin 582 is received within second looped connecting end 584 of connecting rod 574 and is secured at its opposite ends to slider mechanism 586 which functions in piston like fashion as it slides between and in contact with guide shoes 578, 580. Thus, connecting rod 574 functions as means to connect the crank assembly to the slider mechanism which provides for a translation of the rotation of the main drive shaft 520 into linear motion of the slider within the two guide shoes.

Slider mechanism 586 has upper trunnion ends with pin reception holes for receipt of respective ends of hinge pin 582. Slider mechanism further includes reciprocating rod capture recess 583. Accordingly, the connecting rod 574 converts the rotational motion of crank arm or connecting rod 574 into linear motion in the slider mechanism 586 which in turn, based on its releasable capture connection with the enlarged end 330 of rod 264, reciprocates rod 264 within the mixing chamber to purge and/or perform a valve function relative to the chemical mixing chamber feed ports.

The preferred motor type for the mixing module driver of the present invention is a brushless DC motor (for example, a Bodine Brushless Torque motor with RAM of 100 to 2000 RPM). The built in encoder of the present invention's brushless motor provides for accurate dispenser use and avoidance of cold shots in that a preferred embodiment of the invention features a built in encoder that generates a position feedback signal to the control means (i.e., a closed loop system unlike the prior art open loop system). Thus unlike the prior art systems that run open loop and have no way of knowing the positioning of the mixing module rod relative to the axial length of the mixing module passageway and direction of travel therein, the present invention's closed loop arrangement allows the controller to monitor at all times the status of the drive system and hence whether the mixing module is in an opening or closing cycle. This information is valuable in monitoring the drive performance and the early flagging of potential problems (e.g., build up of hardened foam in the mixing chamber) before the potential problems build up to a level causing major problems. FIG. 30 further illustrates drive mechanism home position sensor 515 that identifies the starting position of the drive mechanism so as to provide added feedback for performance monitoring of the mechanism including operation of the encoder itself. If there is sensed a position problem by the home sensor (e.g., a broken crank) a stop signal is generated to prevent additional system damage (similar functions can be provided by the moving jaw home sensor 4036 as well as the cleaning brush reciprocation system home sensor 3056 discussed below). FIGS. 11 and 15 illustrate the control system and with FIG. 15 showing the mixing module home sensor in conjunction with the chemical dispensing and tip cleaning control and monitoring sub-system.

The outlet tip region of a dispensing mixing module is a particularly problematic area with regard to foam buildup and disruption of the desired foam output characteristics. The aforementioned features of the present invention's tip management means including providing a solvent supply system to the front end of the mixing module with a high pressure solvent pump, flow through or flushing/continuous replenishment solvent chamber, heated solvent and directed tip region flow of solvent through the face of the mixing module and around the valving rod is highly effective in precluding build up. However, even with the advantages or arrangement described above, foam can accumulate at the tip of the dispenser in a softened state during solvent flow supply with the potential to harden during periods where the system is shut down and during times in which solvent flow may not be provided. The present inventions tip management means thus preferably includes an auxiliary cleaning component which is directed at physical removal of any chemical build up in the tip region or outlet port region of the mixing module such as in a wiping or brushing fashion. In a preferred embodiment there is provided a brush or a alternate physical chemical build up removal means preferably connected with means for reciprocating or moving that cleaning member (e.g., brush) between cleaning contact and non-contact states relative to the nozzle tip.

As shown in FIGS. 30 and 31 nozzle tip cleaning means 3000 comprises a physical contact with tip cleaning member 3002 preferably formed of a brush having brush base 3004 with a plurality of bristles (e.g., plastic; but more preferably steel). The bristles are arranged and of a height to come in contact with the nozzle outlet tip most prone to foam build up with the amount of contact being preset (or adjusted with height adjustment means as in wedge adjustments (not shown) to have the bristles deflect to some extent to achieve improved wiping, while avoiding an over contact or unnecessary degree of contact with the nozzle end. Linear slide yoke or brush drive transmission connection means 3012 has an extended forward end 3014 which lies flush on a central axial elongation area of brush base 3002. Forward end 3014 is fastened to brush base 3002 with fastener 3018. Yoke 3012 includes a hook section 3020 with a notch which receives flange extension 3022 of the brush base. As its opposite end, yoke 3012 includes U-Shaped connector 3023 with vertically spaced legs having a central aperture in each. One end connecting rod 3024 is received between the legs and held in place by threaded pin 3026 which pivotably receives rod 3024. First and second linear slide rails 3028 and 3030 are secured the respective sides of yoke 3012 and include projections that ride within the elonged recesses of linear slide base 3008 (or vice versa). Connecting rod 3024 is secured to crank 3032 by way of its pivot extension 3034 extending into the aperture in the looped yoke end 3031. Crank 3036 is secured to the bottom end of shaft 3038 which extends through a corresponding series of vertically aligned holes in dispenser housing 194 with suitable bearing mounting into one way clutch 3042 which joins crank 3032 for rotation in one direction of shaft rotation 3038 and freewheels when a shaft 3038 rotates in the opposite direction. At the top end of shaft 3038 there is connected bevel gear 3040 which is connected to the previously described bevel gear 512.

Thus, when motor 508 rotates in a first direction (e.g., clockwise) it reciprocates the mixing module rod (e.g., opens and closes the chemical ports to the mixing chamber while purging the same) and when it runs in the opposite direction it drives the cleaning component (e.g., brush). Motor 508 turns main drive shaft 520, which turns smaller drive shaft 3038, arranged perpendicular thereto, through the bevel gear connection. One way clutch 3042 at the lower end of drive shaft 3038 only transmits rotation when turning in a predetermined direction. If the shaft 3038 is rotating in the opposite direction, shaft 3038 will free ride in clutch 3042 and not activately reciprocate the cleaning brush (at which time main shaft 520 is activately transmitting reciprocating force to the rod) when the shaft 3038 is rotated in the opposite direction (at which time main shaft 520 is not rotated due to the one way clutch 516 being in a freewheel state relative thereto) shaft 3038 is rotating in a direction which turns crank 3036 driving connecting rod 3024 which translates the rotary motion of the shaft 3038 to liner motion in the brush slide assembly.

The number of reciprocating strokes is determined by the controller which instructs motor 508 as to which direction to turn as shown by the control arrangement shown in FIG. 190. In a preferred embodiment, the brush is reciprocated a multiple number of times sufficient to clean all build up subjected to solvent application, again based on controller input (automatic or operator set). That is, the number of brush reciprocation's (time motor running in certain direction) and the period between cycles (time between off states or switching from one direction to another direction) is based on the needs of the system (e.g., solvent type, chemical type, length of inactivity etc.). For example, an extra cleaning cycle both with regard to solvent application and brushing is preferably performed when the system has an extended multi-hour period of shut down such as during a nighttime shut down or other long idler periods (servicing). Preferably this cleaning cycle is performed with the solvent above (e.g., 150 to 160° F.) its normal (e.g., 130° F.) heated temperature (a controller interface relationship between reciprocating brush control and solvent pump supply and manifold heaters). The higher temperature increases the solvation power of the dispenser cleaning solution and extended brushing period will help remove any preexisting build up from the last dispenser run period.

FIG. 31 illustrates some additional features of the physical nozzle tip cleaning means. As shown, the upper, relatively flat side of crank 3032 features groove 3050 of semi-circular cross-section that concentrically encircles the center hole of the crank. Spring loaded plunger 3052 is mounted (e.g., on housing 194) so its retractable tip rides in the groove. Plunger 3052 allows the crank to rotate freely in the brush operating direction because of the nature of the groove design with its ramp up arrangement with wall drop off 3054 which does not preclude crank rotation in the noted direction, but will lock up the crank (relative to a free ride state) if the crank moves in the opposite direction. This feature avoids the possibility of the brush being accidentally moved when the valving rod is the one being moved by the motor such as if there is a minor degree of friction drag in the slip clutch or the brush is in some way accidentally hit in a direction that would force it forward, during potential dispensing of foam, although the cover essentially protects against such an event.

FIG. 31 further illustrates proximity sensor 3056 for home position determination. Thus, in conjunction with the encoder of motor 508, the actual position of brush 3006 relative to its reciprocation travel can be monitored at all times in similar fashion to the location of the reciprocating rod with the proximity sensor 515 (e.g., position monitoring means) ensuring proper operation of the encoder based position monitoring system. Either of these sensors can be moved up or downstream relative to the respective transmission lines in which they exist.

Reference is now made to FIG. 26E for a discussion of a preference embodiment of means for forming a top (downstream formed bag) and bottom (upstream partial bag) end seal and preferably also a separate cross-cut.

Figure 12:
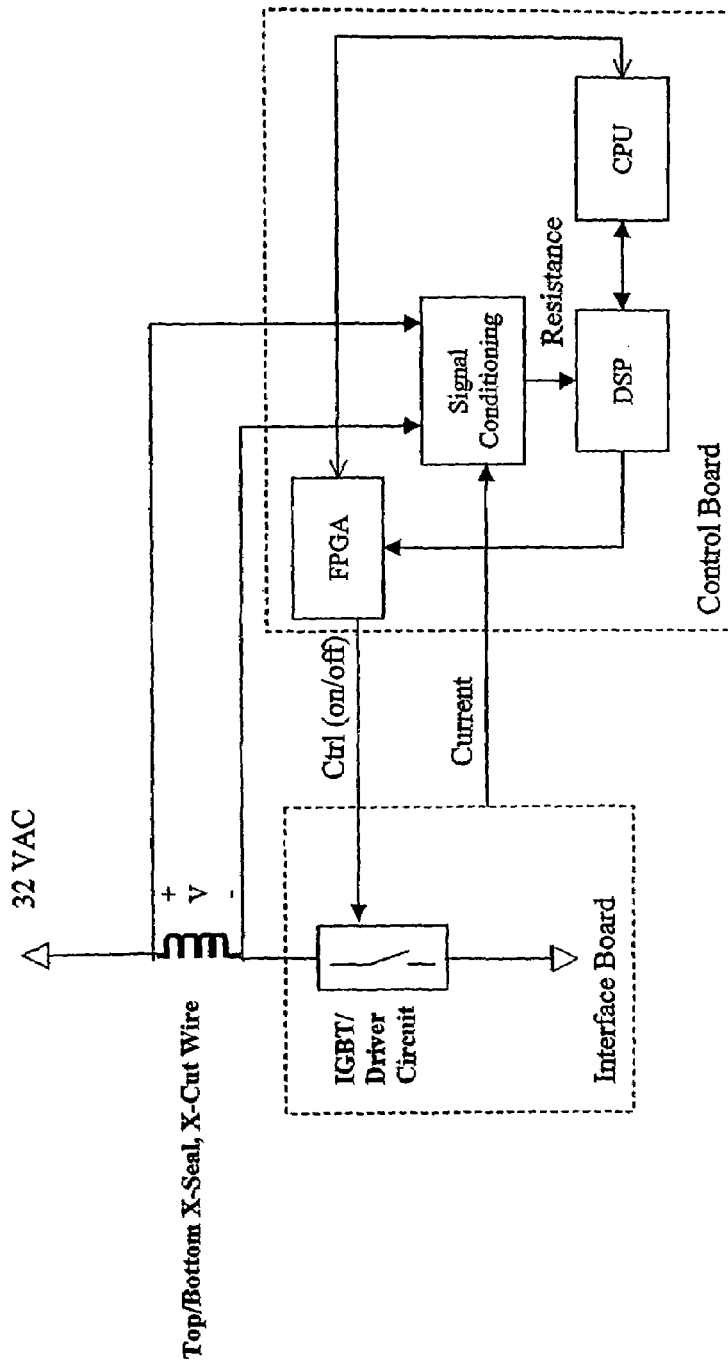
FIG. 12 shows a schematic view of the operational control, interface and power distribution features for the heated cross cut and cross seal wires in a bag forming assembly.

FIG. 12 illustrates the separate operational schematic for this feature of the invention. FIG. 26E is similar to FIG. 26A except for a front hinge access driven roller support structure having been unlatched and rotated down. As seen in addition to the driven roller set 74,76 there is featured a fixed jaw 116 (having extended along and suspended above jaw's 116 surface 1024) a set of three heating elements comprising two outer wire ribbons 1046, 1050 and an intermediate cross-cut interior wire 1648 with associated plug in electrical leads at each end of jaw 116. Once heated to the desired level there is formed a seal-cross-seal (SCS) sequence between a bag being filled and a filled bag.

Figure 13:
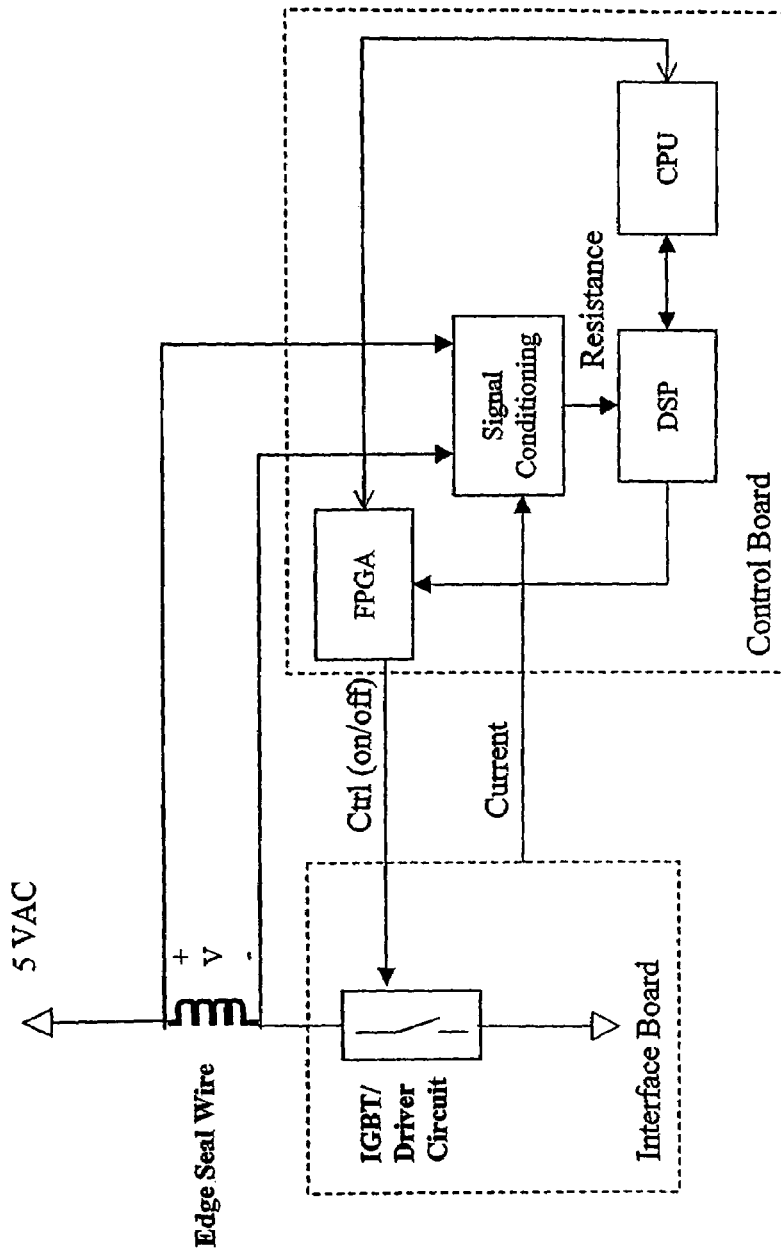
FIG. 13 shows a schematic view of the operational control, interface and power distribution features for a heated end seal wire.
Figure 4:
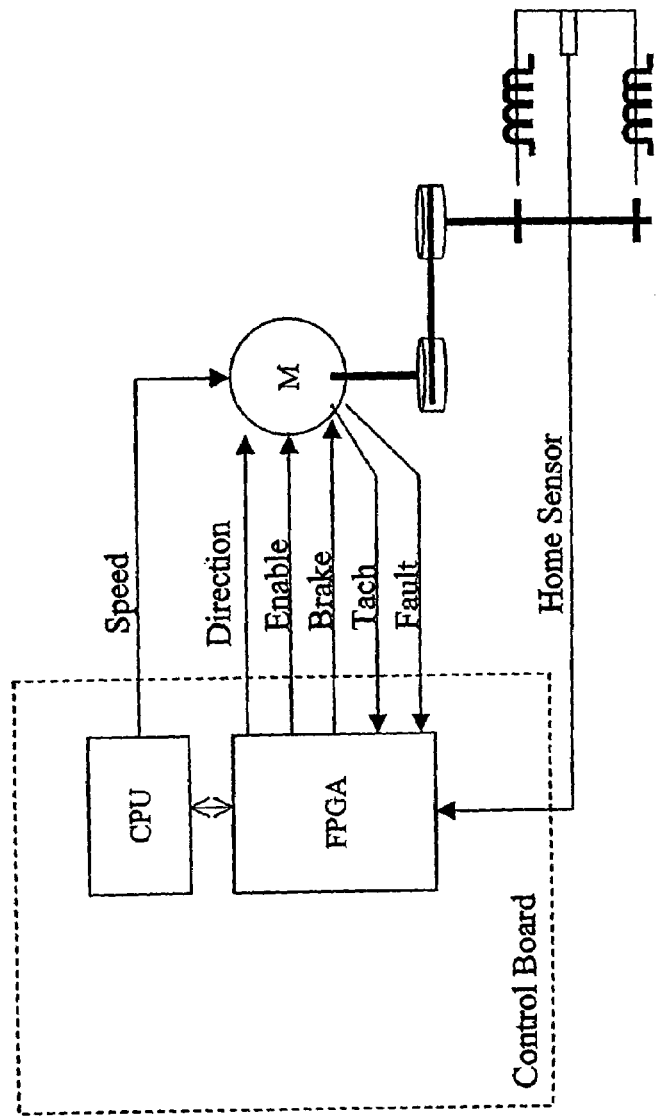
FIG. 4A is a flow chart illustrating an example of the operation of the probe process utilized by the remote monitoring system of the present invention, as shown in FIGS. 2A and 3A.
Figure 33G:
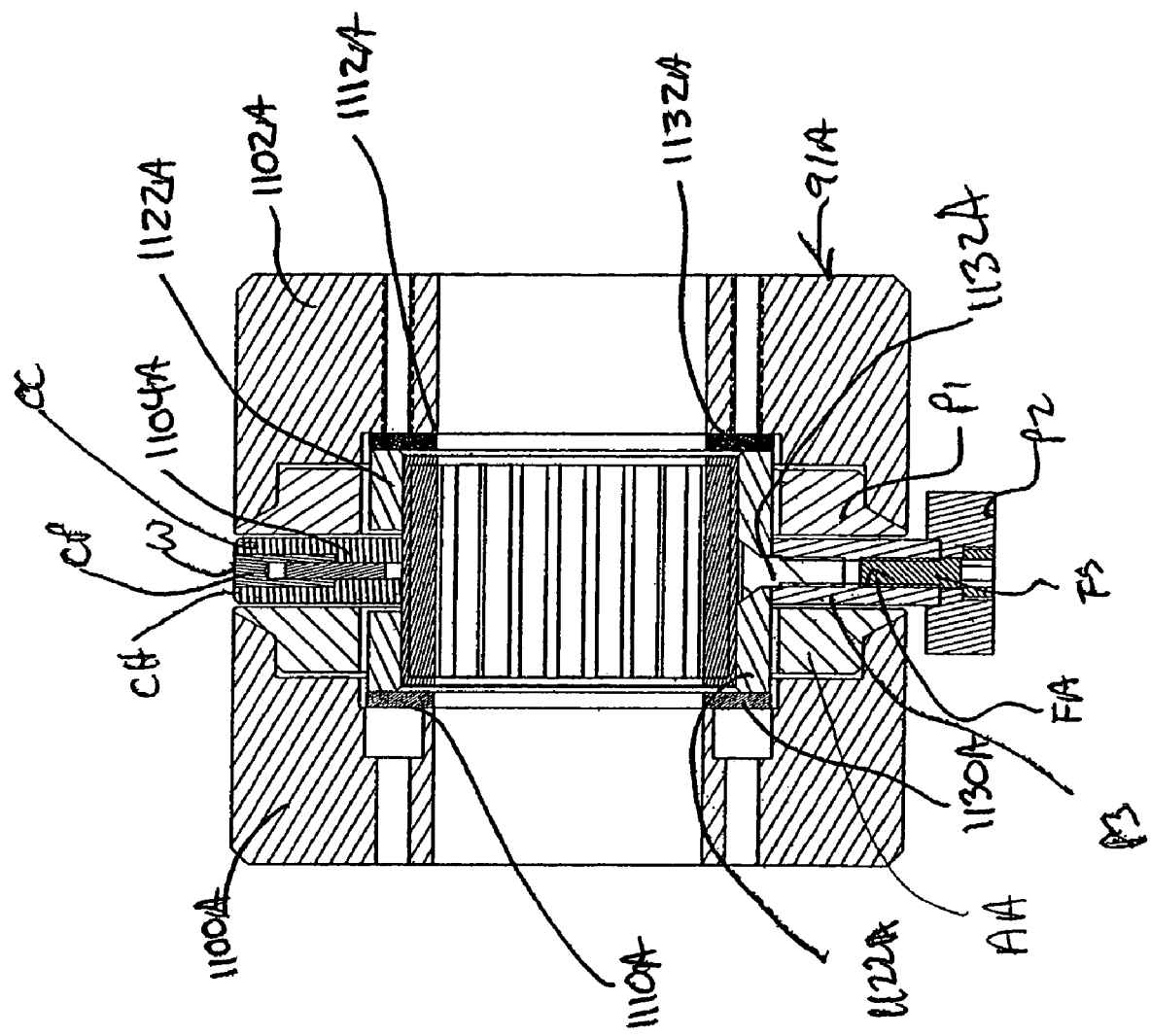
FIG. 33 shows an enlarged view of the edge sealer assembly from the heater wire side.
FIG. 33A shows a vertical cross-sectional view bisecting the arbor assembly positioned between the edge sealer rollers.
FIG. 33B shows a cross-sectional view taken along II-II in FIG. 33.
FIG. 33C shows the plug in edge seal wire supporting portion of the edge seal assembly.
FIG. 33D shows a test system schematic for testing wires for us as edge seal (or end cross cut or cross-seal wires).
FIG. 33E shows a TCR graph for a sealing wire.

Reference is made to FIGS. 33, 33A and 33B for an illustration of the bag edge seal forming means as shown positioned in FIG. 26 on driven roller set shaft 72. FIG. 13 shows the operational control schematics for edge seal formation for an edge sealer. The edge seal assembly 91A includes an interior sleeve 1122A having an interior roller cage secured thereto such that the sleeve and edge sealer ES' can remain stationary while the driven shaft extending through the roller cage rotates. The left and right driven rollers 1100A 11002A rotate with the shaft (e.g., the interior roller 1100A being connected by fasteners to a more interior, adjacent roller on the shaft while the outer roller 11002A is in driving engagement with the shaft itself via a fastener to connection, the shaft's end sleeve ES (FIG. 26). The stationery sleeve provides support for an arbor assembly AA designed with a heating element for forming an edge seal as the film travels past between the nipping driven and drive rollers, and vent (controlled heat lowering adjustment with controller) if an alternate vent mechanism is not utilized as in a cut gorming device. As seen from 33A the arbor assembly preferably comprises main housing MH having pin connectors 1178A and 1180A as shown in FIG. 33A to 33C. Shoes SH1 and SH2, together with fasteners F1 and F2, are used to secure in position head CH (e.g., a sliding friction positioning is suitable between the interior most ends of the shoes). Shoes SH1 and SH2 are thus designed to sandwich head CH within slot a receiving with fasteners F1 and F2 being utilized to secure shoes SH1 and SH2 to housing MH Head CH supports heater wire segment W with upper end UE conforming to the head's CH convex curvature. The shoes are formed of a conductive material so as to provide for an electrical conduction of current from the pins, 1178A and 1180A to head CH. Head CH preferably has, in addition to upper wire segment W, two side wire extensions EX1 and EX2 that are placed in contact with the interior ends of the shoes to complete the circuit. Because rollers 1100 and 1102 are of a non-conducting material together with the arbor housing base unit supporting the shoes, there is sufficient electrical insulation provided relative to the conductive shoes when the edge seal assembly is assembled.

The preferred edge seal system provides for the measurement and control of the temperature of the seal wire (as seen schematically in FIG. 13) as well as the measurement and control of the top/bottom cross-seals) and/or cross-cut formations (as seen schematically in FIG. 12).

The controls for the seal systems in the present invention provide for the measurement and control of the temperature of the edge seal wire as well as the cross-cut/seal wire(s). Heating temperature measurement and control of heat (wire) temperature is achieved through a combination of metallurgic characteristics and electronic control features as described below and provides numerous advantages over the prior art which are devoid of any direct temperature control of the sealing element. The arrangement of the present invention provides edge sealing that is more consistent, shorter system warm-up times, more accurate sizing of the gas vents (e.g., a heating to melt an opening or a discontinuance of or lowering of temperature during edge seal formation, longer sealing element life, and longer life for the wire substrates and cover tapes).

Under a preferred embodiment of the present invention control is achieved by calculating the resistance of the sealing wire, by precisely measuring the voltage across the wire and the current flowing through the wire. Once the current and the voltage are known, one can calculate wire resistance by the application of Ohm's law:

Resistance=Voltage/Current or $R=V/I$

Voltage is preferably measured by using the four-wire approach used in conventional systems, which separates the two power leads that carry the high current to the seal wire, from the two sensing wires that are principally used to measure the voltage.

Under a preferred embodiment, current is calculated by measuring the voltage drop across a very precise and stable resistor on the control board and using Ohm's law one more time. The voltage and current data is used by the system controls to calculate the wire resistance in accordance with Ohm's law. Resistance is preferably calculated by the ultra fast DSP chips (Digital Signal Processing) on the main control board, which are capable of calculating resistance for a sealing wire thousands of times per second.

To determine and control temperature (e.g., changes in duty cycle in the supplied current), the measured resistance values must be correlated to wire temperatures. This involves the field of metallurgy, and a preferred use of the temperature coefficient of resistance ("TCR") value for the seal wire utilized.

TCR concerns the characteristic of a metallic substance involving the notion that electrical resistance of a metal conductor increases slightly as its temperature increases. That is, the electrical resistance of a conductor wire is dependant upon collisional process within the wire, and the resistance thus increases with an increase in temperature as there are more collisions. A fractional change in resistance is therefore proportional to the temperature change or $$\frac{\Delta R}{R_0} = \alpha \Delta T$$

with "α" equal to the temperature coefficient of resistance or "TCR" for that metal.

Figure 33C:
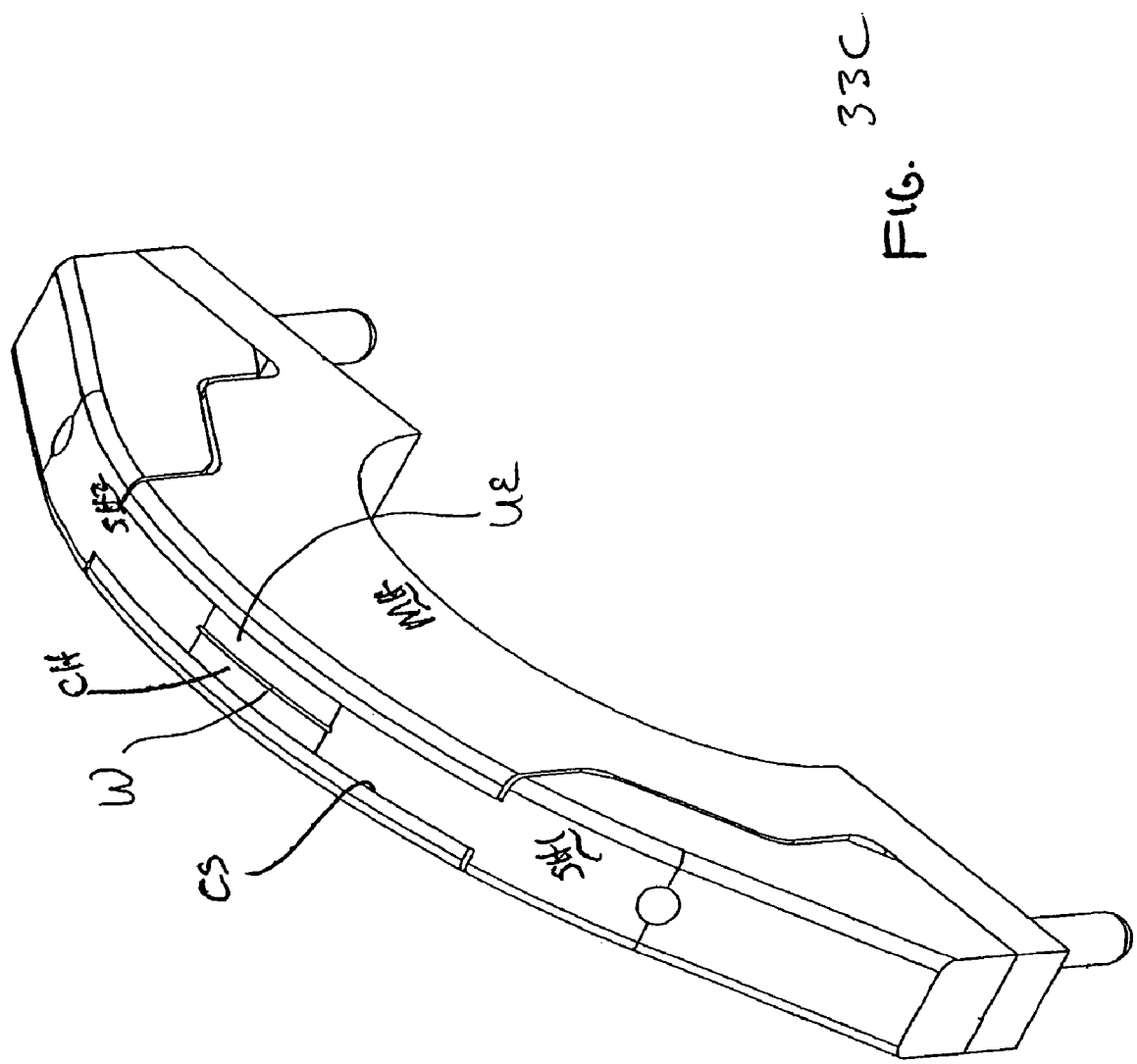

The relationship between temperature and resistance is almost (but not exactly) linear in the temperature range of consequences as represented by FIG. 33C (e.g., 350 to 400° F. sealing temperature range and 380 to 425° F. cutting temperature range for typical film material). The control system of the present invention is able to monitor and control wire temperature because it receives information as to three things about every seal wire involved in the dispenser system (edge seal and end seal/cut wires).

(1) The electrical resistance of the wire involved at the desired sealing temperature (this is achieved by choosing wires that provide a common resistance level at a desired heating wire temperature set point (with adjustment possible with acceptance of some minor deviations due to the non-exact linear TCR relationship)).

(2) Approximate slope of the resistance vs. temperature curve at sealing temperature; and (3) The measured resistance of the wire at its current conditions.

Figure 33D:
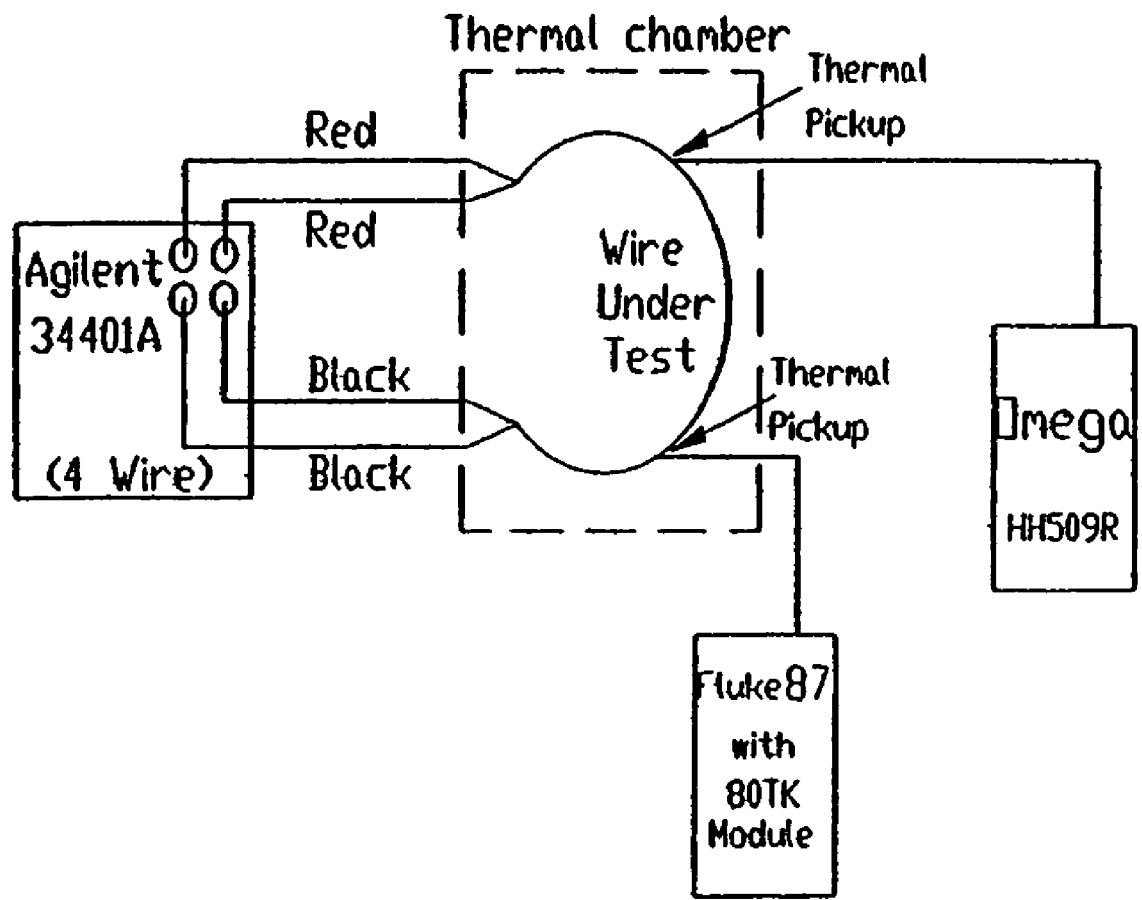
Figure 33E:
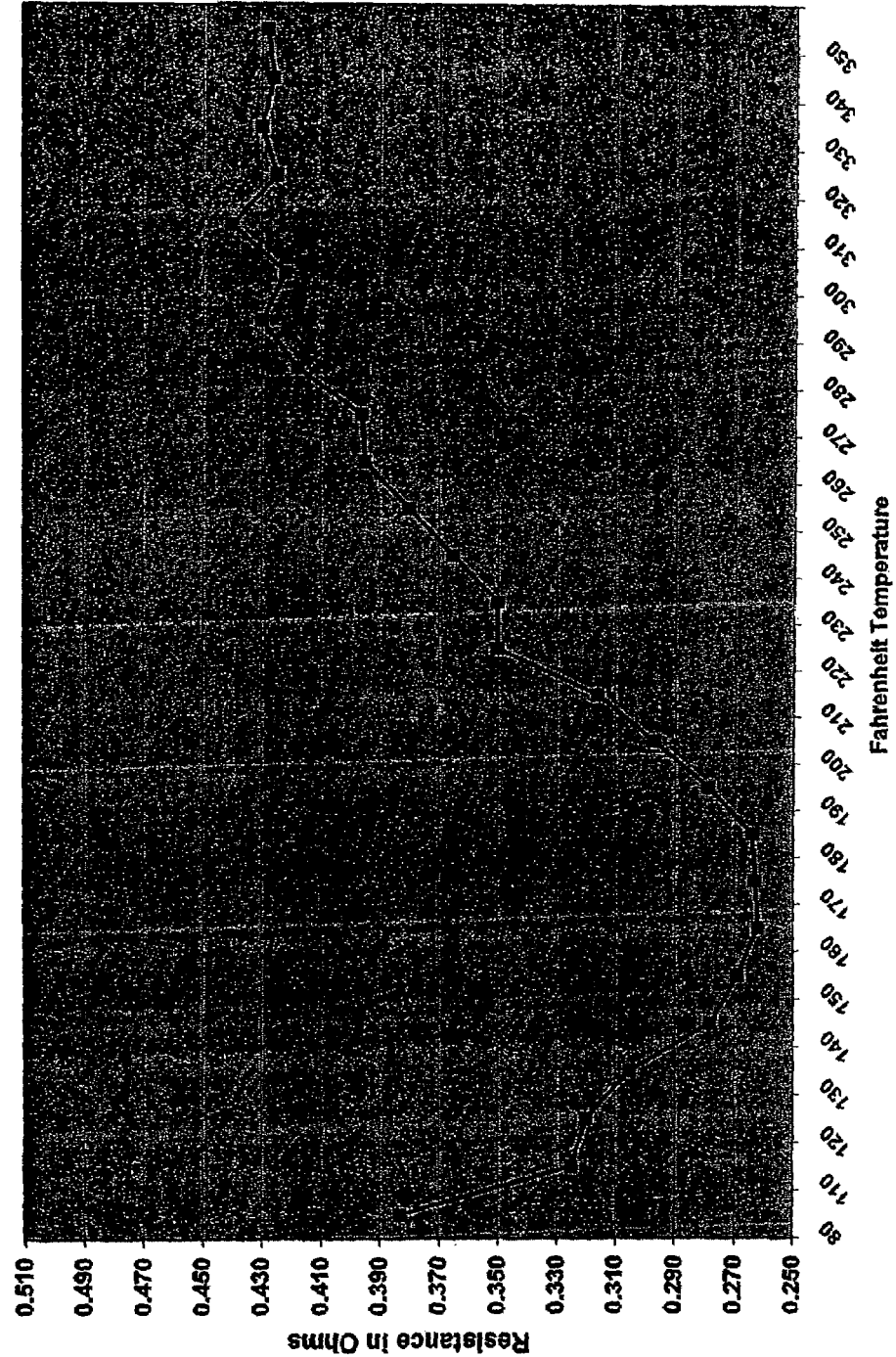

Thus, in controlling the edge seal wire under the present invention there is utilized a technique designed to maintain the seal wire at its desired resistance during the sealing cycle. This in turn maintains the wire at its desired temperature since its temperature is correlated with resistance. The slope of the R vs. T curve or data mapping of the same can also be referenced if there is a desire to adjust the setpoint up or down from the previous calibration point calibrated for a wire at the set point temperature (e.g., an averaged straight line of a jagged slope line). Initial wire determination (e.g., checking whether wire meets desired Resistance versus Temperature correlation) preferably involves heating the wires in an oven and checking to see whether resistance level meets desired value. Having all wires (or sub-groups of wires as in edge and end seal wire grouping) being used of the same resistance at the desired sealing temperature setpoint greatly facilitates the monitoring and control features but is not essential with added complexity to the controller processing (keeping in mind that a set of wires sharing a common resistance value at a first set point temperature may not have the same resistance among them at a different set point temperature due to potentially different TCR plots). In this regard, reference is made to FIG. 33D illustrating a testing system for determining temperature versus resistance values for various wires. The test system shown in FIG. 33D is designed to determine the resistance of the wires at three temperatures, Ambient, 200 F and 350 F. This test was performed on wires in a "Tenney" thermal chamber (from Tenney Environmental Corp.) at the desired temperature. The instrumentation used to measure the resistance was an Agilent 34401A Digital multimeter using 4-Wire configuration. Temperature measurements were taken with a thermocouple attached to the wire under test. Temperature measurement was taken using the Omega HH509R instrument. Ambient temperature was set at 74.6 F. (The Fluke measurement device being replaceable with the same Omega model).

As can be seen from the forgoing and the fact that different metals and alloys have different TCR's, the proper choice of metal alloy for the sealing element can greatly facilitate the controlling and monitoring of sealing wire temperature. For a desired level of accuracy, the wire must deliver a significant resistance change so that the control circuits can detect and measure something. The above described controller circuit design can detect changes as small as a few milliohms. Thus, there can successfully be used wires with TCR's in the 10 milliohm/ohm/degF range.

Some currently commonly used wire alloys, like Nichrome, are not well suited for the wire temperature control means and monitoring means of the present invention because they have a very small TCR, which means that their resistance change per degree F. of temperature change is very small and they do not give the preferred resolution which facilitates accurate temperature control. On the other hand, wires having two large TCR jumps in relation to their power requirements (also associated with resistance and having units ohms/CMF) can lead to too rapid a burn out due to the avalanching of hot spots along the length of the wire which is a problem more pronounced with longer cross-cut wires as compared to the shorter edge seal wires used under the present invention. For the edge seal of the present invention, an alloy called "Alloy 42" having a chemical composition of 42 Ni, balance Fe with (for resistivity at 20° C.) an OHMS/CMF value of 390 and a TCR value 0.0010 Ω/Ω/° C. is suitable. Alloy 42 represents one preferred wire material because it has a relatively high, (yet stable) TCR characteristic. The edge seal wire has improved effectiveness when length is ½inch or less in preferred embodiments. Another requirement of the chosen edge seal wire is consistency despite numerous temperature cycle deviations, which the Alloy 42 provides.

For lower seal heat requirements, there is the potential for alternate wire types such as MWS 294R (which has shown to have avalanche problems when heated to too high a level) and thus has limited usage potential and thus is less preferred compared to Alloy 42 despite its higher TCR value as seen from Table B. As an example of determining TCR wire characteristics, Table A below illustrates the results of tests conducted on a one inch piece of MWS 294R wire. The testing results are shown plotted in FIG. 33E.

TABLE A

EDGE SEAL WIRE MWS 294R

| TEMP | RES |
|---|---|
| AMB. | .383 |
| 110 F. | .325 |
| 120 F. | .320 |
| 130 F. | .305 |
| 140 F. | .278 |
| 150 F. | .269 |
| 160 F. | .262 |
| 170 F. | .263 |
| 180 F. | .264 |
| 190 F. | .279 |
| 200 F. | .297 |
| 210 F. | .316 |
| 220 F. | .350 |
| 230 F. | .350 |
| 240 F. | .365 |
| 250 F. | .380 |
| 260 F. | .392 |
| 270 F. | .396 |
| 280 F. | .418 |
| 290 F. | .430 |
| 300 F. | .422 |
| 310 F. | .440 |
| 320 F. | .425 |
| 330 F. | .430 |
| 340 F. | .426 |
| 350 F. | .428 |

As seen from the above table for the typical heater wire levels, the MWS 294R wire (29 Ni, 17Co., balance Fe) shows a relatively large resistance jump per 10° F. temperature increases (with an increase of about 0.012 ohms per 10° F. being common in the plots set forth above and illustrated in FIG. 197) and features an OHMS/CMF value of 294 as seen from Table B below setting forth some wire characteristics from the MWS® Wire Industry source. Using the testing device shown in FIG. 33D, a TCR plotting can be made and an X-axis to Y-axis correlation between desired temperature set point and associated resistance level can be made for use by the controller as it monitors the current resistance level of the wire and makes appropriate current adjustments to seek the desired resistance (temperature set point level). While Alloy 42 can be used for the cross-cut seal in certain settings, in a preferred embodiment a stainless steel ("SST 302") wire also available for MWS® Wire Industries is well suited to use as the cross-cut wire in providing sufficient TCR increases (TCR of 0.00017—toward the lower end of the overall preferred range of 0.00015 to 0.0035, with a more preferred range, at least for the edge seals being 0.0008 to 0.0030, and with the preferred OHMS/CMF range being 350 to 500 or more preferably 375 to 400).

TABLE B

| MATERIAL | COMPOSITION | RESISTIVITY AT 20° C. OHMS/CMF | TCR 0-100° C. | COEFFICIENT OF LINEAR EXPANSION BETWEEN 20-100° C. | TENSILE STRENGTH MIN. | TENSILE STRENGTH MAX. | POUNDS PER CUBIC INCH | APPROX. MELTING POINT (° C.) |
|---|---|---|---|---|---|---|---|---|
| MWS-875 | 22.5 Cr, 5.5 Al, 5 Si, .1 C, bal. Fe | 875 | .00002 | .000012 | 105,000 | 175,000 | .256 | 1520 |
| MWS-800 | 75 Ni, 20 Cr, 2.5 Al, 2.5 Cu | 800 | .00002 | .000014 | 100,000 | 200,000 | .293 | 1350 |
| MWS-675 | 61 Ni, 15 Cr, bal. Fe | 675 | .00013 | .0000137 | 95,000 | 175,000 | .2979 | 1350 |
| MWS-650 | 80 Ni, 20 Cr | 650 | .00010 | .0000132 | 100,000 | 200,000 | .3039 | 1400 |
| Stainless Steel | 18 Cr, 8 Ni, bal. Fe | 438 | .00017 | .000017 | 100,000 | 300,000 | .286 | 1399 |
| ALLOY 42 | 42 Ni, bal. Fe | 390 | .0010 | .0000029 | 70,000 | 150,000 | .295 | 1425 |
| MWS-294 | 55 Cu, 45 Ni | 294 | .0002* | .0000149 | 60,000 | 135,000 | .321 | 1210 |
| MWS-294R | 29 Ni, 17 Co, bal. Fe | 294 | .0033 | .0000033 | 65,000 | 150,000 | .302 | 1450 |
| Manganin | 13 Mn, 4 Ni, bal. Cu | 290 | .000015** | .0000187 | 40,000 | 90,000 | .296 | 1020 |
| ALLOY 52 | 50.5 Ni, bal. Fe | 260 | .0029 | .0000049 | 70,000 | 150,000 | .301 | 1425 |
| MWS-180 | 22 Ni, bal. Cu | 180 | .00018 | .0000159 | 50,000 | 100,000 | .321 | 1100 |
| MWS-120 | 70 Ni, 30 Fe | 120 | .0045 | .000015 | 70,000 | 150,000 | .305 | 1425 |
| MWS-90 | 12 Ni, bal. Cu | 90 | .0004 | .0000161 | 35,000 | 75,000 | .321 | 1100 |
| MWS-60 | 6 Ni, bal. Cu | 60 | .0005 | .0000163 | 35,000 | 70,000 | .321 | 1100 |
| MWS-30 | 2 Ni, bal. Cu | 30 | .0013 | .0000165 | 30,000 | 60,000 | .321 | 1100 |
| Nickel 205 | 99 Ni | 57 | .0048 | .000013 | 60,000 | 135,000 | .321 | 1450 |
| Nickel 270 | 99.98 Ni | 45 | .0067 | .000013 | 48,000 | 95,000 | .321 | 1452 |

*TCR at 25-105° C.
**TCR at 25-105° C.
Note:
Available in bare or Insulated

The temperature of the seal wire can be readily changed under the current invention by changing the duty cycle pulses of the supplied current within the range of 0 to 100%.

Maintaining the sealing wire at the correct temperature helps improve the consistency of the seals, since wire temperature is the main factor in producing seal in the plastic film. Other advantages of the present invention includes:

(A) Temperature controlling of the edge seal will not only improve sealing performance, it will also improve reliability since the present design can avoid the prior art problem of thermally stressing the components of the seal mechanism;

(B) The seal wire avoids overheating and damaging the substrates, cover tapes, or the wire itself, a problem which exists in prior art designs;

(C) The response time of the sensing circuit is extremely fast because the temperature sensor is the heater itself. The heater element and the temperature sensor are at the same temperature, which is ideal for accurate control.

(D) Thermal Lags and Overshoots are avoided. Even the smallest thermocouples, RTD's, or thermistors have longer response times than the response time available under the present invention.

(E) It no longer matters if the system is located in a hot factory or a cold factory. The seal wire temperature can be easily maintained consistent regardless, and the resultant seals will correspondly be the same. The ambient temperature was a significant problem with the prior art seal wire system designs that lack temperature control.

(F) Duty cycle will no longer be an issue, unlike prior art designs, wherein the higher the duty cycle the hotter the seal wire becomes noting that the seal wires run the coolest when they are first used after a long idle period leading to temperature variations in use which can have a noticeable affect on seal quality.

(G) A temperature-controlled wire will not overheat and produce the phenomenon called ribbon cutting. Ribbon cutting occurs when the wire gets so hot that it cuts right through the film instead of sealing the two layers together. Ribbon Cutting is quite common in the prior art designs and can be a cause of leaky bags.

(H) Vent sizing can be more accurate as the temperature reduction below the sealing temperature and then back up to sealing temperature can be easily implemented.

As noted above, FIG. 11 shows an overall schematic view of the display, controls and power distribution for a preferred foam-in-bag dispenser embodiment which provides for coordinated activity amongst the various sub-assemblies like that for the foam-in-bag dispenser system described above (and for which component reference numbers are provided in addition to the key legend of FIG. 11A). The present invention preferably comprises an electrical package comprised of two board assemblies, the main control board and an operator interface. The boards are interlinked via a single shielded cable, which can be separated up to 8 feet.

The operator interface includes an LCD display, keypad, control board and enclosure. It can be separated from the bag machine via a single shielded umbilical cord. Because the operator interface is a separate item from the rest of the machine, different interfaces can be either separate or integrated. For example, the display panel with button control 133 shown alone in FIG. 34 and mounted in FIG. 40 is preferably pivotably attached to the front of the dispenser and provides for both control of dispenser system and initiating other functions such as remote access via a modem or the like to a service provider.

Figure 19:
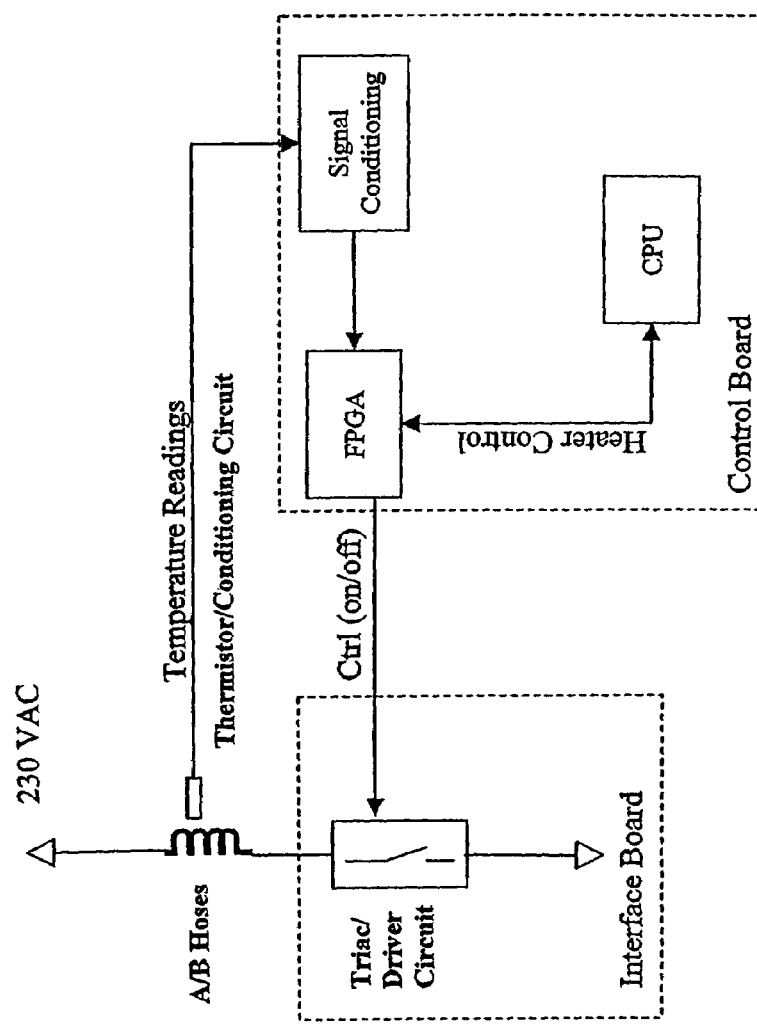
FIG. 19 shows an illustration of the operational control, interface and power distribution features for heaters used in the main manifold and dispenser housing to maintain the chemical flowing therethrough at the desired set temperature through use of heater cartridges in the main manifold and dispenser housing adjacent flow passageways formed in the manifold and housing.
Figure 19:
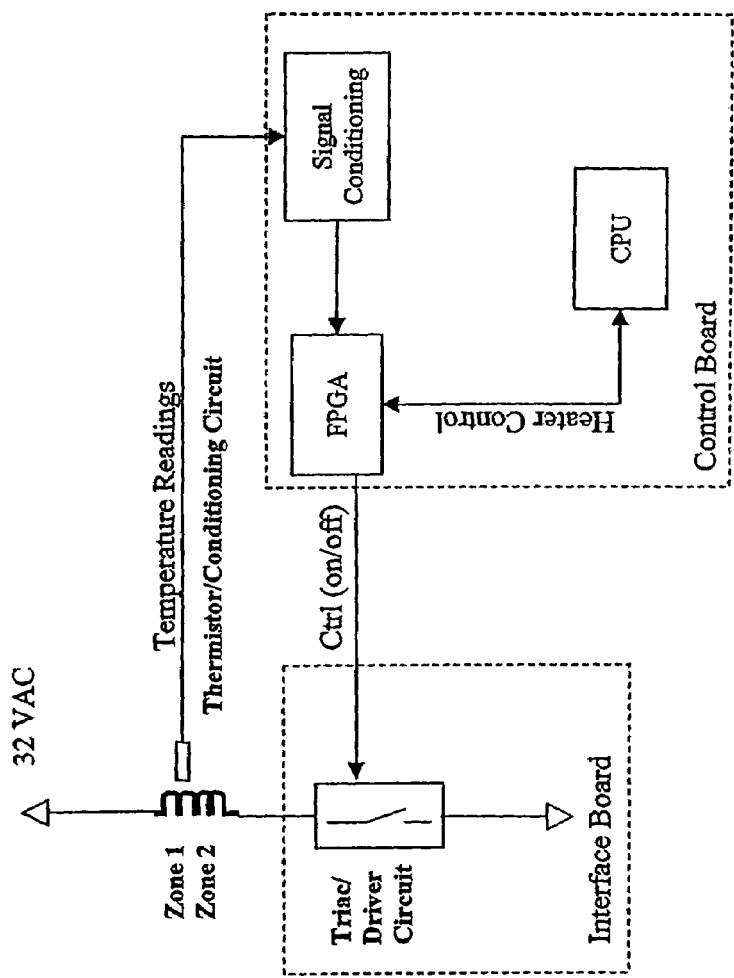
Figure 20:
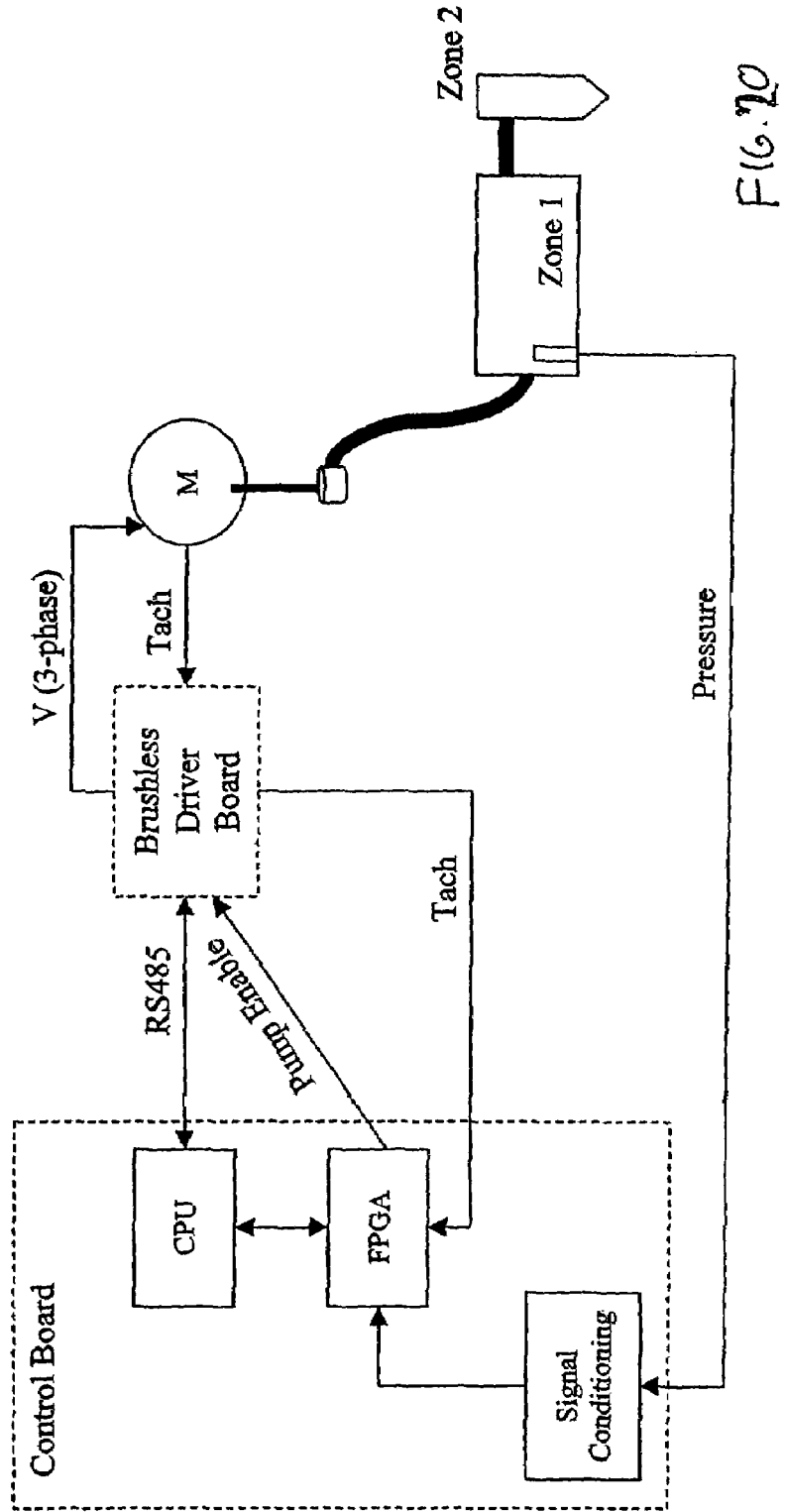
FIG. 20 shows an illustration of the operational control, interface and power distribution features for a pump system feeding chemical to the dispenser.
Figure 21:
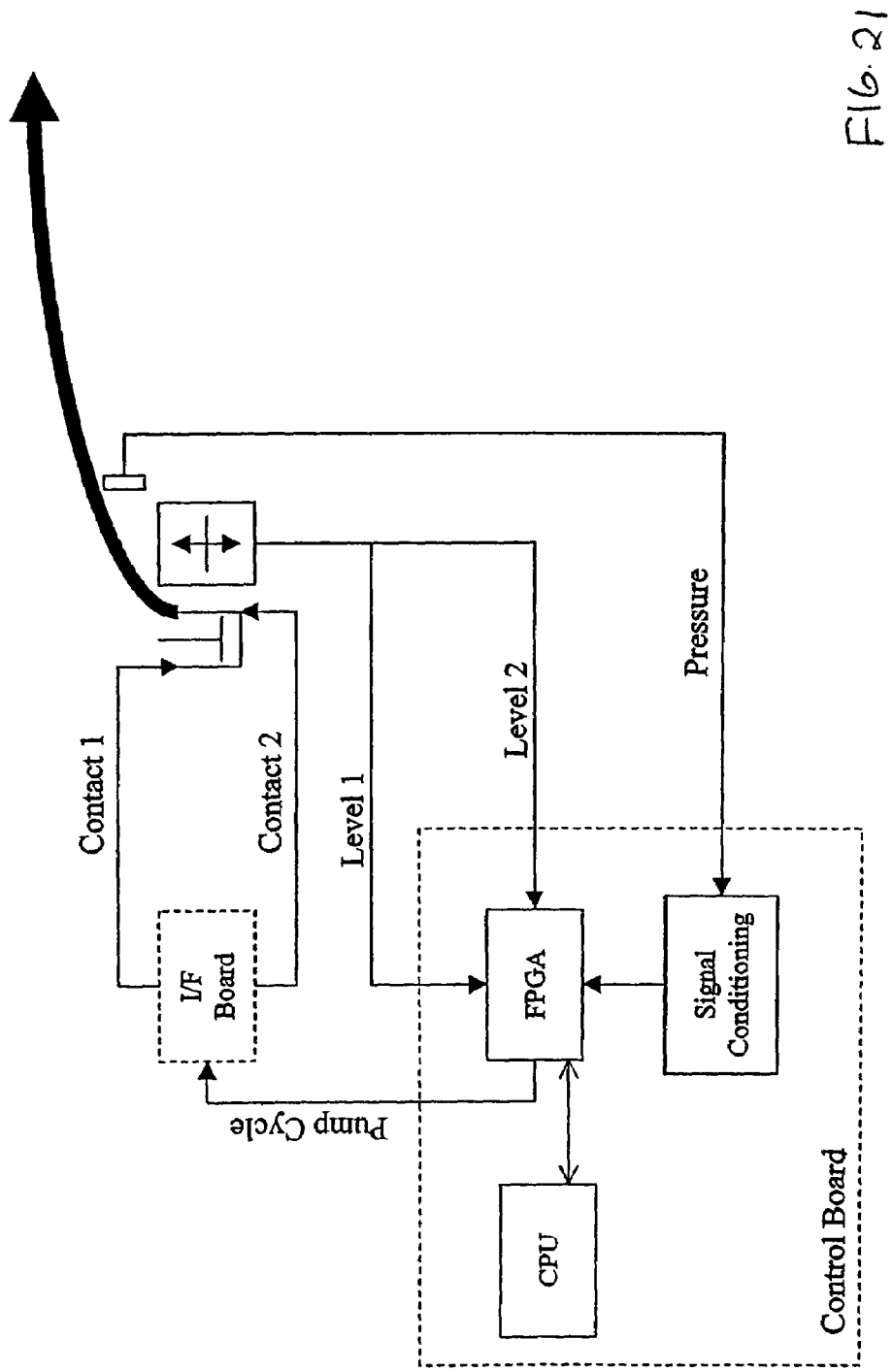
FIG. 21 shows an illustration of the operational control, interface and power distribution features for a solvent system feeding solvent to the dispenser.

Reference is now made to FIGS. 24A and 24B and FIGS. 26, 26B and 30 together with the operational control schematic in FIGS. 18, 19 and 20 for a discussion of the operational control of the chemical temperature and pressure control and monitoring sub-systems.

FIG. 24 shows hoses 28' and 30' extending between in-line pumps 44, 46 (each having a motor monitored for performance levels in conjunction with system pressure monitoring—see FIG. 20 which illustrates motor tach levels being communicated to control logic board (an FPGA board shown for pump motor monitoring and adjustment to desired chemical flow rates as well as chemical flow pressure levels being sensed and fed through a signal conditioning unit to the control logic board. FIG. 26B illustrates chemical line A and chemical line B pressure transducers 1207, 1209 received in intake manifold 199 which allows for pressure level monitoring of the chemical flow in the system. Chemical conduits 28' and 30' are heated hoses which are heated using coiled resistance elements that, in a preferred embodiment, extend for about 75% of the relative hose length. FIG. 24A provides a partial illustration of a coil heater element RH within one hose 28' (the opposite being the same from the standpoint of universal usage in either line) at the feed through end of the hose (the feedthrough unit 812 is shown at the dispenser end of the hose and is connected to the intake manifold 199 shown in FIG. 26B) at manifold blocks 1026 and 1028 having chemical ports aligned with the hose in the intake manifold 199. Temperature probe 180 is positioned internally within the coil RH and is preferably a thermister with probe head BC and electrical lines 810C and 801 extending downstream. Coil RH has connected to it power feed and return lines (801C' and 801D') received within encompassing insulator potting P held to manifold 199 together with feedthrough unit 807. The external portion of the RH and thermister temperature sensor are potted in encompassing insulating block AP and extend out in a common wrapped cable to the control console. The feed through unit 812 forms a seal with block 1206 via O-ring OR received within O-ring recess ORR.

This by way of a controlled electrical driver working in conjunction with the sensed hose chemical temperature a sensed hose chemical level can be maintained. A similar arrangement is provided relative to heater cartridges H1 (intake manifold 199) and H2 (main housing 92) each having associated means for temperature sensing as in a thermistor.

As seen from FIG. 19 the heater cartridges H1 and H2 are provided at the different stages of chemical flow with H1 heating chemical passing between the downstream end of the heated chemical hose line 28' and through the intake manifold (i.e., Zone 1) and heater cartridge H2 is elongated and extends along a throughhole passage in the dispenser housing's main manifold (see FIG. 30) to control the temperature level of the chemical following passage out of intake manifold 199 up to the point of departure from the main housing and into the mixing chamber of cartridge 256 shown in FIG. 30 (Zone 2).

Figure 30A:
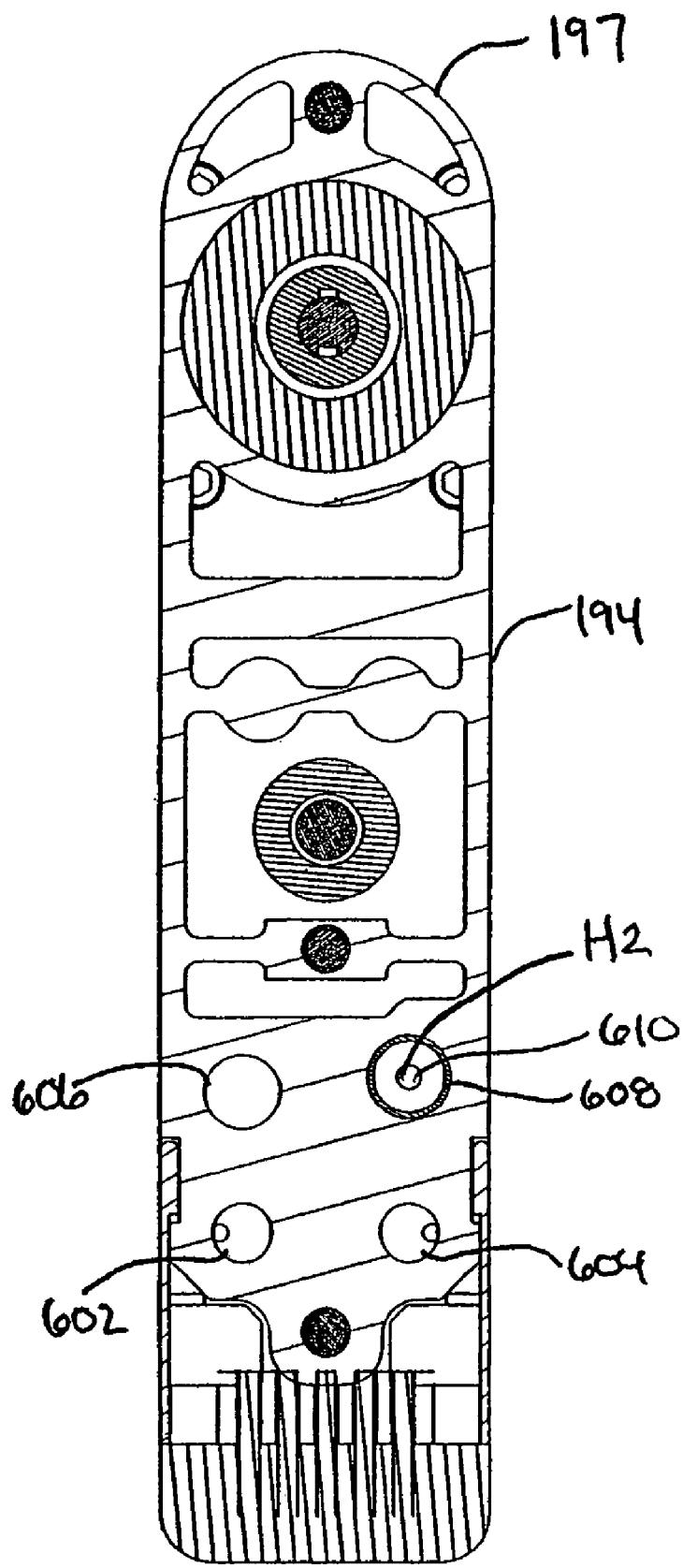
FIG. 30A shows a cross-sectional view of the dispenser taken along cross-section line X-X in FIG. 30.

FIG. 30A represents a cross-sectional view of dispenser 192 taken along cross-section line X-X in FIG. 30 and shows chemical conduits 602 and 604 which are preferably formed in conjunction with an extrusion process used in forming the basic structure of main housing 194 (e.g., main housing section 195). Positioned above conduits 602 and 604 is a second set of conduits with conduit 606 providing a solvent flow through passageway in main housing 194 and with the adjacent conduit 608 providing a cavity for reception of a heater cartridge H2 (e.g., an elongated cylindrical resistance heater element) that is inserted into conduit 608 and has its electrical feed wires (not shown) feeding out the inlet end 198 side to the associated power source and control and monitor systems of the control means of the present invention. Heater cartridge H2 features a heat control sub-component system which interfaces with the control means of the present invention as illustrated in FIG. 19 and, is preferably positioned immediately adjacent (e.g., within an inch or two or three of the two chemical conduits 602 and 604) and runs parallel to the chemical passage to provide a high efficiency heat exchange relationship relative to the main housing preferably formed of extruded aluminum (the setting of the heater temperature taken into account the thermal heat coefficient of the surrounding material and distance to the chemical material being heated). The heat control sub-system of the present invention preferably is designed to adjust (e.g., automatically and/or by way of a temperature level setting means) the heater to correspond or generally correspond (as in averaging) with the temperature setting(s) set for the chemicals passing through the hoses 28' and 30' with heater wires so as to maintain a consistent desired temperature level in the chemicals fed to the dispenser. Heater cartridge H2 is also within an inch or two of the solvent flow through passageway and thus is able to heat up the solvent flow being fed to the mixing module (e.g., a common 130° F. temperature). A temperature sensor is associated with the heater cartridge which allows for a controlled monitoring of the heat output and the known heat transmissions effect on the chemical passing through the adjacent conduit through the intermediate known material (e.g., extruded aluminum).

With reference to FIG. 26B there is illustrated inlet manifold 199 having block 205 with the manifold cavities including one for inlet manifold heater H1 which functions in similar fashion to heater H2 in heating the surrounding region and particularly the chemical flowing through manifold 199 to preferably maintain a consistent chemical temperature level in passing from the heater wire conduit exits to the mixing module. Heater H1 also includes a temperature monitoring and control means associated with the main control board of the present invention to monitor the temperature level in the manifold block and make appropriate heat level adjustments in the manifold block to achieve desired chemical output temperature(s) for Zones 1 and 2, as shown in FIG. 19.

Thus, by monitoring with the temperature sensors provided in the chemical hoses and each of Zones 1 and 2, and making heater driver adjustments via control board signalling, there can be maintained a desired chemical temperature from a point in the heater hose all the way to chemical mixing which immediately precedes output.

Figure 32C:
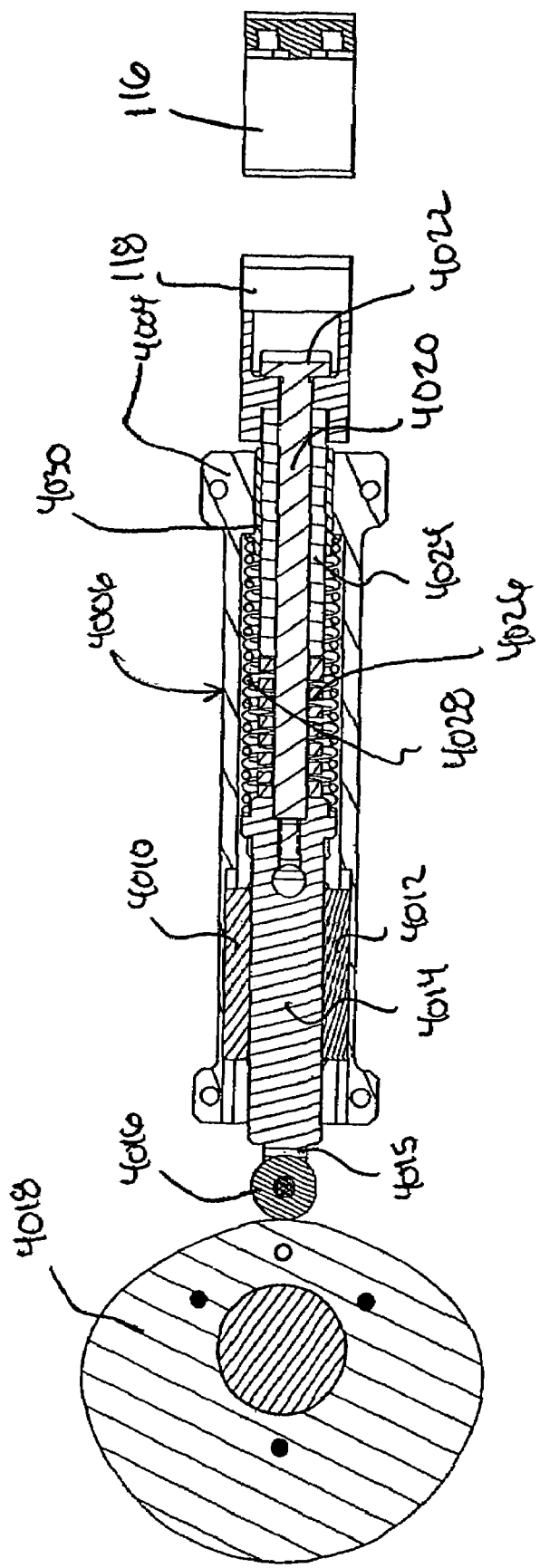
FIG. 32A shows a perspective view of a cross-cut and/or sealer shifter assembly in retracted position relative to a stationary jaw supporting the resistance wire(s).
FIG. 32B shows a cross-sectional view of the shifter assembly taken along cross-section line I-I in FIG. 32A.

FIGS. 26A, 32 and 14 illustrate the moving jaw sub-system which features a reciprocal moving jaw used to create a cross-cut and/or cross-seal between the bag previously formed and the bag presently being formed.

FIG. 32A shows a perspective view of an embodiment of a moving jaw assembly 4000 which retracts and pushes forward jaw block 118 against the preferably stationary jaw 116 (FIG. 26A) supporting heated cross cut and seal wires. The rear end of block 118 is connected at opposite ends to respective casings 4002 and 4004 with these casings forming a part of the cam force transmission devices 4006 and 4008. Cam force transmission devices 4006 and 4008 are the same except for their mirror image positioning (and below described home positioner) and thus the discussion focuses on transmission device 4006 alone. Casing 4004 is secured to frame structure 66 of bagger assembly 64 at its expanded ends and has an interior reception chamber formed along its inner side. As seen from FIG. 32B, within this chamber is positioned bearing plates 4010 and 4012 which receive in sliding fashion cam rod 4014. The rear end of cam rod 4014 includes cam yoke 4015 which supports cam roller 4016 which rides along cam 4018 having a eccentric shape with a minimum contact thickness shown in contact with roller 4016 in FIGS. 32A and 32B.

The forward end of cam rod 4014 includes a threaded center hole receiving push rod 4020 having a first end extending into threaded contact with the center hole and a second end that extends through an aperture in block 118 and has enlarged head 4022. Push rod 4020 is encircled by rod sleeve 4024 having a forward end received with a pocket recess in block 118 and a rearward end in contact with first (inner) biasing member 4026, which is preferably a coil spring, compressed between a forward end of push rod 4014 and a rear end of sleeve 4024. Surrounding inner spring 4026 is a second (outer) biasing member 4028, also preferably in the form of a coil spring, received by a flanged end of cam follower 4014 at one end and in contact with an outer flanged sleeve 4030 in contact with the forward enlarged end of casing 4004. Outer spring 4028 is designed to hold the cam follower or cam rod 4014 against the cam, while the inner spring 4026 produces the compression for sealing the jaws at the time of forward extension. In view of these different functions, outer longer spring (e.g., 3.5 inch free length) preferably has a much lower spring constant (e.g., 12 lbs/in) as compared to the inner shorter spring (e.g., 1.75 inch free length) having a higher spring constant (e.g., 750 lbs/in). Cams 4018 and 4018' are interconnected by cylindrical drive sleeve 4032 with annular flanges 4034 and associated fasteners providing a means of securement between the sleeve 4032 and a respective eccentric cam, with the cams being driven by cam motor 158 and associated drive transmission as shown in FIG. 26A.

FIG. 32A illustrates home sensor 4036 which is connected to an extension of casing 4004 and is positioned for monitoring the exact location of the moving jaw 118 at all times and is in communication with the control and monitoring subsystem shown in FIG. 14 and provides position feedback which is useful, together with the encoder information generated by the cam drive motor 158 in determining current and historic jaw location data. The operational control set up for the moving jaw is illustrated in FIG. 14.

Provided below in Table II is a summary as to some of the operational control system features of a preferred embodiment with reference to the manufacturing device sub-system ("a" to "e" presented earlier) and to means for monitoring (including remote access monitoring) and/or controlling performance.

TABLE II

| Manufacturing Device Sub-system(s) | Means for Monitoring and/or Controlling Performance |
|---|---|
| a)(i) chemical hose heaters (electric heating elements in hoses for chemicals A and B) | A chemical heaters monitoring system with thermistor sensor or other temperature sensing means, works in association with a driver circuit for heating resistance circuitry, and includes a heater control unit at the control board which reads sensed data and which adjusts current level to control board indicated levels and maintains a record of temperature levels, forwards real time and/or saved historical temperature information upon request to memory and/or direction out to a requesting remote access unit, and also monitors for any out of parameter temperature levels (which can trigger local shut off and/or remote access activation). |
| a)(ii) chemical manifold heaters for chemicals A and B | A chemical manifold heater(s) monitoring system with thermistor sensor or other temperature sensing means, works in association with a driver circuit for a heating resistance unit(s) and includes a heater control unit at control board which reads sensed temperature levels and adjusts current levels in resistant manifold heater(s) to control board indicated levels and maintains a record of temperature levels, forwards real time and/or saved historical temperature information, and also monitors for any out of parameter temperature levels (which can trigger a shut down and/or remote access activation and/or alarm). |
| b)(i)(A) pumping system parameters for chemical supply system (pump motor) | A chemical supply pumping system/monitoring system works with a tachometer sensor or the like and monitors pump performance (e.g., for a pump motor - a DC Brushless motor connected to a geroter pump is preferred), which is provided in association with motor control circuitry and a control board (at console) which adjust current to control board indicated levels, forward real time and/or historic pressure level data to memory or a requesting remote access unit, and also monitors for any out of range or off value parameters (e.g., max/min) pressure levels (which can trigger shut down and/or remote access activation and/or an alarm). |
| b)(i)(B) Pumping system parameters (chemical pressure in system) | A chemical supply pressure monitoring means with pressure transducer or alternate pressure sensor which is placed in line with the chemical flow(s) as in a point at the dispenser console prior to entry of chemical into the dispenser manifold(s), and maintains a historical record of pressure levels, forwarding real time and/or saved sensed pressure data, and also monitors for any out of parameter pressure deviations (which can trigger a shutdown and/or remote access activation triggering and/or an alarm). |
| b)(ii)(A) Pumping system parameters for solvent flow (pump motor) | A solvent flow monitoring means which monitors pump motor status by monitoring, for example, cycles of a pump driver motor as with a hall sensor or other tachometer motor sensor, and maintains a historical record of pump cycles, forwards real time and/or saved historic cycle information, and also monitors for any out of parameter cycle deviations (which can trigger a shut down and/or remote access activation and/or an alarm). (See FIG. 21, for example). |
| b)(ii)(B) pumping system parameters for solvent (solvent pressure system) | A solvent supply pressure is featured comprising monitoring system means with a pressure transducer or alternate pressure sensor which is placed in line with solvent flow and maintains a historical log as well as can provide real time information either in an automatic |

TABLE II-continued

| Manufacturing Device Sub-system(s) | Means for Monitoring and/or Controlling Performance |
|---|---|
| | fashion (e.g., periodic presentation) or a command from control unit, and also monitors for any out of desired parameter value or range reading, (which can trigger a shut down and/or remote access activation request, and/or an alarm). (See FIG. 21 as well). |
| c)(i)(A) Chemical resupply monitoring means | A chemical resupply monitoring means is featured that, in one embodiment works in conjunction with the means for monitoring chemical pump motor operation (e.g., cycles of revolution). For example, with the use of a geroter pump which is not a fixed volume pump per se, there is monitored the number of revolutions of the pump (e.g., in conjunction with knowledge of volume of initial full chemical tank hook up, or, if less, an adjustment is made at control unit based on prompt for volume of tank at a designated initiation of volume monitoring), which is multiplied by the monitoring means by an estimated volume of output for each pump cycle as in an averaging of historical data accumulated by the monitoring means from prior activity (e.g., based on the most recent X number of prior shots). An alternate chemical resupply means monitors the duration of each open valve state and the flow rate of chemical during those open states to monitor chemical volume usage. A container(s) volume sensing system can also be used along the lines set forth below relative to the solvent system. |
| c)(ii)(A) resupply system parameters (solvent supply level monitoring) pump motor based | A solvent resupply monitoring means that preferably works in conjunction with the means for monitoring solvent pump motor operation (e.g., cycling) and with data as to solvent container initial fill volume and a fixed volume metering plump (a fixed volume of solvent dispensed with every pump cycle), usage and flow level monitoring is possible, maintains a historical log of usage levels and can provide real time and/or historical data either in an automated fashion or based on a prompt from the control unit based on a remote access request, and also monitors for any out of parameter reading which can trigger a shut down and/or remote activation and/or an alarm. Thus, when certain level parameters are satisfied the control system can inform a remote access service and supply location of a resupply need or order (e.g., an automated order or a prompt to customer to confirm resupply desirable based on sensed low levels of supply) |
| c)(ii)(B) Supplement or alternate solvent resupply monitoring | As a supplement or alternate to the first level monitoring means discussed immediately above, there is preferably further featured a container volume monitoring means as in one or more float valves or alternate liquid volume sensing means which preferably includes a two level system as in a first level ("low") which can trigger a resupply signal and a second level lower than the first ("nearly empty or empty") which triggers a supply request alarm signal as well as preferably a shutdown signal and alarm (local). (See FIG. 21) |
| d) mixing module drive parameters (FIG. 15) | The positioning of the reciprocating purge/valve rod contained in the chemical mixing module for opening and closing the chemical supply valve port(s) leading to the mixing chamber of the mixing module is monitored as in a combination of motor 508 monitoring in conjunction with home sensor 515 shown in FIG. 30. The motor with rod driving transmission acts to reciprocate the rod to open and close off the chemical feed valving. The motor has a built in encoder output signal that provides positional feed back to the system control (e.g., a control board as in a FPGA/CPU combination). The positioned information (e.g., location and direction of travel) monitored by the motor encoder feedback means is preferably supplemented with the home sensor which monitors rod and/or rod drive system positioning. The position of the rod and direction of travel (opening direction) can be provided to the chemical pumping system to improve chemical flow timing relative to the valve open/close timing status. (See FIG. 15). |
| e) mechanical dispenser tip cleaning system (FIG. 15 also - common motor) | An embodiment of the invention includes a mechanical dispenser tip cleaning system, with one embodiment featuring a reciprocated brush. The brush is positioned so as to move into and out of cleaning contact with a dispenser tip which is an area highly susceptible to hardened foam build up and the reciprocated brush preferably works in conjunction with a solvent feed system. (Reference is made to US Pat. Appln. Nos. 60/469,038 filed May 9, 2003 and 10/623,858 filed Jul. 22, 2003, which describe in greater detail the dispenser tip management system and which are incorporated herein by reference). The reciprocating brushes position and direction of travel can be monitored, for example, by a built in encoder output signal that provides positional feedback to the system control. The positional information (location and direction of travel) monitored by the motor encoder feedback means is preferably supplemented with a position home sensor (3056, FIG. 30) placed in line so as to detect brush and/or some components of the brush drive transmission. In a |

TABLE II-continued

| Manufacturing Device Sub-system(s) | Means for Monitoring and/or Controlling Performance |
|---|---|
| | preferred embodiment, a common motor runs both the above noted valving rod and the present reciprocation brush (e.g., a steel bristle brush) with an on/off relationship relative to rod and brush drive to avoid brush drive at same time as valve opening (chemical dispensing). |

The aforementioned operational control features for the noted sub-systems are applicable to a foam dispenser system as in a dispenser system receiving chemicals A and B which are fed/blocked off by a valving rod received within a mixing module which dispenser is susceptible to foam build up which can lead to failure as in rod jam up which can be immediately detected and signaled out to the remote monitoring system (e.g., as in information indicating a slow down and potential bind up if servicing not addressed or an actual bind up as when the rod fails to move and/or reach a home sensor). The above features are generally applicable to a wide variety of dispenser types as in hand held and non-hand held structurally supported dispenser systems. (With the potential exception for the reciprocating brush which is deemed generally undesirable from the stand point of maintaining a hand held dispenser of low weight and small volume).

The control and monitoring features of a preferred embodiment of the present invention are also applicable to foam-in-bag dispensing systems with some control and monitoring features described in the Table III below. As in the above control and monitoring facets "a" to "e", the below describes control and monitoring systems are preferably interfaced with the remote monitoring system from the standpoint of monitoring system failure or events leading into failure potential as well as the also applicable film supply (in similar fashion to the chemical and solvent supply monitoring capability described above).

TABLE III

| Manufacturing Device Sub-system(s) | Means for Monitoring and/or Controlling Performance |
|---|---|
| f)(i) end cut wire temperature and status (FIG. 12) | To provide for the separation of a foam filled bag from a bag filing in the process of being formed is provided means for forming a bottom cross-cut. In some embodiments this end cut is also representative of a sole end seal (e.g., heated sufficiently to both cut and seal off) but, the invention preferably includes providing supplemental cross-seals. The present invention includes a control board with means for controlling a heat resistant wire driver circuit to achieve the desired voltage drop across the cross-cut wire to effectuate a proper cross-cut at the desired timing relative to bag formation and chemical supply to that bag. The control board also preferably includes means for monitoring the temperature of that wire and the compare sensed temperature relative to a desired temperatures setting (single value or range). Reference is made to U.S. Pat. Appln. No. 10/776,453, filed Feb. 12, 2004 which is incorporated herein by reference) and make appropriate heater wire adjustments to maintain a desired temperature setting well suited for proper cross-cut functioning. Again, the operational control system described herein preferably includes an interface with the remote monitoring system to provide data as to the status of the cross-cutter and whether there is a current failure or signs of a problem in the making as in a typical difficulty keeping the wire at a desired setting. The wire temperature is preferably monitored and adjusted directly using the TCR discussion technique above. |
| f(ii) end seal temperature and status (FIG. 12) | To provide added security against foam spill out at the bottom end of a bag being filled or top end of the one downstream, one or preferably two (above/below end cross-cut formation) end seals are provided at a spaced distance from the cross-cut. As different wire temperatures are involved between a cross-cut and cross-seal the control system preferably monitors and adjusts the heat level of the cross sealers (preferably ribbon resistance wires to provide wider sealing effect). The monitoring and adjustment is preferably carved on using the TCR technique described above. Difficulty is reaching a set level or set range can be indicative of a burn out in the wire foam build up or some other seal wire problem. The operation control sub-system is designed to inform the remote control monitor system of any suspected seal wire problems and also carry out an operation shut down if server problem sensed or a warning signal for less severe problem of detection. |
| f (iii) edge seal temperature status FIG. 13 | To provide high integrity edge sealing and also to lessen the chance for edge seal foam leakage as well as preferably providing distinct venting location(s) in the edge seal, the control system preferably monitors edge seal heater wire performance as in using the aforementioned TCR technique. A similar remote monitoring system data feed as well as appropriate operational shut down and/or warnings are preferably included as with end seals and cuts. |

TABLE III-continued

| Manufacturing Device Sub-system(s) | Means for Monitoring and/or Controlling Performance |
|---|---|
| g(c) bag formation film supply levels via the film advance and tracking control system coordination and monitoring film feed status for any deviations (FIG. 16 and 22 and the film tensioning discussion below) | The invention includes the ability to monitor film feed performance including tension level monitoring and control as well as detecting film feed irregularities (see discussion below) (e.g., jams, film run outs) and also controls and monitors performance of the film drive as in a pair of nip rollers. An embodiment of the invention includes means for monitoring and adjusting film source wind out (e.g., a motor in driving engagement with a film roll through a transmission and meshing splines on roller support) as through torque control relative to the film roll and the upstream nip roller film driver assembly. For example, by comparing the encoder values for both the film driver and the roll source there can be monitored the film roll supply status which can be utilized in signaling for resupply needs as well as operator information as to need for roll exchange. The relative status of the film drive system and roll source feed torque level also facilitates determinations as to, for example, film jams with the film not moving despite drive system running or roll empty (sense of torque level reduction due to free-spinning, supply roll). Again, the sensed parameters are preferably used by the operational control system to, for example, shut down other sub-systems as when the film is, out to monitor historical performance (e.g., comparisons chemical shut output to fellow level as in FIG. 22) and resupply needs as through use of the remote monitoring system. |
| (h) end sealer compression assembly positioning | In addition to the above described proper end seal and cut wire temperature maintenance, a good seal cross cut is provided when the pressing relationship between the heated wire(s) and the film is even and at a desirable comparison level. The relative location of the pressing jaw with relationship to other sub-systems as in the film feed can also benefit from improve timed in the pressing member actuation relative to the correct location in the film being fed thereto. The present inventive subject matter includes an embodiment wherein the location of the movable pressing jaw (preferably the one free of any heater wires) is known as in both directions (away from and toward the fixed jaw with heater wires) and position in the system (e.g., all the way retracted or forward) or only partially retracted or advanced). The control system through starting and stopping signals to the pressing jaw and other sub-systems (film feed and chemical dispensing, for example) can provide desired timing as to when a seal/cut is formed during operation of the bag forming sequence and chemical input. This control is preferably carried out with a combination of motor encoder monitoring. |
| (i) film feed tension control (FIG. 17) | The inventive subject matter provides for maintaining a desired tension state in the film being driven downstream by the film drive assembly (e.g., a pair of nip rollers) through control of a torque motor drive in communication with a film source as in a drive engagement with the roll core and intermediate transmission system between the torque motor and roll core engagement. Thus, through the tension control system a steady tension state can be sought despite changes in roll momentum as in accelerations (start up)/decelerations (broken film) and film level changes. Also, the tension control system can maintain a desired tension level during idle periods when the driver is not advancing film and also the roll drive connection provides for reverse direction film movement as in the process of separating upstream and downstream bags relative to a cross-out. Data concerning film tension is also useful to the remote monitoring system as described above in the film tracking and re-supply monitoring. |

Figure 27:
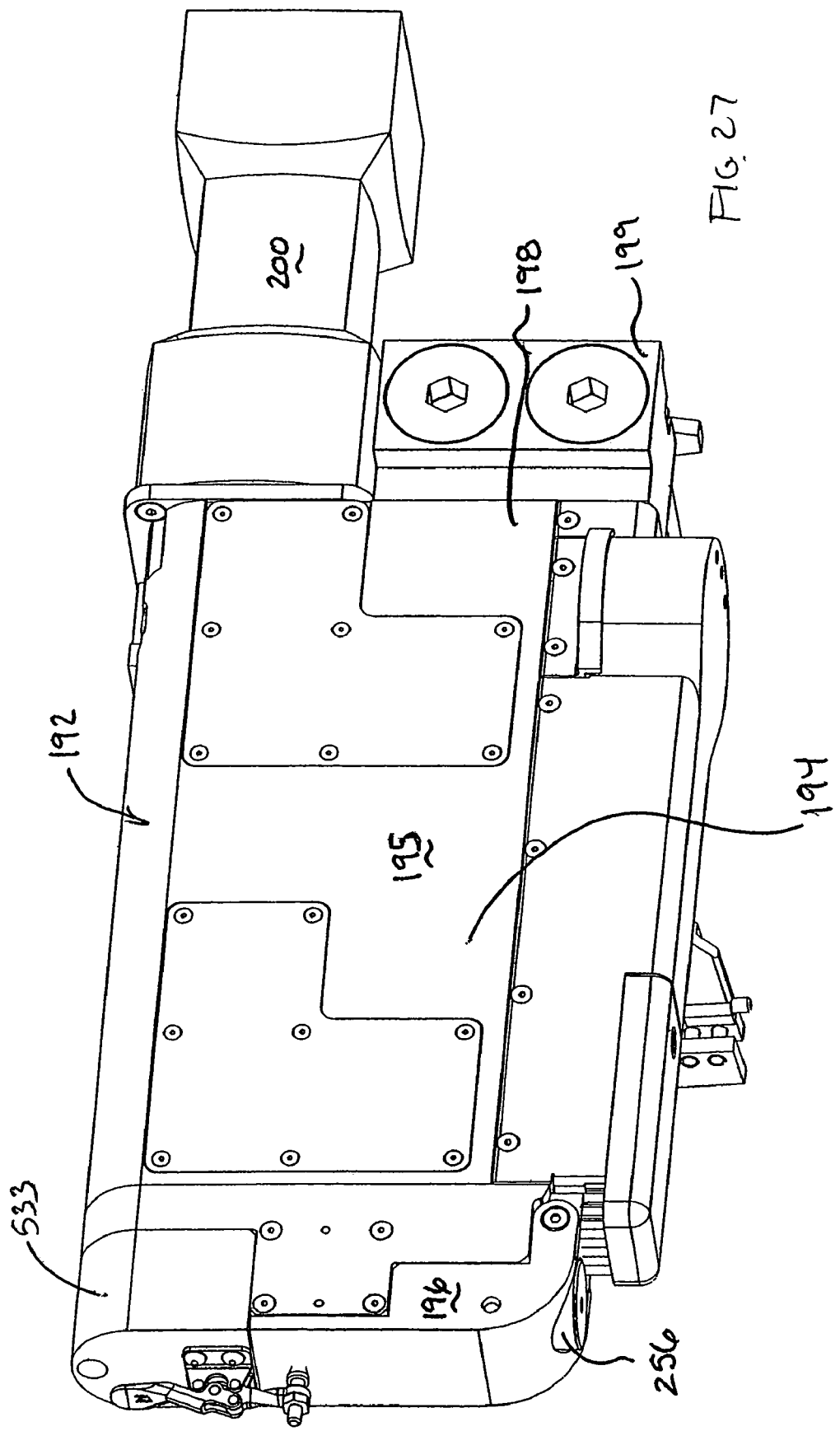
FIG. 27 shows a view of a dispensing apparatus with cleaning member.

FIG. 11 shows an overall schematic view of the display, controls and power distribution for a preferred foam-in-bag dispenser embodiment which provides for coordinated activity amongst the various sub-assemblies like that shown in the foam-in-bag dispenser of FIGS. 26 to 28. The present invention preferably comprises an electrical package comprised of two board assemblies, the main control board and an operator interface. The boards are interlinked via a single shielded cable, which can be, for example, separated up to 8 feet.

Figure 34:
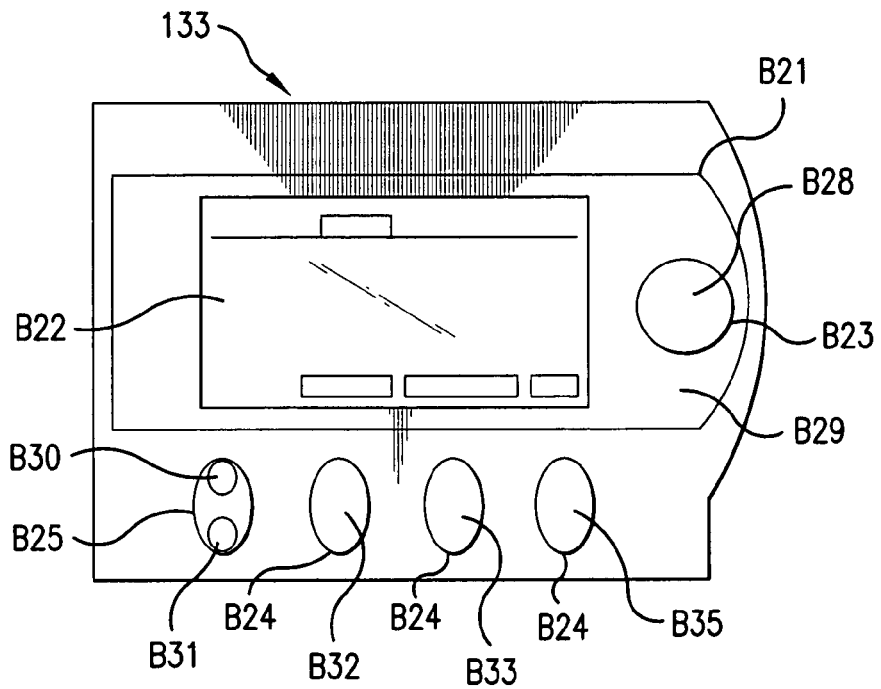
FIG. 34 shows a Display/Control Panel having ergonomically designed buttons.

The operator interface includes an LCD display, keypad, control board and enclosure as shown in FIGS. 34 and 40. The operator interface 133 can be separated from the bag machine via a single shielded umbilical cord. Because the operator interface can be a separate item from the rest of the machine, different interfaces can be either separate or integrated. The display panel with button control 63 in FIG. 18 is an example and is preferably pivtoably attached to the front of the dispenser and provides for both control of dispenser system and initiating other functions such as remote access via a modem or the like to a service provider FIG. 34 illustrates a preferred embodiment of a Display Control Panel B21 which employs the ergonomically improved buttons B24, B25 of the present invention. The Display/Control Panel B21 refers to a relatively small satellite enclosure that can be attached to a machine (see FIG. 40). The Display/Control Panel B21 includes a system display B22, a rotary/pushbutton switch B23 that ties in to the display, and at least one oblong push button (button) B24, B25. Each button B24, B25 can be labeled with one character (represented by button B24) or more than one character (represented by button B25) with each character corresponding to a particular command. The characters correspond to any desired command such as commands for adjusting the height of the machine (e.g., "+" B30 for raising the machine and "−" B31 for lowering the machine), turning the machine on or off, beginning a function of the machine B32, ending or canceling a function of the machine B33, requesting help B35, etc.

Preferably, each oblong push button B24, B25 is made of silicone rubber, having carbon pills (not shown), which are mounted on top of a pc board. The buttons B24, B25 are preferably made of different (function differentiality) colors and labeled with a character by any well known manner. Moreover, the character should be easily readable by the operator and preferably 9-15 point font. Each button B24, B25 fits through holes formed in an injection molded cover. Each button B24, B25, which can be made of, for example, Dura Switch™ switch technology (reference is made to U.S. Pat. No. 5,666,096, incorporated herein by reference), which is consistent over the entire surface of the button B24, B25. Hence, it does not matter if the operator misses the center of the button B24, B25, actuation still occurs.

Figure 35:
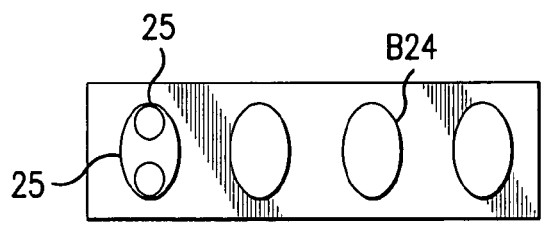
FIG. 35 shows the ergonomically designed oblong push buttons with their support plate.
Figure 45:
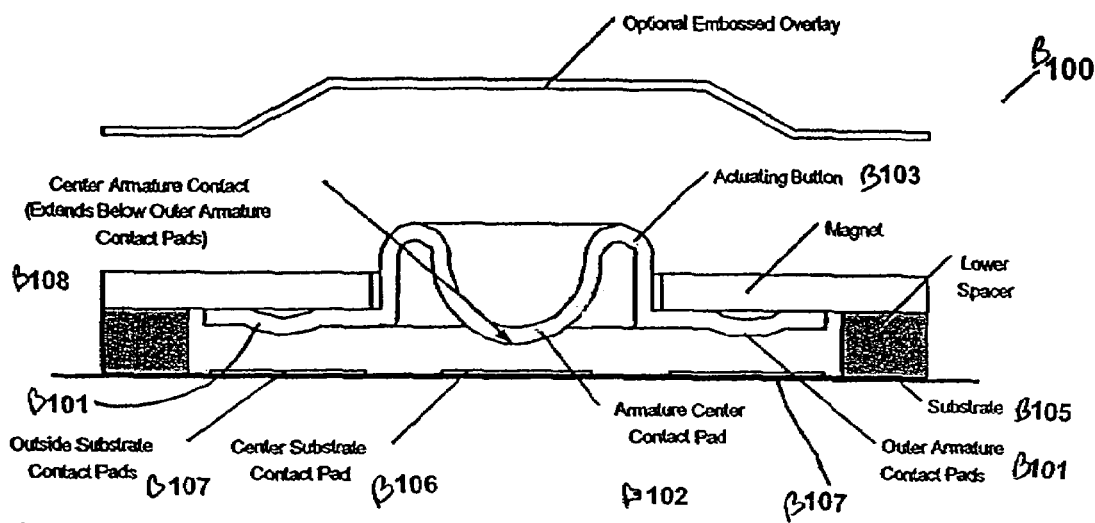
FIGS. 45 and 46 show a schematic illustration of a switch in non-contact/contact modes featuring a multi-directional armature that is held in place magnetically.
Figure 46:
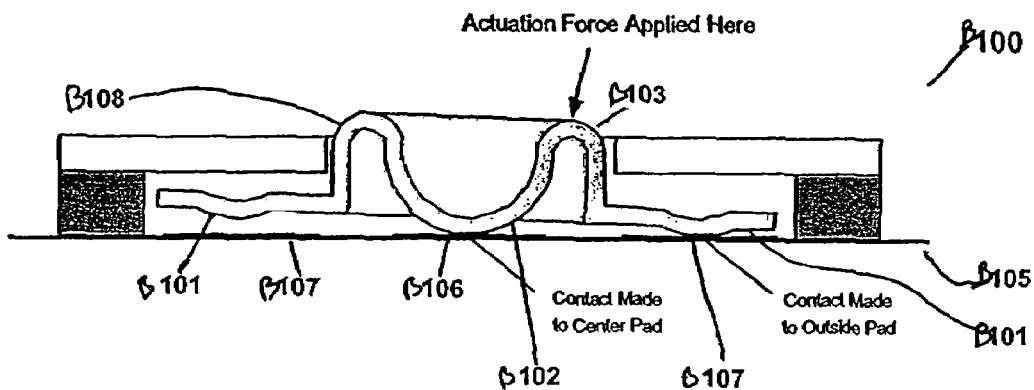

FIG. 35 shows a schematic representation of the buttons B24, B25 of the Display/Control Panel B21 of FIG. 34. As shown in FIG. 35, the buttons B24, B25 are oblong in the vertical direction. Preferably each button B24, B25 is oval-shaped (ellipsoid). Buttons B24, B25 can be of a variety of elongated shapes although, as explained above and below, the elongated dimensions, with a preferred embodiment featuring a DuraSwitch™ switch of DuraSwitch Industries, Inc. of Mesa, Ariz., which is represented in FIGS. 45 and 46 herein.

Figure 36:
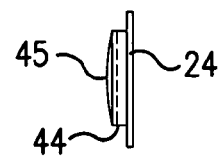
FIG. 36 shows an end elevational view of one of the ergonomically oblong push buttons shown in FIG. 35 which corresponds to a single command.

FIG. 36 shows a side view of one of the ergonomically improved oblong push buttons B24 shown in FIG. 35 which corresponds to a single command. As shown in FIG. 36, each button B24 has a cylindrical base B44, which preferably protrudes from the pc board on which the button B24 is mounted between, and a convex top portion B45 which further protrudes from the cylindrical base B44. The convex top portion B45 is actuated by the operator when the particular command to which the button B24 corresponds is desired. The button B24 is actuated by being compressed by the operator, e.g., by the operator's finger. After the button B24 is compressed and the operator's finger has been removed, the button B24 quickly returns to its original shape.

Figure 37:
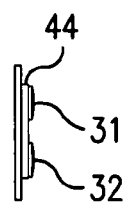
FIG. 37 shows an end elevational view of one of the ergonomically oblong push buttons shown in FIG. 35 which corresponds to more than one command.

As shown in FIG. 37, a button B25 can also be designed such that it corresponds to two functions, such as for raising B30 and lowering B31 of the bag assembly relative to the base of the machine. As shown in FIG. 37, the button B25 has a cylindrical base B44 which protrudes from its support base. The raising B30 and lowering B31 command portions of the button B25 are separated from each other and protrude from the cylindrical base B44 convexly. The raising B30 and lowering B31 commands are preferably round or compressed oval (ellipsoid) in shape. The oval buttons' focal point on the maximum radius is preferably 60-90%, more preferably 70-90%, more preferably 70-85%, the length of the maximum radius. The raising B30 and lowering B31 command portions are actuated by being compressed by the operator, e.g., by the operator's finger. Despite having the multiple functions, a preferred embodiment has this button with raising and lowering functions of the same size as the adjacent single function buttons on the same panel. After the raising B30 or lowering B31 command portions are compressed and the operator's finger has been removed, the command portion quickly returns to its original shape.

Figure 38:
FIG. 38 shows a top plan view of the ergonomically improved buttons shown in FIG. 35.

FIG. 38 illustrates a side view of the buttons shown schematically in FIG. 35. As seen the film cancel and help signals protrude out from the support board to a greater extent. As noted above, during the bag forming operation, operator speed can be of importance both between bag forming cycles and during the same.

FIG. 42 illustrates a preferred embodiment of a Bag-Making Interface B11 which employs the ergonomically improved oblong push buttons (button) B12 of the present invention. The Bag Making Interface B11 refers to the grouping of buttons B12 that the operator pushes to call for a bag in a foam-in-bag dispensing system (such as one dispensing shot of polyurethane mix to a bag being formed by the system and which foam expands inside the bag for use in, for example, the area of protective packaging). Preferably, the Bag Making Interface B11 includes at least one oblong push button B12. Each oblong push button B12 can be labeled with a character (B13) which corresponds to a particular command. For example, the Bag Making Interface B11 can include a first grouping of seven oblong push buttons B12 with each being labeled with a character(s) B13 which corresponds to a particular bag size (e.g., XXS B14, XS B15, S B16, M B17, L B18, XL B19, and XXL B20). The first group of oblong push buttons B12 can also be framed by a demarcated (i.e., elevated) rectangular area B51. The size of each elevated rectangular area B51 differing from the sizes of the elevated rectangular areas B51 of the other oblong push buttons B12 to facilitate rapid operator recognition by added visual indicia. Moreover, the size of each elevated rectangular area B51 should preferably correspond to the size of bag which corresponds to the character B13 on each oblong push button B12 corresponding to a bag size to provide an alternate means for rapid recognition. (e.g., vertical length ratio wise or a sufficient demarcation in a length attribute of the button to clearly convey different bag length.) The Bag Making Interface B11 can also include a second group of oblong push buttons B12 that are labeled with a character(s) that corresponds to other commands necessary for making bags (in this preferred foam-in-bag system example) such as a continuous bag making command. For example, a button B12 in the second group of buttons can be labeled with a character (e.g. "*" B21) which corresponds to a continuous bag making command.

FIG. 43 shows a schematic representation of the button B12 of the Bag Making Interface B11 of FIG. 42. As shown in FIG. 43, the buttons B12 are oblong in the vertical direction. Preferably each button B12 is oval-shaped. As discussed above, the size of each elevated rectangular area B51 differs from the sizes of the elevated rectangular areas B51 of the other buttons B12. In other words, the length of the elevated rectangular area B51 of the button B12 labeled "XXS" is shorter than the length of the elevated rectangular area B51 of the button B12 labeled "XS" B15, which in turn is shorter than the length of the elevated rectangular area B51 of the button B12 labeled "S" B15 and so on.

FIG. 44 shows a side view of one of the buttons B12 shown in FIG. 43. As shown in FIG. 44, each button B12 has a cylindrical base 44 which corresponds to the elevated rectangular area B51, which preferably protrudes from the pc board on which the button B12 is mounted. Each button also has a convex top portion B45 which further protrudes from the elevated rectangular area B51.

FIG. 41 illustrates a side view of the buttons shown schematically in FIG. 43.

FIG. 40 shows an example of a bag making machine B131. The bag making machine employs a Display/Control Panel B133 and a Bag Making Interface B132. Preferably, the Bag Making Interface B132 is located on the front cover of the bag making machine B131. This is directly above the place where the bags (not shown) exit the bag making machine B131, and is the location that the operator will normally be facing. This places the Bag Making Interface B132 in a helpful location for operator usage in the preferred foam-in-bag setting. In contrast, the bag making buttons on a common conventional system are located on the display box, which is located on the far right side of the machine. This forces the operator to turn away from the work zone and twist to locate and push the tiny bag buttons. In addition, the Display/Control Panel B133 is preferably attached to the right side of the bag making machine B131 (as viewed from the front). Hence, the Display/Control Panel B133 is also in the location that the operator will normally be facing.

Control panel B133 shown mounted in the control area to the right side of bag forming components and dispenser of the foam-in-bag device shown in FIG. 40 and mounted on the fixed frame structure and to the right of the bag forming display panel B132 positioned within 6 inches of the nip roller set or means for drawing film through the foam-in-bag dispenser B131. Shown control panel B133 includes a height of bagger-dispenser BD which is implemented by a drive system associated with the liftable stand (e.g., telescoping) BST. This button B25 provides for a lifting or lowering of the bagger system to accommodate different height usages. There is also provided a menu/adjust button B26 which is shown circular rather than oval and of larger dimensions and which can be repeatedly pushed and/or twisted (preferable both pushed and twisted) to cycle through menu selection. Amongst these options include the option of receiving and/or sending data of systems parameters via an internet link (e.g., modem or wireless) such as in accordance with U.S. patent application No. 60/468,982 filed on May 9, 2003, entitled Foam-In-Bag Dispenser System with Internet Connection.

FIGS. 45 and 46 show a schematic illustration of a switch in non-contact/contact modes featuring a multi-directional armature that is held in place magnetically made by DuraSwitch Industries, Inc. FIG. 45a shows the armature B108 in non-contact (unactuated) mode while FIG. 46 shows the armature B108 in contact (actuated) mode. The armature B108, with inner contact pad B102 and outer contact pads B101 and actuating button B103, is stamped as a single piece part. Note that the inner contact pad B102 extends below the outer pads B101. The switch B100 is normally actuated along the edge of the actuating button B103 formed at the top of the armature B108. The outer armature contact pads B101 are formed downward and toward the edge of the armature B108 and, depending on the application, are formed either as discrete contact pads or as a continuous ridge extending around the perimeter of the armature.

A substrate B105 containing electrical contacts B106, B107 on its upper surface is show at the base of the assembly. These contacts B106, B107 are arranged in various configurations about the top surface of the substrate B105. The actual array depends on the desired directional function. These range from individual discrete contact pads, arranged in a circular array to a continuous analog variable resistor or voltage divider. With individual discrete contact pads, the specific switch output is defined directly by the set(s) of contact pads bridged by the armature. A comparator circuit or an analog-to-digital converter in a microprocessor determines switch position when an analog resistance output is used. The latter provides an unlimited number of switch locations.

Actuation is achieved by depressing the armature B108 at any desired position on top of the actuating button B103. When the armature 108 is depressed, as shown in FIG. 5b, the armature contact pads B101, B102 contact both the center electrical contact B106 and the outer electrical contacts B107. The outer electrical contacts B107 pad on the substrate B105 determines the specific switch to be actuated.

Software or programmed hardware for monitoring, for example, chemical parameters is preferably included with examples provided below (noting the processor and FPGA exchange described above as one example of a preferred processor/sub-system interrelationship):

Recorded Shot (dispensed chemical) Data: 1) A and B temperatures 2) A and B pressures 3) Time and date 4) A and B amounts dispensed PC Programmable Variables: 1) A and B ratio 2) A and B specific gravities 3)

User interface menus on/off Shot History: Last 300 shots. download via PC.

The shot history allows the operator to monitor and keep track of usage of the noted sub-system (with similar possibilities for other sub-systems such as those illustrated in FIG. 11).

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A method for providing remote monitoring of a foam dispenser device, the method comprising:
    connecting to the foam dispenser device for purposes of data communication, and wherein said foam dispenser device is a foam-in-bag dispensing device comprising a chemical shot output mixing assembly, a bag forming assembly, a film advance device and an upstream film tensioner device; and
    receiving data from the foam dispenser device with means for receiving data from said foam dispenser device, which data includes;
    a) film advance and film tensioning correlation data derived from compared operation characteristics of each of said film advance device and said upstream film tensioner device, and which correlation data provides a source for film supply condition information as to a film supply used in a bag forming assembly of said dispenser device, and
    b) data as to a number of dispenser chemical output shots; and said method further including
    receiving from said dispenser device a request for resupply of film for the foam dispenser device, which request for resupply is based, at least in part, on data involving a).

2. The method of claim 1, further comprising the step of:
    acquiring performance data from the foam dispenser device; and
    generating a report from the performance data concerning a).

3. The method of claim 1, further comprising the step of: downloading software to the foam dispenser device.

4. The method of claim 1, wherein the step of receiving data in a) further comprises
    receiving film advance and film tensioning correlation data indicative of a real time film run out situation as the film supply condition information.

5. The method of claim 1 wherein the step of receiving data in a) further comprises receiving;
    film advance and film tensioning correlation data indicative of a film jam situation as the film supply condition information.

6. The method of claim 1 further comprising forwarding a help condition signal to means for receiving a help condition signal, which means for receiving a help condition signal receives a help condition signal based on a sensing of system parameter deviation from a norm value or values relative to a closed loop sensing system associated with the dispensing device.

7. The method of claim 1 wherein said step of receiving data from said foam dispenser device includes communication of data to a service computer which service computer is remote from said dispenser device.

8. The method of claim 1 wherein said means for receiving data from the foam dispenser device includes component location data from said dispenser device which involves a).

9. The method of claim 1 wherein there are a plurality of foam dispenser devices and a plurality of service computers associated with said foam dispenser devices, and said method includes having said plurality of foam dispenser devices and service computers interfacing with a common network that enables data stream communication amongst said foam dispenser devices and service computers, and wherein whether or not activity is carried by one or more of said foam dispenser devices and service computers is based on data characteristics relative to the data stream being transferred on said common network and received on a network interface of said foam dispenser devices and computers.

10. The method of claim 4, further comprising the step of receiving an indication of a help condition and wherein said request for resupply is forwarded in conjunction with the step of receiving an indication of a help condition and wherein said receipt of said indication of a help condition is located at a location remote from the foam dispensing device being monitored.

11. The method of claim 4, further comprising the step of receiving an indication of a help condition and wherein said help condition is a film resupply need status condition that is based upon a monitoring of current film supply level relative to a preset film supply need criteria.

12. The method of claim 1, further comprising the step of determining a film level suited for a resupply need that includes a review of past history usage of said dispenser device.

13. The method of claim 12, wherein the review of past history includes a review of foam shot output by said dispenser device.

14. The method of claim 8, wherein said location data includes location data relative to a driving component of said film tension device.

15. The method of claim 1, further comprising a step of receiving an indication of a help condition wherein said indication of a help condition is an indication of a film resupply need in a foam-in-bag dispenser device generated by a user of the dispenser device and forwarded to a remote supply monitoring location.

16. The method of claim 1 wherein the request for resupply is based on a historical comparison between said output shot data and said film advance and film tensioning correlation data.

17. An apparatus for providing remote monitoring of a foam dispenser device that is a foam-in-bag dispensing device comprising a chemical shot output mixing assembly, a bag forming assembly, a film advance device and an upstream film tensioner device, comprising:
means for connecting to the foam dispenser device; and
means for receiving data from the foam dispenser device, which data includes:
a) film advance and film tensioning correlation data derived from compared operation characteristics of each of said film advance device and said upstream film tensioner device, and which correlation data provides a source of film supply level information as to a film supply used in the bag forming assembly of said dispenser device, and
b) data that involves a number of dispenser chemical output shots, and
wherein said means for receiving data from the foam dispenser device receives a request for a resupply of film for the foam dispenser device that is based on data concerning the number of chemical output shots for a prior run period of said dispenser device.

18. The apparatus of claim 17, further comprising:
means for acquiring performance data from the foam dispenser device; and
means for generating a report from the performance data concerning a).

19. The apparatus of claim 17, further comprising:
means for downloading software to the foam dispenser device.

20. The apparatus of claim 17 wherein said means for receiving data from the foam dispensing device includes a service location remotely located from said dispensing device.

21. The apparatus of claim 17 wherein there are a plurality of foam dispenser devices and a plurality of service computers associated with said foam dispenser devices, said plurality of foam dispenser devices and service computers interfacing with a common network that enables data stream communication amongst said foam dispenser devices and service computers, and wherein whether or not activity is carried by one or more of said foam dispenser devices and service computers is based on data characteristics relative to the data stream being transferred on said common network and received on a network interface of said foam dispenser devices and computers.

22. The method of claim 17, wherein the request for resupply of film based on a number of dispenser chemical output shots includes a historical comparison between data of a) and b).

23. The apparatus of claim 17, further comprising means for receiving an indication of a help condition and wherein said means for receiving an indication of a help condition receives an indication of a help condition based on data generated in a).

24. The apparatus of claim 23, further comprising means for receiving an indication of a help condition which comprises a remotely located service computer.

25. The apparatus of claim 23, wherein said means for receiving an indication of a help condition receives an indication of a help condition in the form of a resupply request, and said resupply request is based on data derived from a) that includes consideration of current film level data with past history usage data of film by said dispenser device.

26. The apparatus of claim 25, wherein said past history usage data includes dispenser foam shot output data.

27. The apparatus of claim 17, wherein said means for receiving data from the foam dispenser device includes component location data from said dispensing device.

28. The apparatus of claim 27, wherein said location data includes location data relative to a driving component of said film tensioner device.

29. The apparatus of claim 17, further comprising means for receiving an indication of a help condition and wherein said indication of a help condition is an indication of a film resupply need in a foam-in-bag dispenser device generated by a user of the dispenser device and forwarded to a remote supply monitoring location.

* * * * *